United States Patent
Ashrafi

(10) Patent No.: US 11,170,318 B2
(45) Date of Patent: Nov. 9, 2021

(54) MULTI-PHOTON, MULTI-DIMENSIONAL HYPER-ENTANGLEMENT USING HIGHER-ORDER RADIX QUDITS WITH APPLICATIONS TO QUANTUM COMPUTING, QKD AND QUANTUM TELEPORTATION

(71) Applicant: NXGEN PARTNERS IP, LLC, Dallas, TX (US)

(72) Inventor: Solyman Ashrafi, Plano, TX (US)

(73) Assignee: NXGEN PARTNERS IP, LLC, Dallas, TX (US)

( * ) Notice: Subject to any disclaimer, the term of this patent is extended or adjusted under 35 U.S.C. 154(b) by 0 days.

(21) Appl. No.: 15/931,019

(22) Filed: May 13, 2020

(65) Prior Publication Data
US 2021/0133614 A1    May 6, 2021

Related U.S. Application Data

(60) Provisional application No. 62/928,869, filed on Oct. 31, 2019.

(51) Int. Cl.
| | | |
|---|---|---|
| *G02F 1/39* | (2006.01) | |
| *G06N 10/00* | (2019.01) | |
| *G02F 3/00* | (2006.01) | |

(52) U.S. Cl.
CPC ............ *G06N 10/00* (2019.01); *G02F 3/00* (2013.01)

(58) Field of Classification Search
CPC .................. G06N 10/00; G02F 3/00

USPC ........................................... 359/107
See application file for complete search history.

(56) References Cited

U.S. PATENT DOCUMENTS

| | | | |
|---|---|---|---|
| 10,708,046 B1 | 7/2020 | Ashrafi | |
| 2007/0145271 A1* | 6/2007 | Beausoleil | B82Y 10/00 250/316.1 |
| 2014/0218747 A1* | 8/2014 | Wong | G02F 1/39 356/491 |
| 2020/0050959 A1 | 2/2020 | Ashrafi | |
| 2020/0118026 A1 | 4/2020 | Ashrafi | |
| 2020/0119435 A1 | 4/2020 | Ashrafi | |

FOREIGN PATENT DOCUMENTS

WO    WO-2019104426 A1 *  6/2019  ............. B82Y 20/00

OTHER PUBLICATIONS

"A Radix-4 Chrestenson Gate for Optical Quantum Computation" by Smith et al, 2018 IEEE 48th International Symposium on Multiple Value Logic, May 16-18, 2018 (Year: 2018).*

(Continued)

*Primary Examiner* — Audrey Y Chang

(57) ABSTRACT

A system for use with quantum system comprises a light source for generating a first light beam, wherein the first light beam is modulated by a data stream. Entanglement circuitry receives the first light beam from the light source and generates at least two second light beams responsive to the first light beam. The at least two second light beams are entangled. Multistate photon processing circuitry processes each of the at least two second light beams to apply n-states to photons within the at least two light beams and create hyperentangled qudits, where n is greater than 2.

30 Claims, 98 Drawing Sheets

(56) References Cited

OTHER PUBLICATIONS

"Quantum entanglement of the spin and orbit angular momentum of photons using metamaterials" Stav et al, Science 361,1101-1104, Sep. 2018, (Year: 2018).*
"Multidimensional QKD Based on Combined Orbital and Spin Angular Momenta on Photon" by Djordjevic, IEEE Photonics Journal, vol. 5, No. 6, Dec. 2013. (Year: 2013).*
"Proposed optical realisation of a two photon four-qubit entangled xstate" by Ritboon et al, Journal of Optics 19, (2017) (Year: 2017).*
Frank Arute, Google. "Quantum supremacy using a programmable superconducting processor," Nature, vol. 574, Oct. 24, 2019.
A. Calafell, "Quantum computing with graphene plasmons," npj Quantum Information, May 2019.
M. Beijersbergen, et al. "Astigmatic laser mode converters and transfer of orbital angular momentum," Opt. Comm. 96, 1993.
M. Lavery, et al. "Refractive Elements for the Measurement of the Orbital Angular Momentum of a Single Photon," Opt. Express 20, 2012.
S. Ashrafi, et al. "Recent advances in high-capacity free-space optical and radio-frequency communications using orbital angular momentum multiplexing," Royal Society Publishing, Phil. Trans. R. Soc. A375:20150439, Oct. 13, 2016.
S. Ashrafi, et al. "Performance Metrics and Design Considerations for an FSO Communications Link Based on Multiplexing of Multiple Orbital-Angular-Momentum Beams," Globecom2014 OWC Workshop, 2014.
S. Ashrafi, et al. "Optical Communications Using Orbital Angular Momentum Beams," Adv. Opt. Photon. 7, 66-106, Advances in Optics and Photonic, 2015.
S. Ashrafi, et al., Invited Article: "Division and multiplication of the state order for data-carrying orbital angular momentum beams," APL Photonics 1, Sep. 8, 2002; https://doi.org/10.1063/1.4968838; 2016.
S. Ashrafi, et al. "Performance Enhancement of an Orbital-Angular-Momentum-Based Free-Space Optical Communication Link through Beam Divergence Controlling," OSA, 2015.
S. Ashrafi, et al. "Link Analysis of Using Hermite-Gaussian Modes for Transmitting Multiple Channels in a Free-Space Optical Communication System," the Optical Society, vol. 2, No. 4, Apr. 2015.
S. Ashrafi, et al. "Performance Metrics and Design Considerations for a Free-Space Optical Orbital-Angular-Momentum-Multiplexed Communication Link," OSA, vol. 2, No. 4, Apr. 2015.
S. Ashrafi, et al. "Demonstration of Distance Emulation for an Orbital-Angular-Momentum Beam," OSA, 2015.
S. Ashrafi, et al. "Free-Space Optical Communications Using Orbital-Angular-Momentum Multiplexing Combined with MIMO-Based Spatial Multiplexing," Optics Letters, 2015.
S. Ashrafi, et al. "Experimental Demonstration of a 400-Gbit/s Free Space Optical Link Using Multiple Orbital-Angular-Momentum Beams with Higher Order Radial Indices," OSA, 2015.
S. Ashrafi, et al. "400-Gbit/s Free-Space Optical Communications Link Over 120-meter Using Multiplexing of 4 Collocated Orbital-Angular-Momentum Beams," OSA, 2015.
S. Ashrafi, et al. "Orbital and Angular Momentum Multiplexed Free Space Optical Communication Link Using Transmitter Lenses," Applied Optics, vol. 55, No. 8, Mar. 2016.
S. Ashrafi, et al. "Experimental Characterization of a 400 GBit/s Orbital Angular Momentum Multiplexed Free Space Optical Link Over 120 m," Optics Letters, 2016.
S. Ashrafi, et al. "Demonstration of OAM-based MIMO FSO link using spatial diversity and MIMO equalization for turbulence mitigation," Optical Fiber Conf, OSA 2016.
S. Ashrafi, et al. "Exploiting the Unique Intensity Gradient of an OAM Beam for Accurate Receiver Alignment Monitoring in Free-Space Communication Link," Ecoc 2015—ID: 066.
S. Ashrafi, et al. "Dividing and Multiplying the Mode Order for OAM Beams," Ecoc 2015—ID: 0716.
S. Ashrafi, et al. "Demonstration of Using Passive Integrated Phase Masks to Generate OAM Beams in a Communications Link," CIEO: OSA 2016.
S. Ashrafi, et al. "Orbital angular momentum multiplexed free space optical communication link using transmitter lenses," Applied Optics, vol. 55, No. 8, Mar. 2016.
S. Ashrafi, et al. "Free space optical communications link using orbital angular momentum multiplexing combined with MIMO-based spatial multiplexing," Optic Letters, vol. 40, Vo. 18 Sep. 2015.
S. Ashrafi, et al. "4 Gbit/s Underwater Optical Transmission Using OAM Multiplexing and Directly Modulated Green Laser," OSA 2016.
S. Ashrafi, et al. "Experimental demonstration of enhanced spectral efficiency of 1.18 symbols/s/Hz using multiple-layer-overlay modulation for QPSK over a 14-km fiber link," OSA 2014.
S. Ashrafi, et al. "Experimental Demonstration of Two-Mode 16-Gbit/s Free-Space mm-Wave Communications Link Using Thin Metamaterial Plates to Generate Orbital Angular Momentum Beams," Optica, vol. 1, No. 6, Dec. 2014.
S. Ashrafi, et al. "Demonstration of an Obstruction-Tolerant Millimeter-Wave Free-Space Communications Link of Two 1-Gbaud 16-QAM Channels using Bessel Beams Containing Orbital Angular Momentum," (ICOAM), Aug. 2015.
S. Ashrafi, et al. "Patch Antenna Array for the Generation of Millimeter-wave Hermite-Gaussian Beams," IEEE Antennas and Wireless Propagation Letters, vol. 15, 2016.
S. Ashrafi, et al. "A Dual-Channel 60GHz Communications Link Using Patch Antenna Arrays to Generate Data Carrying OAM Beams," IEEE ICC 2016—Wireless Communications Symposium.
S. Ashrafi, et al. "Experimental demonstration of 16 Gbit/s millimeter-wave communications using MIMO processing of 2 OAM Modes of Each of 2 Transmitter/Receiver Antenna Apertures," Wireless Communications Symposium, Globecom 2014.
S. Ashrafi, et al. "32 Gbps/60 GHz millimeter wave wireless communication using orbital angular momentum and polarization multiplexing," IEEE, ICC 2016 Wireless Symposium.
S. Ashrafi, et al. "Physical phase plate for the generation of a millimeter-wave Hermite-Gaussian Beam," IEEE 2016.

* cited by examiner

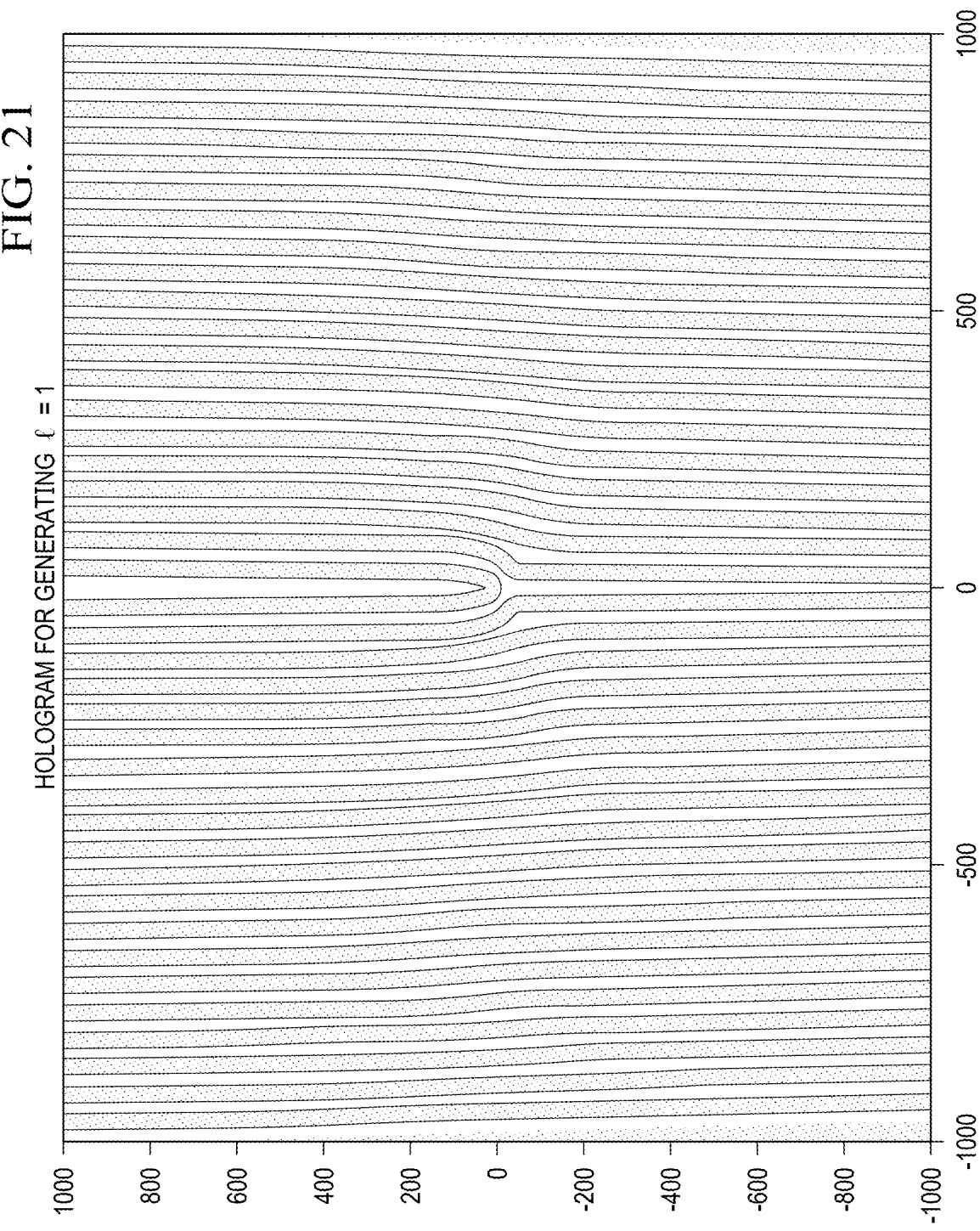

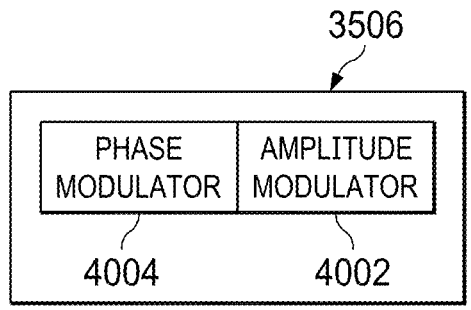
FIG. 40
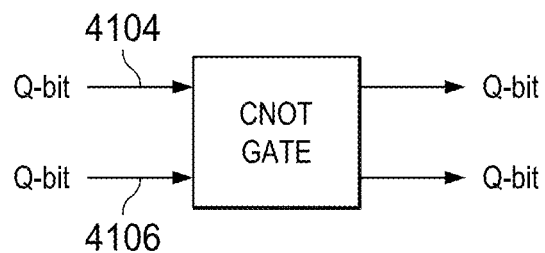
FIG. 41
| BEFORE | | AFTER | |
|---|---|---|---|
| CONTROL | TARGET | CONTROL | TARGET |
| $|0\rangle$ | $|0\rangle$ | $|0\rangle$ | $|0\rangle$ |
| $|0\rangle$ | $|1\rangle$ | $|0\rangle$ | $|1\rangle$ |
| $|0\rangle$ | $|0\rangle$ | $|1\rangle$ | $|1\rangle$ |
| $|0\rangle$ | $|1\rangle$ | $|1\rangle$ | $|0\rangle$ |
FIG. 42

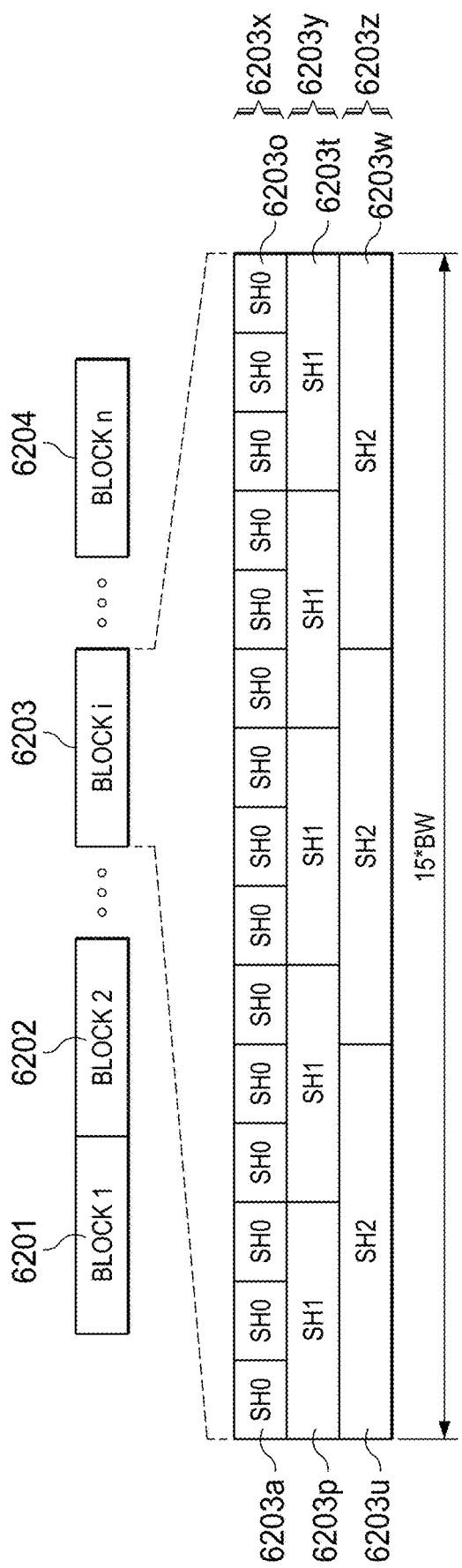
FIG. 62
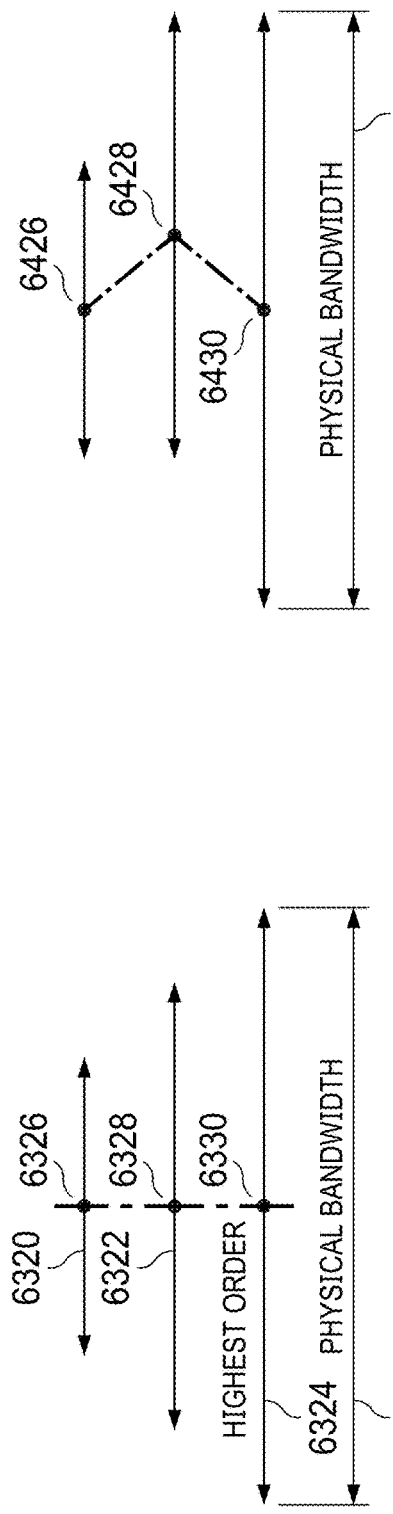
FIG. 64
FIG. 63

|  | SH0 | SH1 | SH2 | SH3 | SH4 | SH5 |
|---|---|---|---|---|---|---|
| SH0 | 1 | 0 | 0 | 0 | 0 | 0 |
| SH1 | 0 | 1 | 0 | 0 | 0 | 0 |
| SH2 | 0 | 0 | 1 | 0 | 0 | 0 |
| SH3 | 0 | 0 | 0 | 1 | 0 | 0 |
| SH4 | 0 | 0 | 0 | 0 | 1 | 0 |
| SH5 | 0 | 0 | 0 | 0 | 0 | 1 |

$$\begin{bmatrix} y_1 \\ y_2 \\ y_3 \end{bmatrix} = \begin{bmatrix} h_{1,1} & h_{1,2} & h_{1,3} & h_{1,4} & h_{1,5} & h_{1,6} & h_{1,7} & h_{1,8} & h_{1,9} & h_{1,10} & h_{1,11} & h_{1,12} & h_{1,13} & h_{1,14} & h_{1,15} \\ h_{2,1} & h_{2,2} & h_{2,3} & h_{2,4} & h_{2,5} & h_{2,6} & h_{2,7} & h_{2,8} & h_{2,9} & h_{2,10} & h_{2,11} & h_{2,12} & h_{2,13} & h_{2,14} & h_{2,15} \\ h_{3,1} & h_{3,2} & h_{3,3} & h_{3,4} & h_{3,5} & h_{3,6} & h_{3,7} & h_{3,8} & h_{3,9} & h_{3,10} & h_{3,11} & h_{3,12} & h_{3,13} & h_{3,14} & h_{3,15} \end{bmatrix} \begin{bmatrix} x_{-2,1} \\ x_{-1,1} \\ x_{0,1} \\ x_{1,1} \\ x_{2,1} \\ x_{-2,2} \\ x_{-1,2} \\ x_{0,2} \\ x_{1,2} \\ x_{2,2} \\ x_{-2,3} \\ x_{-1,3} \\ x_{0,3} \\ x_{1,3} \\ x_{2,3} \end{bmatrix}$$

FIG. 67

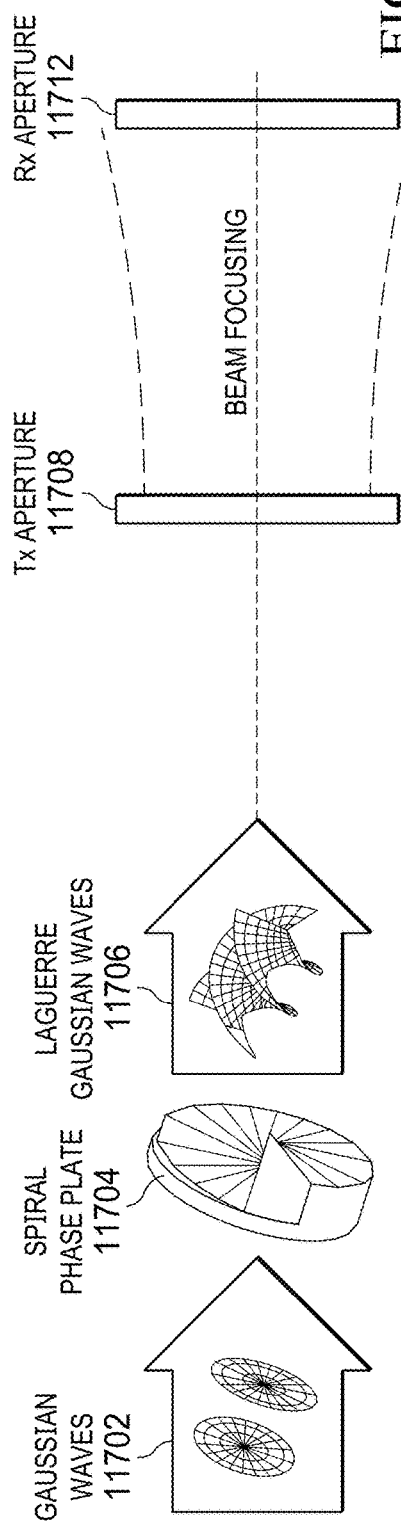
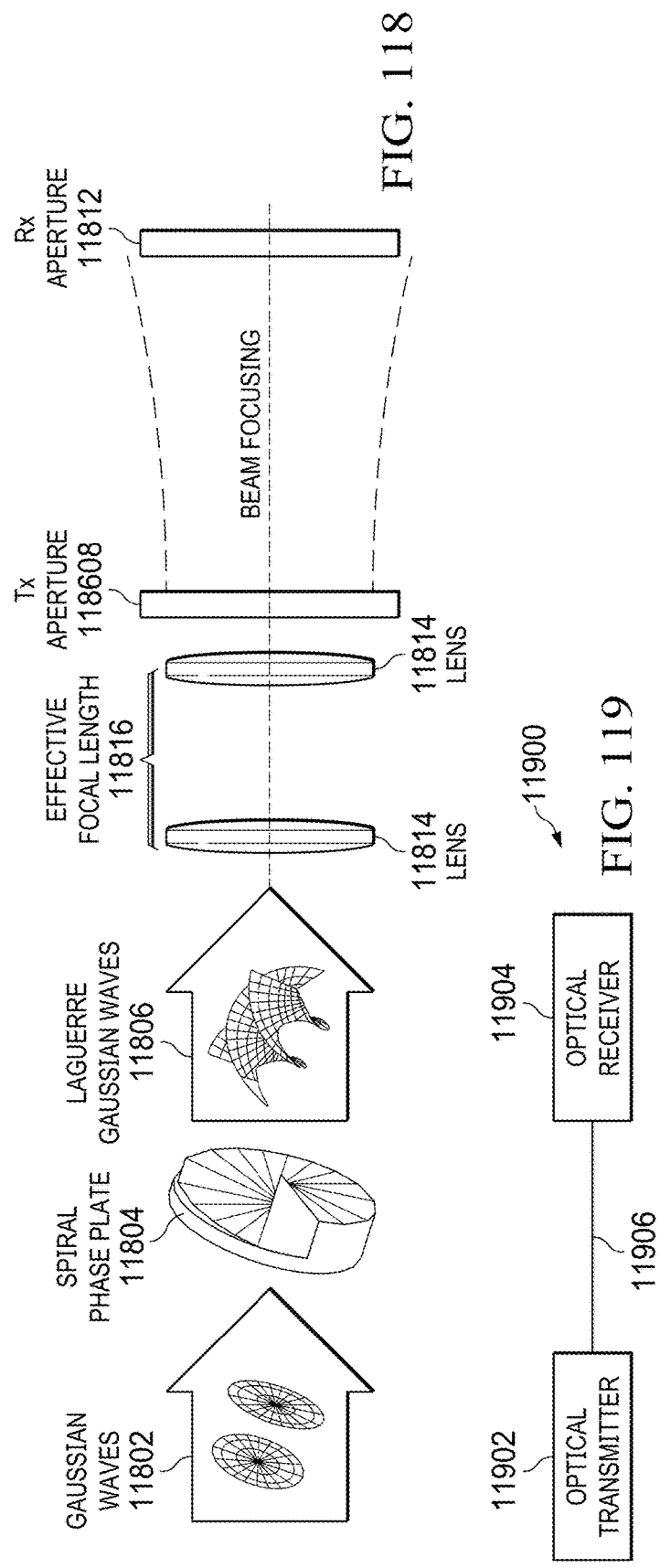
FIG. 117
FIG. 118
FIG. 119

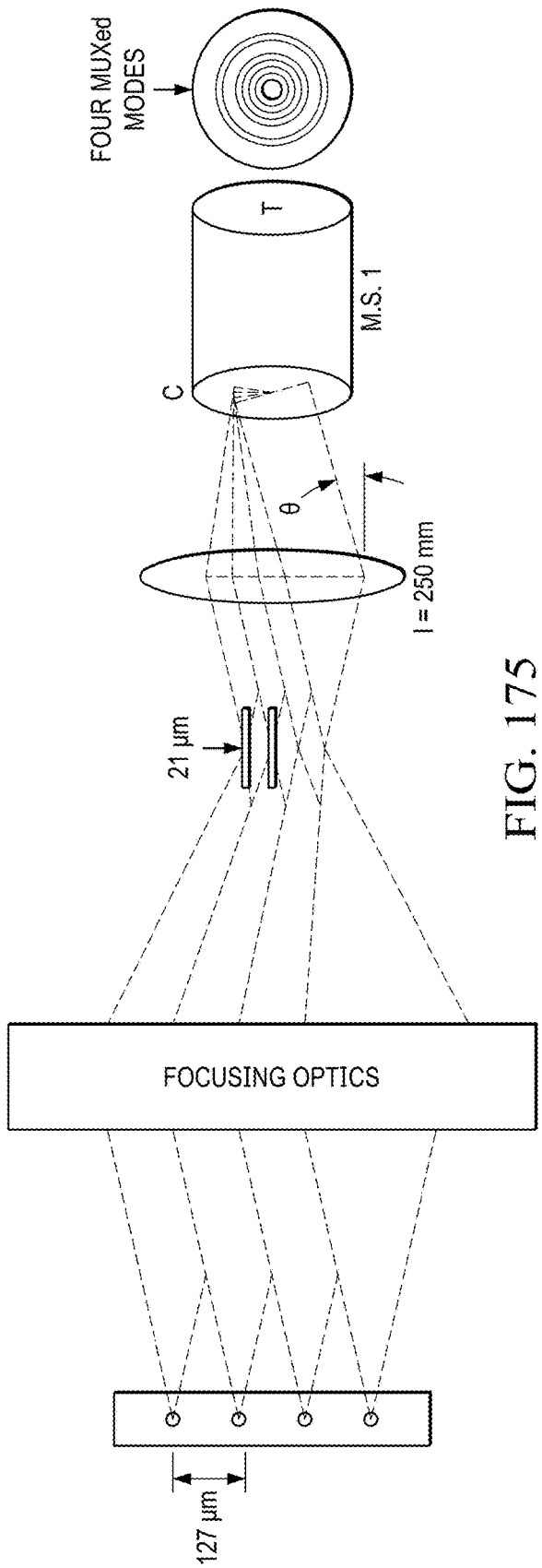
FIG. 175
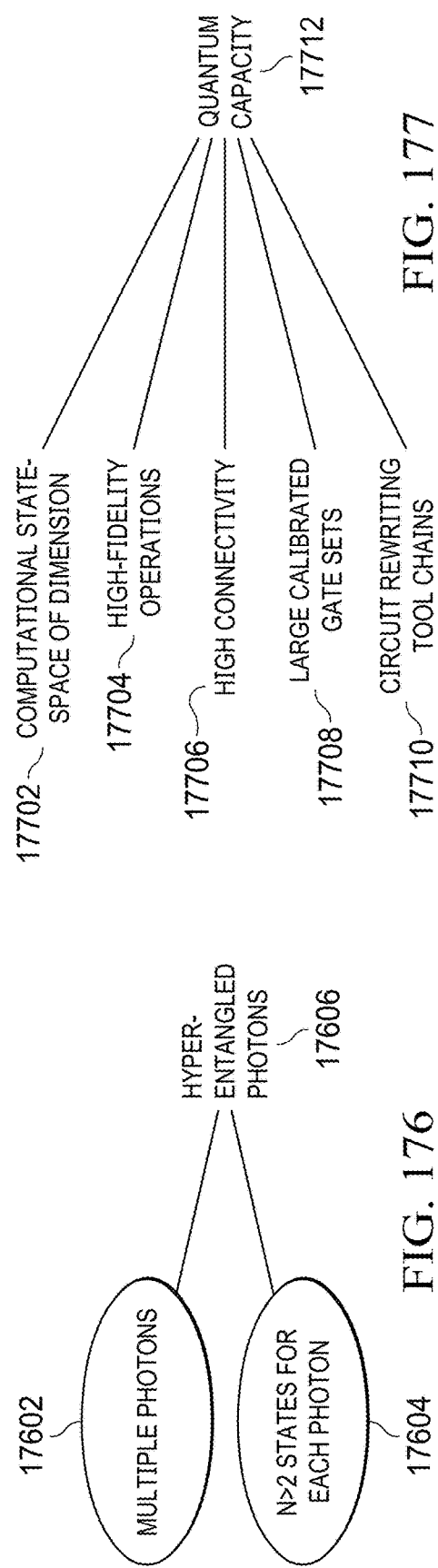
FIG. 177
FIG. 176

MULTI-PHOTON, MULTI-DIMENSIONAL HYPER-ENTANGLEMENT USING HIGHER-ORDER RADIX QUDITS WITH APPLICATIONS TO QUANTUM COMPUTING, QKD AND QUANTUM TELEPORTATION

CROSS-REFERENCE TO RELATED APPLICATIONS

This application claims benefit of U.S. Provisional Application No. 62/928,869, filed Oct. 31, 2019, entitled MULTI-PHOTON, MULTI-DIMENSIONAL HYPER-ENTANGLEMENT USING HIGHER-ORDER RADIX QUDITS WITH APPLICATIONS TO QUANTUM COMPUTING, QKD AND QUANTUM TELEPORTATION, the specifications of which is incorporated by reference herein in its entirety.

TECHNICAL FIELD

The present invention relates to quantum computing system, and more particular to quantum computing systems using multiple photons each having greater than two states associated with the photons.

BACKGROUND

Existing quantum computing techniques utilize techniques that provide much faster processing than classic computer systems. In a quantum computer, the basic unit of information is known as a quantum bit or "qubit." Through quantum mechanical phenomena (superposition and entanglement), these qubits can perform many computations simultaneously in parallel, which theoretically allows the quantum computer to solve a difficult subset of problems much faster than a classical computer. Existing qudit based quantum computers have two states associated with each entangled bit. Existing qudit quantum-based computers also work on an atomic basis that requires specific operating conditions such as very cold temperatures and are susceptible to noise and other types of interference. Thus, some manner for implementing a quantum computer that did not require specialized operating conditions and was less susceptible to interference would be greatly beneficial.

SUMMARY

The present invention, as disclosed and described herein, in one aspect thereof comprise a system for use with quantum system comprises a light source for generating a first light beam, wherein the first light beam is modulated by a data stream. Entanglement circuitry receives the first light beam from the light source and generates at least two second light beams responsive to the first light beam. The at least two second light beams are entangled. Multistate photon processing circuitry processes each of the at least two second light beams to apply n-states to photons within the at least two light beams and create hyperentangled qudits, where n is greater than 2.

BRIEF DESCRIPTION OF THE DRAWINGS

For a more complete understanding, reference is now made to the following description taken in conjunction with the accompanying Drawings in which:

FIG. 21 illustrates a hologram that may be used for modulating a light beam;

FIG. 40 illustrates an E/O modulator;

FIG. 41 illustrates a generalized-CNOT gate;

FIG. 42 illustrates the operation of a CNOT gate on a quantum register consisting of two qubits;

FIG. 62 illustrates a spectral alignment of multiple level overlay signals for differing bandwidths of signals;

FIG. 63-64 illustrate frequency domain envelopes located in separate layers within a same physical bandwidth;

FIG. 67 illustrates a fixed channel matrix;

FIG. 112 illustrates the use of a pilot signal to improve channel impairments;

FIG. 113 is a flowchart illustrating the use of a pilot signal to improve channel impairment;

FIG. 114 illustrates a channel response and the effects of amplifier nonlinearities;

FIG. 115 illustrates the use of QLO in forward and backward channel estimation processes;

FIG. 116 illustrates the manner in which Hermite Gaussian beams and Laguerre Gaussian beams diverge when transmitted from phased array antennas;

FIG. 117 illustrates beam divergence between a transmitting aperture and a receiving aperture;

FIG. 118 illustrates the use of a pair of lenses for reducing beam divergence;

FIG. 119 illustrates the configuration of an optical fiber communication system;

FIG. 120 illustrates the first six modes within a step index fiber;

FIG. 121 illustrates the classes of random perturbations within a fiber;

FIG. 122 illustrates the intensity patterns of first order groups within a vortex fiber;

FIG. 123 illustrates the transmission of four OAM beams over a fiber;

Figure 124:
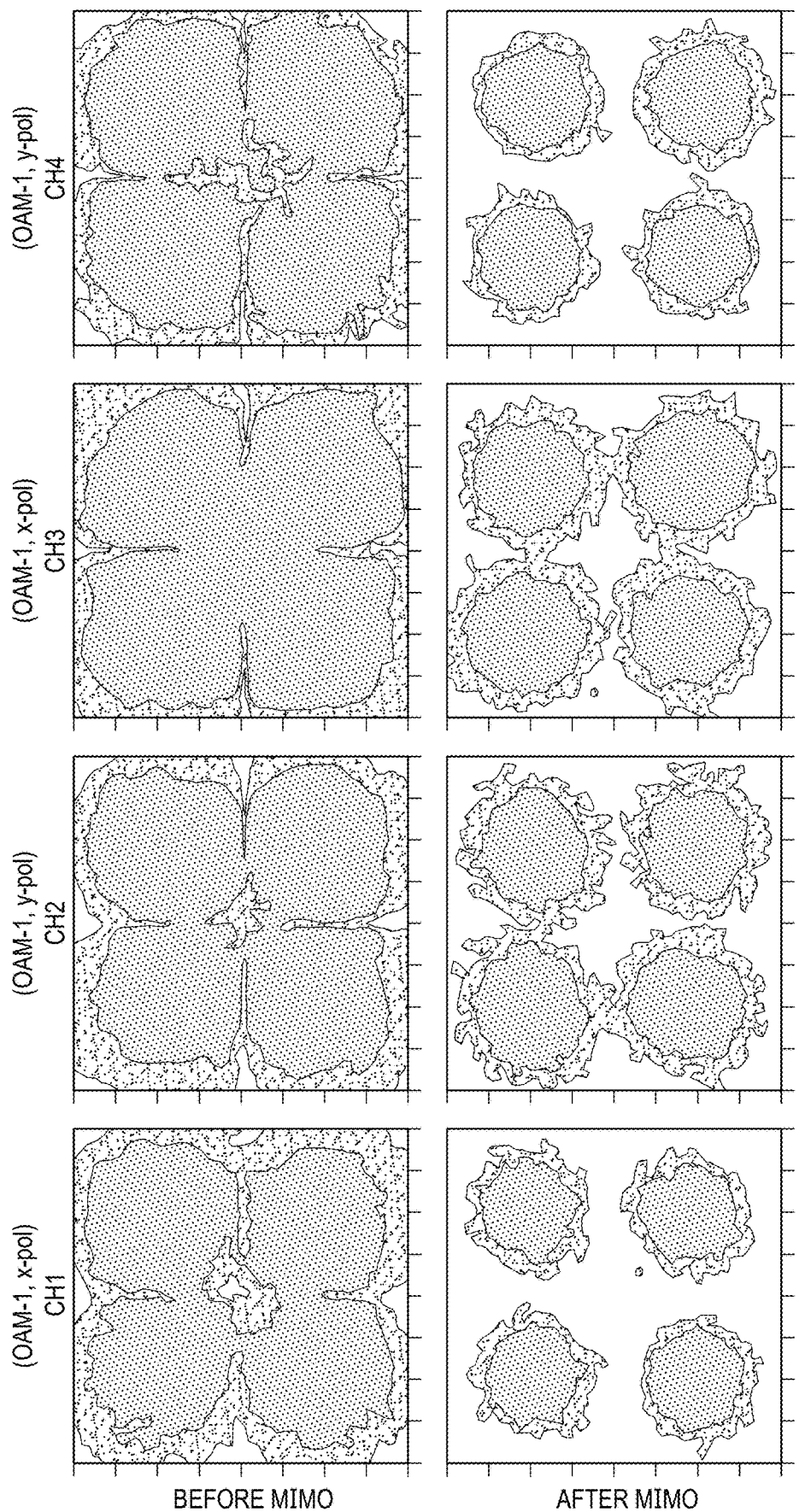
Figure 125:
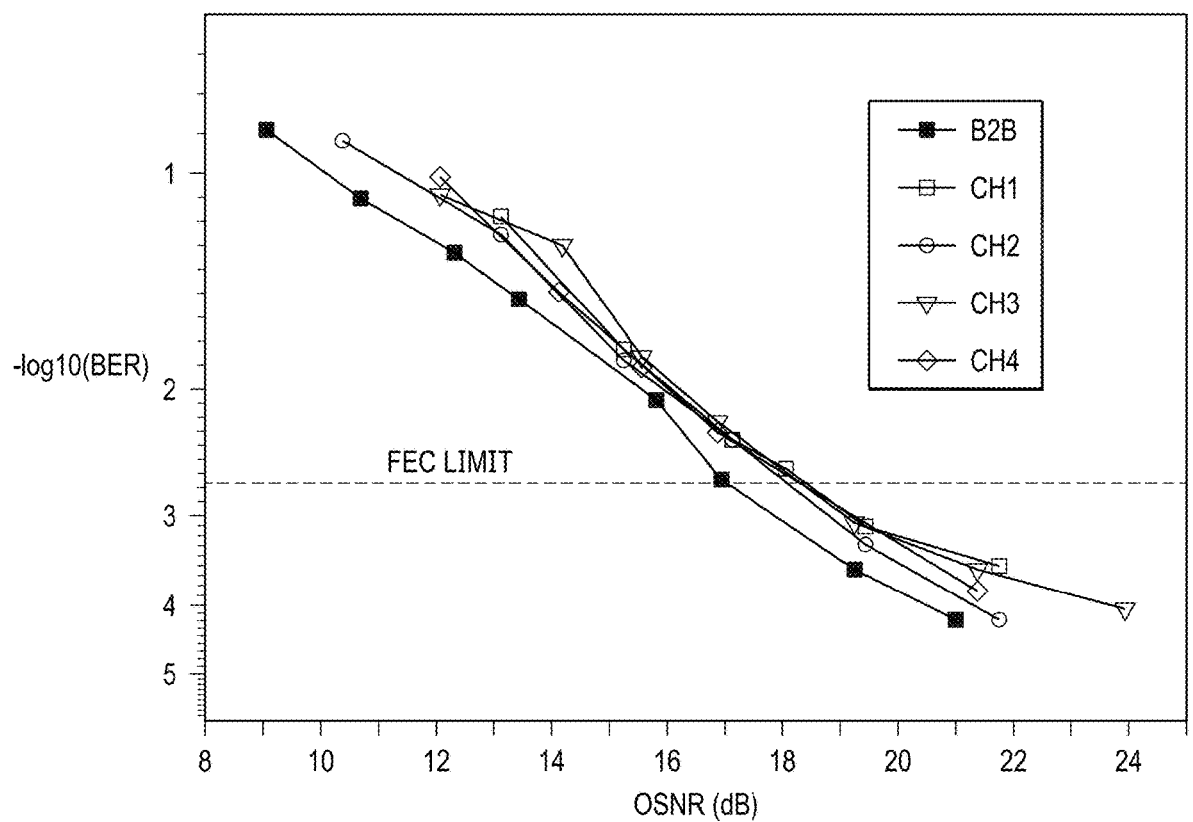
Figure 126:
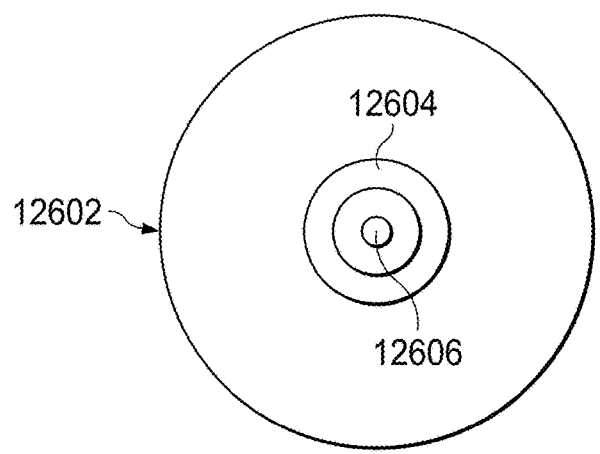
Figure 127:
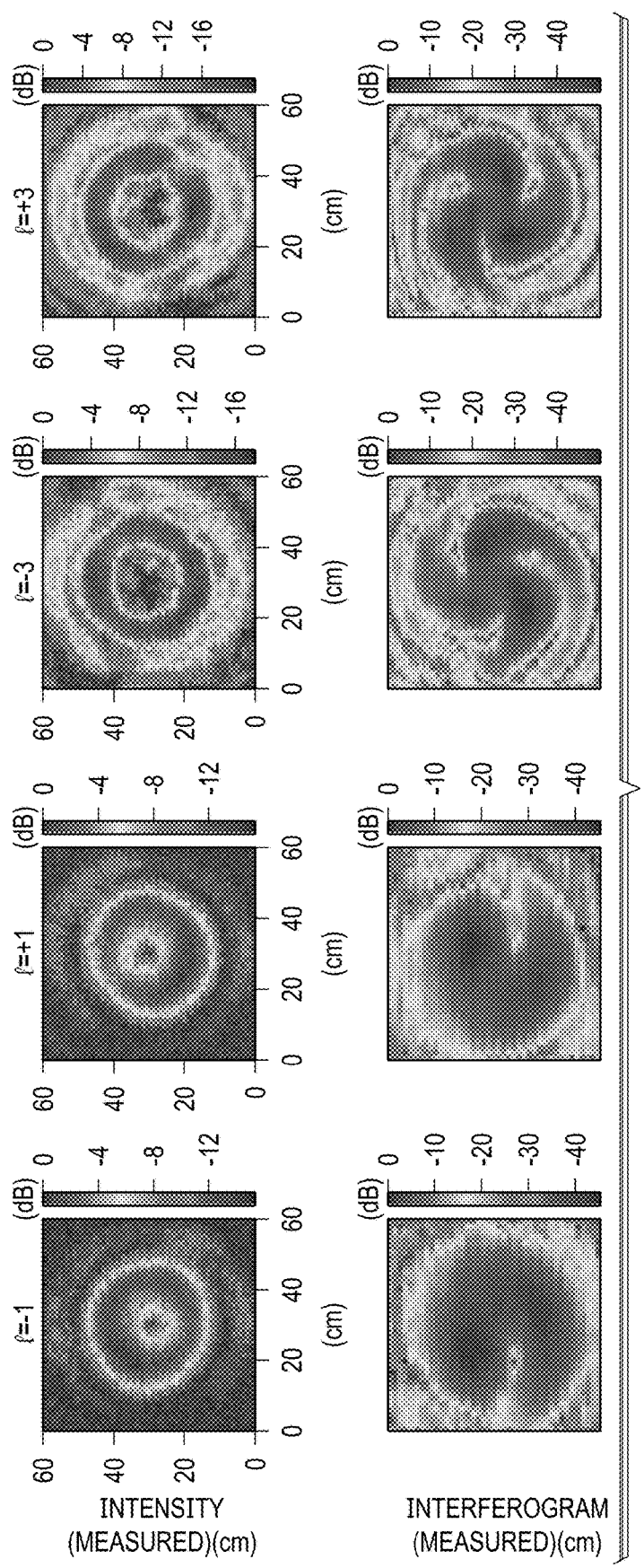
Figure 128:
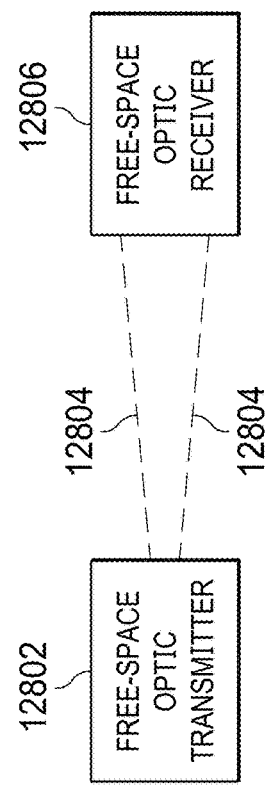
Figure 129:
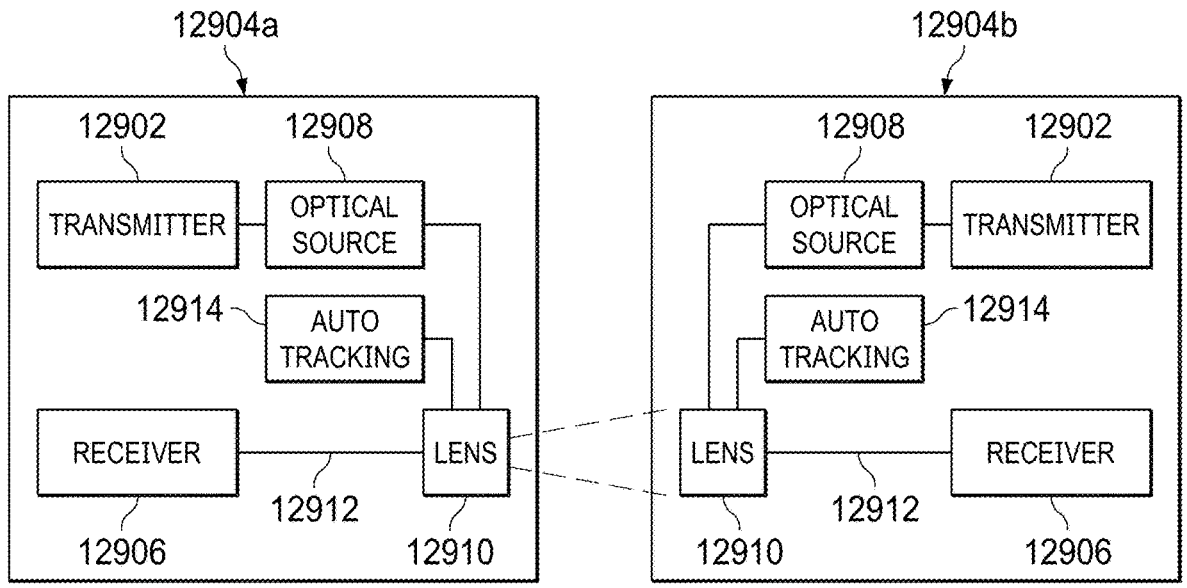
Figure 130:
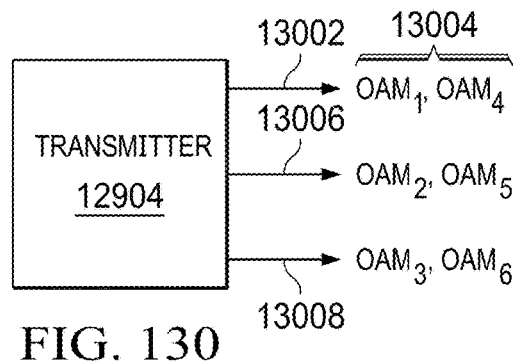
Figure 131:
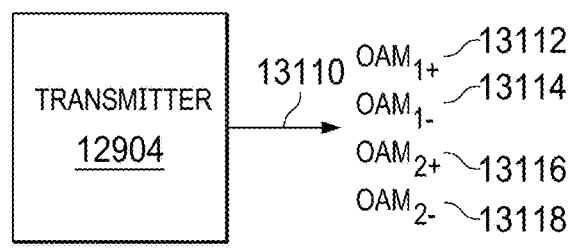
Figure 132:
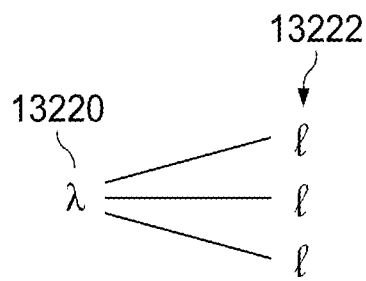
Figure 133:
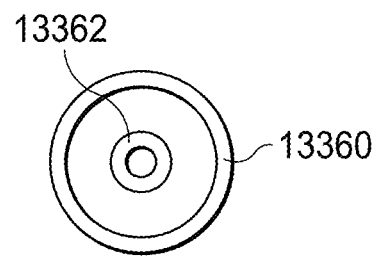
Figure 134:
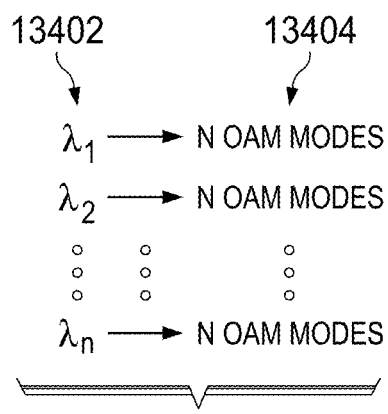
Figure 135:
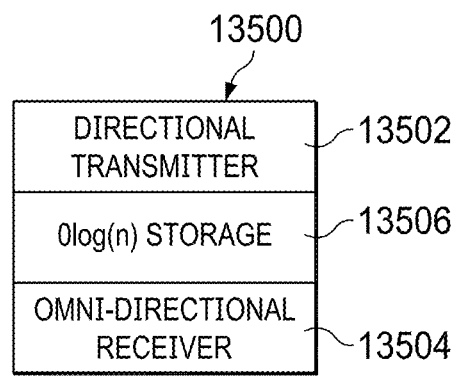
Figure 136:
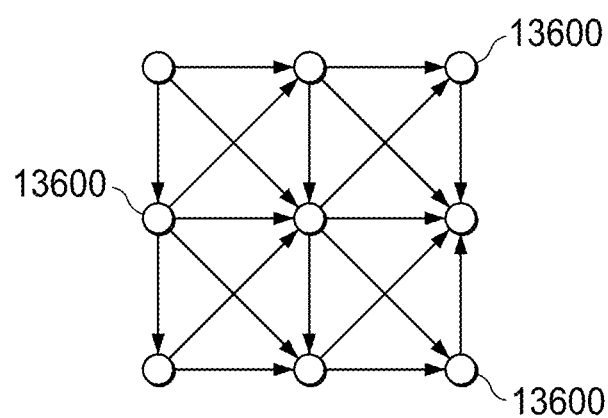
Figure 137:
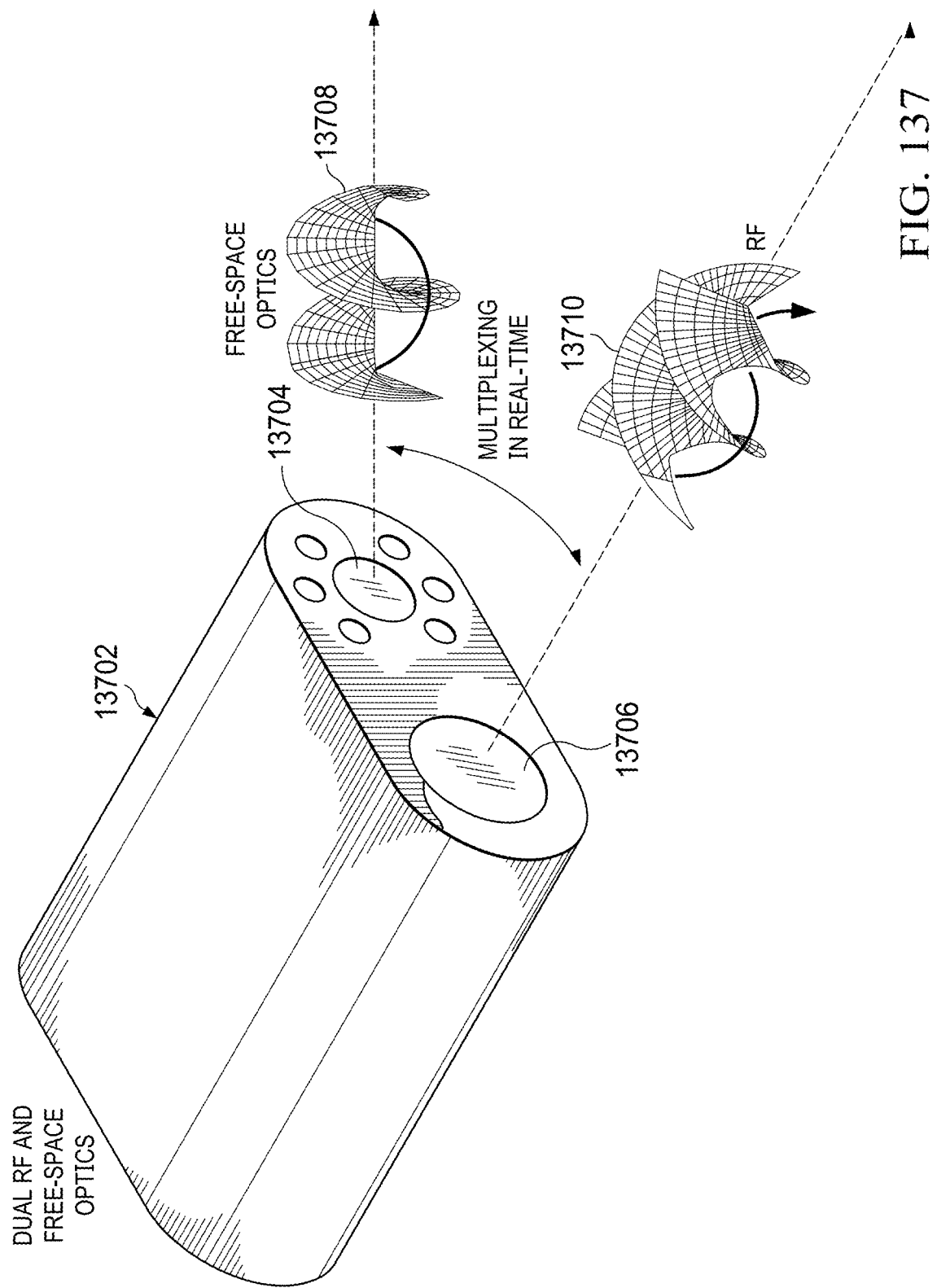
Figure 138:
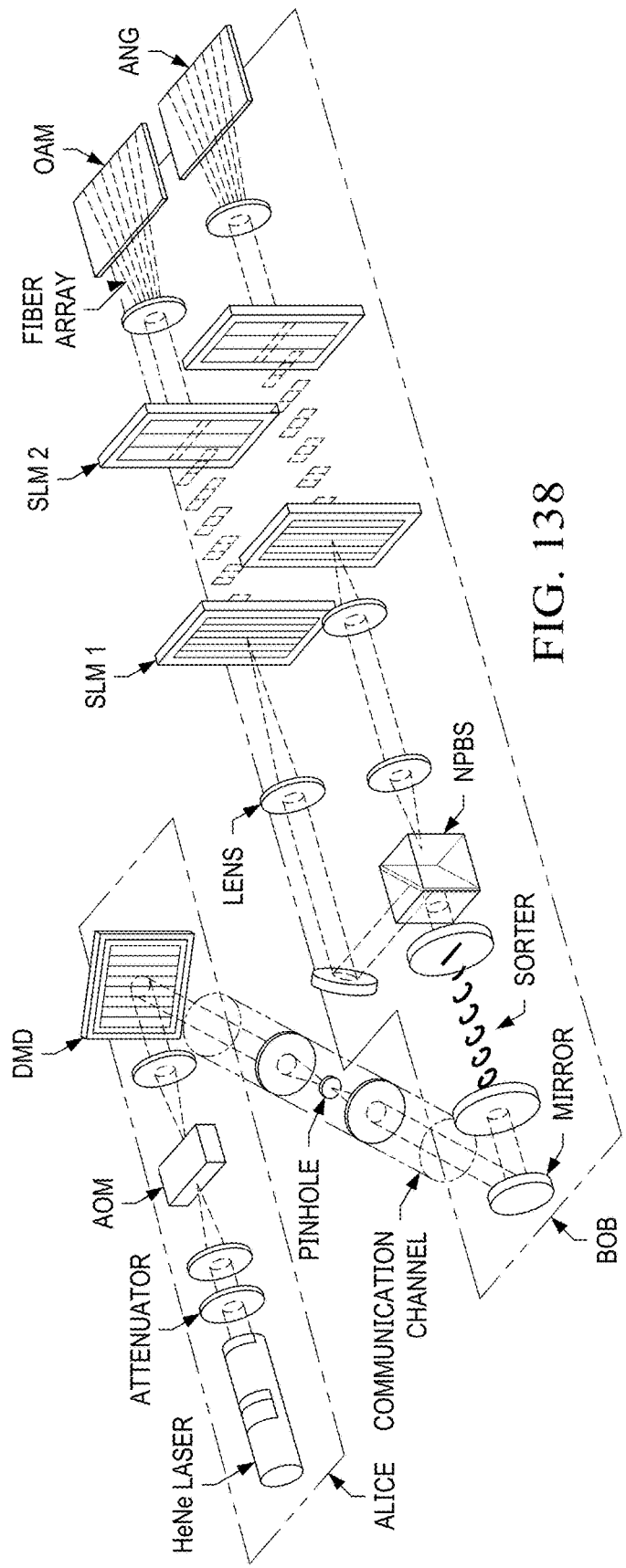
Figure 139:
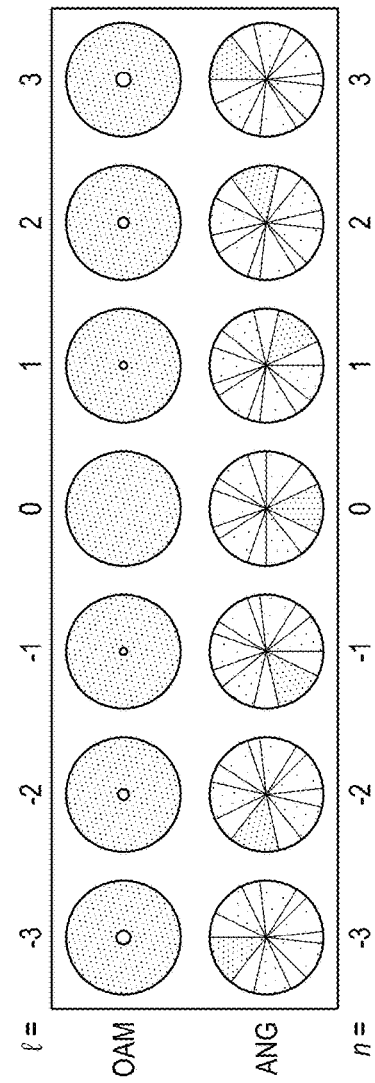
Figure 140:
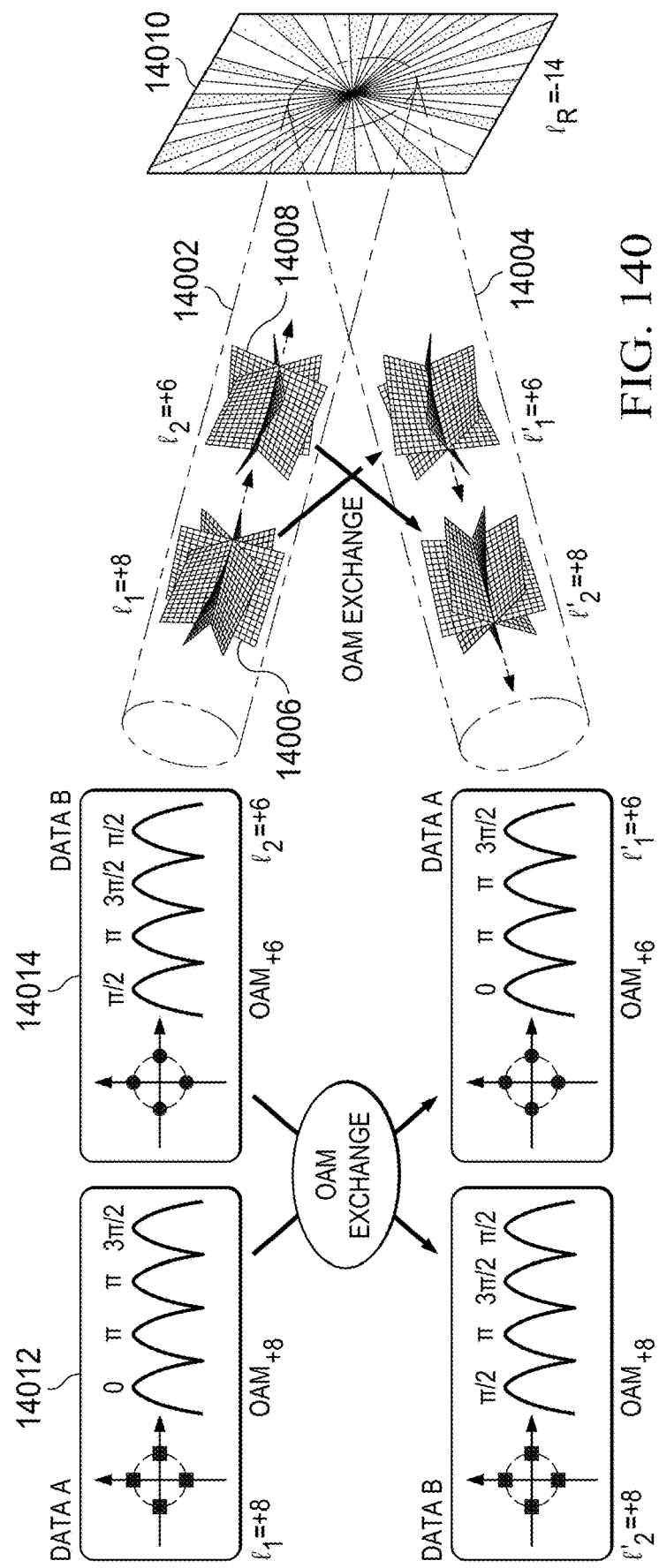
Figure 141:
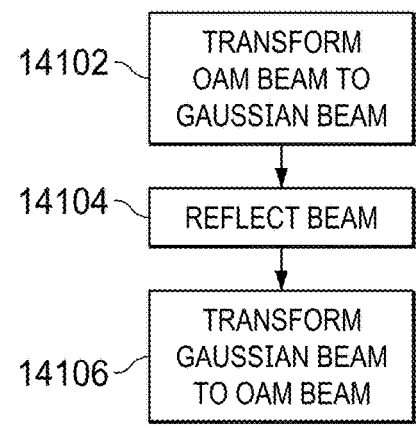
Figure 143:
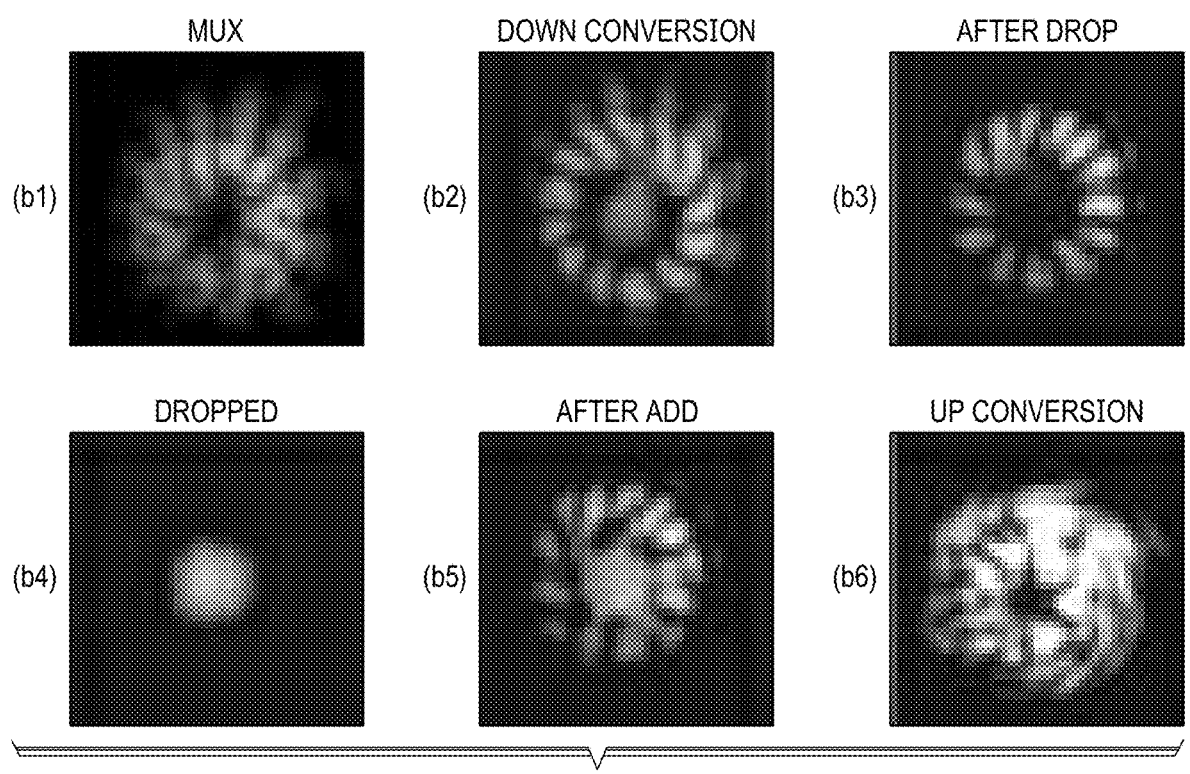
Figure 142:
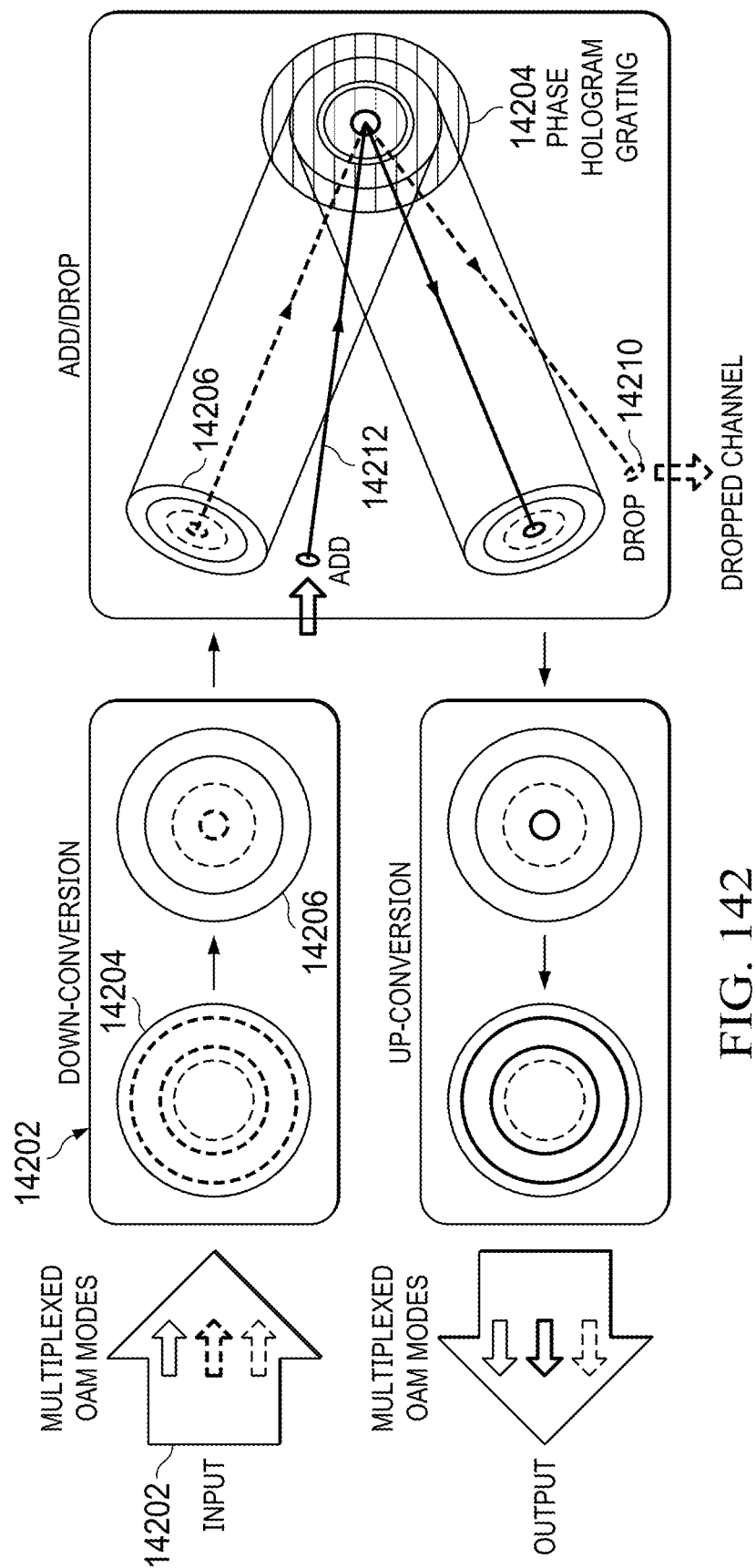
Figure 144:
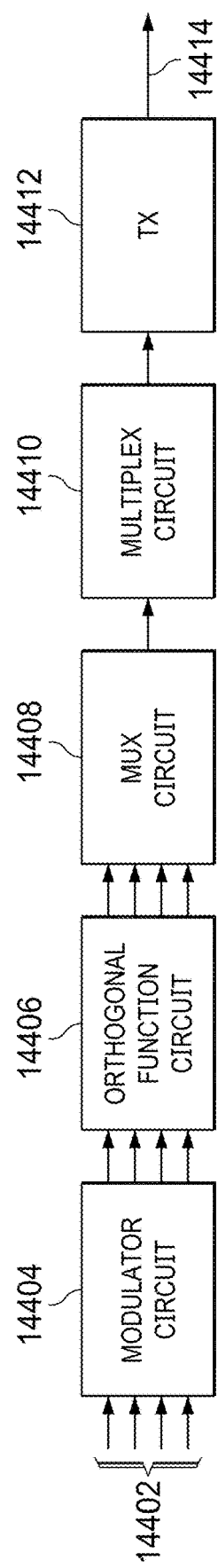
Figure 146:
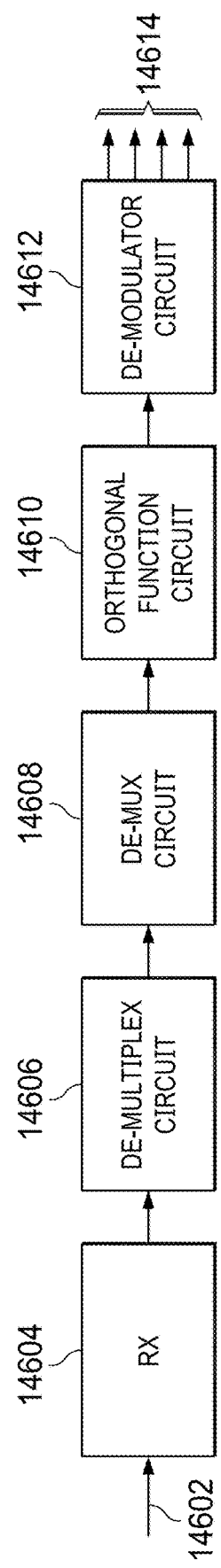
Figure 145:
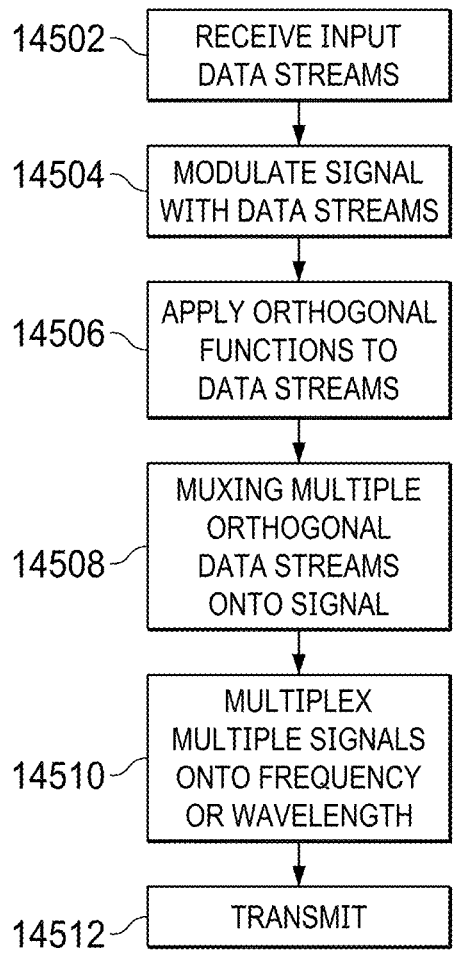
Figure 147:
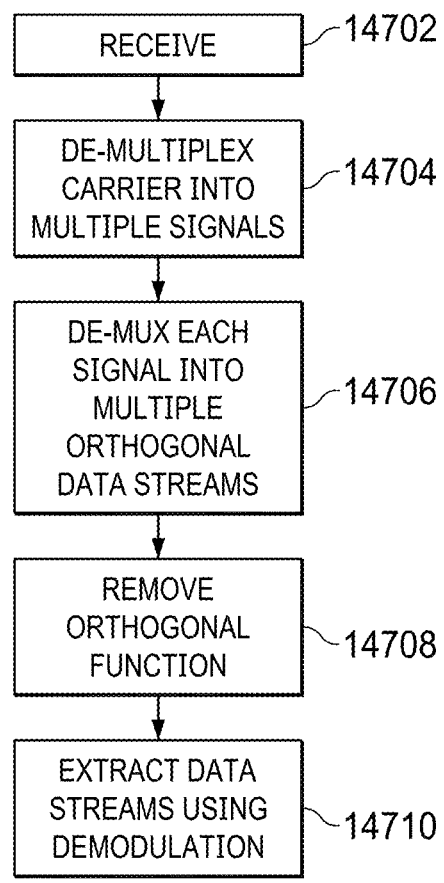
Figure 148:
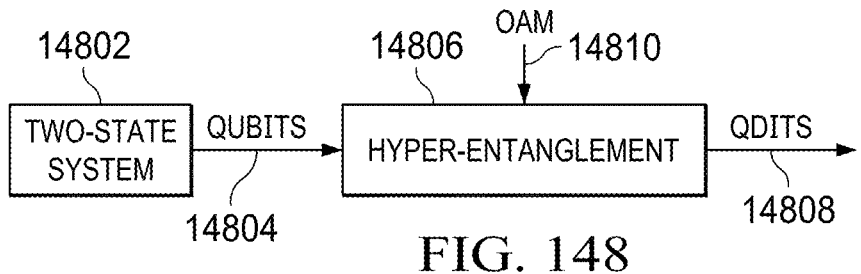
Figure 149:
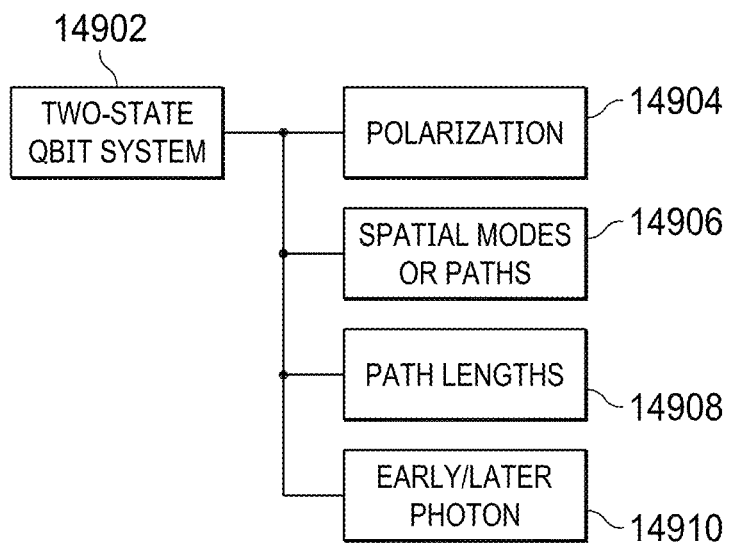
Figure 150:
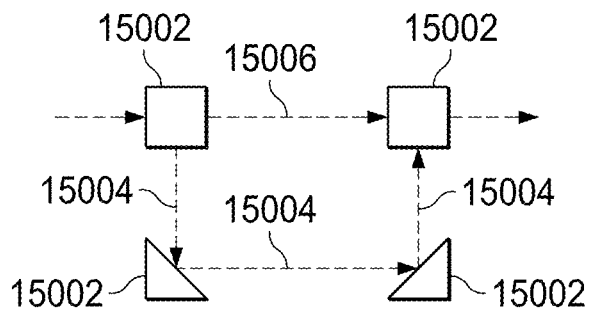
Figure 151:
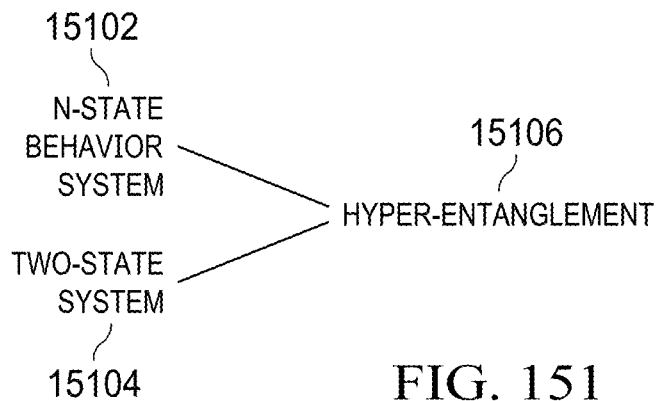
Figure 152:
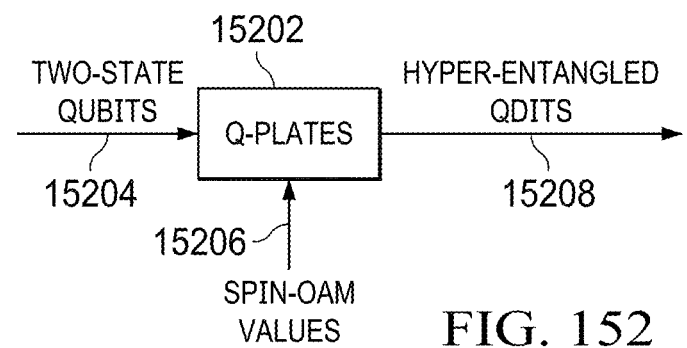
Figure 153:
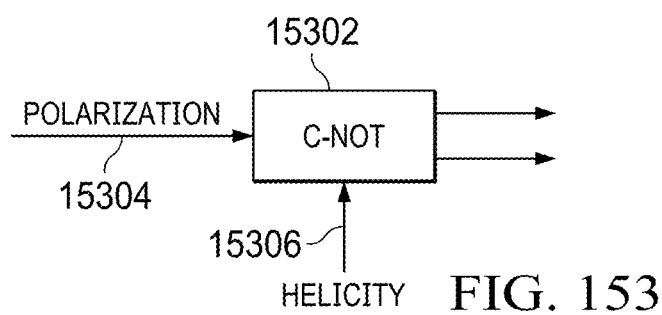
Figure 154:
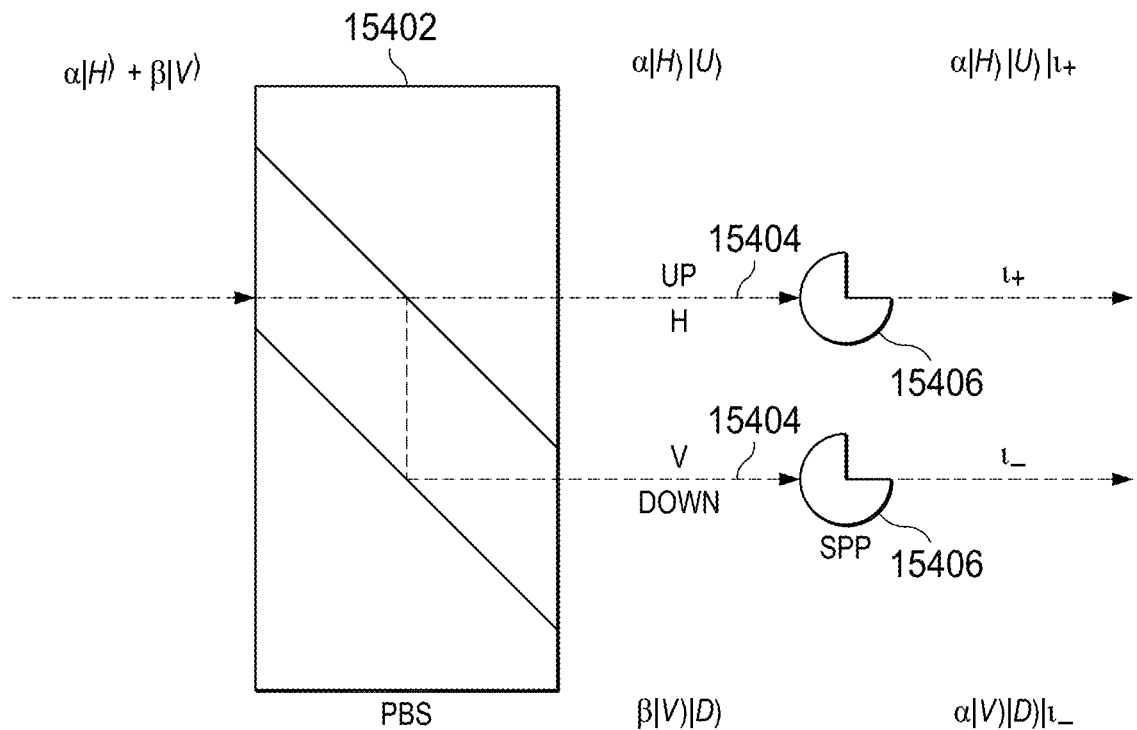
Figure 155:
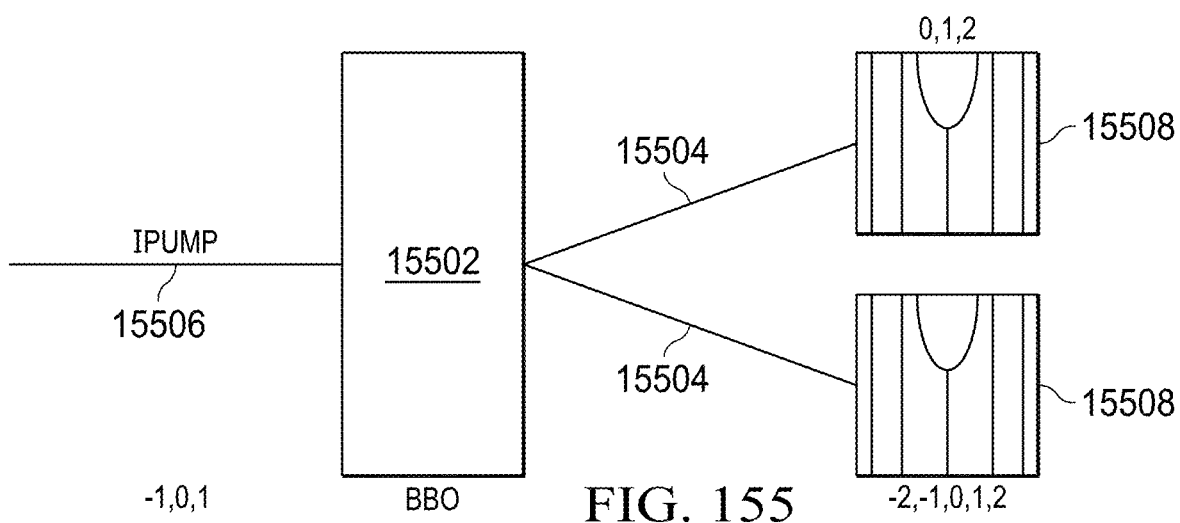
Figure 156:
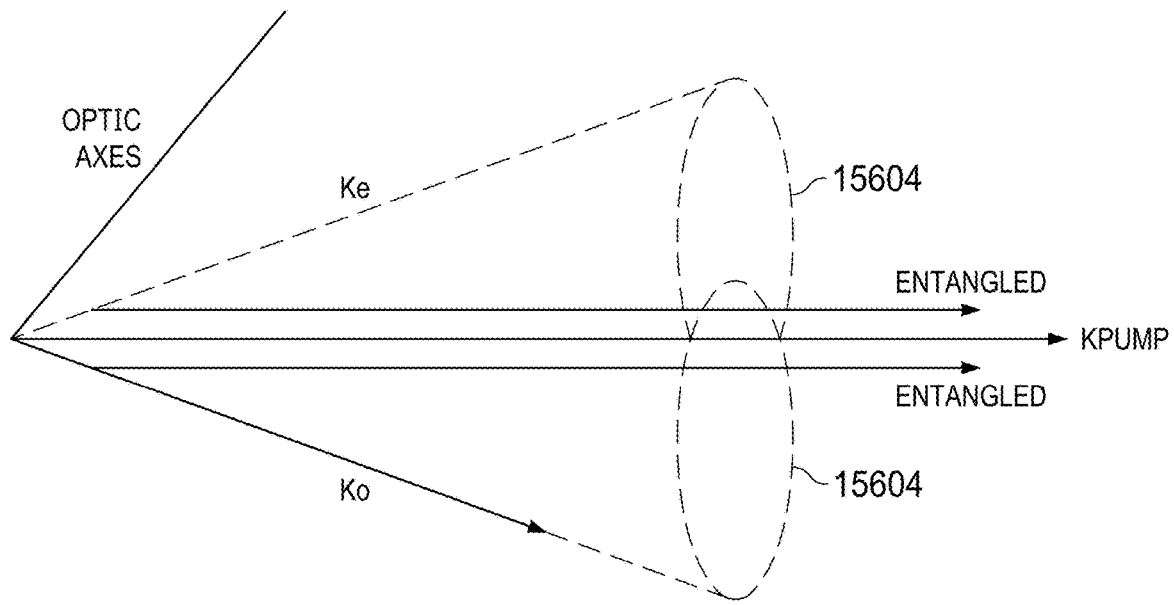
Figure 157:
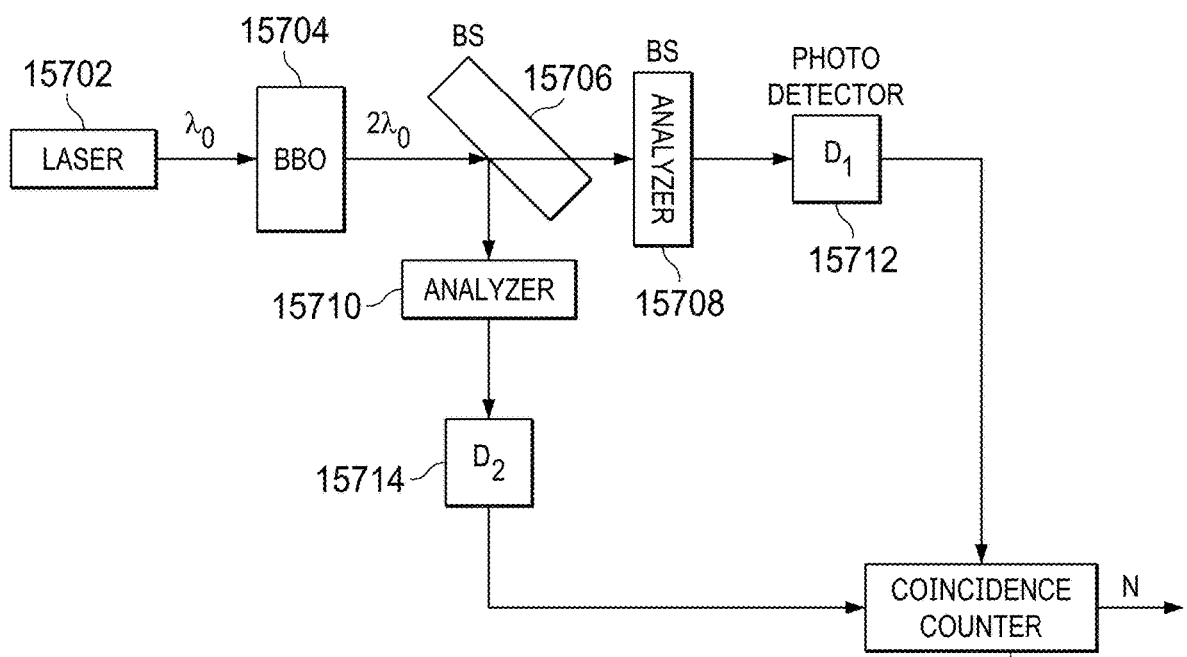
Figure 158:
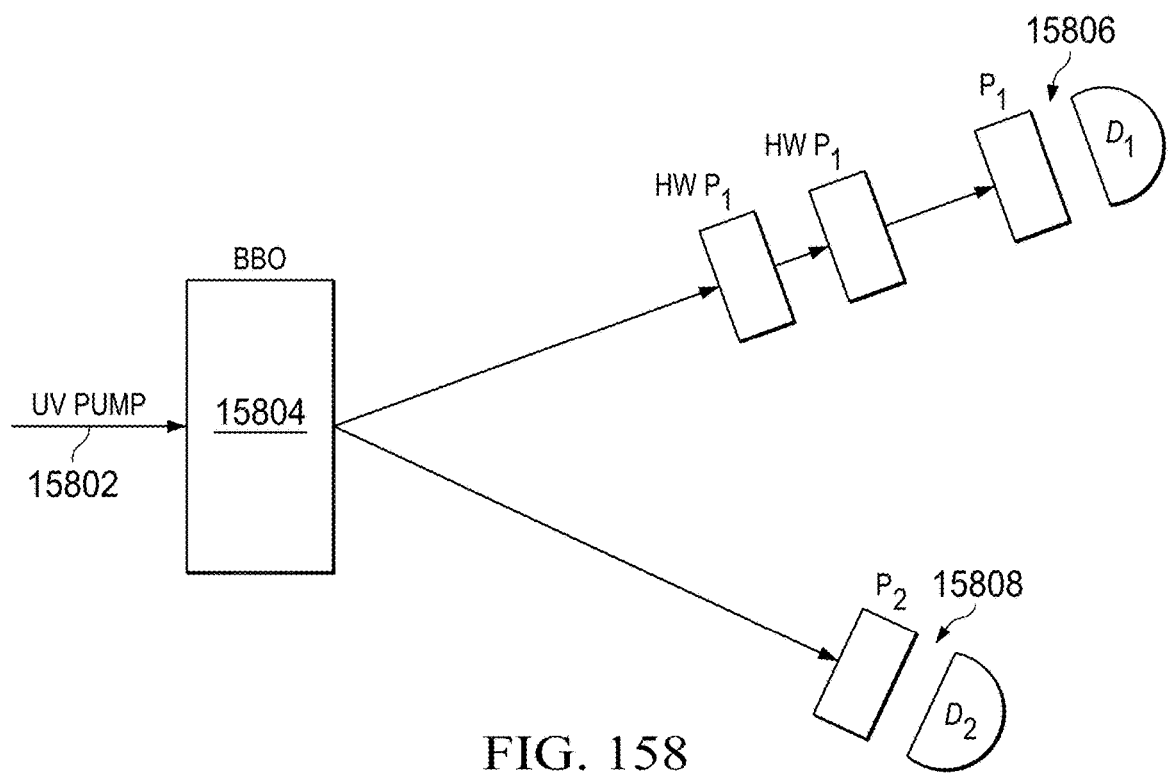
Figure 159:
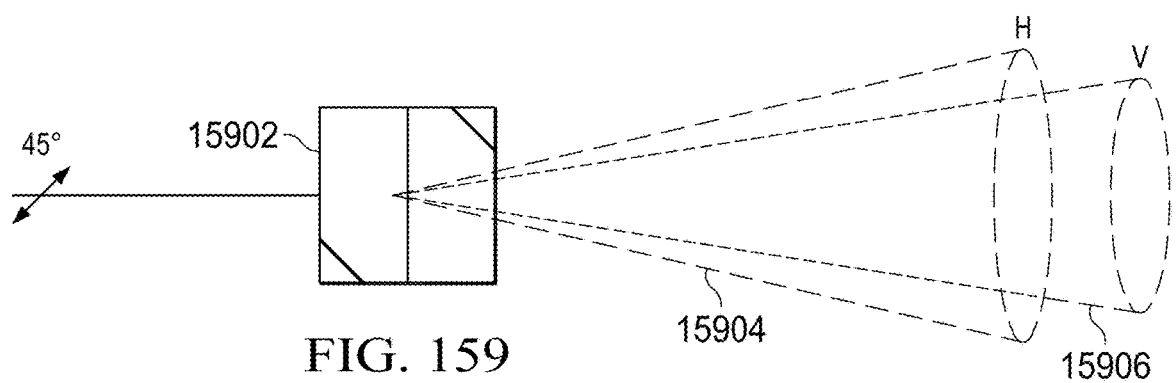
Figure 160:
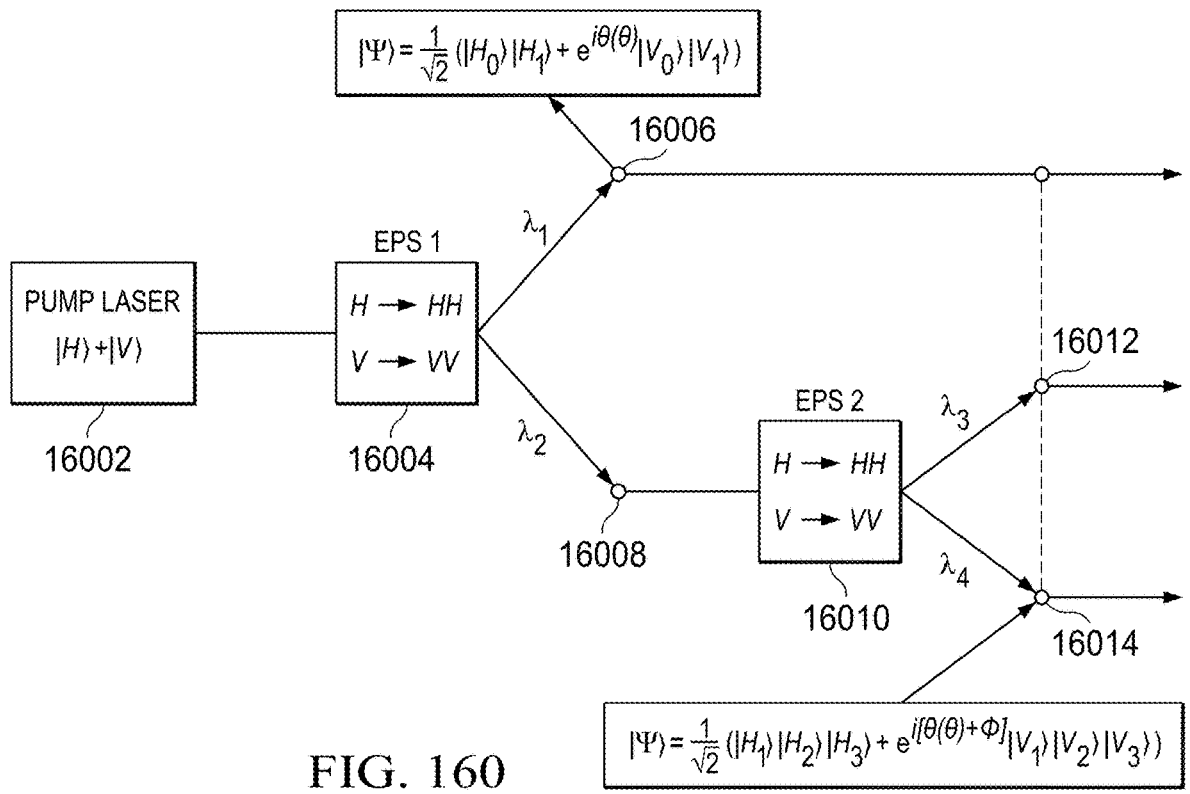
Figures 161, 163:
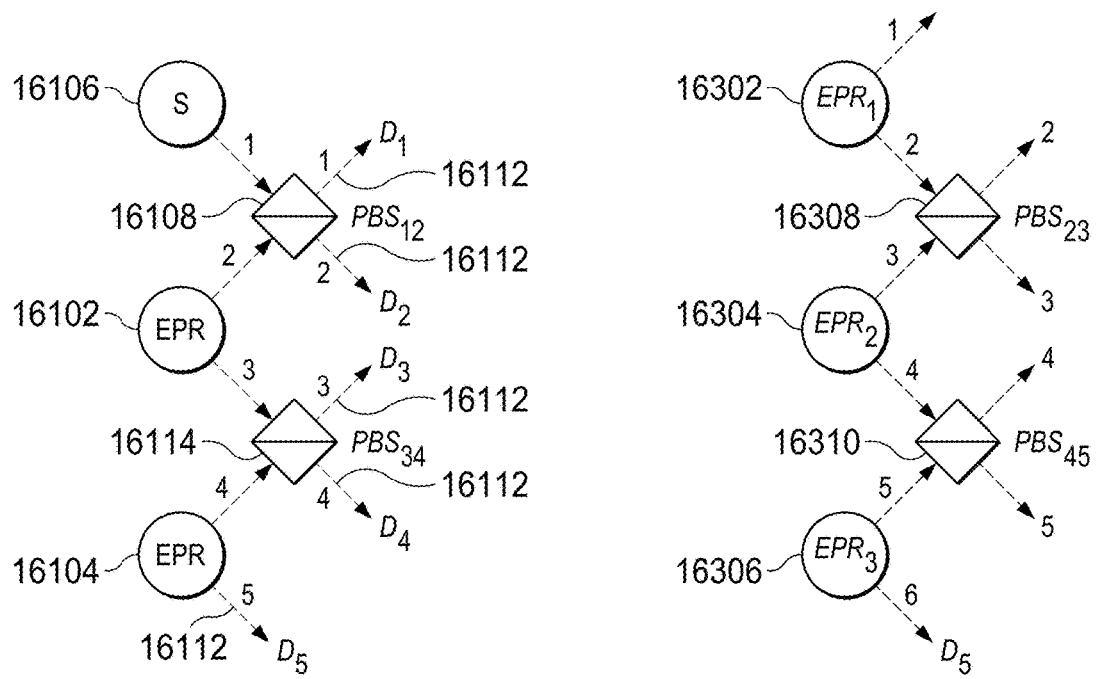
Figure 162:
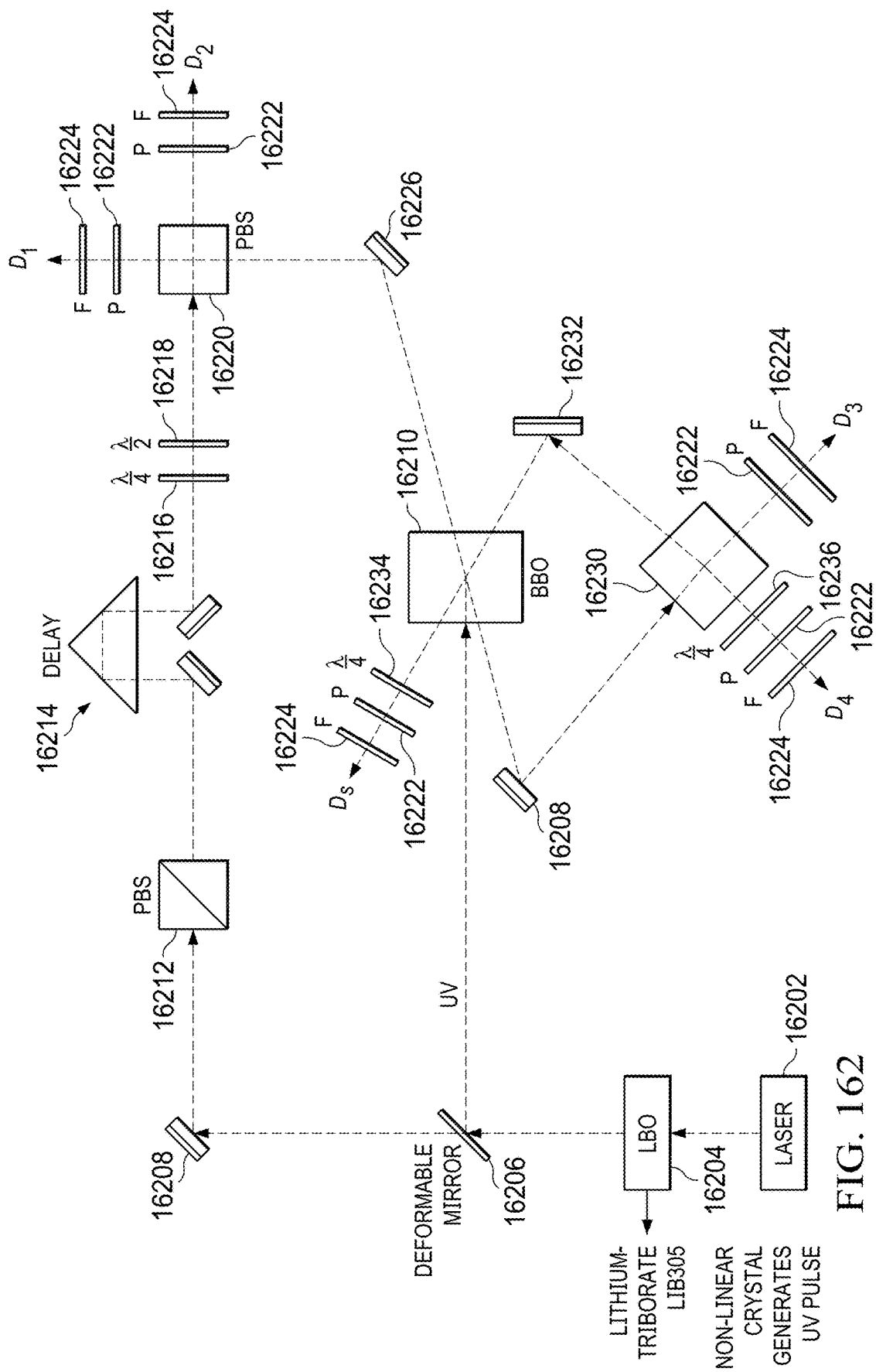
Figure 164:
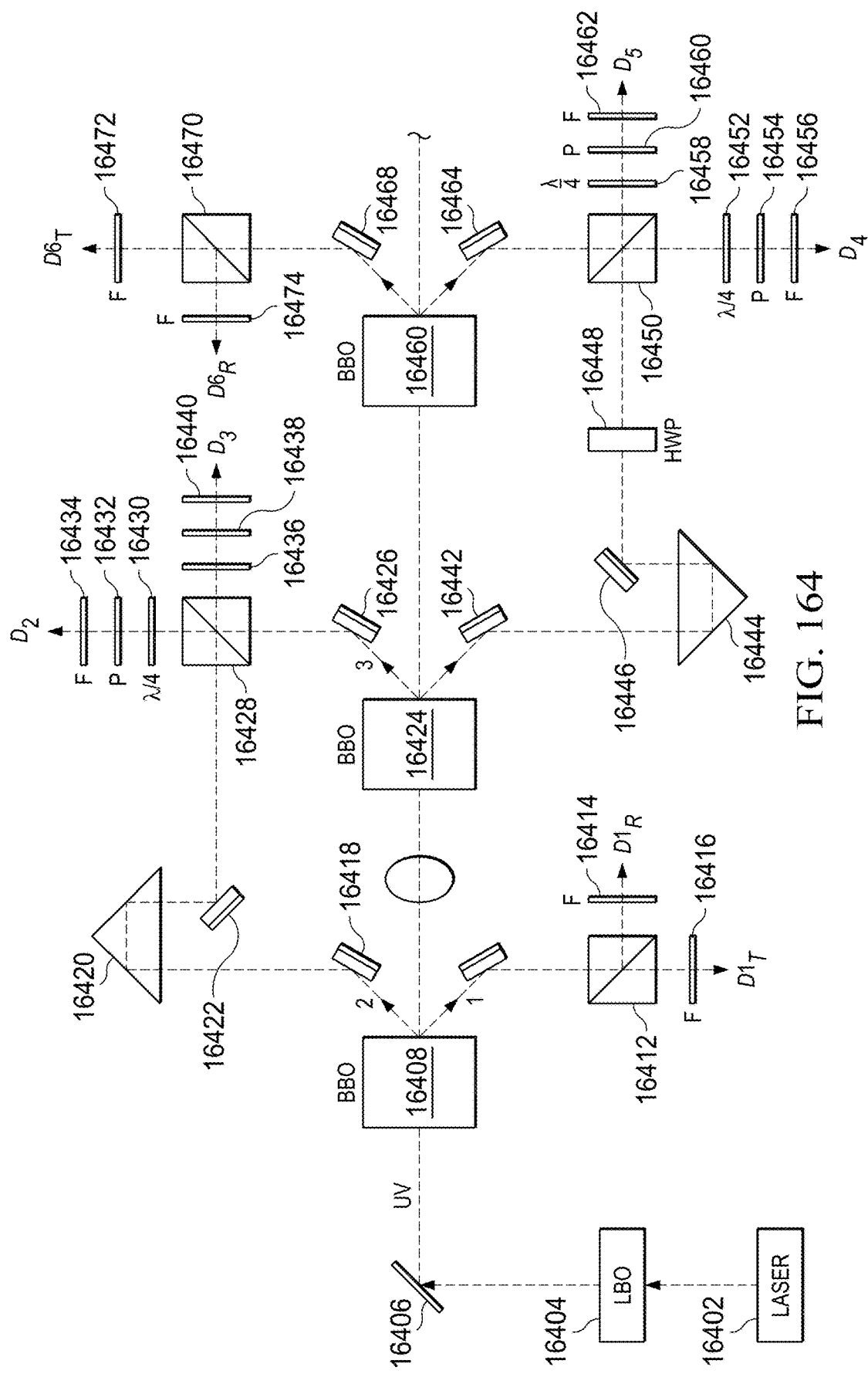
Figure 165:
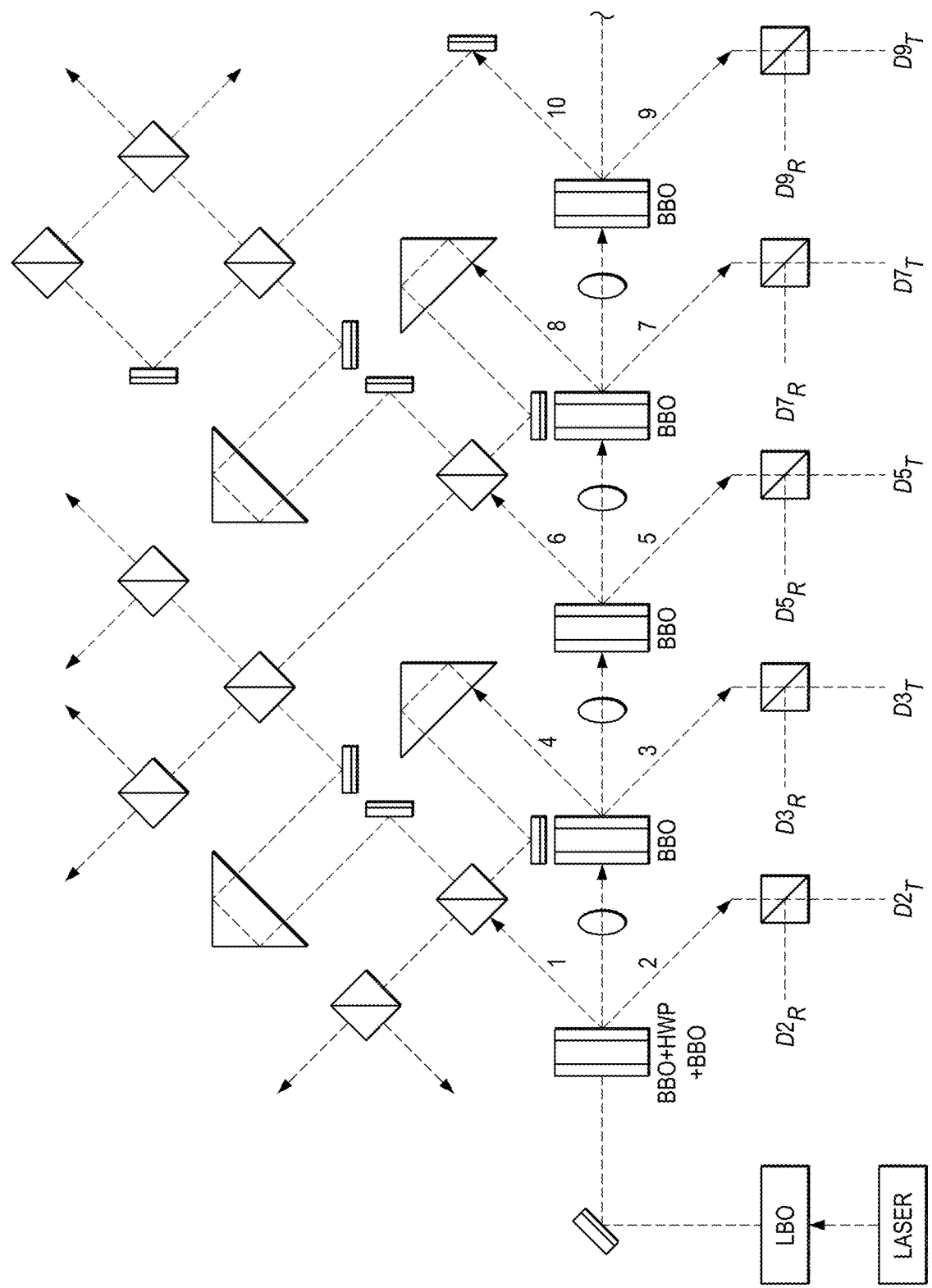
Figure 166:
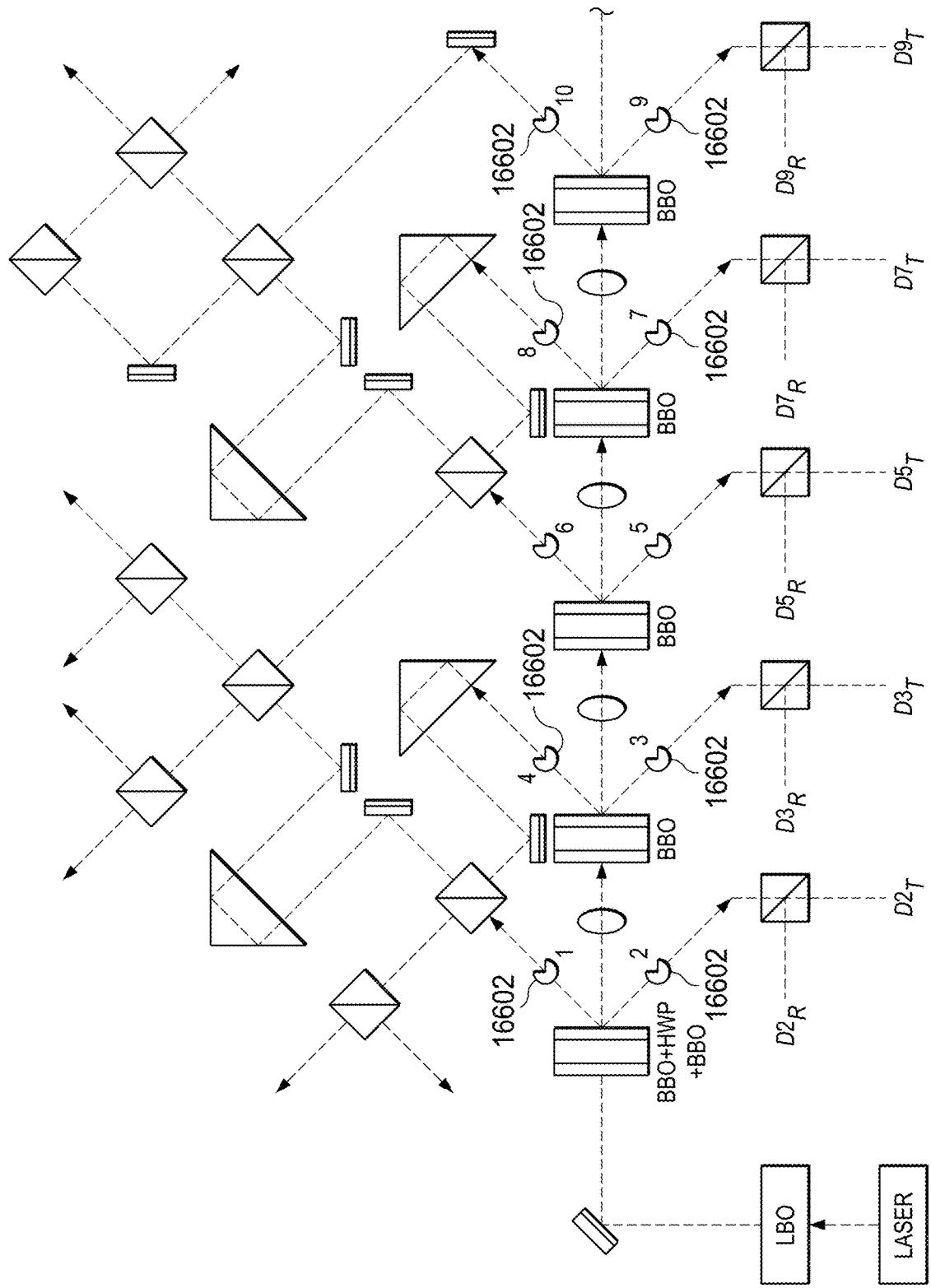
Figure 167:
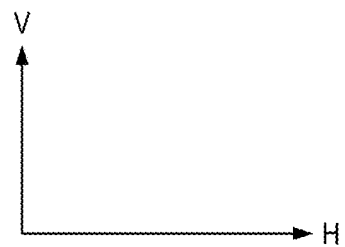
Figure 168:
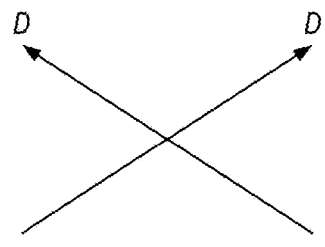
Figure 169:
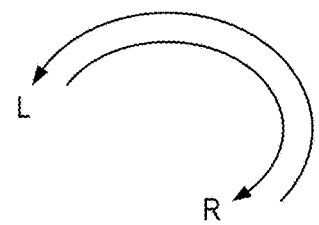
Figure 170:
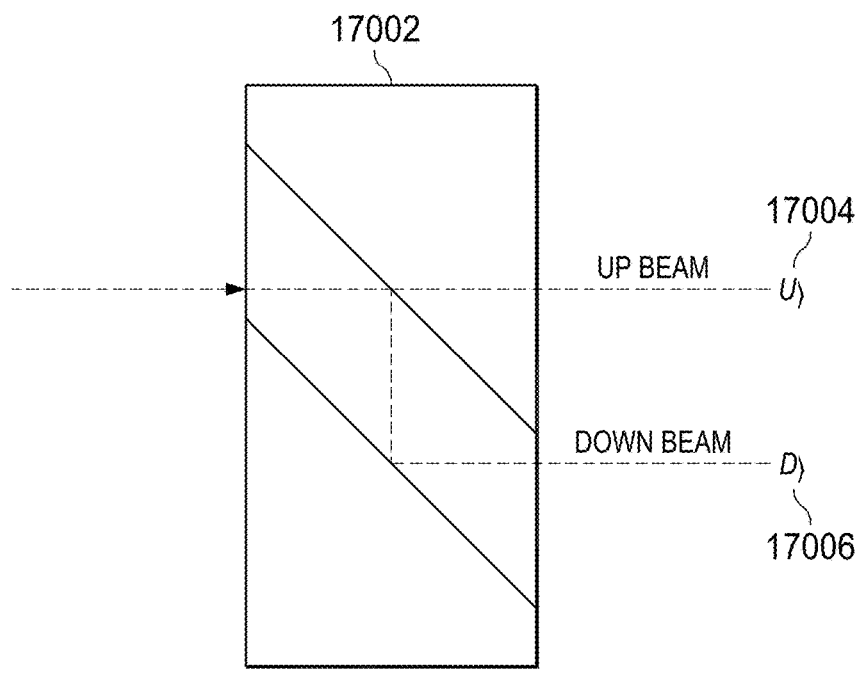
Figure 171:
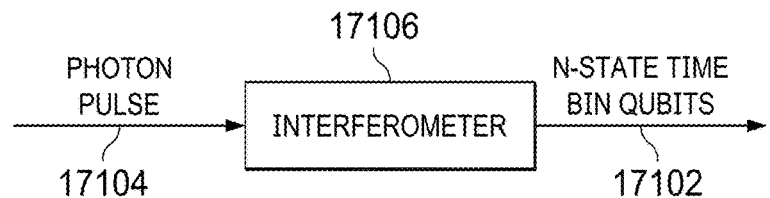
Figure 172:
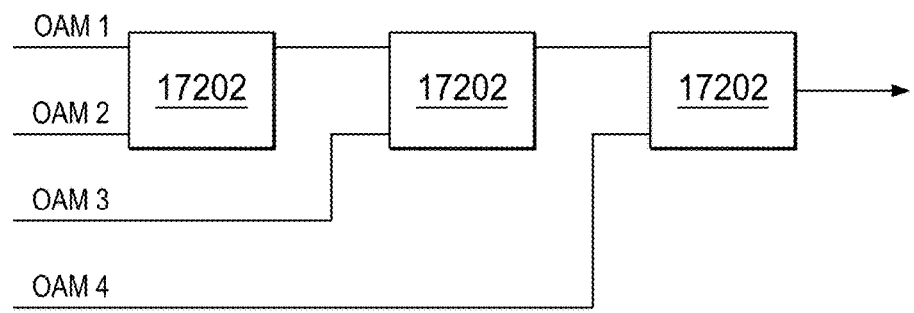
Figure 173:
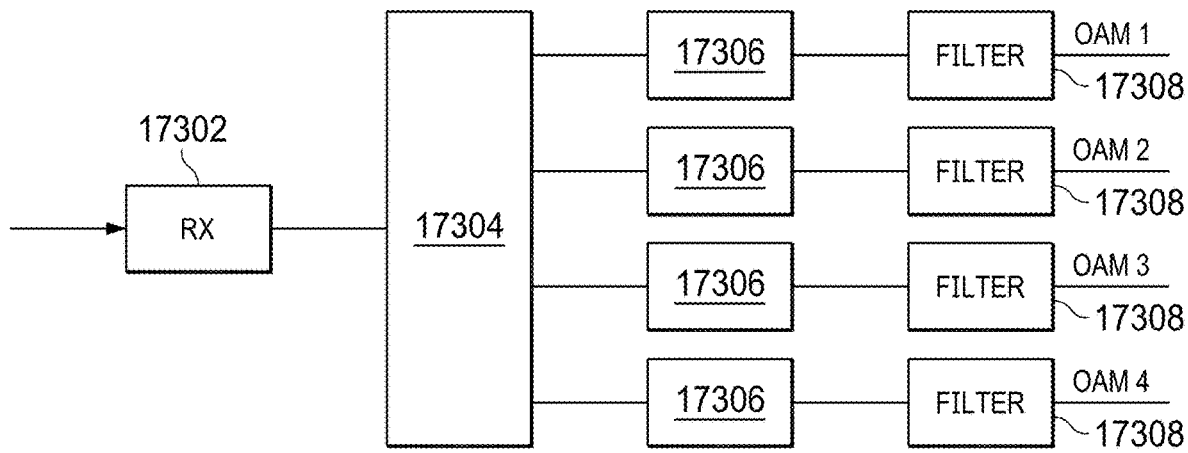
Figure 174:
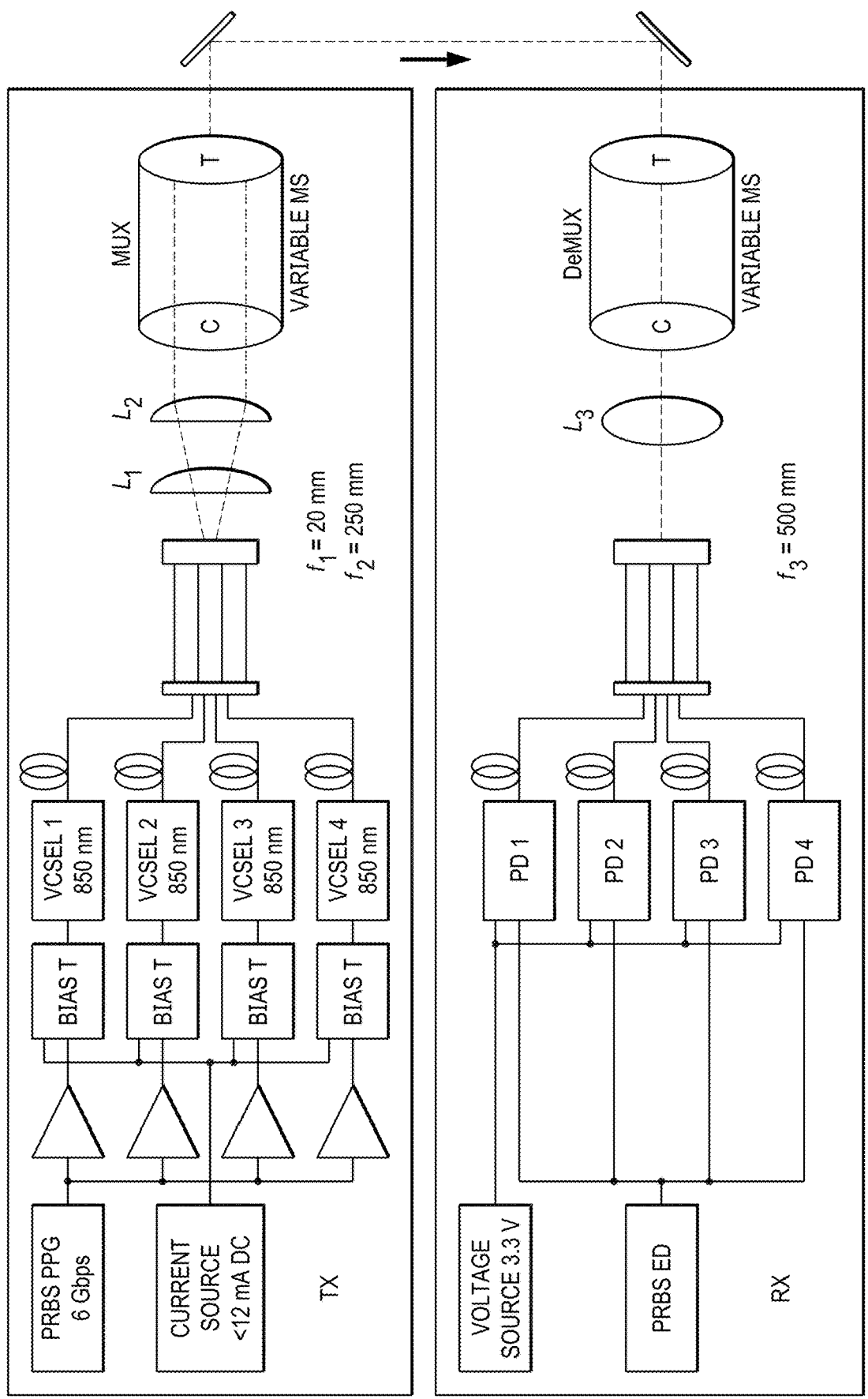

FIG. 124 illustrates the recovered constellations of 20 Gbit/sec QPSK signals carried on each OAM beam of the device of FIG. 130;

FIG. 125 illustrates the measured BER curves of the device of FIG. 130;

FIG. 126 illustrates a vortex fiber;

FIG. 127 illustrates intensity profiles and interferograms of OAM beams;

FIG. 128 illustrates a free-space communication system;

FIG. 129 illustrates a block diagram of a free-space optics system using orbital angular momentum and multi-level overlay modulation;

FIGS. 130-132 illustrate the manner for multiplexing multiple data channels into optical links to achieve higher data capacity;

FIG. 133 illustrates groups of concentric rings for a wavelength having multiple OAM valves;

FIG. 134 illustrates a WDM channel containing many orthogonal OAM beams;

FIG. 135 illustrates a node of a free-space optical system;

FIG. 136 illustrates a network of nodes within a free-space optical system;

FIG. 137 illustrates a system for multiplexing between a free space signal and an RF signal;

FIG. 138 illustrates a seven dimensional QKD link based on OAM encoding;

FIG. 139 illustrates the OAM and ANG modes providing complementary 7 dimensional bases for information encoding;

FIG. 140 illustrates the use of a reflective phase hologram for data exchange;

FIG. 141 is a flow diagram illustrating the process for using ROADM for exchanging data signals;

FIG. 142 illustrates the concept of a ROADM for data channels carried on multiplexed OAM beams;

FIG. 143 illustrates observed intensity profiles at each step of an ad/drop operation such as that of FIG. 142;

FIG. 144 is a block diagram of a circuit for generating a muxed and multiplexed data stream containing multiple new Eigen channels;

FIG. 145 is a flow diagram describing the operation of the circuit of FIG. 144;

FIG. 146 is a block diagram of a circuit for de-muxing and de-multiplexing a data stream containing multiple new Eigen channels;

FIG. 147 is a flow diagram describing the operation of the circuit of FIG. 146;

FIG. 148 illustrates a two-state system using photonics;

FIG. 149 illustrates various types of two-state qbit systems;

FIG. 150 illustrates a two-state qbit system including two different path lengths;

FIG. 151 illustrates the combination of n-state behavior systems with two-state systems to create hyperentanglement;

FIG. 152 illustrates SAM-OAM entanglement using q-plates;

FIG. 153 illustrates the use of hyperentangled states with respect to a C-not gate;

FIG. 154 illustrates a crystal using output photons as a target bid and control bit;

FIG. 155 illustrates an example of two-photon interferometry;

FIG. 156 illustrates an emitted photon pair having polarization orthogonal to a pump-beam;

FIG. 157 illustrates beam splitters providing high-intensity type II phase-matched SPDC 2-photon entanglement;

FIG. 158 illustrates as system for generating four Bell states;

FIG. 159 illustrates a line polarized 45° pump;

FIG. 160 illustrates a pump laser providing a beam with horizontal and vertical polarization;

FIG. 161 illustrates the generation of five proton entanglement;

FIG. 162 illustrates a system for providing five proton entanglement;

FIG. 163 illustrates the generation of six proton entanglement;

FIG. 164 illustrates a system for providing six proton entanglement;

FIG. 165 illustrates the generation of ten proton entanglement;

FIG. 166 illustrates a system for providing ten proton entanglement combined with OAM;

FIG. 167 illustrates linear two-proton polarization;

FIG. 168 illustrates diagonal two-proton polarization;

FIG. 169 illustrates circular two-proton polarization;

FIG. 170 illustrates a beam splitter for generating spatial qubits;

FIG. 171 illustrates a system for generating any state of time-bin qubits;

FIG. 172 illustrates a manner for multiplexing multiple beams;

FIG. 173 illustrates a manner for demultiplexing multiple beams;

FIG. 174 illustrates a mode sorter;

FIG. 175 illustrates a transformation of multiple OAM beams having different l states into plane waves having a different tilt;

FIG. 176 illustrates the combination of multiple photons with greater than two states per photon to create hyperentangled states; and FIG. 177 illustrates the manner for determining quantum capacity.

DETAILED DESCRIPTION

Referring now to the drawings, wherein like reference numbers are used herein to designate like elements throughout, the various views and embodiments of multi-photon, multi-dimensional hyper-entanglement using higher-order radix qudits with applications to quantum computing, quantum key distribution and quantum teleportation are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Quantum computing has been an area of ongoing research for more than 30 years. It leverages quantum mechanical phenomena to greatly enhance the way in which information is stored and processed. Quantum computing also uses more efficient algorithms than possible in classical computing. Although physicists were able to theorize three decades ago how a quantum computer could work, scientists and engineers had difficulty building one. In the last five years, the hardware and software capability have moved out of university labs and into tangible business products however, the technology still needs to mature for it to become fully enterprise-ready and deliver meaningful, cost-effective business and military results.

In a quantum computer, the basic unit of information is known as a quantum bit or "qubit." Through quantum mechanical phenomena (superposition and entanglement), these qubits can perform many computations simultaneously in parallel, which theoretically allows the quantum computer to solve a difficult subset of problems much faster than a classical computer.

Quantum technology is still maturing and there are some hurdles left to overcome in order to build fully scalable quantum computers. As just one example, quantum systems are much more sensitive than classical computers to noise. Noise causes a quantum system to decohere and lose its quantum properties. There is a lot of room for progress in devising quantum error correction schemes (also known as fault-tolerant quantum computing), as well as engineering advancements toward suppressing noise effects. Nevertheless, many companies have started looking at quantum computing from both defense and commercial sectors (i.e. financial, healthcare, manufacturing, media and technology). Governments around the world are forging ahead with quantum computing initiatives and there are now over 100 companies working on quantum computing and almost all are using qubit as their elementary unit of information.

Qubits and Higher Order Radix Qudits

Qubit is the standard unit of information for radix-2, or base-2, quantum computing. The qubit models information as a linear combination of two orthonormal basis states such as the states $|0\rangle$ and $|1\rangle$. The qubit differs from the classical bit by its ability to be in a state of superposition, or a state of linear combination, of all basis states. Superposition allows quantum algorithms to be very powerful since it allows for parallelism during computation so that multiple combinations of information can be evaluated at once. There are theoretically an infinite number of states for a qubit while in a state of superposition:

$$|\Psi\rangle_2 = \alpha|0\rangle + \beta|1\rangle \text{ Where}$$

$$|0\rangle_2 = \begin{pmatrix} 1 \\ 0 \end{pmatrix} \text{ and } |1\rangle_2 = \begin{pmatrix} 0 \\ 1 \end{pmatrix} \text{ and}$$

Where $\alpha$ and $\beta$ are complex numbers and for radix-2

$$\alpha^*\alpha + \beta^*\beta = 1$$

For a higher order radix (i.e. radix-4):

$$|\Psi\rangle_4 = \alpha|0\rangle + \beta|1\rangle + \gamma|2\rangle + \delta|3\rangle$$

Where $$|00\rangle_2 = |0\rangle_4 = \begin{pmatrix} 1 \\ 0 \\ 0 \\ 0 \end{pmatrix}, |01\rangle_2 = |1\rangle_4 = \begin{pmatrix} 0 \\ 1 \\ 0 \\ 0 \end{pmatrix}$$

$$|10\rangle_2 = |2\rangle_4 = \begin{pmatrix} 0 \\ 0 \\ 1 \\ 0 \end{pmatrix}, |11\rangle_2 = |3\rangle_4 = \begin{pmatrix} 0 \\ 0 \\ 0 \\ 1 \end{pmatrix}$$

Where $\alpha$, $\beta$, $\gamma$, $\delta$ are complex numbers and for radix-4

$$\alpha^*\alpha + \beta^*\beta + \gamma^*\gamma + \delta^*\delta = 1$$

Quantum algorithms need maximal superposition of states. Maximal superposition of 2-state qubit (basis $|0\rangle$, $|1\rangle$) is:

$$\alpha^*\alpha=\beta^*\beta=\tfrac{1}{2}$$

Maximal superposition of 4-state qudit (basis $|0\rangle$, $|1\rangle$, $|2\rangle$, $|3\rangle$) is:

$$\alpha^*\alpha=\beta^*\beta=\gamma^*\gamma=\delta^*\delta=\tfrac{1}{4}$$

Hadamard and Chrestenson Transform

Quantum algorithms need maximal superposition of states. Maximal superposition of 2-state qubit basis can be constructed using Hadamard operator. However, the generalized Chrestenson operator can be used and would extend to multi-dimensional qudits that include more than two states. Quantum algorithms require that the states be in superposition (parallelism) and achieving maximal superposition this can be achieved using a gate called Hadamard gate or Chrestenson gate. This means that the qubit (or qudit) is equally likely to be measured at the value of any of the possible basis vectors. In radix-2 (or base-2 binary), the Hadamard gate can be represented by a 2×2 matrix. A Chrestenson gate does exactly the same thing for radix higher than 2. Therefore, a 2×2 Chrestenson matrix is identical to Hadamard matrix. However, one can have higher order Chrestenson matrix like a 4×4 Chrestenson matrix which would represent a radix-4. This is used in a system where entangled photons are first created, then qudits are created using OAM. The qudits are then pass through the Chrestenson (or Hadamard) gate to make them maximally superpositioned.

A Hadamard gate puts a qubit in maximally superimposed state for base-2 qubit (radix-2):

$$\text{Hadamard operator } \mathbb{H} = \frac{1}{\sqrt{2}}\begin{bmatrix} 1 & 1 \\ 1 & -1 \end{bmatrix}$$

However, Chrestenson operator/gate does the same thing for a multidimensional qudit including more than two states.

$\mathbb{C}$=multi-dimensional Hadamard for n-state qudit of radix-n.

Chrestenson $\mathbb{C}$ is an orthogonal matrix with both column and row vectors form an orthogonal set:

$$\mathbb{C}_r = \frac{1}{\sqrt{r}}\begin{bmatrix} w_0^0 & w_0^1 & \cdots & w_0^{r-1} \\ w_1^0 & w_1^1 & \cdots & w_1^{r-1} \\ \vdots & \vdots & \ddots & \vdots \\ w_{r-1}^0 & w_{r-1}^1 & \cdots & w_{r-1}^{r-1} \end{bmatrix}$$

Where $$w_0 = e^{i\frac{2\pi}{4}\cdot 0} = 1$$
$$w_1 = e^{i\frac{2\pi}{4}\cdot 1} = i$$
$$w_2 = e^{i\frac{2\pi}{4}\cdot 2} = -1$$
$$w_3 = e^{i\frac{2\pi}{4}\cdot 3} = -i$$

or in general:

$$w_k = e^{i\frac{2\pi}{r}k}$$

Thus, for a radix-4, the Chrestenson is:

$$\mathbb{C}_4 = \frac{1}{\sqrt{4}}\begin{bmatrix} 1 & 1 & 1 & 1 \\ 1 & i & -1 & -i \\ 1 & -1 & 1 & -1 \\ 1 & -i & -1 & i \end{bmatrix} \text{ And}$$

$$\mathbb{C}_4|0\rangle_4 = \frac{1}{2}\begin{pmatrix} 1 \\ 1 \\ 1 \\ 1 \end{pmatrix} = \frac{1}{2}[|0\rangle + |1\rangle + |2\rangle + |3\rangle] = |b\rangle$$

$$\mathbb{C}_4|3\rangle_4 = \frac{1}{2}\begin{pmatrix} 1 \\ -i \\ -1 \\ i \end{pmatrix} = \frac{1}{2}[|0\rangle - i|1\rangle - |2\rangle + i|3\rangle] = |d\rangle$$

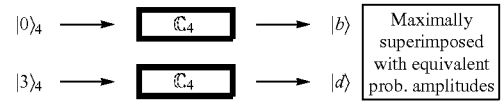

In a quantum computer, the basic unit of information is known as a quantum bit or "qubit." Through quantum mechanical phenomena (superposition and entanglement), these qubits can perform many computations simultaneously in parallel, which theoretically allows the quantum computer to solve a difficult subset of problems much faster than a classical computer that must perform the computations in a serial fashion.

Quantum Computer System

Figure 1A:
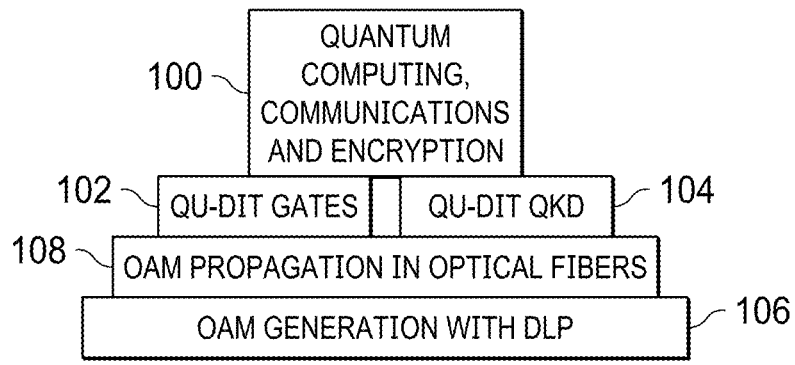
FIG. 1A illustrates an overall view of various components of a universal quantum computer system using OAM qudits with digital light processing.

Referring now to FIG. 1A, there is illustrated an overall view of the various components contributing to a universal quantum computer system using OAM qudits with digital light processing. The present invention uses an approach for both quantum communication and quantum computing applications 100 to work simultaneously using OAM Qudits for implementing Qudit Gates 102 and Qudit Quantum Key Distribution (QKD) 104 with integrated photonics (i.e. digital light processing (DLP)) 106. The OAM signals are generated using digital light processing 106 and allowed to utilize OAM propagation to propagate through optical fibers 108. The OAM propagated signals are utilized within qudit gates 102 and may make use of qudit QKD 104 in order to perform quantum computing, communications and encryption 100. A qudit comprises a quantum unit of information that may take any of d states, where d is a variable.

Figure 1B:
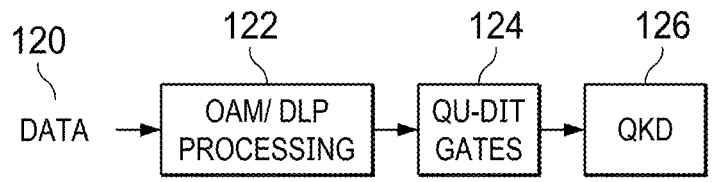
FIG. 1B illustrates a block diagram of a universal quantum computer system using OAM qudits with digital light processing.

Referring now to FIG. 1B, there is illustrated a block diagram of a universal quantum computer system using OAM qudits with digital light processing. An input data stream 120 is provided to OAM 122 to have OAM values applied to the data 120. The OAM processing enables photons to carry an arbitrary number of bits per photon. The OAM processed data bits are applied to the photons using digital light processing (DLP) technologies using digital light processing 123 as described hereinbelow. The signals from the digital light processing 123 are provided to qudit gates 124. The qudit gates 124 may comprise generalized X-gates, generalized Z-gates and generalized CNOT-gates that are qudit versions of existing qubit gates. The qudit gates 124 may also comprise modules such as fault-tolerate quantum computing modules, QKD modules, etc. The modules may provide for quantum error correction (i.e. non-binary syndrome module); entanglement-assisted QKD (i.e. the generalized Bell-states, etc.). The basic qudit gate 124 would comprise a QFT (quantum Fourier transform). Thus, the F-gate on qudits has the same effect as the Hadamard gate on qubits |0> is mapped to 1/sqrt(2) {|0>+|1>}, |1> is mapped to 1/sqrt(2) {|0>−|1>}. The signals out foot from the cutie Gates 124 may then be used in for example a quantum key distribution (QKD) process 126. Existing QKD with high-speed communications and computing is very slow. By using the system described herein there may be a simultaneous increase insecurity and throughput while further increasing the capacity of computing and processing of the system.

Figure 2:
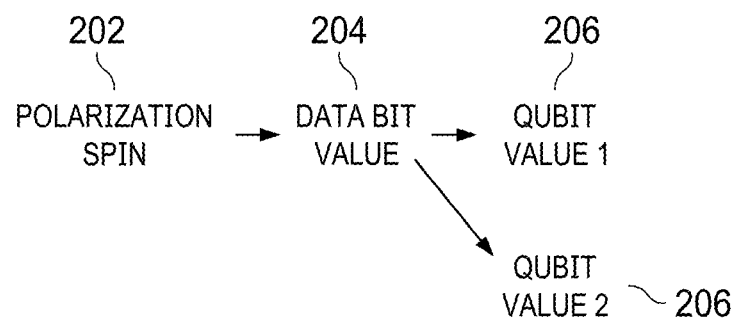
FIG. 2 illustrates the use of spin polarization for quantum gate inputs.
Figure 3:
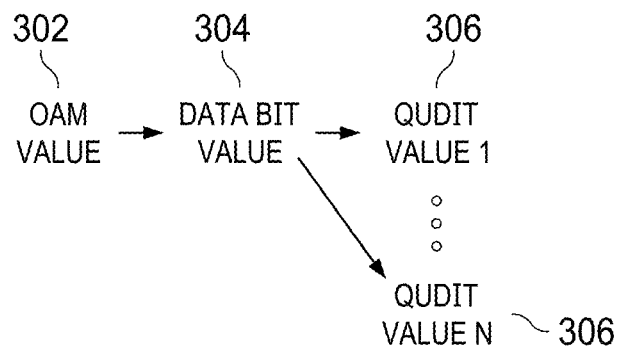
FIG. 3 illustrates the use of OAM for quantum gate inputs.

The photon angular momentum of photons can be used to carry both the spin angular momentum (SAM) and the orbital angular momentum (OAM) to transmit multiple data bits. SAM is associated with polarization, while OAM is associated with azimuthal phase dependence of the complex electric field. Given that OAM eigenstates are mutually orthogonal, a large number of bits per single photon can be transmitted. This is more particularly illustrated with respect to FIGS. 2 and 3. FIG. 2 illustrates how polarization spin 202 may be applied to data bit values 204 to generate qubit values 206. Since each data bit value 204 may only have a positive spin polarization or a negative spin polarization applied thereto only a pair of qubit states are available for each data value. However, as shown in FIG. 3, if an OAM value 302 is applied to each data bit value 304 a much larger number of qudit values 306 maybe obtain for each data bit value 304. The number of qudit values may range from 1 to N, where N is the largest number of different OAM states that are applied to the data values 304. The manner for applying the OAM values 302 to the data bit value 304 may use the DLP® processing 123 that will be more fully described herein below.

Referring now back to FIG. 1, the OAM processed signals may be transmitted using OAM propagation in optical fibers 108. The ability to generate/analyze states with different photon angular momentum applied thereto, by using holographic methods, allows the realization of quantum states in multidimensional Hilbert space. Because OAM states provide an infinite basis state, while SAM states are 2-D only, the OAM states can also be used to increase the security for quantum key distribution (QKD) applications 104 and improve computational power for quantum computing applications 100. The goal of the system is to build angular momentum based deterministic universal quantum qudit gates 102, namely, generalized-X, generalized-Z, and generalized-CNOT qudit gates, and different quantum modules of importance for various applications, including fault-tolerant quantum computing, teleportation, QKD, and quantum error correction. For example, the basic quantum modules for quantum teleportation applications include the generalized-Bell-state generation module and the QFT-module. The basic module for entanglement assisted QKD is either the generalized-Bell-state generation module or the Weyl-operator-module. The approach is to implement all these modules in integrated optics using multi-dimensional qudits on digital light processing.

In quantum computing a qubit or quantum bit is the basic unit of quantum information and comprises the quantum version of the classical binary bit physically realized with a two-state device. A qubit is a two-state quantum-mechanical system, one of the simplest quantum systems displaying the characteristics of quantum mechanics. Examples include: the spin of the electron in which the two levels can be taken as spin up and spin down; or the polarization of a single photon in which the two states can be taken to be the vertical polarization and the horizontal polarization. In a classical system, a bit would have to be in one state or the other. However, quantum mechanics allows the qubit to be in a coherent superposition of both states/levels at the same time, a property that is fundamental to quantum mechanics and thus quantum computing. We can use any two-state system as a qubit and use them to create hyper-entanglement of qudits In quantum computing, the concept of 'qubit' has been introduced as the counterpart of the classical concept of 'bit' in conventional computers. The two qubit states labeled as |0> and |1> correspond to the classical bits 0 and 1 respectively. The arbitrary qubit state |φ> maintains a coherent superposition of states |0> and |1>:

$$|\varphi\rangle = a|0\rangle + b|1\rangle$$

where a and b are complex numbers called probability amplitudes. That is, the qubit state |φ> collapses into either |0> state with probability $|a|^2$, or |1> state with probability $|b|^2$ with satisfying $|a|^2+|b|^2=1$.

The qubit state |φ> is described as $$|\varphi\rangle = \cos\theta|0\rangle + e^{i\psi}\sin\theta|1\rangle$$

which is called Bloch-sphere representation. In order to give a minimum representation of the basic quantum logic gates, this is rewritten as a function with complex-valued representation, by corresponding the probability amplitudes a and b as the real part and imaginary part of the function respectively. The quantum state with complex-valued representation is described as $$f(\theta) = e^{i\theta} = \cos\theta + i\sin\theta,$$

In quantum computing and specifically the quantum circuit model of computation, a quantum logic gate (or simply quantum gate) is a basic quantum circuit operating on a small number of qubits. They are the building blocks of quantum circuits, like classical logic gates are for conventional digital circuits.

Quantum Gates

In quantum computing and specifically the quantum circuit model of computation, a quantum logic gate (or simply quantum gate) is a basic quantum circuit operating on a small number of qubits. They are the building blocks of quantum circuits, like classical logic gates are for conventional digital circuits. We can build All major quantum gates can be built using photonics using photonics (X gates, Z gates, C gates, F gates and C-NOT gates)

Unlike many classical logic gates, quantum logic gates are reversible. However, it is possible to perform classical computing using only reversible gates. For example, the reversible Toffoli gate can implement all Boolean functions, often at the cost of having to use ancillary bits. The Toffoli gate has a direct quantum equivalent, showing that quantum circuits can perform all operations performed by classical circuits.

Quantum logic gates are represented by unitary matrices. The most common quantum gates operate on spaces of one or two qubits, just like the common classical logic gates operate on one or two bits. As matrices, quantum gates can be described by $2^n \times 2^n$ sized unitary matrices, where n is the number of qubits that the gates act on. The variables that the gates act upon, the quantum states, are vectors in $2^n$ complex dimensions, where n again is the number of qubits of the variable. The base vectors are the possible outcomes if measured, and a quantum state is a linear combination of these outcomes.

Figure 4:
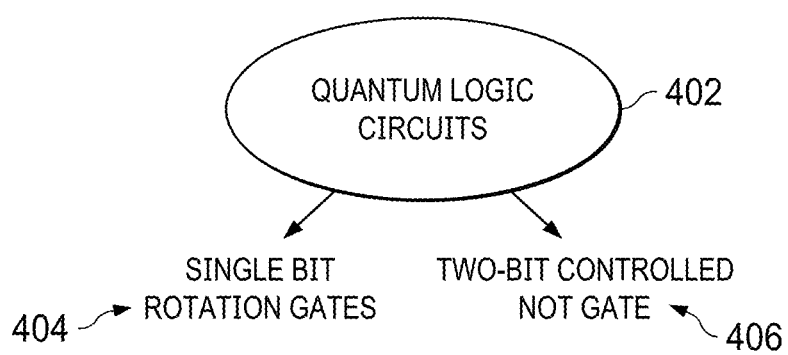
FIG. 4 illustrates various types of quantum logic circuits.
Figure 5:
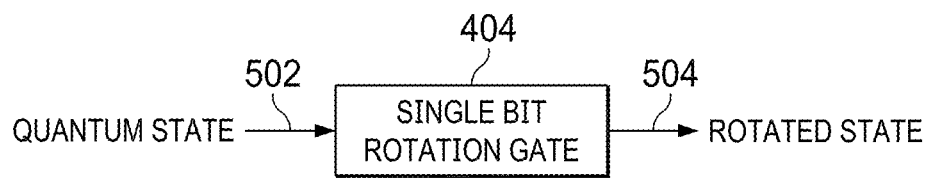
FIG. 5 illustrates a single bit rotation gate.

Referring now to FIG. 4, in quantum logic circuits, fundamental quantum gates 3802 are the single bit rotation gate 404 and two-bit controlled NOT gate 406. Any quantum logic circuit can be constructed by combinations of these two gates. As shown in FIG. 5, a single bit rotation gate 404 takes a quantum state as its input 502 and outputs a rotated state in the complex plane at its output 504. This gate can be described as $f(\theta_1+\theta_2)=f(\theta_1)\cdot f(\theta_2)$.

Figure 6:
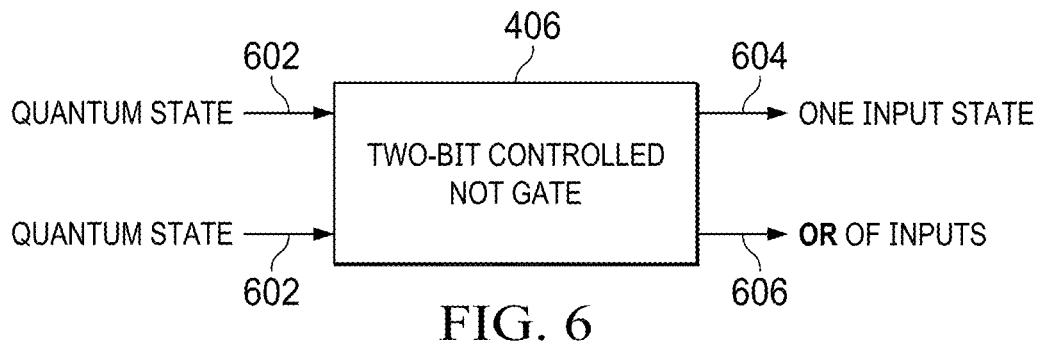
FIG. 6 illustrates a two bit controlled NOT gate.

A two-bit controlled NOT gate 602, as shown in FIG. 6, takes two quantum states as its inputs 602 and gives two outputs: one of the input states 604 and the exclusive OR-ed result of two inputs 606. It is necessary to represent the inversion and non-inversion of the quantum state in order to describe this operation, thus a controlled input parameter V is introduced:

$$f\left(\frac{\pi}{2}\gamma + (1-2\gamma)\cdot\theta\right) = \begin{cases} \cos\theta + i\sin\theta, & \gamma = 0 \\ \sin\theta + i\cos\theta, & \gamma = 1 \end{cases}$$

The output state of the neuron k, denoted as $x_k$, is given as:

$$x_k = f(y_k) = \cos y_k + i \sin y_k = e^{iy_k}$$

A similar formulation for Qudits and a corresponding neural network approach may also be provided.

In recent years, scientists have developed quantum-neuro computing in which the algorithm of quantum computation is used to improve the efficiency of neural computing systems. The quantum state and the operator of quantum computation are both important to realize parallelisms and plasticity respectively in information processing systems. The complex valued representation of these quantum concepts allows neural computation system to advance in learning abilities and to enlarge its possibility of practical applications. The application of the above described application of nonlinear modeling and forecasting to AI may be implemented according to two specific proposals. One is to use a Qubit neural network model based on 2-dimensional Qubits and the second is to expand the Qubits to multi-dimensional Qudits and further investigate their characteristic features, such as the effects of quantum superposition and probabilistic interpretation in the way of applying quantum computing to a neural network.

Figure 7:
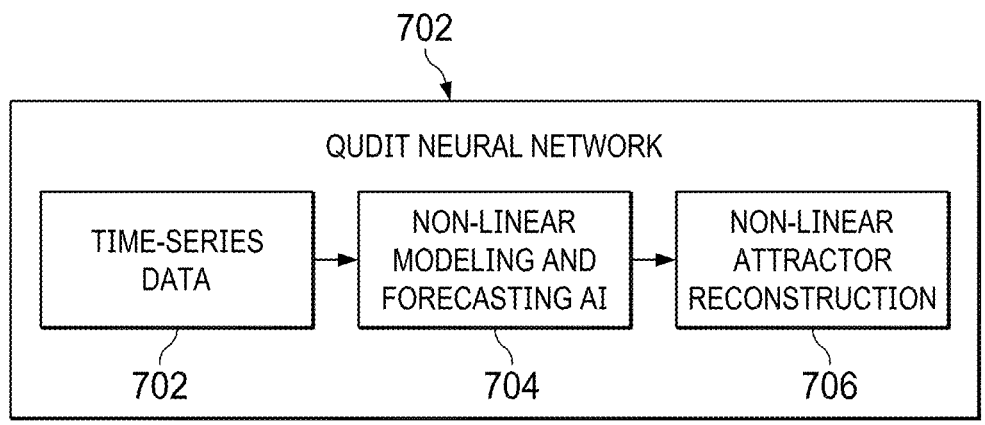
FIG. 7 illustrates a Qudit network

One of the applications for quantum networks is to predict time-series from dynamical systems, especially from chaotic systems by their various applications. There have been several attempts to use real-valued neural networks for predictions, but there have been no attempts for prediction by complex-valued Qudit-based neural networks using nonlinear attractor reconstruction where learning iterations, learning success rates, and prediction errors may be examined. Thus, as shown generally in FIG. 7, a Qudit based network 702 may implement nonlinear modeling and forecasting to AI 704 that generates nonlinear attractor reconstructions 706 from the time-series data 708.

This process implements developments in quantum-neuro computing in which the algorithm of quantum computation is used to improve the efficiency of a neural computing system and those can be used in conjunction with the use of attractors to predict future behavior. The attractor approach is totally classical and not quantum mechanical. For example when delaying embedding to reconstruct the attractor, it is one simple process of delay embedding that occurs multiple times in parallel and therefore quantum computation can be used to realize parallelisms in real time to perform the process of delay embedding. The first implementation is to use Qubit neural network model based on 2-dimensional Qubits to construct attractors and provide predictions of future behavior as described herein and a second is to expand the Qubits to multi-dimensional Qudits for the same purposes and further investigate their characteristic features, such as the effects of quantum superposition and probabilistic interpretation in the way of applying quantum computing to neural network.

OAM Generation

Application of Orbital Angular Momentum to photons that are provided as input to Quantum Gates enable greater amounts of data to each individual photon. The use of OAM enables an arbitrary number of bits to be carried per photon. Achieving higher data carrying capacity is perhaps one of the primary interests of the computing community. This is led to the investigation of using different physical properties of a light wave for communications and data transmission, including amplitude, phase, wavelength and polarization. Orthogonal modes in spatial positions are also under investigation and seemed to be useful as well. Generally these investigative efforts can be summarized in 2 categories: 1) encoding and decoding more bits on a single optical pulse; a typical example is the use of advanced modulation formats, which encode information on amplitude, phase and polarization states, and 2) multiplexing and demultiplexing technologies that allow parallel propagation of multiple independent data channels, each of which is addressed by different light property (e.g., wavelength, polarization and space, corresponding to wavelength-division multiplexing (WDM), polarization-division multiplexing (PDM) and space division multiplexing (SDM), respectively). One manner for achieving the higher data capacity is through using OAM communications and computing which is a process of applying orbital angular momentum to communications/quantum computing signals to prevent interference between signals and to provide for an increased bandwidth as described in U.S. patent application Ser. No. 14/864,511, entitled APPLICATION OF ORBITAL ANGULAR MOMENTUM TO FIBER, FSO AND RF, which is incorporated herein by reference in its entirety. The application of OAM to signals will be more fully described herein below.

The recognition that orbital angular momentum (OAM) has applications in communication and quantum computing has made it an interesting research topic. It is well-known that a photon can carry both spin angular momentum and orbital angular momentum. Contrary to spin angular momentum (e.g., circularly polarized light), which is identified by the electrical field direction, OAM is usually carried by a light beam with a helical phase front. Due to the helical phase structure, an OAM carrying beam usually has an annular intensity profile with a phase singularity at the beam center. Importantly, depending on discrete twisting speed of the helical phase, OAM beams can be quantified is different states, which are completely distinguishable while propagating coaxially. This property allows OAM beams to be potentially useful in either of the two aforementioned categories to help improve the performance of a free space or fiber communication or quantum computing system. Specifically, OAM states could be used as a different dimension to encode bits on a single pulse (or a single photon), or be used to create additional data carriers in an SDM system.

There are some potential benefits of using OAM for communications and quantum computing, some specially designed novel fibers allow less mode coupling and cross talk while propagating in fibers. In addition, OAM beams with different states share a ring-shaped beam profile, which indicate rotational insensitivity for receiving the beams. Since the distinction of OAM beams does not rely on the wavelength or polarization, OAM multiplexing could be used in addition to WDM and PDM techniques so that potentially improve the system performance may be provided.

Figure 8:
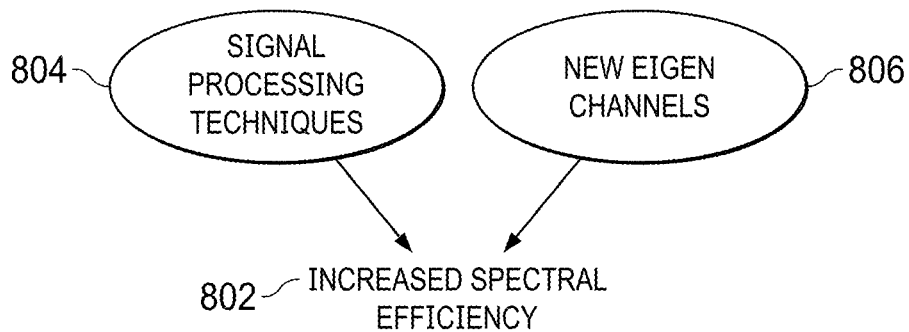
FIG. 8 illustrates various techniques for increasing spectral efficiency within a transmitted signal.

Referring now to the drawings, and more particularly to FIG. 8, wherein there is illustrated two manners for increasing spectral efficiency of a communications or quantum computing system. In general, there are basically two ways to increase spectral efficiency 802 of a communications or quantum computing system. The increase may be brought about by signal processing techniques 804 in the modulation scheme or using multiple access technique. Additionally, the spectral efficiency can be increase by creating new Eigen channels 806 within the electromagnetic propagation. These two techniques are completely independent of one another and innovations from one class can be added to innovations from the second class. Therefore, the combination of this technique introduced a further innovation.

Spectral efficiency 802 is the key driver of the business model of a communications or quantum computing system. The spectral efficiency is defined in units of bit/sec/hz and the higher the spectral efficiency, the better the business model. This is because spectral efficiency can translate to a greater number of users, higher throughput, higher quality or some of each within a communications or quantum computing system.

Regarding techniques using signal processing techniques or multiple access techniques. These techniques include innovations such as TDMA, FDMA, CDMA, EVDO, GSM, WCDMA, HSPA and the most recent OFDM techniques used in 4G WIMAX and LTE. Almost all of these techniques use decades-old modulation techniques based on sinusoidal Eigen functions called QAM modulation. Within the second class of techniques involving the creation of new Eigen channels 806, the innovations include diversity techniques including space and polarization diversity as well as multiple input/multiple output (MIMO) where uncorrelated radio paths create independent Eigen channels and propagation of electromagnetic waves.

Figure 9:
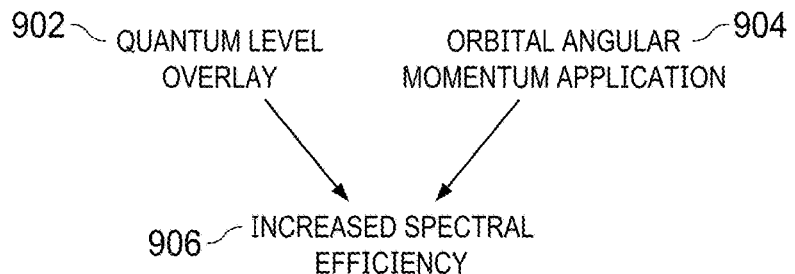
FIG. 9 illustrates a particular technique for increasing spectral efficiency within a transmitted signal.

Referring now to FIG. 9, the present system configuration introduces two techniques, one from the signal processing techniques 804 category and one from the creation of new eigen channels 806 category that are entirely independent from each other. Their combination provides a unique manner to disrupt the access part of an end to end communications or quantum computing system from twisted pair and cable to fiber optics, to free space optics, to RF used in cellular, backhaul and satellite, to RF satellite, to RF broadcast, to RF point-to point, to RF point-to-multipoint, to RF point-to-point (backhaul), to RF point-to-point (fronthaul to provide higher throughput CPRI interface for cloudification and virtualization of RAN and cloudified HetNet), to Internet of Things (IOT), to Wi-Fi, to Bluetooth, to a personal device cable replacement, to an RF and FSO hybrid system, to Radar, to electromagnetic tags and to all types of wireless access. The first technique involves the use of a new signal processing technique using new orthogonal signals to upgrade QAM modulation using non-sinusoidal functions. This is referred to as quantum level overlay (QLO) 902. The second technique involves the application of new electromagnetic wavefronts using a property of electromagnetic waves or photon, called orbital angular momentum (QAM) 104. Application of each of the quantum level overlay techniques 902 and orbital angular momentum application 904 uniquely offers orders of magnitude higher spectral efficiency 906 within communication or quantum computing systems in their combination.

With respect to the quantum level overlay technique 909, new eigen functions are introduced that when overlapped (on top of one another within a symbol) significantly increases the spectral efficiency of the system. The quantum level overlay technique 902 borrows from quantum mechanics, special orthogonal signals that reduce the time bandwidth product and thereby increase the spectral efficiency of the channel. Each orthogonal signal is overlaid within the symbol acts as an independent channel. These independent channels differentiate the technique from existing modulation techniques.

With respect to the application of orbital angular momentum 904, this technique introduces twisted electromagnetic waves, or light beams, having helical wave fronts that carry orbital angular momentum (OAM). Different OAM carrying waves/beams can be mutually orthogonal to each other within the spatial domain, allowing the waves/beams to be efficiently multiplexed and demultiplexed within a link. OAM beams are interesting in communications or quantum computing due to their potential ability in special multiplexing multiple independent data carrying channels.

With respect to the combination of quantum level overlay techniques 902 and orbital angular momentum application 904, the combination is unique as the OAM multiplexing technique is compatible with other electromagnetic techniques such as wavelength and polarization division multiplexing. This suggests the possibility of further increasing system performance. The application of these techniques together in high capacity data transmission disrupts the access part of an end to end communications or quantum computing system from twisted pair and cable to fiber optics, to free space optics, to RF used in cellular, backhaul and satellite, to RF satellite, to RF broadcast, to RF point-to point, to RF point-to-multipoint, to RF point-to-point (backhaul), to RF point-to-point (fronthaul to provide higher throughput CPRI interface for cloudification and virtualization of RAN and cloudified HetNet), to Internet of Things (IOT), to Wi-Fi, to Bluetooth, to a personal device cable replacement, to an RF and FSO hybrid system, to Radar, to electromagnetic tags and to all types of wireless access.

Each of these techniques can be applied independent of one another, but the combination provides a unique opportunity to not only increase spectral efficiency, but to increase spectral efficiency without sacrificing distance or signal to noise ratios.

Using the Shannon Capacity Equation, a determination may be made if spectral efficiency is increased. This can be mathematically translated to more bandwidth. Since bandwidth has a value, one can easily convert spectral efficiency gains to financial gains for the business impact of using higher spectral efficiency. Also, when sophisticated forward error correction (FEC) techniques are used, the net impact is higher quality but with the sacrifice of some bandwidth. However, if one can achieve higher spectral efficiency (or more virtual bandwidth), one can sacrifice some of the gained bandwidth for FEC and therefore higher spectral efficiency can also translate to higher quality.

System providers are interested in increasing spectral efficiency. However, the issue with respect to this increase is the cost. Each technique at different layers of the protocol has a different price tag associated therewith. Techniques that are implemented at a physical layer have the most impact as other techniques can be superimposed on top of the lower layer techniques and thus increase the spectral efficiency further. The price tag for some of the techniques can be drastic when one considers other associated costs. For example, the multiple input multiple output (MIMO) technique uses additional antennas to create additional paths where each RF path can be treated as an independent channel and thus increase the aggregate spectral efficiency. In the MIMO scenario, the operator has other associated soft costs dealing with structural issues such as antenna installations, etc. These techniques not only have tremendous cost, but they have huge timing issues as the structural activities take time and the achieving of higher spectral efficiency comes with significant delays which can also be translated to financial losses.

The quantum level overlay technique 902 has an advantage that the independent channels are created within the symbols. This will have a tremendous cost and time benefit compared to other techniques. Also, the quantum layer overlay technique 902 is a physical layer technique, which means there are other techniques at higher layers of the protocol that can all ride on top of the QLO techniques 902 and thus increase the spectral efficiency even further. QLO technique 902 uses standard QAM modulation used in OFDM based multiple access technologies such as WIMAX or LTE. QLO technique 902 basically enhances the QAM modulation at the transceiver by injecting new signals to the I & Q components of the baseband and overlaying them before QAM modulation as will be more fully described herein below. At the receiver, the reverse procedure is used to separate the overlaid signal and the net effect is a pulse shaping that allows better localization of the spectrum compared to standard QAM or even the root raised cosine. The impact of this technique is a significantly higher spectral efficiency.

Figure 10:
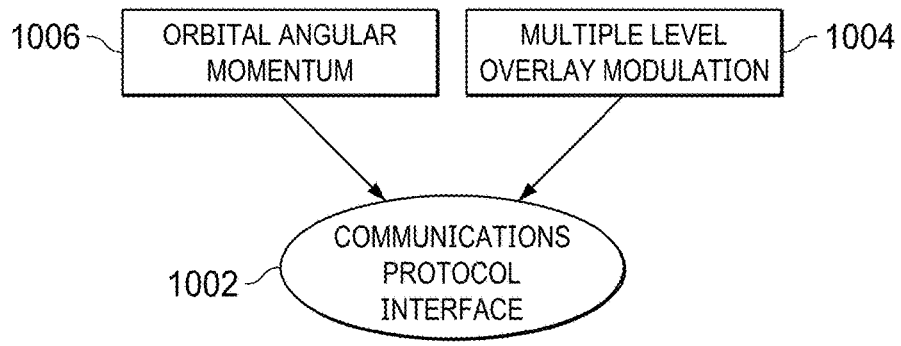
FIG. 10 illustrates a general overview of the manner for providing communication bandwidth between various communication protocol interfaces.

Referring now more particularly to FIG. 10, there is illustrated a general overview of the manner for providing improved communication and/or data transmission bandwidth within various interfaces 1002, using a combination of multiple level overlay modulation 1004 and the application of orbital angular momentum 1006 to increase the number of communications channels or amount of transmitted data.

The various interfaces 1002 may comprise a variety of links, such as RF communication, wireline communication such as cable or twisted pair connections, or optical communications making use of light wavelengths such as fiber-optic communications or free-space optics. Various types of RF communications may include a combination of RF microwave or RF satellite communication, as well as multiplexing between RF and free-space optics in real time.

By combining a multiple layer overlay modulation technique 1004 with orbital angular momentum (OAM) technique 1006, a higher throughput over various types of links 1002 may be achieved. The use of multiple level overlay modulation alone without OAM increases the spectral efficiency of communication links 1002, whether wired, optical, or wireless. However, with OAM, the increase in spectral efficiency is even more significant.

Multiple overlay modulation techniques 1004 provide a new degree of freedom beyond the conventional 2 degrees of freedom, with time T and frequency F being independent variables in a two-dimensional notational space defining orthogonal axes in an information diagram. This comprises a more general approach rather than modeling signals as fixed in either the frequency or time domain. Previous modeling methods using fixed time or fixed frequency are considered to be more limiting cases of the general approach of using multiple level overlay modulation 1004. Within the multiple level overlay modulation technique 1004, signals may be differentiated in two-dimensional space rather than along a single axis. Thus, the information-carrying capacity of a communications channel may be determined by a number of signals which occupy different time and frequency coordinates and may be differentiated in a notational two-dimensional space.

Within the notational two-dimensional space, minimization of the time bandwidth product, i.e., the area occupied by a signal in that space, enables denser packing, and thus, the use of more signals and/or data, with higher resulting information-carrying capacity, within an allocated channel. Given the frequency channel delta ($\Delta f$), a given signal transmitted through it in minimum time $\Delta t$ will have an envelope described by certain time-bandwidth minimizing signals. The time-bandwidth products for these signals take the form:

$$\Delta t\, \Delta f = \tfrac{1}{2}(2n+1)$$

where n is an integer ranging from 0 to infinity, denoting the order of the signal.

These signals form an orthogonal set of infinite elements, where each has a finite amount of energy. They are finite in both the time domain and the frequency domain, and can be detected from a mix of other signals and noise through correlation, for example, by match filtering. Unlike other wavelets, these orthogonal signals have similar time and frequency forms.

The orbital angular momentum process 1006 provides a twist to wave fronts of the electromagnetic fields carrying the data stream that may enable the transmission of multiple data streams on the same frequency, wavelength, or other signal-supporting mechanism. Similarly, other orthogonal signals may be applied to the different data streams to enable transmission of multiple data streams on the same frequency, wavelength or other signal-supporting mechanism. This will increase the bandwidth over a communications link by allowing a single frequency or wavelength to support multiple eigen channels, each of the individual channels having a different orthogonal and independent orbital angular momentum associated therewith.

Figure 11:
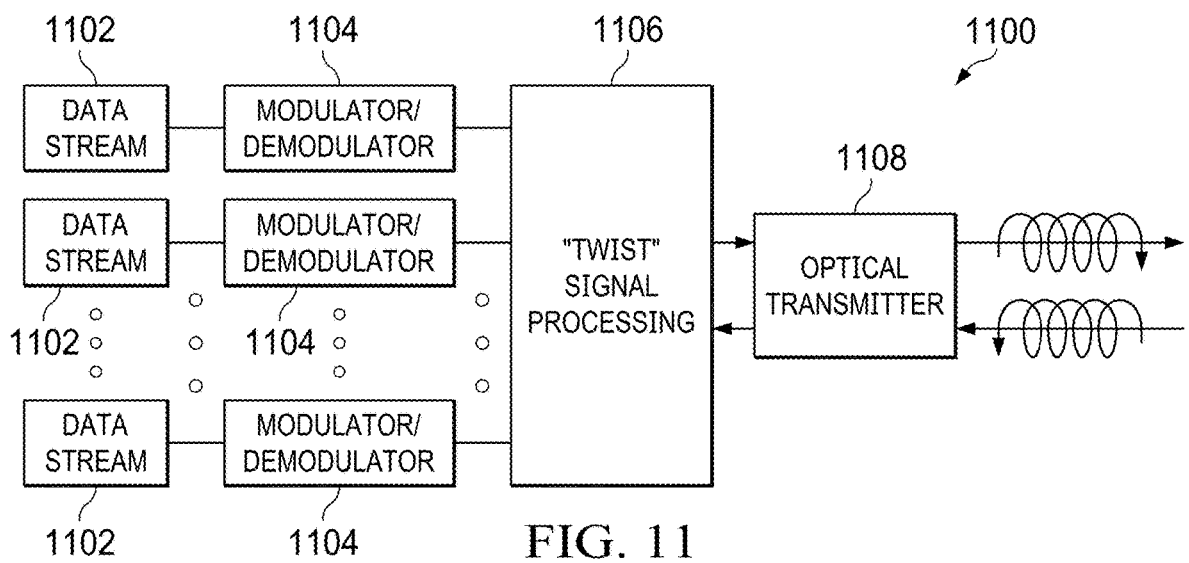
FIG. 11 is a functional block diagram of a system for generating orbital angular momentum within a communication system.

Referring now more particularly to FIG. 11, there is illustrated a functional block diagram of a system for generating the orbital angular momentum "twist" within a communication or quantum computing system, such as that illustrated with respect to FIG. 10, to provide a data stream that may be combined with multiple other data streams for transmission upon a same wavelength or frequency. Multiple data streams 1102 are provided to the transmission processing circuitry 1100. Each of the data streams 1102 comprises, for example, an end to end link connection carrying a voice call or a packet connection transmitting non-circuit switch packed data over a data connection. The multiple data streams 1102 are processed by modulator/demodulator circuitry 1104. The modulator/demodulator circuitry 1104 modulates the received data stream 1102 onto a wavelength or frequency channel using a multiple level overlay modulation technique, as will be more fully described herein below. The communications link may comprise an optical fiber link, free-space optics link, RF microwave link, RF satellite link, wired link (without the twist), etc.

The modulated data stream is provided to the orbital angular momentum (OAM) signal processing block 1106.

The orbital angular momentum signal processing block 1106 applies in one embodiment an orbital angular momentum to a signal. In other embodiments, the processing block 1106 can apply any orthogonal function to a signal being transmitted. These orthogonal functions can be spatial Bessel functions, Laguerre-Gaussian functions, Hermite-Gaussian functions or any other orthogonal function. Each of the modulated data streams from the modulator/demodulator 1104 are provided a different orbital angular momentum by the orbital angular momentum electromagnetic block 1106 such that each of the modulated data streams have a unique and different orbital angular momentum associated therewith. Each of the modulated signals having an associated orbital angular momentum are provided to an optical transmitter 1108 that transmits each of the modulated data streams having a unique orbital angular momentum on a same wavelength. Each wavelength has a selected number of bandwidth slots B and may have its data transmission capability increase by a factor of the number of degrees of orbital angular momentum $\ell$ that are provided from the OAM electromagnetic block 1106. The optical transmitter 1108 transmitting signals at a single wavelength could transmit B groups of information. The optical transmitter 1108 and OAM electromagnetic block 1106 may transmit $\ell \times B$ groups of information according to the configuration described herein.

In a receiving mode, the optical transmitter 1108 will have a wavelength including multiple signals transmitted therein having different orbital angular momentum signals embedded therein. The optical transmitter 1108 forwards these signals to the OAM signal processing block 1106, which separates each of the signals having different orbital angular momentum and provides the separated signals to the demodulator circuitry 1104. The demodulation process extracts the data streams 1102 from the modulated signals and provides it at the receiving end using the multiple layer overlay demodulation technique.

Figure 12:
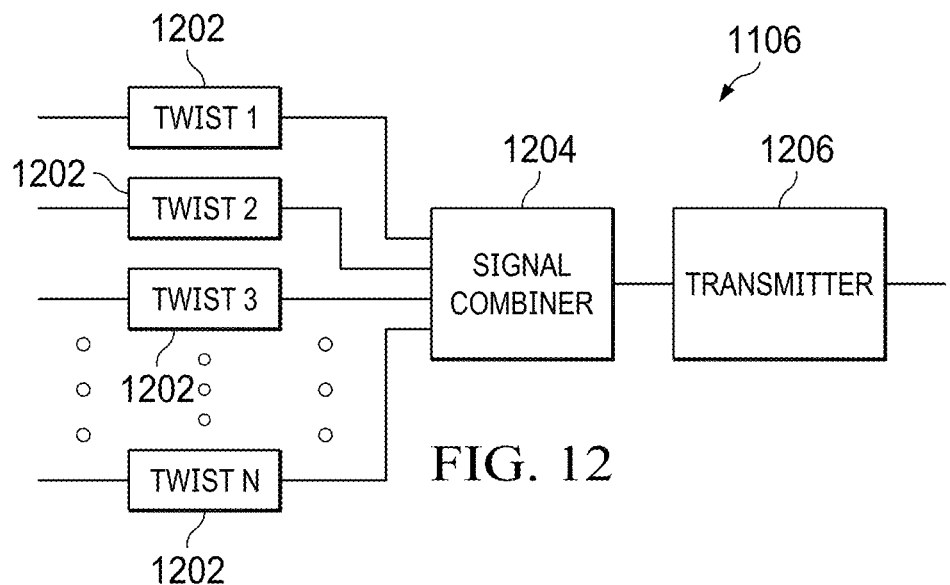
FIG. 12 is a functional block diagram of the orbital angular momentum signal processing block of FIG. 11.

Referring now to FIG. 12, there is provided a more detailed functional description of the OAM signal processing block 1106. Each of the input data streams are provided to OAM circuitry 1202. Each of the OAM circuitry 1202 provides a different orbital angular momentum to the received data stream. The different orbital angular momentums are achieved by applying different currents for the generation of the signals that are being transmitted to create a particular orbital angular momentum associated therewith. The orbital angular momentum provided by each of the OAM circuitries 1202 are unique to the data stream that is provided thereto. An infinite number of orbital angular momentums may be applied to different input data streams or photons using many different currents. Each of the separately generated data streams are provided to a signal combiner 1204, which combines/multiplexes the signals onto a wavelength for transmission from the transmitter 1206. The combiner 1204 performs a spatial mode division multiplexing to place all of the signals upon a same carrier signal in the space domain.

Figure 13:
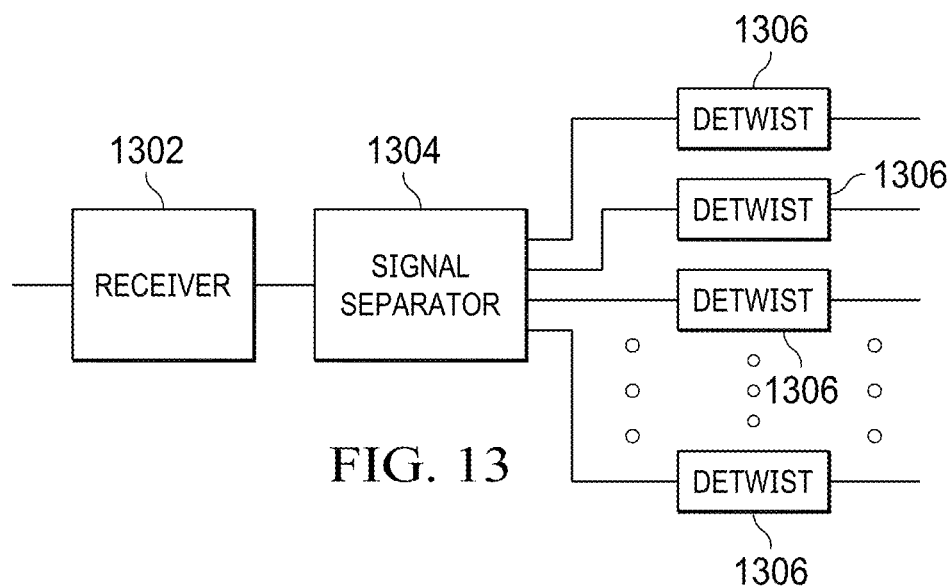
FIG. 13 is a functional block diagram illustrating the manner for removing orbital angular momentum from a received signal including a plurality of data streams.

Referring now to FIG. 13, there is illustrated the manner in which the OAM processing circuitry 1106 may separate a received signal into multiple data streams. The receiver 1302 receives the combined OAM signals on a single wavelength and provides this information to a signal separator 1304. The signal separator 1304 separates each of the signals having different orbital angular momentums from the received wavelength and provides the separated signals to OAM de-twisting circuitry 1306. The OAM de-twisting circuitry 1306 removes the associated OAM twist from each of the associated signals and provides the received modulated data stream for further processing. The signal separator 1304 separates each of the received signals that have had the orbital angular momentum removed therefrom into individual received signals. The individually received signals are provided to the receiver 1302 for demodulation using, for example, multiple level overlay demodulation as will be more fully described herein below.

Figure 14:
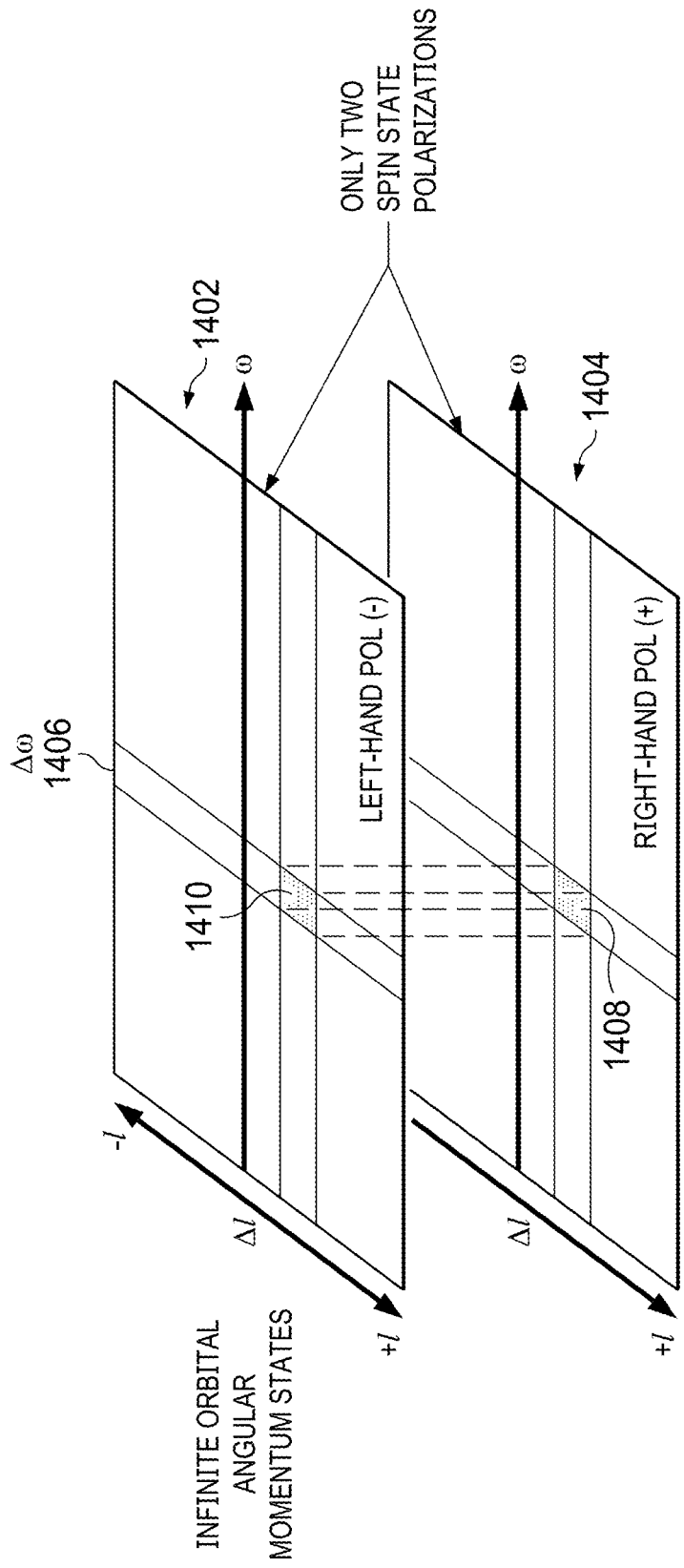
FIG. 14 illustrates a single wavelength having two quanti-spin polarizations providing an infinite number of signals having various orbital angular momentums associated therewith.

FIG. 14 illustrates in a manner in which a single wavelength or frequency, having two quanti-spin polarizations may provide an infinite number of twists having various orbital angular momentums associated therewith. The l axis represents the various quantized orbital angular momentum states which may be applied to a particular signal at a selected frequency or wavelength. The symbol omega (ω) represents the various frequencies to which the signals of differing orbital angular momentum may be applied. The top grid 1402 represents the potentially available signals for a left-handed signal polarization, while the bottom grid 1404 is for potentially available signals having right handed polarization.

By applying different orbital angular momentum states to a signal at a particular frequency or wavelength, a potentially infinite number of states may be provided at the frequency or wavelength. Thus, the state at the frequency Δω or wavelength 1406 in both the left-handed polarization plane 1402 and the right handed polarization plane 1404 can provide an infinite number of signals at different orbital angular momentum states Δl. Blocks 1408 and 1410 represent a particular signal having an orbital angular momentum Δl at a frequency Δω or wavelength in both the right-handed polarization plane 1404 and left handed polarization plane 1410, respectively. By changing to a different orbital angular momentum within the same frequency Δω or wavelength 1406, different signals may also be transmitted. Each angular momentum state corresponds to a different determined current level for transmission from the optical transmitter. By estimating the equivalent current for generating a particular orbital angular momentum within the optical domain and applying this current for transmission of the signals, the transmission of the signal may be achieved at a desired orbital angular momentum state.

Thus, the illustration of FIG. 14, illustrates two possible angular momentums, the spin angular momentum, and the orbital angular momentum. The spin version is manifested within the polarizations of macroscopic electromagnetism and has only left and right hand polarizations due to up and down spin directions. However, the orbital angular momentum indicates an infinite number of states that are quantized. The paths are more than two and can theoretically be infinite through the quantized orbital angular momentum levels.

Figure 15A:
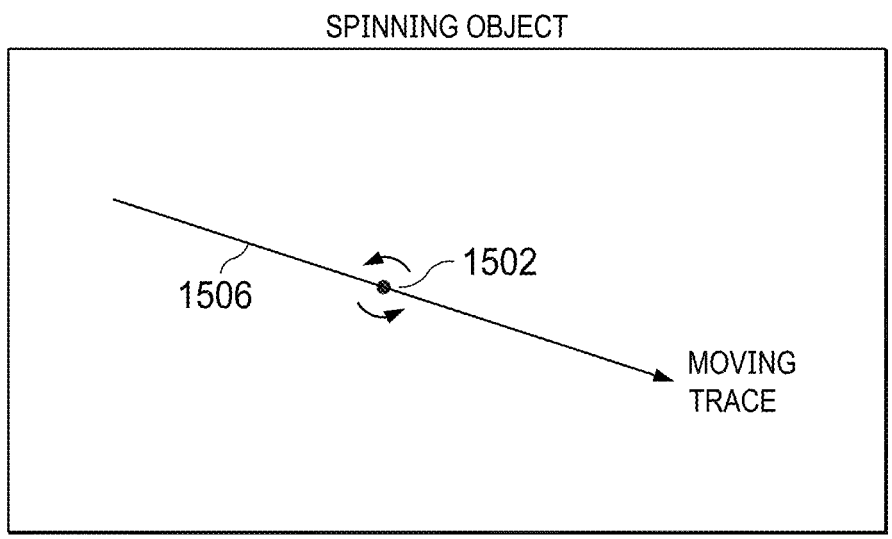
FIG. 15A illustrates an object with a spin angular momentum.
Figure 15B:
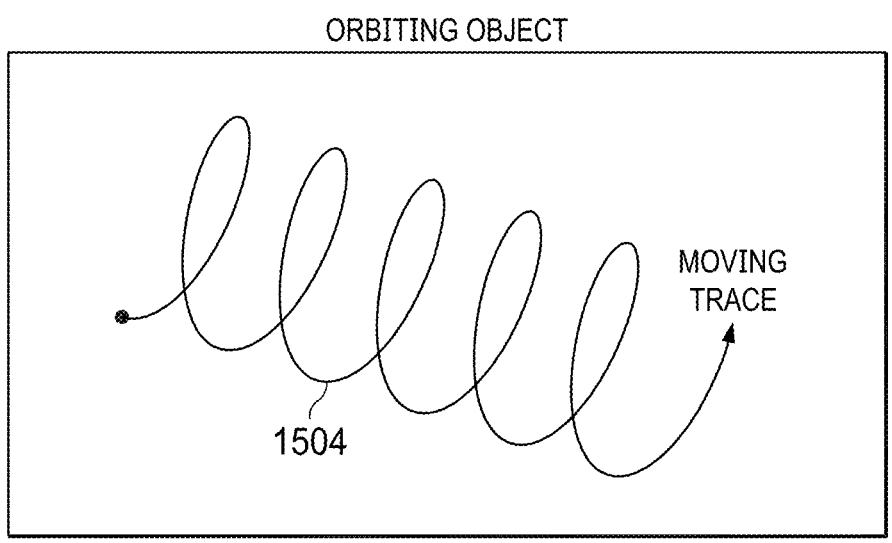
FIG. 15B illustrates an object with an orbital angular momentum.
Figure 15C:
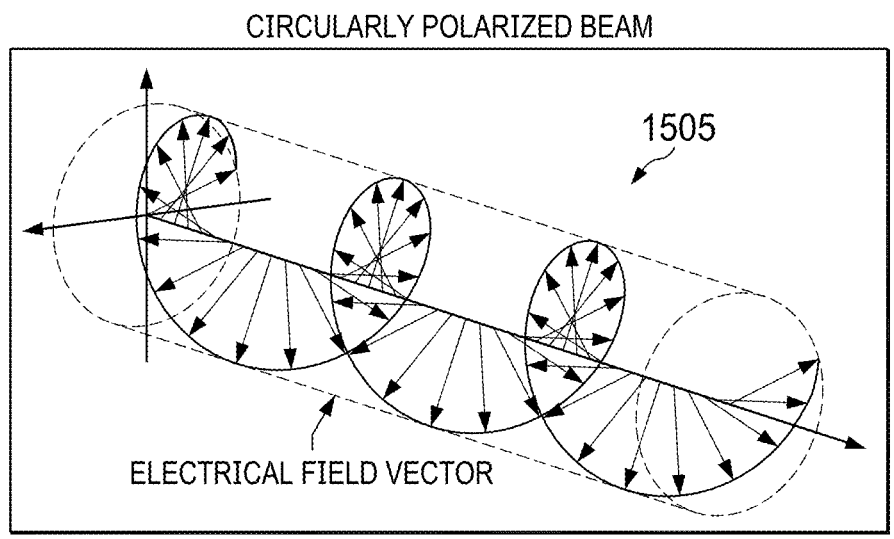
FIG. 15C illustrates a circularly polarized beam carrying spin angular momentum.
Figure 15D:
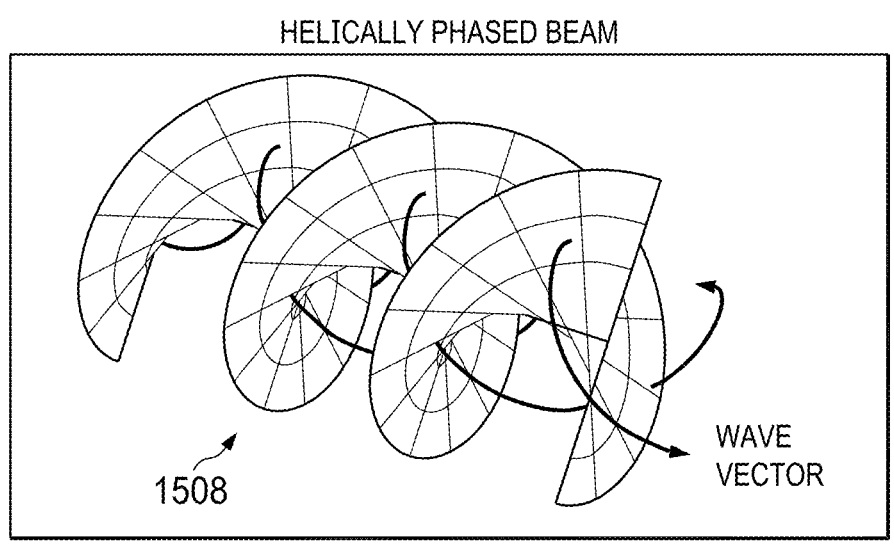
FIG. 15D illustrates the phase structure of a light beam carrying an orbital angular momentum.

It is well-known that the concept of linear momentum is usually associated with objects moving in a straight line. The object could also carry angular momentum if it has a rotational motion, such as spinning (i.e., spin angular momentum (SAM) 1502), or orbiting around an axis 1506 (i.e., OAM 1504), as shown in FIGS. 15A and 15B, respectively. A light beam may also have rotational motion as it propagates. In paraxial approximation, a light beam carries SAM 1502 if the electrical field rotates along the beam axis 1506 (i.e., circularly polarized light 1505), and carries OAM 1504 if the wave vector spirals around the beam axis 1506, leading to a helical phase front 1508, as shown in FIGS. 15C and 15D. In its analytical expression, this helical phase front 1508 is usually related to a phase term of $\exp(i\ell\theta)$ in the transverse plane, where θ refers to the angular coordinate, and $\ell$ is an integer indicating the number of intertwined helices (i.e., the number of 2π phase shifts along the circle around the beam axis). ℓ could be a positive, negative integer or zero, corresponding to clockwise, counterclockwise phase helices or a Gaussian beam with no helix, respectively.

Two important concepts relating to OAM include: 1) OAM and polarization: As mentioned above, an OAM beam is manifested as a beam with a helical phase front and therefore a twisting wave vector, while polarization states can only be connected to SAM 1502. A light beam carries SAM 1502 of ±h/2π (h is Plank's constant) per photon if it is left or right circularly polarized and carries no SAM 1502 if it is linearly polarized. Although the SAM 1502 and OAM 1504 of light can be coupled to each other under certain scenarios, they can be clearly distinguished for a paraxial light beam. Therefore, with the paraxial assumption, OAM 1504 and polarization can be considered as two independent properties of light. 2) OAM beam and Laguerre-Gaussian (LG) beam: In general, an OAM-carrying beam could refer to any helically phased light beam, irrespective of its radial distribution (although sometimes OAM could also be carried by a non-helically phased beam). An LG beam is a special subset among all OAM-carrying beams, due to that the analytical expression of LG beams are eigen-solutions of paraxial form of the wave equation in cylindrical coordinates. For an LG beam, both azimuthal and radial wavefront distributions are well defined, and are indicated by two index numbers, ℓ and p, of which ℓ has the same meaning as that of a general OAM beam, and p refers to the radial nodes in the intensity distribution. Mathematical expressions of LG beams form an orthogonal and complete basis in the spatial domain. In contrast, a general OAM beam actually comprises a group of LG beams (each with the same ℓ index but a different p index) due to the absence of radial definition. The term of "OAM beam" refers to all helically phased beams and is used to distinguish from LG beams.

Using the orbital angular momentum state of the transmitted energy signals, physical information can be embedded within the radiation transmitted by the signals. The Maxwell-Heaviside equations can be represented as:

$$\nabla \cdot E = \frac{\rho}{\varepsilon_0}$$

$$\nabla \times E = -\frac{\partial B}{\partial t}$$

$$\nabla \cdot B = 0$$

$$\nabla \times B = \varepsilon_0 \mu_0 \frac{\partial E}{\partial t} + \mu_0 j(t, x)$$

where ∇ is the del operator, E is the electric field intensity and B is the magnetic flux density. Using these equations, one can derive 23 symmetries/conserved quantities from Maxwell's original equations. However, there are only ten well-known conserved quantities and only a few of these are commercially used. Historically if Maxwell's equations where kept in their original quaternion forms, it would have been easier to see the symmetries/conserved quantities, but when they were modified to their present vectorial form by Heaviside, it became more difficult to see such inherent symmetries in Maxwell's equations.

Maxwell's linear theory is of U(1) symmetry with Abelian commutation relations. They can be extended to higher symmetry group SU(2) form with non-Abelian commutation relations that address global (non-local in space) properties. The Wu-Yang and Harmuth interpretation of Maxwell's theory implicates the existence of magnetic monopoles and magnetic charges. As far as the classical fields are concerned, these theoretical constructs are pseudo-particle, or instanton. The interpretation of Maxwell's work actually departs in significant ways from Maxwell's original intention. In Maxwell's original formulation, Faraday's electrotonic states (the Aμ field) was central making them compatible with Yang-Mills theory (prior to Heaviside). The mathematical dynamic entities called solitons can be either classical or quantum, linear or non-linear and describe EM waves. However, solitons are of SU(2) symmetry forms. In order for conventional interpreted classical Maxwell's theory of U(1) symmetry to describe such entities, the theory must be extended to SU(2) forms.

Besides the half dozen physical phenomena (that cannot be explained with conventional Maxwell's theory), the recently formulated Harmuth Ansatz also address the incompleteness of Maxwell's theory. Harmuth amended Maxwell's equations can be used to calculate EM signal velocities provided that a magnetic current density and magnetic charge are added which is consistent to Yang-Mills filed equations. Therefore, with the correct geometry and topology, the Aμ potentials always have physical meaning The conserved quantities and the electromagnetic field can be represented according to the conservation of system energy and the conservation of system linear momentum. Time symmetry, i.e. the conservation of system energy can be represented using Poynting's theorem according to the equations:

$$H = \sum_i m_i \gamma_i c^2 + \frac{\varepsilon_0}{2} \int d^3 x (|E|^2 + c^2 |B|^2) \quad \text{Hamiltonian (total energy)}$$

$$\frac{dU^{mech}}{dt} + \frac{dU^{em}}{dt} + \oint_{s'} d^2 x' \hat{n}' \cdot S = 0 \quad \text{conservation of energy}$$

The space symmetry, i.e., the conservation of system linear momentum representing the electromagnetic Doppler shift can be represented by the equations:

$$p = \sum_i m_i \gamma_i v_i + \varepsilon_0 \int d^3 x (E \times B) \quad \text{linear momentum}$$

$$\frac{dp^{mech}}{dt} + \frac{dp^{em}}{dt} + \oint_{s'} d^2 x' \hat{n}' \cdot T = 0 \quad \text{conservation of linear momentum}$$

The conservation of system center of energy is represented by the equation:

$$R = \frac{1}{H} \sum_i (x_i - x_0) m_i \gamma_i c^2 + \frac{\varepsilon_0}{2H} \int d^3 x (x_i - x_0)(|E|^2 + c^2 |B|^2)$$

Similarly, the conservation of system angular momentum, which gives rise to the azimuthal Doppler shift is represented by the equation:

$$\frac{dJ^{mech}}{dt} + \frac{dJ^{em}}{dt} + \oint_{s'} d^2 x' \hat{n}' \cdot M = 0$$

conservation of angular momentum

For radiation beams in free space, the EM field angular momentum $J^{em}$ can be separated into two parts:

$$J^{em} = \varepsilon_0 \int_{V'} d^3x' (E \times A) + \varepsilon_0 \int_{V'} d^3x' E_i [(x'-x_0) \times \nabla] A_i$$

For each singular Fourier mode in real valued representation:

$$J^{em} = -i\frac{\varepsilon_0}{2\omega} \int_{V'} d^3x' (E^* \times E) - i\frac{\varepsilon_0}{2\omega} \int_{V'} d^3x' E_i [(x'-x_0) \times \nabla] E_i$$

The first part is the EM spin angular momentum $S^{em}$, its classical manifestation is wave polarization. And the second part is the EM orbital angular momentum $L^{em}$ its classical manifestation is wave helicity. In general, both EM linear momentum $P^{em}$, and EM angular momentum $J^{em}=L^{em}+S^{em}$ are radiated all the way to the far field.

By using Poynting theorem, the optical vorticity of the signals may be determined according to the optical velocity equation:

$$\frac{\partial U}{\partial t} + \nabla \cdot S = 0, \quad \text{continuity equation}$$

where S is the Poynting vector $$S = \frac{1}{4}(E \times H^* + E^* \times H),$$

and U is the energy density $$U = \frac{1}{4}(\varepsilon|E|^2 + \mu_0|H|^2),$$

with E and H comprising the electric field and the magnetic field, respectively, and $\varepsilon$ and $\mu_0$ being the permittivity and the permeability of the medium, respectively. The optical vorticity V may then be determined by the curl of the optical velocity according to the equation:

$$V = \nabla \times v_{opt} = \nabla \times \left( \frac{E \times H^* + E^* \times H}{\varepsilon|E|^2 + \mu_0|H|^2} \right)$$

Maxwell's Equations

Gauss' Laws:
$\nabla \cdot D = \rho$
$\nabla \cdot B = 0$

Faraday's Law:
$\nabla \times E = -\frac{\partial B}{\partial t}$

Ampere's Law:
$\nabla \times H = J + \frac{\partial D}{\partial t}$

↓

$\nabla^2 E + k^2 E = 0$ (Full Wave Equation)

↓

Wave Equations $\frac{d^2E}{dx^2} + \frac{d^2E}{dy^2} + \frac{d^2E}{dz^2} + k^2 E = 0$ (Rectangular)

$\frac{1}{\rho}\frac{d}{d\rho}\left(\rho \frac{d}{d\rho}\right)E + \frac{1}{\rho^2}\frac{d^2}{d\varphi^2}E + \frac{d^2E}{dz^2} + k^2 E = 0$ (Cylindrical)

Figure 16A:
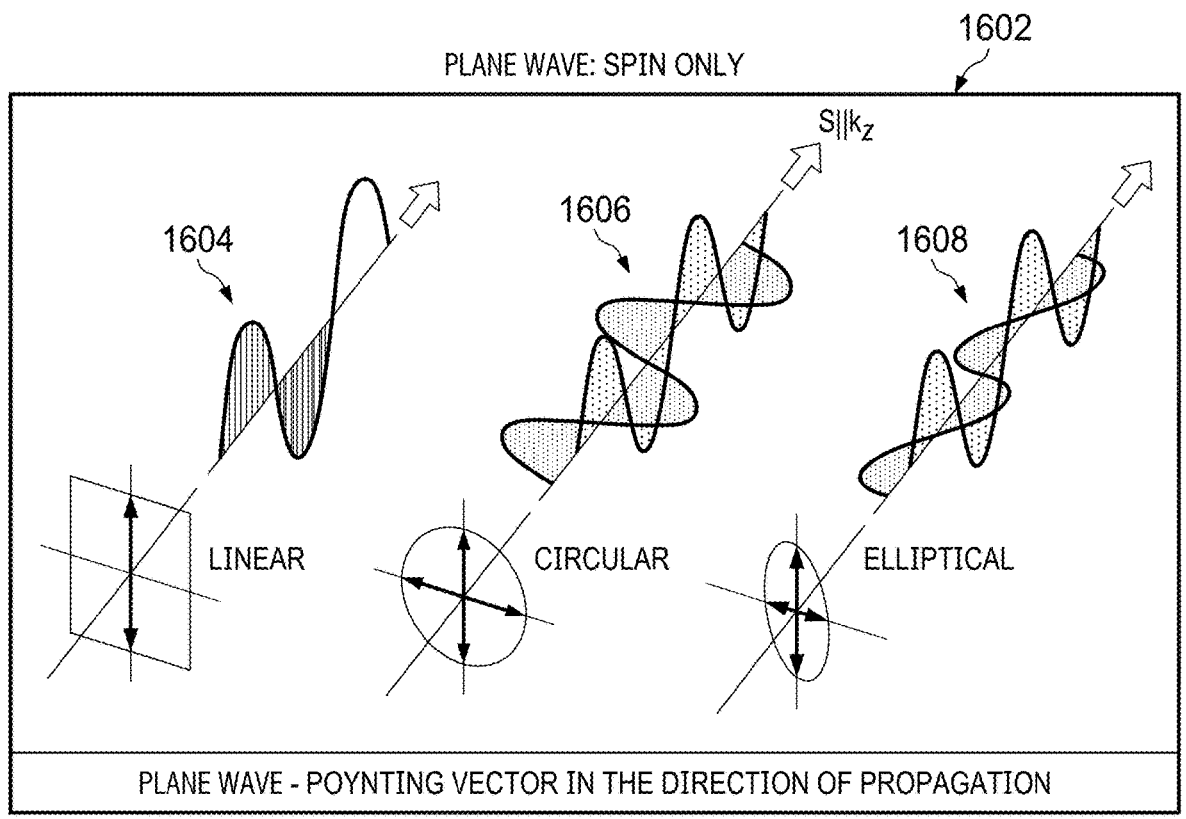
FIG. 16A illustrates a plane wave having only variations in the spin angular momentum.
Figure 16B:
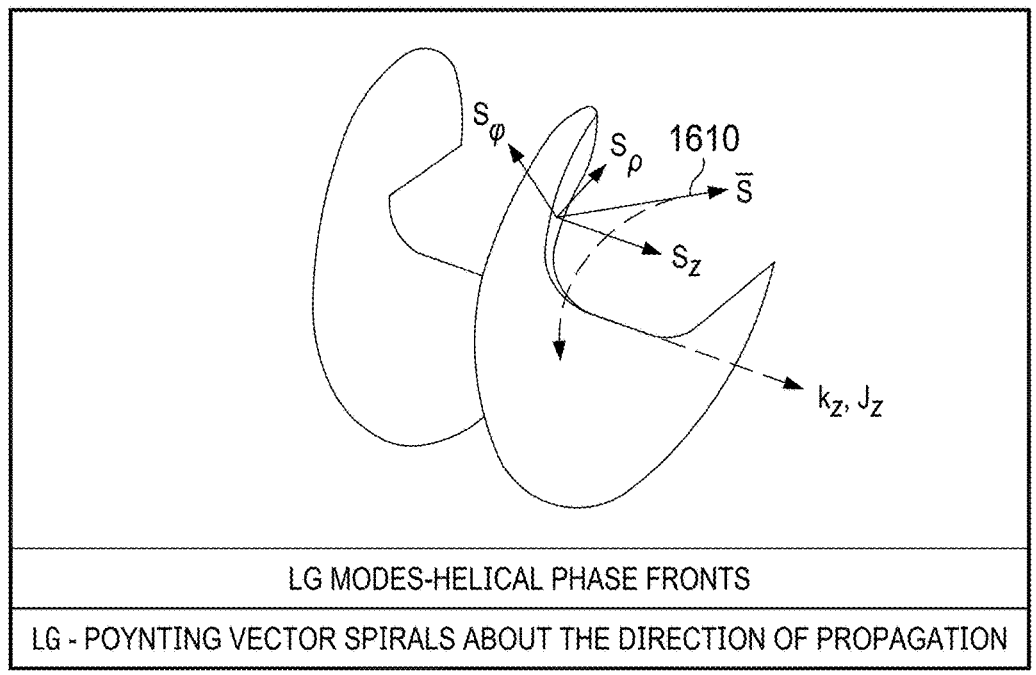
FIG. 16B illustrates a signal having both spin and orbital angular momentum applied thereto.

Referring now to FIGS. 16A and 16B, there is illustrated the manner in which a signal and its associated Poynting vector in a plane wave situation. In the plane wave situation illustrated generally at 1602, the transmitted signal may take one of three configurations. When the electric field vectors are in the same direction, a linear signal is provided, as illustrated generally at 1604. Within a circular polarization 1606, the electric field vectors rotate with the same magnitude. Within the elliptical polarization 1608, the electric field vectors rotate but have differing magnitudes. The Poynting vector remains in a constant direction for the signal configuration to FIG. 16A and always perpendicular to the electric and magnetic fields. Referring now to FIG. 16B, when a unique orbital angular momentum is applied to a signal as described here and above, the Poynting vector S 1610 will spiral about the direction of propagation of the signal. This spiral may be varied in order to enable signals to be transmitted on the same frequency as described herein.

Figure 17A:
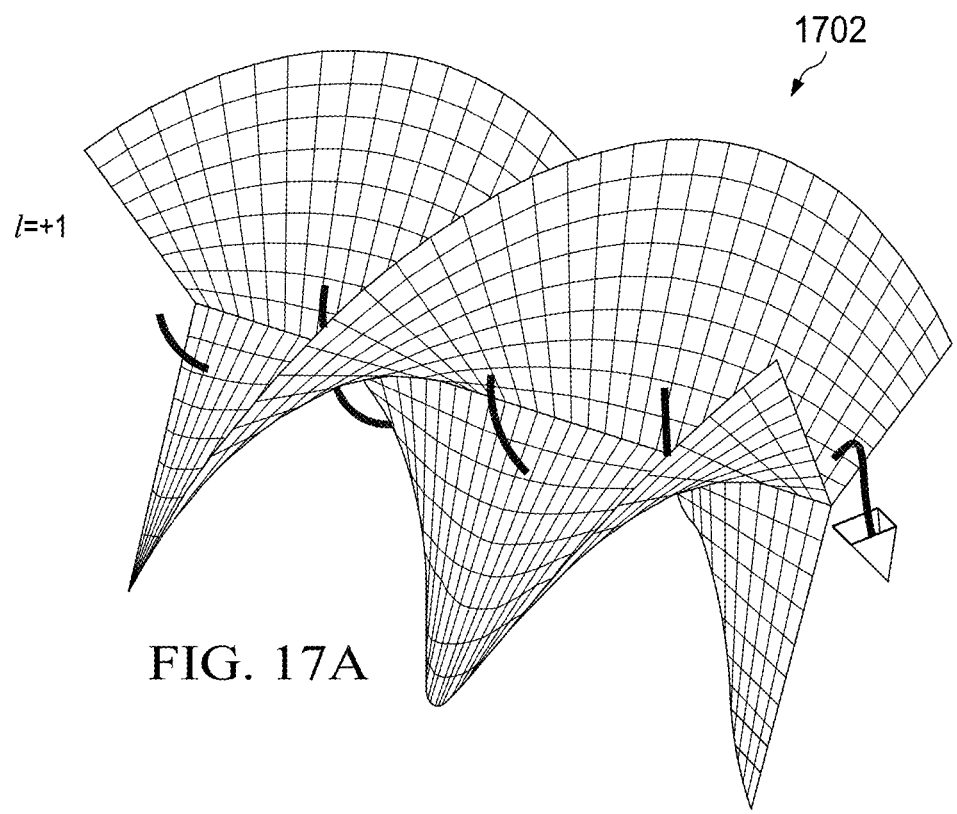
FIGS. 17A-17C illustrate various signals having different orbital angular momentum applied thereto.
Figure 17B:
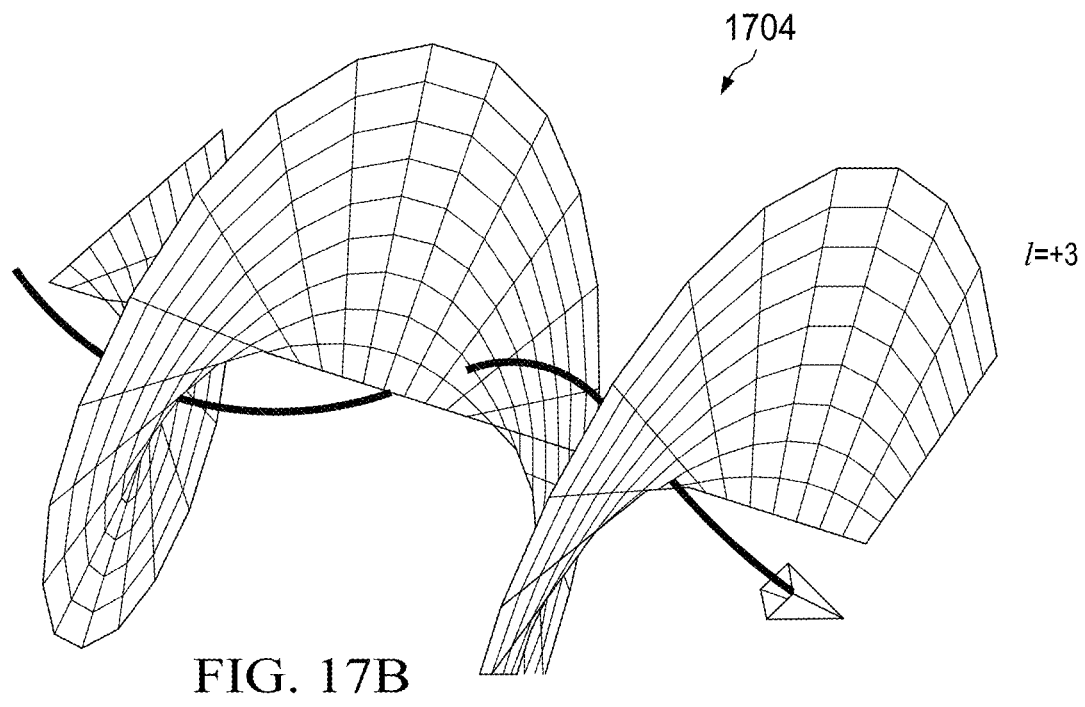
Figure 17C:
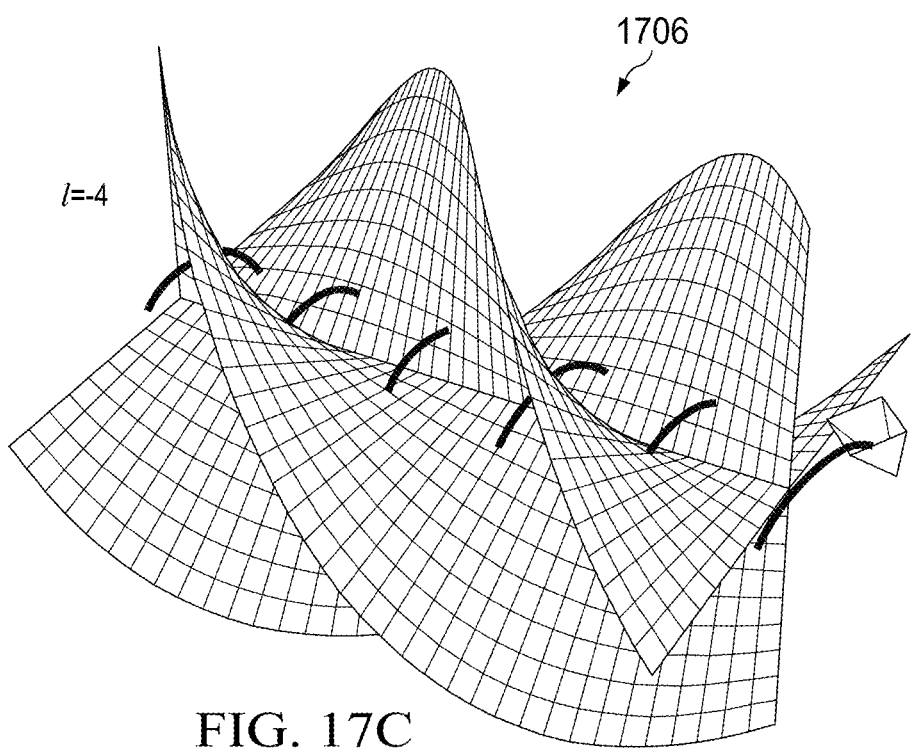

FIGS. 17A through 17C illustrate the differences in signals having different helicity (i.e., orbital angular momentums). Each of the spiraling Poynting vectors associated with the signals 1702, 1704, and 1706 provide a different shaped signal. Signal 1702 has an orbital angular momentum of +1, signal 1704 has an orbital angular momentum of +3, and signal 1706 has an orbital angular momentum of −4. Each signal has a distinct angular momentum and associated Poynting vector enabling the signal to be distinguished from other signals within a same frequency. This allows differing type of information to be transmitted on the same frequency, since these signals are separately detectable and do not interfere with each other (Eigen channels).

Figure 17D:
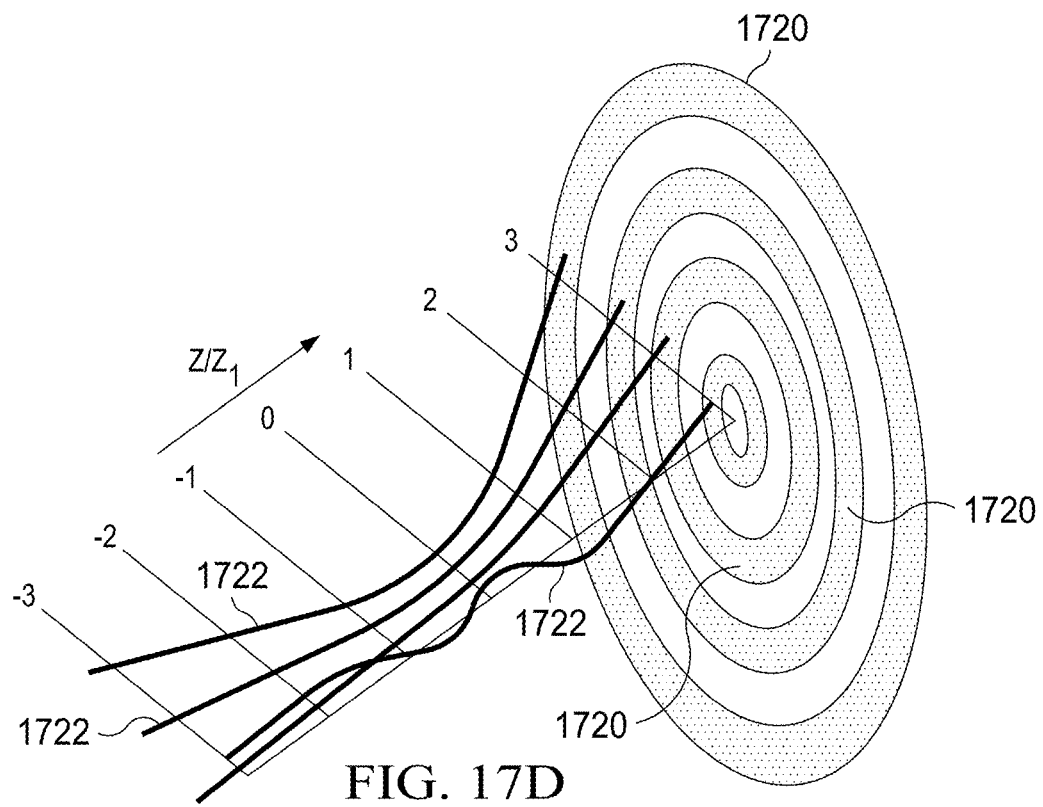
FIG. 17D illustrates a propagation of Poynting vectors for various Eigen modes.

FIG. 17D illustrates the propagation of Poynting vectors for various Eigen modes. Each of the rings 1720 represents a different Eigen mode or twist representing a different orbital angular momentum within the same frequency. Each of these rings 1720 represents a different orthogonal channel. Each of the Eigen modes has a Poynting vector 1722 associated therewith.

Topological charge may be multiplexed to the frequency for either linear or circular polarization. In case of linear polarizations, topological charge would be multiplexed on vertical and horizontal polarization. In case of circular polarization, topological charge would multiplex on left hand and right-hand circular polarizations. The topological charge is another name for the helicity index "l" or the amount of twist or OAM applied to the signal. Also, use of the orthogonal functions discussed herein above may also be multiplexed together onto a same signal in order to transmit multiple streams of information. The helicity index may be positive or negative. In wireless communications, different topological charges/orthogonal functions can be created and muxed together and de-muxed to separate the topological charges charges/orthogonal functions. The signals having different orthogonal function are spatially combined together on a same signal but do not interfere with each other since they are orthogonal to each other.

Figure 17E:
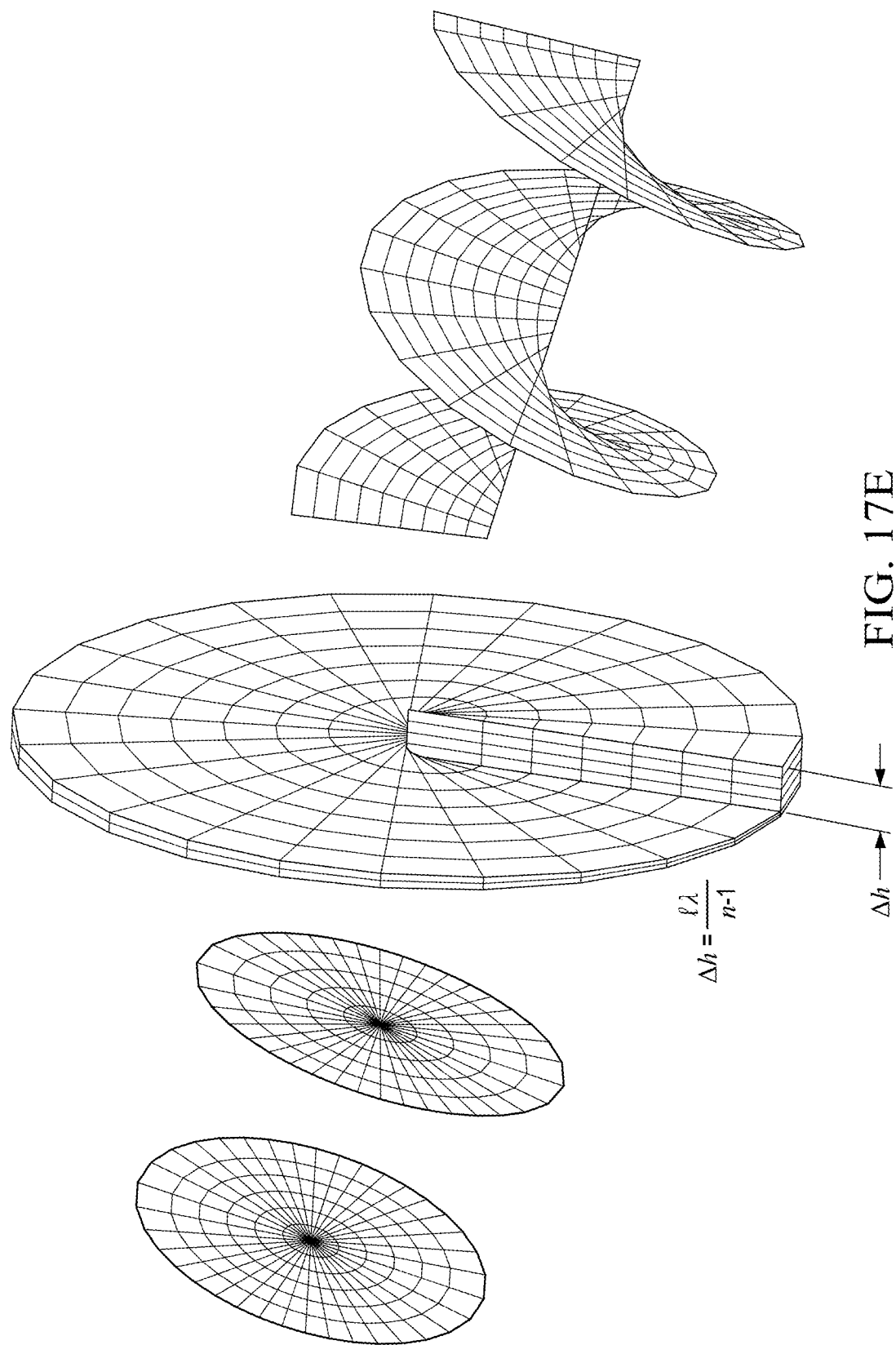
FIG. 17E illustrates a spiral phase plate.

The topological charges ℓ s can be created using Spiral Phase Plates (SPPs) as shown in FIG. 17E using a proper material with specific index of refraction and ability to machine shop or phase mask, holograms created of new materials or a new technique to create an RF version of Spatial Light Modulator (SLM) that does the twist of the RF waves (as opposed to optical beams) by adjusting voltages on the device resulting in twisting of the RF waves with a specific topological charge. Spiral Phase plates can transform a RF plane wave (ℓ=0) to a twisted RF wave of a specific helicity (i.e. ℓ=+1).

Cross talk and multipath interference can be corrected using RF Multiple-Input-Multiple-Output (MIMO). Most of the channel impairments can be detected using a control or pilot channel and be corrected using algorithmic techniques (closed loop control system).

While the application of orbital angular momentum to various signals allow the signals to be orthogonal to each other and used on a same signal carrying medium, other orthogonal function/signals can be applied to data streams to create the orthogonal signals on the same signal media carrier.

Within the notational two-dimensional space, minimization of the time bandwidth product, i.e., the area occupied by a signal in that space, enables denser packing, and thus, the use of more signals, with higher resulting information-carrying capacity, within an allocated channel. Given the frequency channel delta ($\Delta f$), a given signal transmitted through it in minimum time $\Delta t$ will have an envelope described by certain time-bandwidth minimizing signals. The time-bandwidth products for these signals take the form:

$$\Delta t \, \Delta f = \tfrac{1}{2}(2n+1)$$

where n is an integer ranging from 0 to infinity, denoting the order of the signal.

These signals form an orthogonal set of infinite elements, where each has a finite amount of energy. They are finite in both the time domain and the frequency domain and can be detected from a mix of other signals and noise through correlation, for example, by match filtering. Unlike other wavelets, these orthogonal signals have similar time and frequency forms. These types of orthogonal signals that reduce the time bandwidth product and thereby increase the spectral efficiency of the channel.

Hermite-Gaussian polynomials are one example of a classical orthogonal polynomial sequence, which are the Eigenstates of a quantum harmonic oscillator. Signals based on Hermite-Gaussian polynomials possess the minimal time-bandwidth product property described above and may be used for embodiments of systems. However, it should be understood that other signals may also be used, for example orthogonal polynomials such as Jacobi polynomials, Gegenbauer polynomials, Legendre polynomials, Chebyshev polynomials, and Laguerre-Gaussian polynomials. Q-functions are another class of functions that can be employed as a basis for MLO signals.

In addition to the time bandwidth minimization described above, the plurality of data streams can be processed to provide minimization of the Space-Momentum products in spatial modulation. In this case:

$$\Delta x \Delta p = \tfrac{1}{2}$$

Processing of the data streams in this manner create wavefronts that are spatial. The processing creates wavefronts that are also orthogonal to each other like the OAM twisted functions but these comprise different types of orthogonal functions that are in the spatial domain rather than the temporal domain.

The above described scheme is applicable to twisted pair, coaxial cable, fiber optic, RF satellite, RF broadcast, RF point-to point, RF point-to-multipoint, RF point-to-point (backhaul), RF point-to-point (fronthaul to provide higher throughput CPRI interface for cloudification and virtualization of RAN and cloudified HetNet), free-space optics (FSO), Internet of Things (IOT), Wifi, Bluetooth, as a personal device cable replacement, RF and FSO hybrid system, Radar, electromagnetic tags and all types of wireless access. The method and system are compatible with many current and future multiple access systems, including EV-DO, UMB, WIMAX, WCDMA (with or without), multimedia broadcast multicast service (MBMS)/multiple input multiple output (MIMO), HSPA evolution, and LTE.

Hermite Gaussian Beams

Hermite Gaussian beams may also be used for transmitting orthogonal data streams. In the scalar field approximation (e.g. neglecting the vector character of the electromagnetic field), any electric field amplitude distribution can be represented as a superposition of plane waves, i.e. by:

$$E \propto \iint \frac{dk_x dk_y}{(2\pi)^2} A(k_x, k_y) e^{ik_x x + ik_y y + ik_z z + iz\sqrt{k^2 - k_x^2 - k_y^2}}$$

This representation is also called angular spectrum of plane waves or plane-wave expansion of the electromagnetic field. Here $A(k_x, k_y)$ is the amplitude of the plane wave. This representation is chosen in such a way that the net energy flux connected with the electromagnetic field is towards the propagation axis z. Every plane wave is connected with an energy flow that has direction k. Actual lasers generate a spatially coherent electromagnetic field which has a finite transversal extension and propagates with moderate spreading. That means that the wave amplitude changes only slowly along the propagation axis (z-axis) compared to the wavelength and finite width of the beam. Thus, the paraxial approximation can be applied, assuming that the amplitude function $A(k_x, k_y)$ falls off sufficiently fast with increasing values of $(k_x, k_y)$.

Two principal characteristics of the total energy flux can be considered: the divergence (spread of the plane wave amplitudes in wave vector space), defined as:

$$\text{Divergence} \propto \iint \frac{dk_x dk_y}{(2\pi)^2} (K_x^2 + K_y^2) |A(k_x, k_y)|^2$$

and the transversal spatial extension (spread of the field intensity perpendicular to the z-direction) defined as:

$$\text{Transversal Extention} \propto \int_{-\infty}^{\infty} dx \int_{-\infty}^{\infty} dy (x^2 + y^2) |E|^2 = $$
$$\iint \frac{dk_x dk_y}{(2\pi)^2} \left[ \left|\frac{\partial A}{\partial x}\right|^2 + \left|\frac{\partial A}{\partial y}\right|^2 \right]$$

Let's now look for the fundamental mode of the beam as the electromagnetic field having simultaneously minimal divergence and minimal transversal extension, i.e. as the field that minimizes the product of divergence and extension. By symmetry reasons, this leads to looking for an amplitude function minimizing the product:

$$\left[\int_{-\infty}^{\infty} \frac{dk_x}{(2\pi)} k_x^2 |A|^2\right]\left[\int_{-\infty}^{\infty} \frac{dk_x}{(2\pi)} \left|\frac{\partial A}{\partial k_x}\right|^2\right] = \frac{\|A\|^4}{(8\pi^2)^2}$$

Thus, seeking the field with minimal divergence and minimal transversal extension can lead directly to the fundamental Gaussian beam. This means that the Gaussian beam is the mode with minimum uncertainty, i.e. the product of its sizes in real space and wave-vector space is the theoretical minimum as given by the Heisenberg's uncertainty principle of Quantum Mechanics. Consequently, the Gaussian mode has less dispersion than any other optical field of the same size, and its diffraction sets a lower threshold for the diffraction of real optical beams.

Hermite-Gaussian beams are a family of structurally stable laser modes which have rectangular symmetry along the propagation axis. In order to derive such modes, the simplest approach is to include an additional modulation of the form:

$$E_{m,n}^H = \int_{-\infty}^{\infty} \frac{dk_x dk_y}{(2\pi)^2} (ik_x)^m (ik_y)^n e^S$$

$$S(k_x, k_y, x, y, z) = ik_x x + ik_y y + ik_z z - \frac{W_0}{4}\left(1 + i\frac{Z}{Z_R}\right)[k_x^2 + k_y^2]$$

The new field modes occur to be differential derivatives of the fundamental Gaussian mode $E_0$.

$$E_{m,n}^H = \frac{\partial^{m+n}}{\partial x^m \partial y^n} E_0$$

Looking at the explicit form E0 shows that the differentiations in the last equation lead to expressions of the form:

$$\frac{\partial^P}{\partial x^P} e^{(-\alpha x^2)}$$

with some constant p and α. Using now the definition of Hermits' polynomials, $$H_p(x) = (-1)^p e^{(x^2)} \frac{d^P}{dx^P} e^{(-\alpha x^2)}$$

Then the field amplitude becomes $$E_{m,n}^H(x, y, z) = \sum_m \sum_n C_{mn} E_0 \frac{w_0}{w(z)} H_m\left(\sqrt{2}\frac{x}{w(z)}\right)$$

$$H_n\left(\sqrt{2}\frac{y}{w(z)}\right) e^{\frac{-(x^2+y^2)}{w(z)^2}} e^{-j(m+n+1)\tan^{-1} Z/Z_R} e^{\frac{-(x^2+y^2)}{2R(z)}}$$

Where $$\rho^2 = x^2 + y^2$$

$$\xi = \frac{Z}{Z_R}$$

and Rayleigh length $z_R$ $$z_R = \frac{\pi w_0^2}{\lambda}$$

And beam diameter $$w(\xi) = w_0 \sqrt{(1+\xi^2)}$$

In cylindrical coordinates, the field takes the form:

$$E_{L,p}^L(\rho, \varphi, z) = \sum_l \sum_{np} C_{lp} E_0 \frac{w_0}{w(z)}\left(\sqrt{2}\frac{\rho}{w(z)}\right)^l$$

$$L_p^l\left(\sqrt{2}\frac{\rho}{w(z)}\right) e^{\frac{-\rho^2}{w(z)^2}} e^{-j(2p+l+1)\tan^{-1} Z/Z_R} e^{jl\varphi} e^{\frac{-jk\rho^2}{2R(z)}}$$

Where $L_p^l$ is Laguerre functions.

Mode division multiplexing (MDM) of multiple orthogonal beams increases the system capacity and spectral efficiency in optical communication systems. For free space systems, multiple beams each on a different orthogonal mode can be transmitted through a single transmitter and receiver aperture pair. Moreover, the modal orthogonality of different beans enables the efficient multiplexing at the transmitter and demultiplexing at the receiver.

Different optical modal basis sets exist that exhibit orthogonality. For example, orbital angular momentum (OAM) beams that are either Laguerre Gaussian (LG or Laguerre Gaussian light modes may be used for multiplexing of multiple orthogonal beams in free space optical and RF transmission systems. However, there exist other modal groups that also may be used for multiplexing that do not contain OAM. Hermite Gaussian (HG) modes are one such modal group. The intensity of an $HG_{m,n}$ beam is shown according to the equation:

$$I(x, y, z) = C_{m,n} H_m^2\left(\frac{\sqrt{2}x}{w(z)}\right) H_n^2\left(\frac{\sqrt{2}y}{w(z)}\right) \times \exp\left(-\frac{2x^2}{w(z)^2} - \frac{2y^2}{w(z)^2}\right),$$

$$w(z) = w_0 \sqrt{1 + [\lambda z/\pi w_0^2]}$$

in which $H_m(*)$ and $H_n(*)$ are the Hermite polynomials of the mth and nth order. The value $w_0$ is the beam waist at distance Z=0. The spatial orthogonality of HG modes with the same beam waist $w_0$ relies on the orthogonality of Hermite polynomial in x or y directions.

Figure 18:
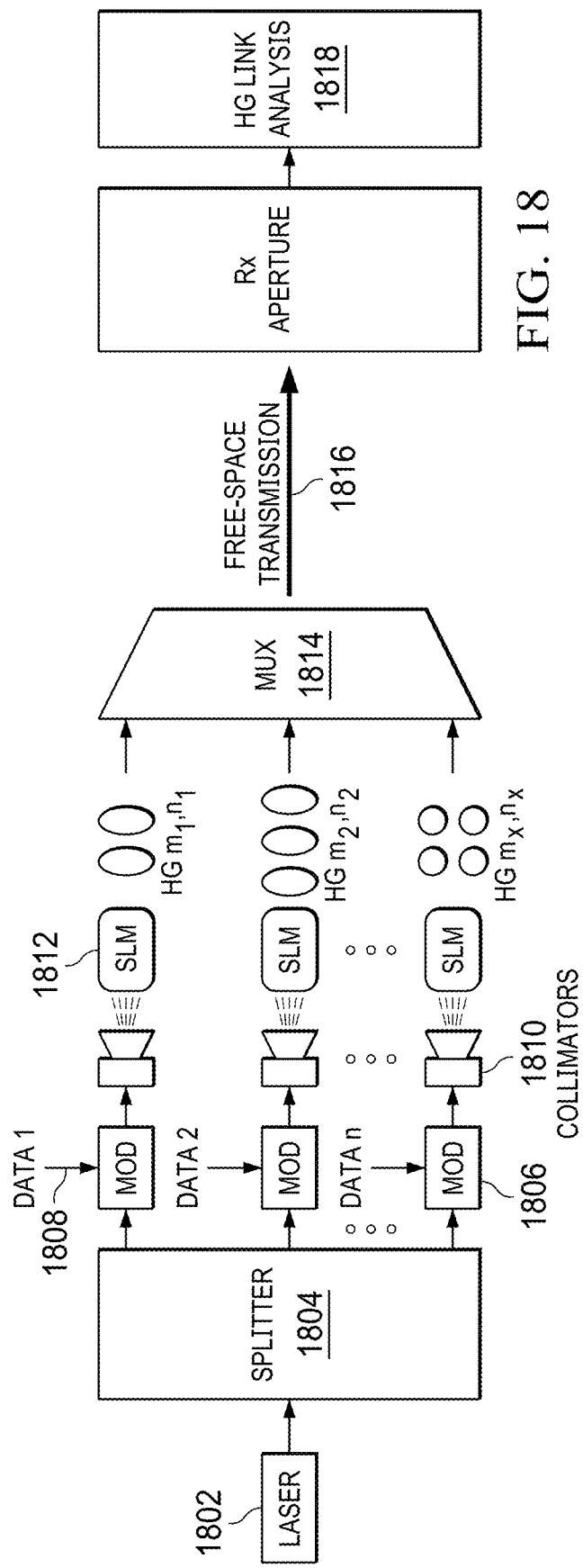
FIG. 18 illustrates a system for using the orthogonality of an HG modal group for free space spatial multiplexing.

Referring now to FIG. 18, there is illustrated a system for using the orthogonality of an HG modal group for free space spatial multiplexing in free space. A laser 1802 is provided to a beam splitter 1804. The beam splitter 1804 splits the beam into multiple beams that are each provided to a modulator 1806 for modulation with a data stream 1808. The modulated beam is provided to collimators 1810 that provides a collimated light beam to spatial light modulators

1812. Spatial light modulators (SLM's) 1812 may be used for transforming input plane waves into HG modes of different orders, each mode carrying an independent data channel. These HG modes are spatially multiplexed using a multiplexer 1814 and coaxially transmitted over a free space link 1816. At the receiver 1818 there are several factors that may affect the demultiplexing of these HG modes, such as receiver aperture size, receiver lateral displacement and receiver angular error. These factors affect the performance of the data channel such as signal-to-noise ratio and crosstalk.

With respect to the characteristics of a diverged $HG_{m,0}$ beam (m=0-6), the wavelength is assumed to be 1550 nm and the transmitted power for each mode is 0 dBm. Higher order HG modes have been shown to have larger beam sizes. For smaller aperture sizes less power is received for higher order HG modes due to divergence.

Since the orthogonality of HG modes relies on the optical field distribution in the x and y directions, a finite receiver aperture may truncate the beam. The truncation will destroy the orthogonality and cost crosstalk of the HG channels. When an aperture is smaller, there is higher crosstalk to the other modes. When a finite receiver is used, if an HG mode with an even (odd) order is transmitted, it only causes cross talk to other HG modes with even (odd) numbers. This is explained by the fact that the orthogonality of the odd and even HG modal groups remains when the beam is systematically truncated.

Moreover, misalignment of the receiver may cause crosstalk. In one example, lateral displacement can be caused when the receiver is not aligned with the beam axis. In another example, angular error may be caused when the receiver is on axis but there is an angle between the receiver orientation and the beam propagation axis. As the lateral displacement increases, less power is received from the transmitted power mode and more power is leaked to the other modes. There is less crosstalk for the modes with larger mode index spacing from the transmitted mode.

Mode Conversion Approaches

Figure 19:
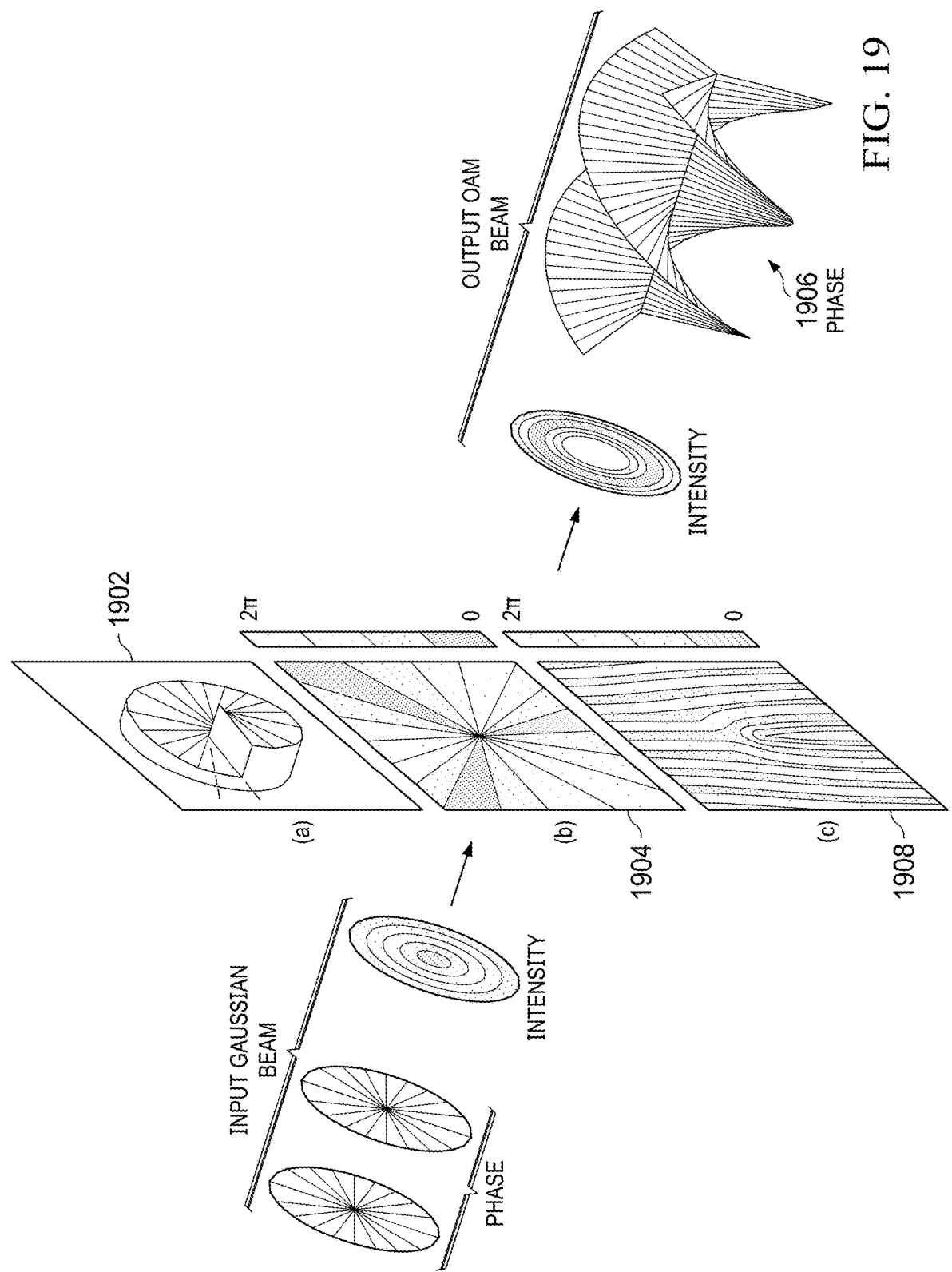
FIG. 19 illustrates various manners for converting a Gaussian beam into an OAM beam.

Referring now to FIG. 19, among all external-cavity methods, perhaps the most straightforward one is to pass a Gaussian beam through a coaxially placed spiral phase plate (SPP) 1902. An SPP 1902 is an optical element with a helical surface, as shown in FIG. 17E. To produce an OAM beam with a state of $\ell$, the thickness profile of the plate should be machined as $\ell\lambda\theta/2\pi(n-1)$, where n is the refractive index of the medium. A limitation of using an SPP 1902 is that each OAM state requires a different specific plate. As an alternative, reconfigurable diffractive optical elements, e.g., a pixelated spatial light modulator (SLM) 1904, or a digital micro-mirror device can be programmed to function as any refractive element of choice at a given wavelength. As mentioned above, a helical phase profile $exp(i\ell\theta)$ converts a linearly polarized Gaussian laser beam into an OAM mode, whose wave front resembles an C-fold corkscrew 1906, as shown at 1904. Importantly, the generated OAM beam can be easily changed by simply updating the hologram loaded on the SLM 1904. To spatially separate the phase-modulated beam from the zeroth-order non-phase-modulated reflection from the SLM, a linear phase ramp is added to helical phase code (i.e., a "fork"-like phase pattern 1908 to produce a spatially distinct first-order diffracted OAM beam, carrying the desired charge. It should also be noted that the aforementioned methods produce OAM beams with only an azimuthal index control. To generate a pure LG_(l,p) mode, one must jointly control both the phase and the intensity of the wavefront. This could be achieved using a phase only SLM with a more complex phase hologram.

OAM Generation with Digital Light Processing

Figure 20:
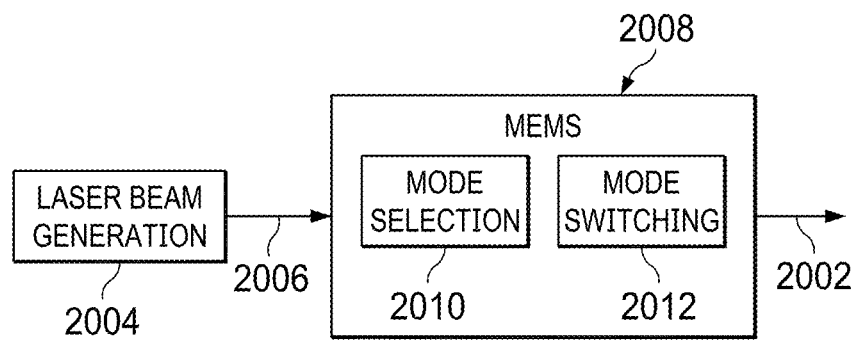
FIG. 20 illustrates a manner for generating a light beam including orthogonal functions.

The OAM signals used within quantum computers as described above may be generated using Digital Light Processors. Digital light processing comprises digital light processors that are display devices based on optical micro-electro-mechanical technology that uses a digital micromirror device using for example technologies disclosed in U.S. patent application Ser. No. 14/864,511, entitled SYSTEM AND METHOD FOR APPLYING ORTHOGONAL LIMITATIONS TO LIGHT BEAMS USING MICROELECTROMECHANICAL SYSTEMS, which is incorporated herein by reference in its entirety. Referring now to FIG. 20, there is illustrated a further manner for generating a light beam 2002 including orthogonal functions such as OAM, Hermite Gaussian, Laguerre Gaussian, etc., therein to encode information in the beam. The laser beam generator 2004 generates a beam 2006 including plane waves that is provided to a MicroElectroMechanical system (MEMs) device 2008. Examples of MEMs devices 2008 include digital light processing projectors or digital micro-mirror devices (DMDs) that enable the generation of light beams having various characteristics. A MEMs device 2008 can generate Hermite Gaussian (HG) modes, Laguerre Gaussian (LG) modes and vortex OAM modes that are programmed responsive to inputs to the MEMs device 2008. The MEMs device 2008 has mode selection logic 2010 that enable selection of the Laguerre Gaussian, Hermite Gaussian and vortex OAM modes (or other orthogonal function modes) for processing of the incoming light beam 2006. The MEMs device 2008 further enables switching between the different modes at a very high rate of a few thousand times per second which is not achievable using spatial light modulator (SLMs). Switching between the modes is controlled via mode switching logic 2012. This fast switching enables these forms of OAM, HG or LG mode generation for communications as well as quantum key distribution (QKD) and quantum computers for quantum information processing. The orthogonal characteristics of Laguerre-Gaussian (LG) with OAM and Hermite-Gaussian (HG) beams combined with high-speed switching of MEMs make the device useful in achieving higher data capacity. This is possible using holograms that are programmed into the memory of a digital light processor that program micro-mirrors to selected positions and can twist a light beam with programmed information using the mirrors.

This enables the on-demand realization of binary gratings (holograms) that can be switched between at very high speed using an external digital signal. Using, for example, DLP digital light processing technologies, a switch between different modes (different binary gratings) may be achieved at a very high rate of speed of a few thousand times per second which is not achievable using spatial light modulators (SLMs). This allows for the dynamic control of helicities provided to a beam of light for a new modulation and/or multiple access technique to encode information.

Digital light processors allow for high resolution and accuracy from micrometers to millimeters thus enabling a variety of frequencies from infrared to ultraviolet to be utilized. The use of digital light processors for MDM (mode division multiplexing) minimizes color, distance, movement and environmental sensitivity and is thus ideal for building integrated optics. The majority of SLM's are limited by a frame refresh rate of about 60 Hz which makes the high speed, wide range of operational spectral bandwidth of digital micro-mirror devices (DMD's) useful in a variety of applications. DMD designs inherently minimize temperature sensitivity for reliable 3-D wave construction.

The vast majority of commercially available SLM devices are limited to frame rate of about 60 Hz which considerably limits the speed of operation of any system based on this technology. A DMD is an amplitude only spatial light modulator. The high speed, wide range of operational spectral bandwidth and high-power threshold of a DMDs makes the device a useful tool for variety of applications. Variations of DMD's are commercially available for a fraction of the cost of a phase only SLM. Intensity shaping of spatial modes can be achieved by switching the micro mirrors on and off rapidly. However, the modes created during this process may not be temporally stable and have the desired intensity profile only when averaged by a slow detector.

Phase and amplitude information may be encoded by modulating the position and width of a binary amplitude grating implemented within a hologram such as those illustrated in FIGS. 21A-21H. By implementing such holograms to control a DMD, HG modes, LG modes, OAM vortex modes or any angular (ANG) mode may be created by properly programming the DMD with a hologram. Additionally, the switching between the generated modes may be performed at a very high speed.

This approach may be realized by considering a one-dimensional binary amplitude grating. The transmission function for this grating can be written as:

$$\tau(x) = \sum_{n=-\infty}^{\infty} \prod\left[\frac{x-(n+k)x_0}{wx_0}\right]$$

Where $$\prod(v) = Rect(v) = \begin{cases} 1 & \text{if } |v| \leq 1 \\ 0 & \text{else} \end{cases}$$

This function can be pictured as a pulse train with a period of $x_0$. The parameters of "k" and "w" are unitless quantities that set the position and the width of each pulse and are equal to constant values for a uniform grating. It is possible to locally change the value of these parameters to achieve phase and amplitude modulations of the optical field. The transmittance function $\tau(x)$ is a periodic function and can be expanded as a Fourier series.

In a case where $k(x)$ and $w(x)$ are functions of x and the binary grating is illuminated by a monochromatic plane wave. The first order diffracted light can be written as:

$$\tau_1(x) = \frac{1}{\pi}\sin[\pi w(x)]e^{i2\pi k(x)}$$

Thus, w(x) is related to the amplitude of the diffracted light while k(x) sets its phase. Therefore, the phase and the amplitude of the diffracted light can be controlled by setting the parameters k(x) and w(x). In communication theory, these methods are sometimes referred to as pulse position modulation (PPM) and pulse width modulation (PWM). The equation above is a good approximation for slowly varying k(x) and w(x) functions.

The above analysis treats a one-dimensional case. A two-dimensional grating can be generated by thresholding a rapidly varying modulated carrier as:

$$\tau(x,y) = \tfrac{1}{2} + \tfrac{1}{2}\text{sgn}\{\cos[2\pi x/x_0 + \pi k(x,y)] - \cos[\pi w(x,y)]\}$$

Here, sgn(x, y) is the sign function. This may be checked in the limit where w(x,y) and k(x,y). One can find the corresponding w(x,y) and k(x,y) functions for a general complex scalar field:

$$\text{scaler field} = A(x,y)e^{i\varphi(x,y)}$$

According to the relations $$w(x, y) = \frac{1}{\pi}\sin^{-1}[A(x, y)]$$

$$k(x, y) = \frac{1}{\pi}\varphi(x, y)$$

One could design 2-D binary amplitude holograms to generate LG modes. The gratings holograms designed for vortex modes would have a fairly uniform width across the aperture whereas for the case of LG modes, the gratings gradually disappear when the amplitude gets negligibly small.

Figure 22:
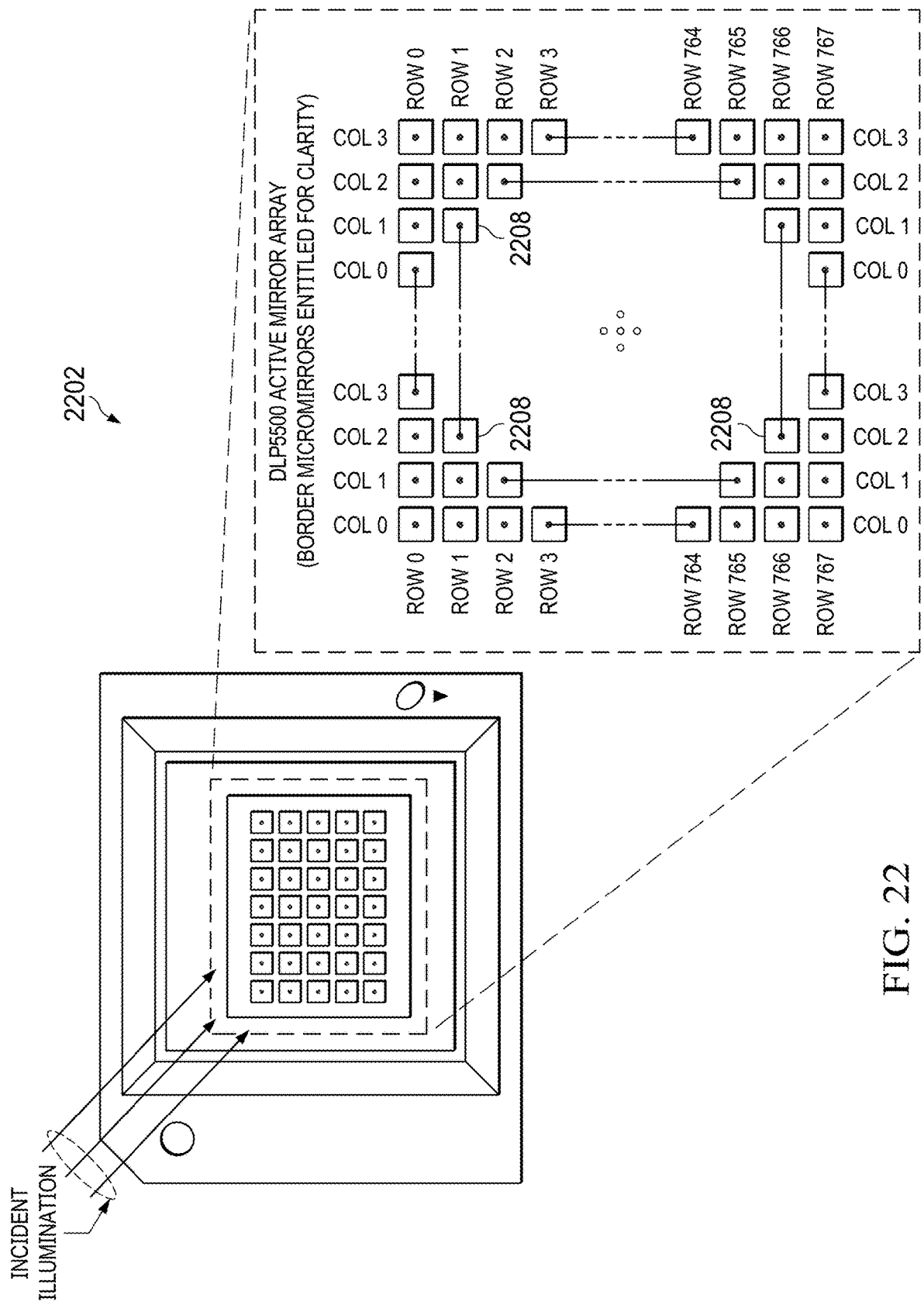
FIG. 22 is a block diagram of a digital micro-mirror device.

A digital micro-mirror device (DMD) is an amplitude only spatial light modulator. The device consists of an array of micro mirrors that can be controlled in a binary fashion by setting the deflection angle of an individual mirror to either +12° or −12°. Referring now to FIG. 22, there is illustrated a general block diagram of a DMD 2202. The DMD 2202 includes a plurality of micro-mirrors 2208 arranged in an X by Y array. The array may comprise a 1024×768 array of aluminum micro-mirrors such as that implemented in the digital light processor 5500 DMD Array. However, it will be appreciated that other array sizes and DMD devices may be used. Each micro-mirror 2208 includes a combination of opto-mechanical and electro-mechanical elements. Each micro-mirror 2208 comprises a pixel of the DMD 2202. The micro-mirror 2208 is an electromechanical element having two stable micro-mirror states of +12 and −12°. The micro-mirrors have a 10.8 micrometer pitch and are designed for light having a wavelength of 420 nm-700 nm. The state of the micro-mirror 2208 is determined by the geometry and electrostatics of the pixel during operation. The two positions of the micro-mirror 2208 determine the direction that the light beam striking the mirror is deflected. In particular, the DMD 2202 is a spatial light modulator. By convention, the positive (+) state is tilted toward the illumination and is referred to as the "on" state. Similarly, the negative (−) state is tilted away from the illumination and is referred to as the "off" state.

Figure 23:
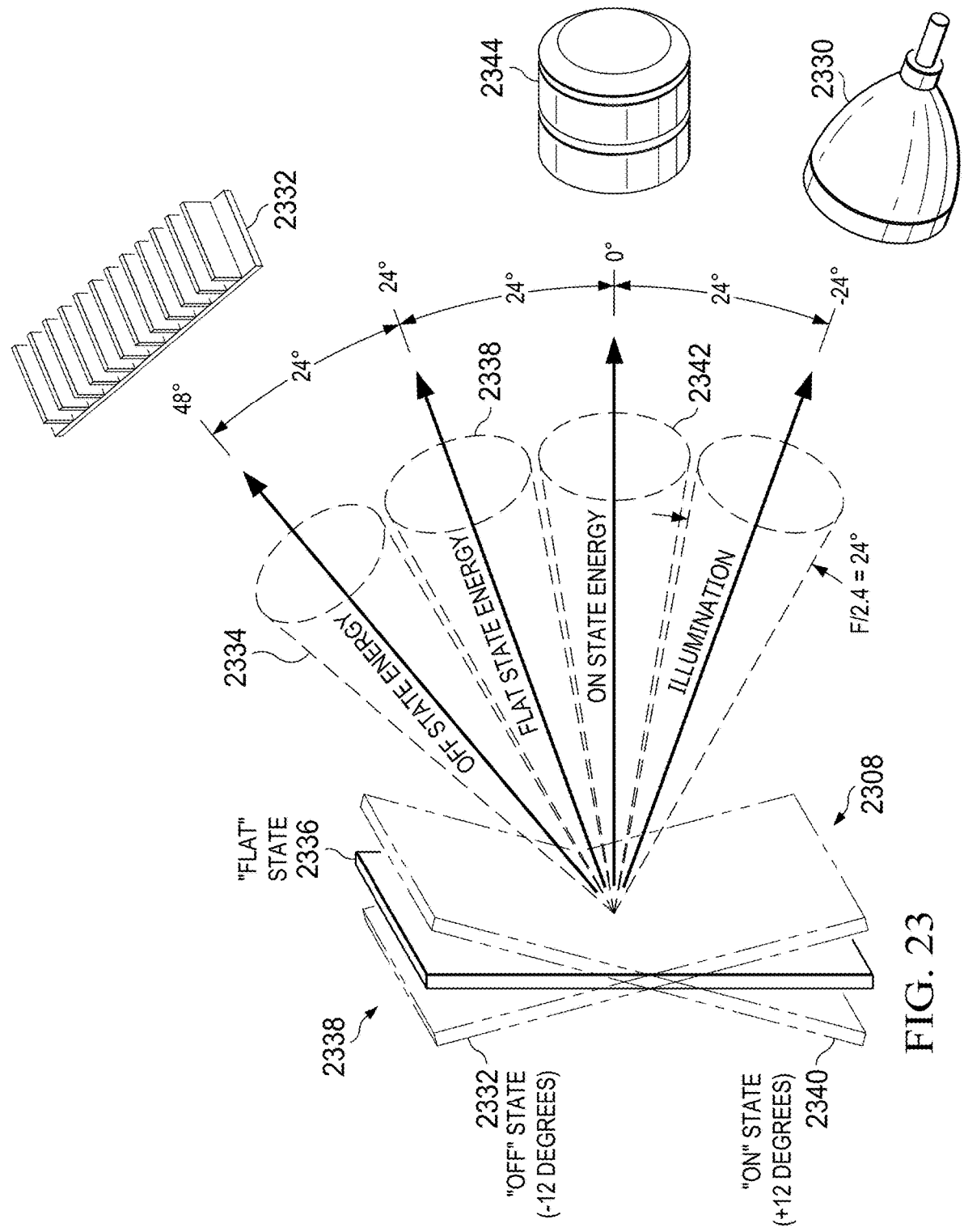
FIG. 23 illustrates the manner in which a micro-mirror interacts with a light source.

FIG. 23 illustrates the manner in which a micro-mirror 2308 will interact with a light source 2330 such as a laser. The light source 2330 shines a beam along angle of −24° that strikes the micro-mirror 2208. When the mirror is in the "off" state 2332 at an angle of −12°, the off state energy 2334 is reflected at an angle of 48°. When the mirror 2308 is positioned at the flat state 2336 of 0°, the flat state energy 2338 is reflected in an angle of 24°. Finally, when the mirror is at +12° in the "on" state 2340, the on-state energy 2342 is reflected at 0° through the projection lens 2334 of a DMD.

Figure 24:
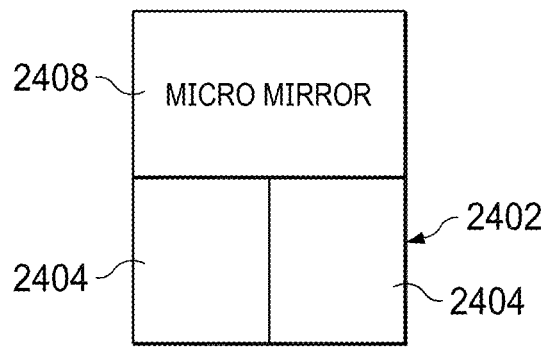
FIG. 24 is a block diagram of the functional components of a micro-mirror.

Referring now also to FIG. 24, there is illustrated a block diagram of the functional components of the micro-mirror 2208. Below each micro-mirror 2208 is a memory cell 2402 consisting of dual CMOS memory elements 2404. The states of the two memory elements 2404 are not independent but are always complementary. If one CMOS memory element 2404 is at a logical "1" level, the other CMOS element is at a logical "0" and vice versa. The state of the memory cell 2402 of the micro-mirror 2208 plays a part in the mechanical position of the mirror 2208. However, loading information within the memory cell 2402 does not automatically change the mechanical state of the micro-mirror 2208.

Although the state of the dual CMOS memory elements 2404 plays a part in determining the state of the micro-mirror 2208, the state of the memory elements 2304 is not the sole determining factor. Once the micro-mirror 2208 has landed, changing the state of the memory cells 2402 will not cause the micro-mirror 2208 to flip to the other state. Thus, the memory state and the micro-mirror state are not directly linked together. In order for the state of the CMOS memory elements 2404 to be transferred to the mechanical position of the micro-mirror 2208, the micro-mirror 3108 must receive a "Mirror Clocking Pulse" signal. The mirror clocking pulse signal momentarily releases the micro-mirror 3108 and causes the mirror to reposition based on the state of the CMOS memory elements 2304. Thus, information relating to mirror positions may be preloaded into the memory element 2404, and the mechanical position of the mirror 2302 for each mirror within a MEMs device 2202 simultaneously change responsive to the mirror clocking pulse signal. One manner in which the information within the memory cells 2402 may be programmed is through the use of holograms, such as those described herein that are used to defined the position of each of the micro-mirrors 2208 with and a MEMs device 2202.

Figure 25:
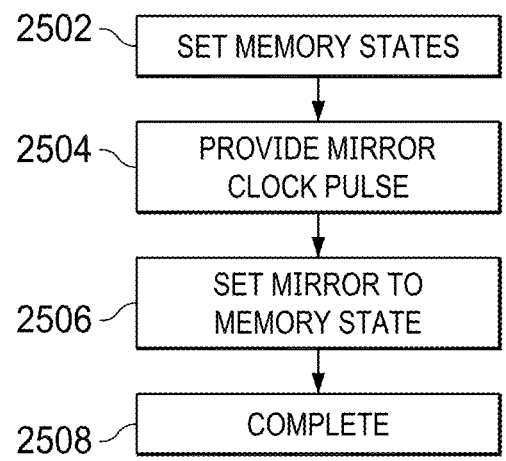
FIG. 25 illustrates a flow chart of the process for changing the position of a micro-mirror.

When a DMD 2202 is "powered up" or "powered down," there are prescribed operations that are necessary to ensure the proper orientation of the micro-mirrors 2208. These operations position the micro-mirrors 2208 during power up and release them during power down. The process for changing the position of a micro-mirror 2208 is more particularly illustrated in the flowchart of FIG. 25. Initially, at step 2502, the memory states within the memory cells 2402 are set. Once the memory states have been set within the memory cells 2402, the mirror clock pulse signal may be applied at step 2504. The micro-mirror 3108 will have an established specification of the time before and after a mirror clocking pulse that data may be loaded into the memory cell 2402. Application of the mirror clocking pulse signal will then set the mirrors to their new state established by the memory at step 2506. The process is completed at step 2508, and the mirror 2302 position is fixed and new data may be loaded into the memory cell 2402.

Figure 26:
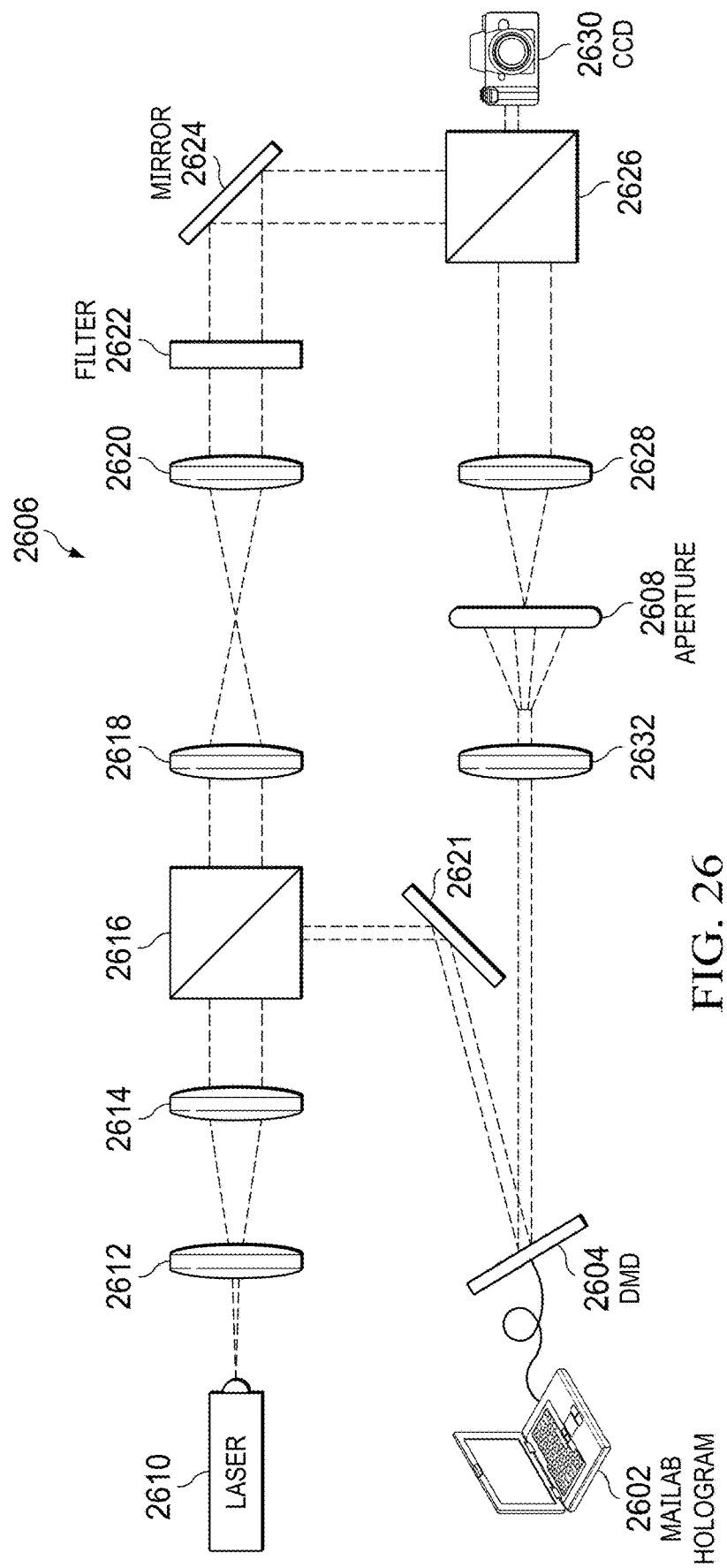
FIG. 26 illustrates an intensity in phase interferometer for measuring the intensity and phase of a generated beam.

Referring now to FIG. 26, there is illustrated an intensity and phase interferometer for measuring the intensity and phase of the generated beam. One can generate spatial modes by loading computer-generated Matlab holograms 2602 such as those described herein above and illustrated in FIGS. 31A-31H onto a DMD memory. The holograms 2602 for generating modes can be created by modulating a grating function with 20 micro-mirrors per each period. The holograms 2602 are provided to a DMD 2604. An imaging system 2606 along with an aperture 2608 separates the first order diffracted light into separate modes. The imaging system includes a laser 2610 that provides a light through a pair of lenses 2612, 2614. The lens 2612 expands the light beam to lens 2614 which collimates the beam. A beam splitter 2616 splits the beam toward a lens 2618 and mirror 2621. Lens 2618 focuses the beam through lens 2620 which collimates the beam through a filter 2622. The filtered beam is reflected by mirror 2624 through a second beam splitter 2626. The beam splitter 2626 splits the beam toward a lens 2628 and a charge coupled device camera 2630. The charge coupled device (CCD) camera 2630 measures the intensity profile of the generated beam. The plane wave beam provided to lens 2628 is focused on to the aperture 2608 to interfere with the twisted beam from the DMD. Also focused on the aperture 2608 is the twisted beam from the DMD 2604. The beam from the DMD 2604 is provided through a lens 2632 that also focuses on the aperture 2608. The phase of the mode being generated is determined from the number of spirals in the pattern and is caused by interfering the twisted beam with a plane wave beam. Also, whether the phase is positive or negative may be determined by whether the spirals are clockwise (positive) or counterclockwise (negative). A Mach-Zehnder interferometer may be used to verify the phase pattern of the created beams. The collimated plane wave provided from lens 2628 is interfered with the modes generated by the beam from the DMD 2604 through lens 2632. This generates the interferograms (spiral patterns) at the aperture 2608. The modes generated from the DMD may then be multiplexed together using memory-based static forks on the digital light processor.

Therefore, there is a possibility of using binary holograms to coherently control both phase and amplitude of a light beam. A low number of pixels per each period of the binary grating results in quantization errors in encoding phase and intensity. The total number of grating periods within the incident beam on the DMD 2604 sets an upper limit on the spatial bandwidth of the generated modes. Consequently, a large number of micro-mirrors is preferable for generating high-quality modes. This can be achieved by using newer generations of DMDs. Another set of modes that are needed for OAM-based quantum key distribution is the set of angular (ANG) modes.

Figure 27A:
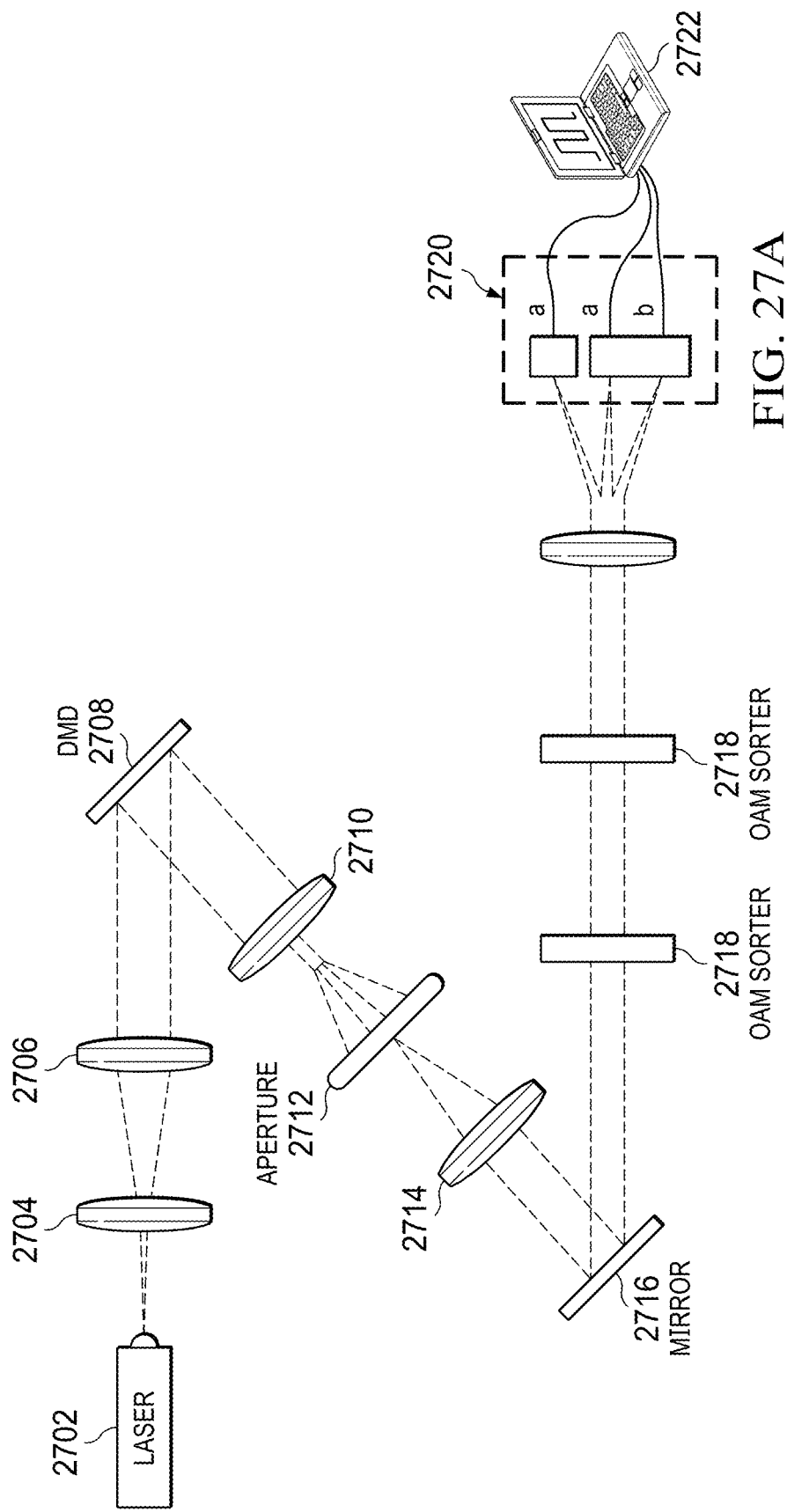
FIG. 27A illustrates the manner in which switching between different OAM modes may be achieved in real time.

Referring now to FIG. 27A, there is illustrated the manner in which switching between different OAM modes may be achieved in real time. The laser 2702 generates a collimated beam through lenses 2704 and 2706 to a DMD 2708. The DMD 2708 provides a beam that is focused by lens 2710 onto aperture 2712. The output from the aperture 2712 is provided to a lens 2714 that collimates the beam onto a mirror 2716. The collimated beam is provided to an OAM sorter 2718 that separates the signal into various OAM modes 2720 as detected by a computer 2722.

Figure 27B:
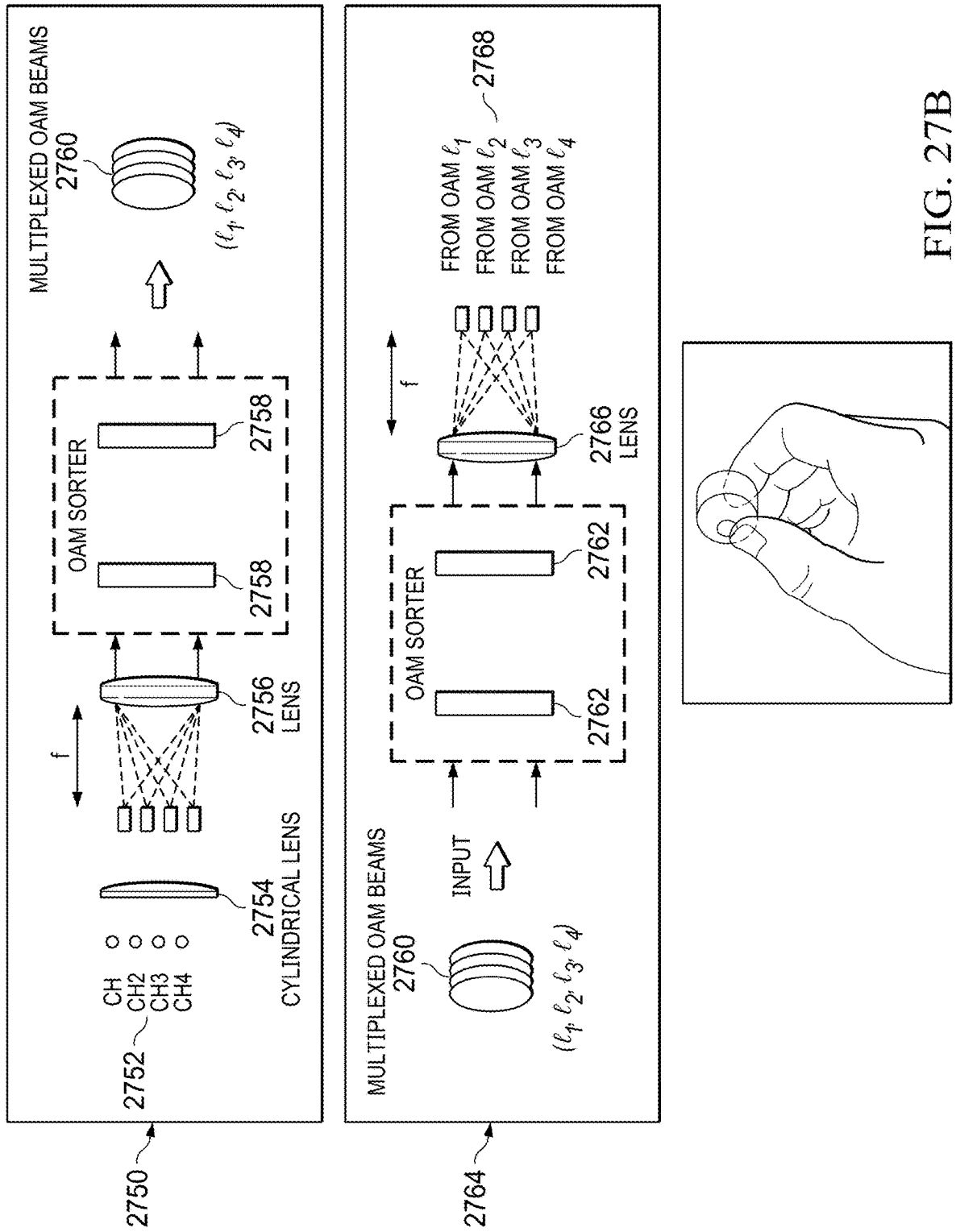
FIG. 27B illustrates the manner in which a transmitter processes multiple data channels that are passed through a cylindrical lens to a focusing lens.

Referring now to FIG. 27B, there is more generally illustrated the manner in which a transmitter 2750 processes multiple data channels 2752 that are passed through a cylindrical lens 2754 to a focusing lens 2756. The lens 2756 focuses the beam on a OAM sorter 2758. The collimated beam is passed through an OAM sorter 2758 for multiplexing the OAM beams together as multiplexed OAM beams 2764 transmission to a receiver 2764. The multiplexed OAM beams 2760 are passed through a second OAM sorter 2762 at the receiver 2764 to demultiplex the beams into separate OAM channels. The received OAM channels 2768 are passed through a lens 2766 to focus the separate OAM beam channels 2768.

Using DMDs for generating OAM modes provides the ability to switch between different modes at very high speeds. This involves a much smaller number of optical elements as compared to the conventional techniques were OAM modes are generated using a series of separated forked holograms and are multiplexed using beam splitters. Therefore, one can achieve dynamic switching among vortex OAM modes with different quantum numbers. The computer-generated holograms for these modes must be loaded onto the memory of the DMD 2708, and the switching is achieved by using a clock signal. One can use a mode sorter to map the input modes to a series of separated spots. The intensity may then be measured corresponding to each mode using a high-bandwidth PIN detector at positions corresponding to each mode. The DMD devices are available for a fraction of the cost of phase only spatial light modulators.

The DMD efficiency observed in a specific application depends on application-specific design variables such as illumination wavelength, illumination angle, projection aperture size, overfill of the DMD micro-mirror array and so on. Overall optical efficiency of each DMD can generally be estimated as a product of window transmission, a diffraction efficiency, micro-mirror surface reflectivity and array fill factor. The first three factors depend on the wavelength of the illumination source.

Digital light processing technology uses two types of materials for DMD mirrors. The mirror material for all DMD's except Type-A is Corning Eagle XG, whereas type A DMDs use Corning 7056. Both mirror types have an anti-reflectivity (AR), thin-film coating on both the top and the bottom of the window glass material. AR coatings reduce reflections and increase transmission efficiency. The DMD mirrors are designed for three transmission regions. These ranges include the ultraviolet light region from 300 nm to 400 nm, the visible light region from 400 nm to 700 nm and the near infrared light region (NIR) from 700 nm to 2500 nm. The coating used depends on the application. UV windows have special AR coatings designed to be more transmissive for ultraviolet wavelengths, visible coatings for visible DMDs and NIR coatings for NIR DMDs.

The measured data provided in the following sections reflects a typical single pass transmittance through both top and bottom AR coated mirror surfaces with random polarization. The angle of incidence (AOI) of 0° is measured perpendicular to the window surface unless mentioned otherwise. With an increase in the number of window passes, the efficiency would decline.

Figure 28:
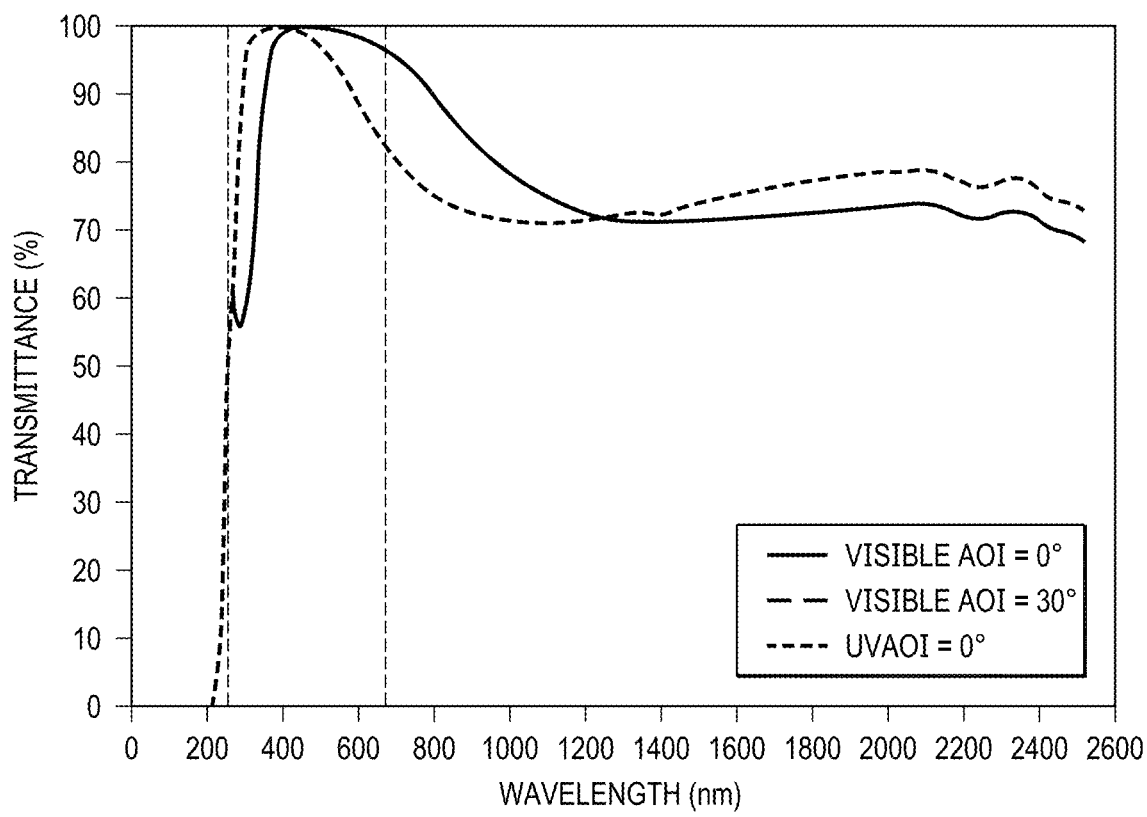
FIG. 28 illustrates the window transmission curves for Corning 7056.

FIG. 28 represents the window transmission curves for Corning 7056. The window transmission response curve in this figure applies to Taipei MDM's in their specified illumination wavelength regions. FIG. 28 shows the UV window transmittance measured perpendicular to the window surface and visible window transmittance at a lie of 0° and 30°.

Figure 29:
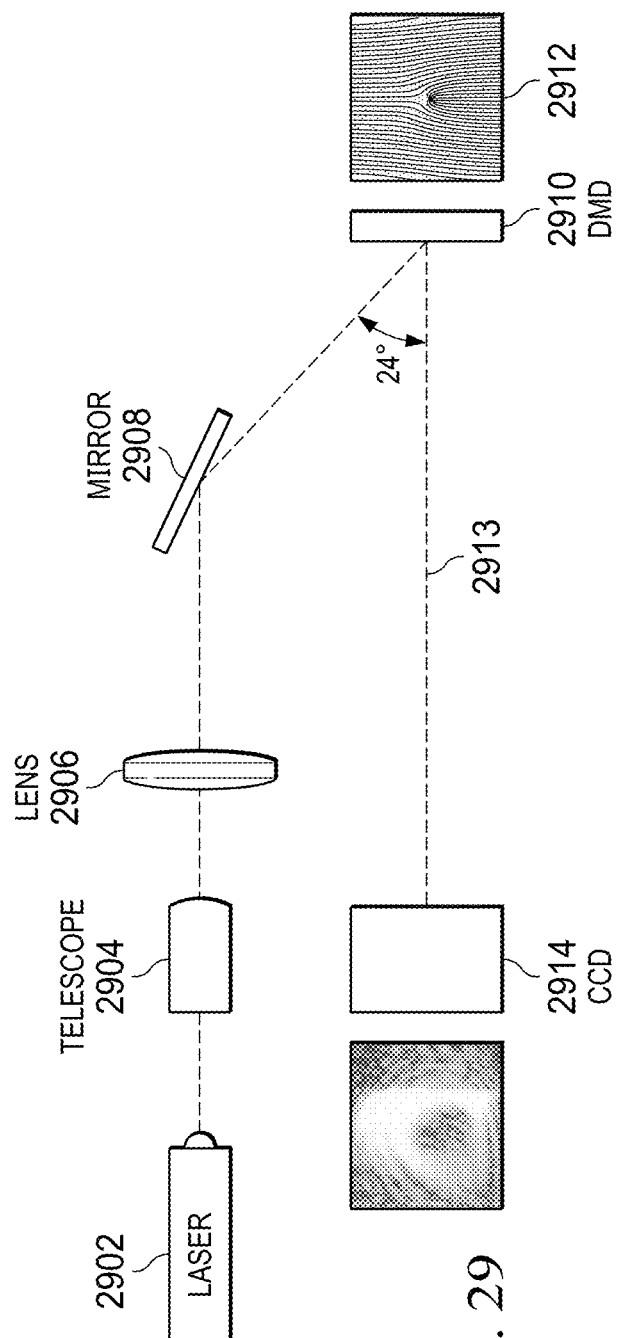
FIG. 29 illustrates circuitry for the generation of an OAM twisted beam using a hologram within a micro-electromechanical device.

Referring now to FIG. 29, there is illustrated a configuration of generation circuitry for the generation of an OAM twisted beam using a hologram within a micro-electrical mechanical device. A laser 2902 generates a beam having a wavelength of approximately 543 nm. This beam is focused through a telescope 2904 and lens 2906 onto a mirror/system of mirrors 2908. The beam is reflected from the mirrors 2908 into a DMD 2910. The DMD 2910 has programmed in to its memory a one or more forked holograms 2912 that generate a desired OAM twisted beam 2913 having any desired information encoded into the OAM modes of the beam that is detected by a CCD 2914. The holograms 2912 are loaded into the memory of the DMD 2910 and displayed as a static image. In the case of 1024×768 DMD array, the images must comprise 1024 by 768 images. The control software of the DMD 2910 converts the holograms into .bmp files. The holograms may be displayed singly, or as multiple holograms displayed together in order to multiplex particular OAM modes onto a single beam. The manner of generating the hologram 2912 within the DMD 2910 may be implemented in a number of fashions that provide qualitative differences between the generated OAM beam 2913. Phase and amplitude information may be encoded into a beam by modulating the position and width of a binary amplitude grating used as a hologram. By realizing such holograms on a DMD the creation of HG modes, LG modes, OAM vortex mode or any angular mode may be realized. Furthermore, by performing switching of the generated modes at a very high speed, information may be encoded within the helicity's that are dynamically changing to provide a new type of helicity modulation. Spatial modes may be generated by loading computer-generated holograms onto a DMD. These holograms can be created by modulating a grating function with 20 micro mirrors per each period.

Rather than just generating an OAM beam 2913 having only a single OAM value included therein, multiple OAM values may be multiplexed into the OAM beam in a variety of manners as described herein below. The use of multiple OAM values allows for the incorporation of different information into the light beam. Programmable structured light provided by the digital light processor allows for the projection of custom and adaptable patterns. These patterns may be programmed into the memory of the digital light processor and used for imparting different information through the light beam. Furthermore, if these patterns are clocked dynamically a modulation scheme may be created where the information is encoded in the helicities of the structured beams.

Figure 30:
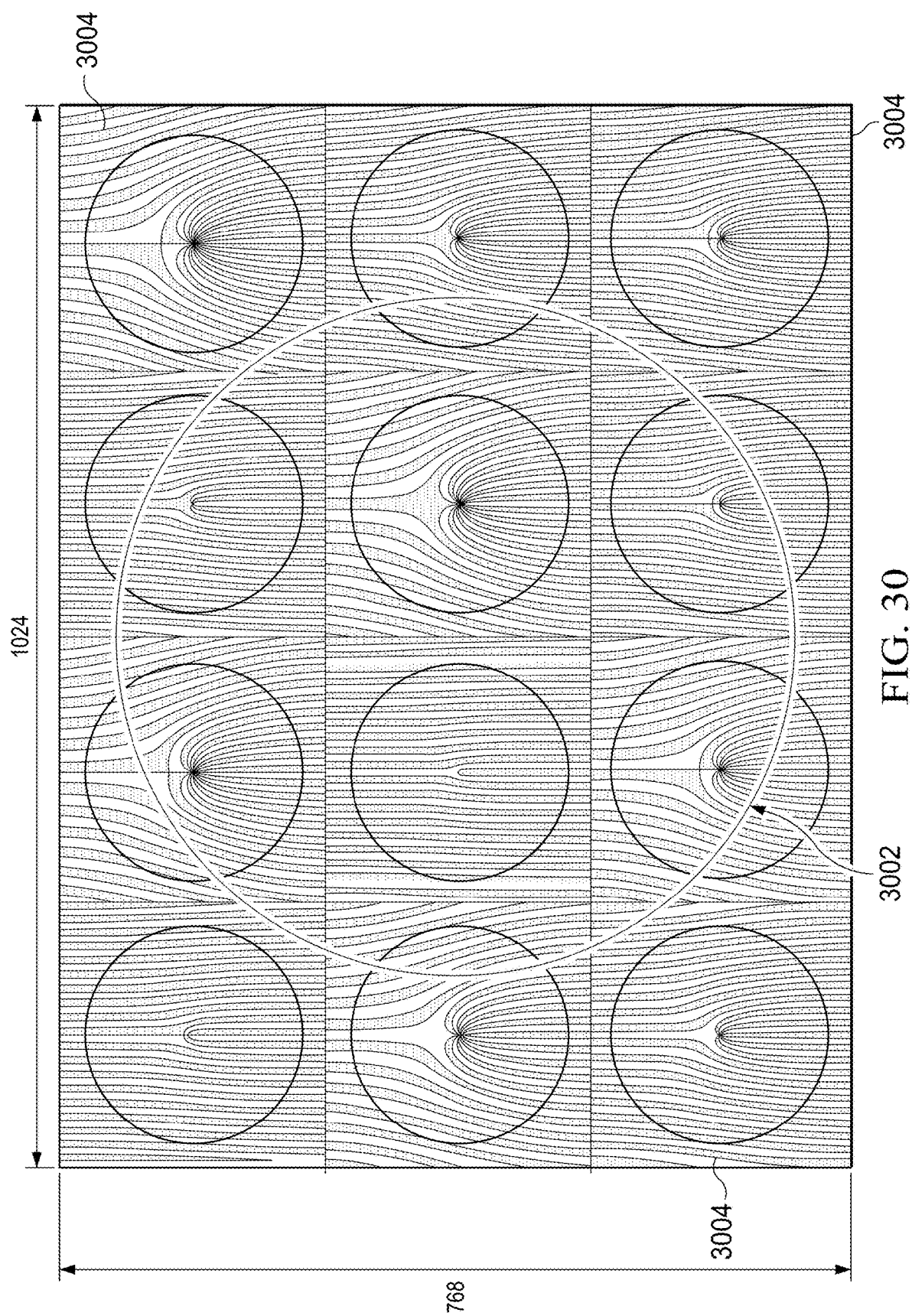
FIG. 30 illustrates the use of multiple single holograms for multiplexing.

Referring now to FIG. 30, rather than just having the laser beam 3002 shine on a single hologram, multiple holograms 3004 may be generated by the DMD 2910. FIG. 30 illustrates an implementation wherein a 4×3 array of holograms 3004 are generated by the DMD 2910. The holograms 3004 are square and each edge of a hologram lines up with an edge of an adjacent hologram to create the 4×3 array. The OAM values provided by each of the holograms 3004 are multiplexed together by shining the beam 3002 onto the array of holograms 3004. Several configurations of the holograms 3004 may be used in order to provide differing qualities of the OAM beam 2913 and associated modes generated by passing a light beam through the array of holograms 3004.

Figure 31:
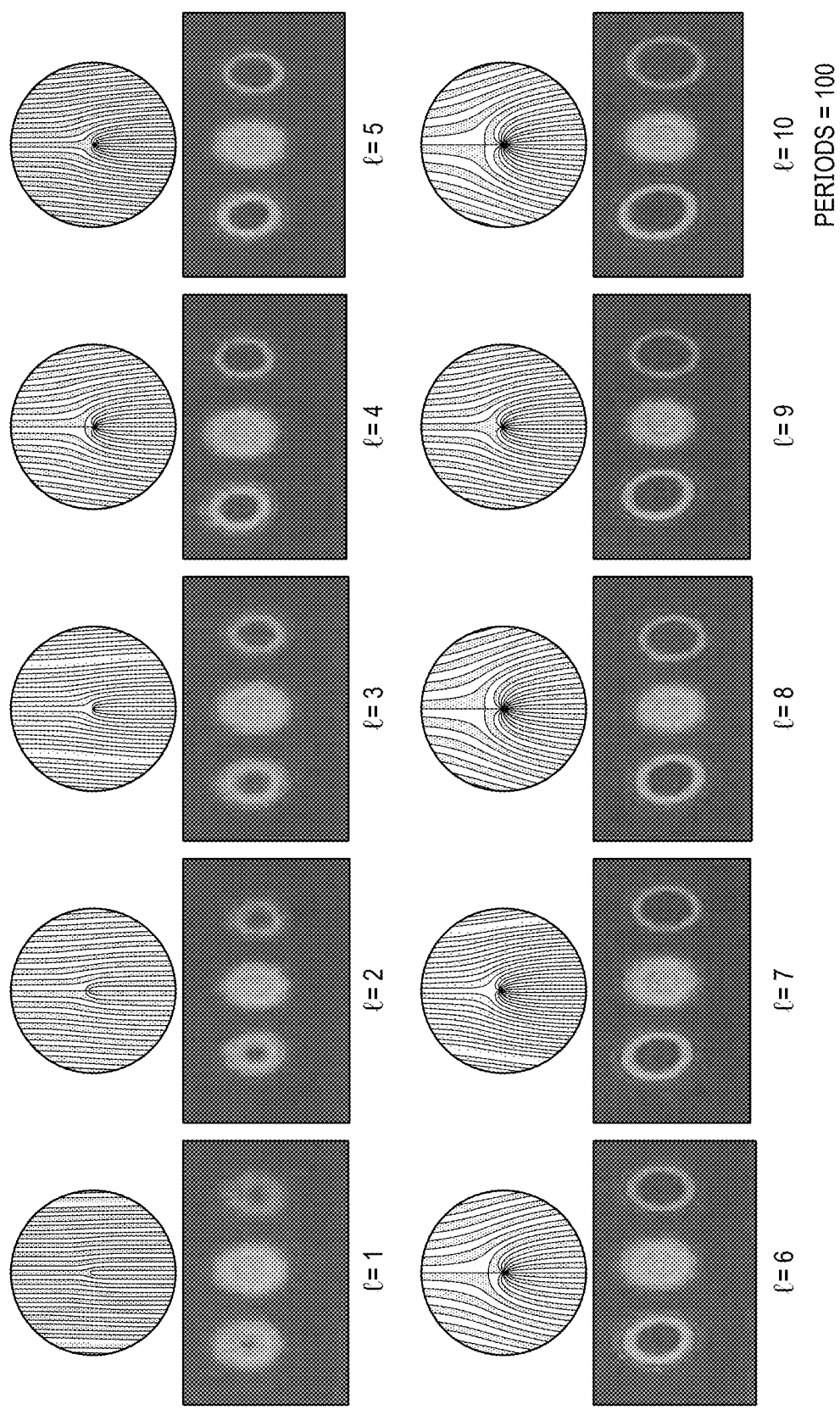
FIG. 31 illustrates various reduced binary for holograms for applying OAM levels.

FIG. 31 illustrates various reduced binary fork holograms that may be used for applying different OAM levels to a light. FIG. 31 illustrates holograms for applying OAM light from $\ell=1$ to $\ell=10$ a period of 100.

Figure 32:
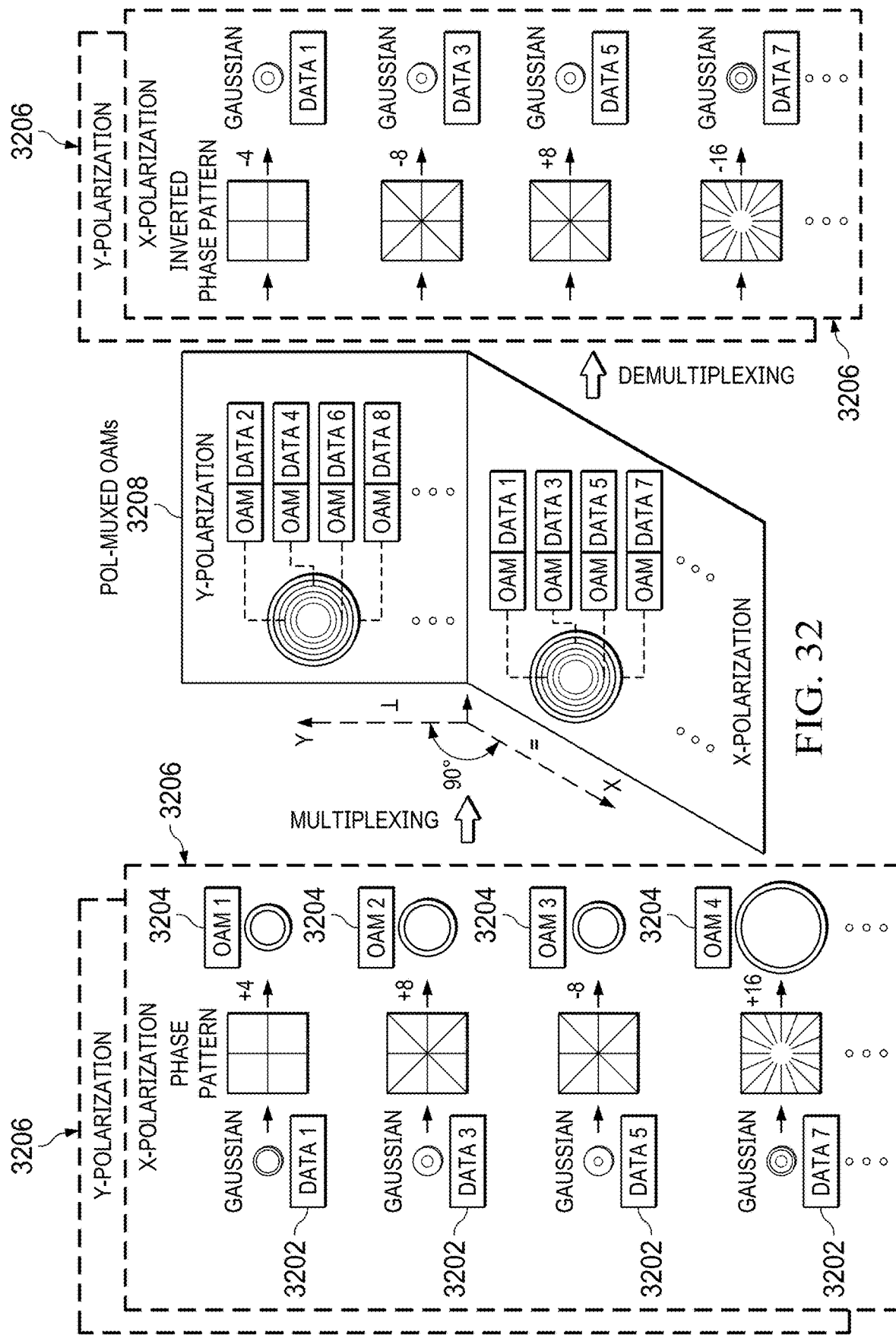
FIG. 32 illustrates the combined use of OAM and polarization processing.

Referring now to FIG. 32, there is illustrated the manner in which a combined use of OAM processing and polarization processing may be used to increase the data with any particular combination of signals using a digital light processing system. A variety of data (Data1, Data3, Data5, Data7) 3202 have differing OAM levels (OAM1, OAM2, OAM3, OAM4) 3204 and differing X and Y polarizations 3206. This enables multiplexing of the signals together into a polarization multiplexed OAM signal 3208. The polarization multiplexed OAM signal 3208 made the demultiplexed by removing the X and Y polarizations 3206 and OAM to re-create the data signals 3202.

Spin angular momentum (SAM) is associated with polarization and given by $\sigma\hbar=\pm\hbar$ (for circular polarization). While orbital angular momentum (OAM) is associated with azimuthal phase of the complex electric field. Each photon with the azimuthal phase dependence is of the form $\exp(-jl\varnothing)(l=0,\pm1,\pm2,\ldots)$ and carries the OAM of $l\hbar$. Therefore, with each photon we can associate a photon angular momentum defined over computational basis states $|l, \sigma\rangle$. Because the OAM eigenstates are mutually orthogonal, an arbitrary number of bits per single photon can be transmitted. The possibility to generate/analyze states with different photon angular momentum, by using holographic method, allows the realization of quantum states in multidimensional Hilbert space. Because OAM states provide an infinite basis state, while SAM states are two-dimensional only, the OAM can also be used to simultaneously increase the security for QKD and improve the computational power for quantum computing applications. We introduce the following deterministic quantum qu-dit gates and modules based on photon angular momentum.

Qudit Gates

Figure 33:
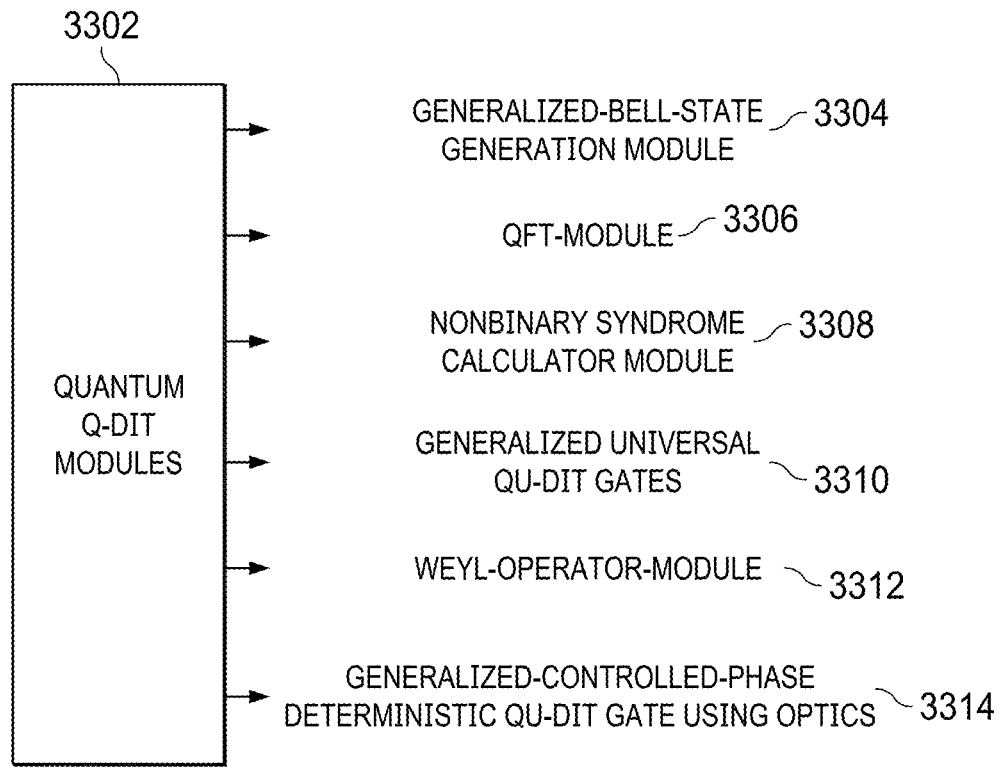
FIG. 33 illustrates basic quantum modules.

Referring now to FIG. 33, the basic quantum modules 3302 for quantum teleportation applications include the generalized-Bell-state generation module 3304 and the QFT-module 3306. Quantum teleportation is a process in which quantum information (e.g. the exact state of an atom or photon) can be transmitted from one location to another, with the help of classical communication and previously shared quantum entanglement between the sending and receiving location. The basic module for entanglement assisted QKD is either the generalized-Bell-state generation module 3304 or the Weyl-operator-module 3312. The photon angular momentum based universal quantum qudit gates, namely generalized-X, generalized-Z, generalized-CNOT qudit gates. A set of universal quantum gates is any set of gates to which any operation possible on a quantum computer can be reduced, that is, any other unitary operation can be expressed as a finite sequence of gates from the set. Technically this is impossible since the number of possible quantum gates is uncountable, whereas the number of finite sequences from a finite set is countable. To solve this problem, we only require that any quantum operation can be approximated by a sequence of gates from this finite set. Moreover, for unitaries on a constant number of qubits, the Solovay-Kitaev theorem guarantees that this can be done efficiently.

Different quantum modules 3302 of importance are introduced for different applications including (fault-tolerant) quantum computing, teleportation, QKD, and quantum error correction. Quantum Q-dit modules include generalized Bell State Generation Modules 3304, QFT Modules 3306, Non-Binary Syndrome Calculator Modules 3308, Generalized Universal Q-dit gates 3310, Weyl-Operator Modules 3312 and Generalized Controlled Phase Deterministic Qudit Gate Using Optics 3314, which is a key advantage compared to probabilistic SAM based CNOT gate. Also, by describing such gates and modules, we introduce their corresponding integrated optics implementation on digital light processing. We also introduce several entanglement assisted protocols by using the generalized-Bell-state generation module. The approach is to implement all these modules in integrated optics using multi-dimensional qudits on digital light processing Photon OAM Based Universal Qudit Gates and Quantum Modules An arbitrary photon angular momentum state $|\psi\rangle$ can be represented as a linear superposition of $|l, \sigma\rangle$-basekets as follows:

$$|\psi\rangle = \sum_{l=-L_-}^{L_+} \sum_{\sigma=\pm 1} C_{l,\sigma}|l, \sigma\rangle, \sum_{l=-L_-}^{L_+} \sum_{\sigma=\pm 1} |C_{l,\sigma}|^2$$

where the $|l, \sigma\rangle$-basekets are mutually orthogonal, namely $$\langle m,\sigma|n,\sigma'\rangle = \delta_{mn}\delta_{\sigma\sigma'}; m,n,\in\{-L_-, \ldots, -1, 0, 1, \ldots, L_+\}; \sigma,\sigma'\in\{-1,1\}$$

Therefore, the photon angular momentum kets live in $D=2(L_-+L_++1)$ dimensional Hilbert space $\mathcal{H}_2(L_-+L_++1)$. Kets are defined as a vector in Hilbert space, especially as representing the state a quantum mechanical system. Notice that in the most general case, the number of states with negative OAM index, denoted as L does not need to be the same as the number of OAM states with positive OAM index. This photon angular momentum concept to describe the photon states is different from the total angular momentum of photon defined as $j\hbar=(l+\sigma)$.

As an illustration, in total angular momentum-notation for j=4 we cannot distinguish between $|l=5, \sigma=-1\rangle$ and $|l=3, \sigma=1\rangle$ photon angular momentum states. Therefore, the use of $|l=\sigma\rangle$ notation is more general. The SAM (circularly polarized) states can be represented in computational base $\{|H\rangle, |V\rangle$ $|H\rangle$—horizontal photon, $|V\rangle$—vertical photon) as follows:

$$|+1\rangle = \frac{1}{\sqrt{2}}\begin{bmatrix} 1 \\ j \end{bmatrix}, |+1\rangle = \frac{1}{\sqrt{2}}\begin{bmatrix} 1 \\ -j \end{bmatrix}$$

The SAM operator is represented by:

$$S = \begin{bmatrix} 0 & -j \\ j & 0 \end{bmatrix}$$

Clearly, right-circular ($|+1\rangle$) and left-circular ($|-1\rangle$) states are eigenkets of this operator since:

$$S|+1\rangle = |+1\rangle, S|-1\rangle = -|-1\rangle$$

The OAM states ($|+1\rangle$) and ($|-1\rangle$) generated using, for example, the process described previously, can be represented in reduced two-dimensional subspace, respectively, as follows:

$$|1\rangle = \frac{1}{l}\begin{bmatrix} l \\ 0 \end{bmatrix}, |-1\rangle = \frac{1}{l}\begin{bmatrix} 0 \\ -l \end{bmatrix}$$

Figure 34:
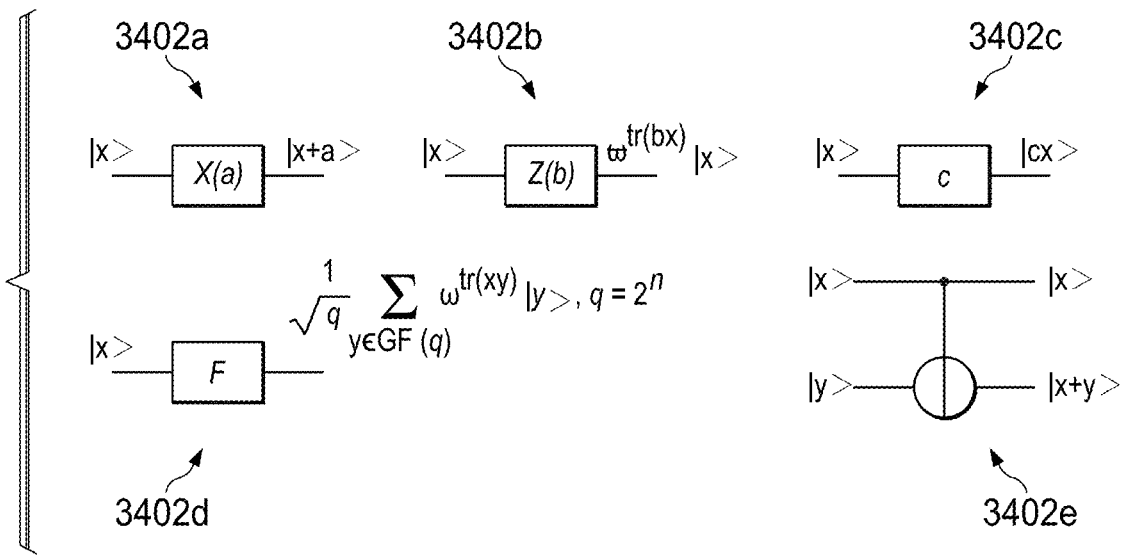
FIG. 34 illustrates examples of quantum gates.

Referring now to FIG. 34, there are illustrated a number of examples of quantum gates 3402 that generate outputs responsive to input qubits $|x\rangle$ applied to the input of quantum gates 3402a, 3402b, 3402c and 3402d and the input qubits $|x\rangle$ and $|y\rangle$ applied to the inputs of gate 3402e. The outputs of the various quantum gates 3402 may be provided depending upon the type of processes implemented within the quantum gate. While the following examples are mad with respect to qubit gates having inputs and outputs based on spin angular momentum, by applying OAM processing as described herein to the inputs and outputs the gates can operate as qudit gates operable with a larger number of input states.

In this representation shown in FIG. 34, since the mode with l=0 has no OAM value, it can be denoted as:

$$|0\rangle [0\ 0]^T$$

In this particular case, the photon angular momentum state reduces to the SAM state only. By assuming that the OAM-ket is aligned with the direction of propagation (z-axis), the OAM operator can be represented as:

$$L_z = \begin{bmatrix} 1 & 0 \\ 0 & -1 \end{bmatrix}$$

It is straightforward to verify that states |1⟩ and |−1⟩ are eigenkets of OAM operator $L_z$:

$$L_z|\pm l\rangle = (\pm l)|\pm l\rangle$$

The spin operator S and SAM operator $L_z$ satisfy the following properties:

$$S^2 = I_2, L_z^2 = l^2 I_2$$

where $I_2$ is the identity operator. The photon angular momentum operator can now be defined as $$J = (L_z \otimes I)(I \otimes S) = \begin{bmatrix} lS & 0 \\ 0 & -lS \end{bmatrix}$$

where the operator $\otimes$ denotes the tensor product. The corresponding eigenvalue equation is given by:

$$J|\pm l, \pm 1\rangle = (\pm l)(\pm 1)|\pm l, \pm 1\rangle$$

For convenience purpose, we can use a single indexing of photon angular momentum, and the computational bases related to photon angular momentum states are denoted as $\{|0\rangle, |1\rangle, \ldots, |D-1\rangle\}$, $D = 2(L_- + L_+)$.

By properly selecting $L_-$ and $L_+$ to make sure that the dimensionality D is equal to some power of two, then the dimension D can be expressed as $D = q = 2^p$, where $p \geq 1$ is a prime. If the addition operation is performed over Galois field $GF(2^p)$ instead "per mod D," the set of gates that can be used for arbitrary operation on qudits can be defined as illustrated in FIG. 34. The F-gate corresponds to the quantum Fourier transform (QFT) gate. Its action on ket |0⟩ is the superposition of all basis kets with the same probability amplitude $$F|0\rangle = q^{-\frac{1}{2}} \sum |u\rangle.$$

Therefore, the F-gate on qudits has the same role as Hadamard gate on qu-bits. The action of generalized X- and Z-gates can be described as follows:

$$X(a)|x\rangle = |x\rangle = |x+a\rangle, Z(b)|x\rangle = \omega^{tr(bx)}|x\rangle; x, a, b \in GF(q)$$

Where x, a, b, $\in GF(q)$, tr(.) denotes the trace operation from GF(q) to GF(p) and ω is a p-th root of unity, namely $\omega = \exp(j2\pi/p)$. By omitting the SAM as a degree of freedom, since it represents a fragile source of quantum information, the corresponding space becomes $(L_- + L_+)$-dimensional $(D = L_- + L_+)$.

By selecting $(L_- + L_+)$ to be a prime P, the corresponding addition operation represents "mod P addition," in other words right cyclic shift. The left cyclic shift can be defined as:

$$X(a)|x\rangle = |x-a\rangle$$

At the same time, the trace operation becomes trivial, and the action of generalized Z-gate becomes $$Z(b)|m\rangle = e^{j\left(\frac{2\pi}{p}\right)bm}|m\rangle.$$

The corresponding generalized-Hadamard gate in this formalism is the F-gate since:

$$F|n\rangle = D^{-1/2} \sum_{m=0}^{D-1} \omega^{-nm}|m\rangle$$

Figure 35:
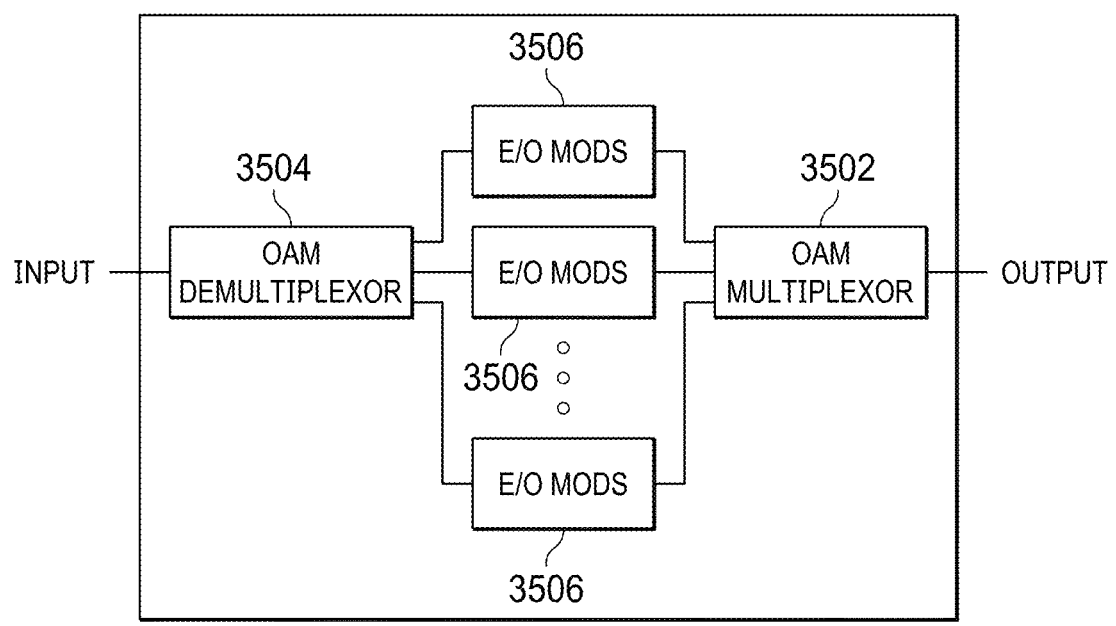
FIG. 35 illustrates a qudit gate implemented using OAM degrees of freedom.

Therefore, all these single-qudit gates can be implemented by using the OAM as a degree of freedom. One particularly suitable technology is based on spatial modes in few-mode fibers. As shown in FIG. 35, the basic building blocks for that purpose are OAM multiplexers 3502, OAM de-multiplexers 3504, few-mode fiber itself, and a series of electro-optical modulators 3506. Since few-mode fibers are not compatible with integrated optics, single-qudit OAM-based gate can be modified as described below.

Figure 36:
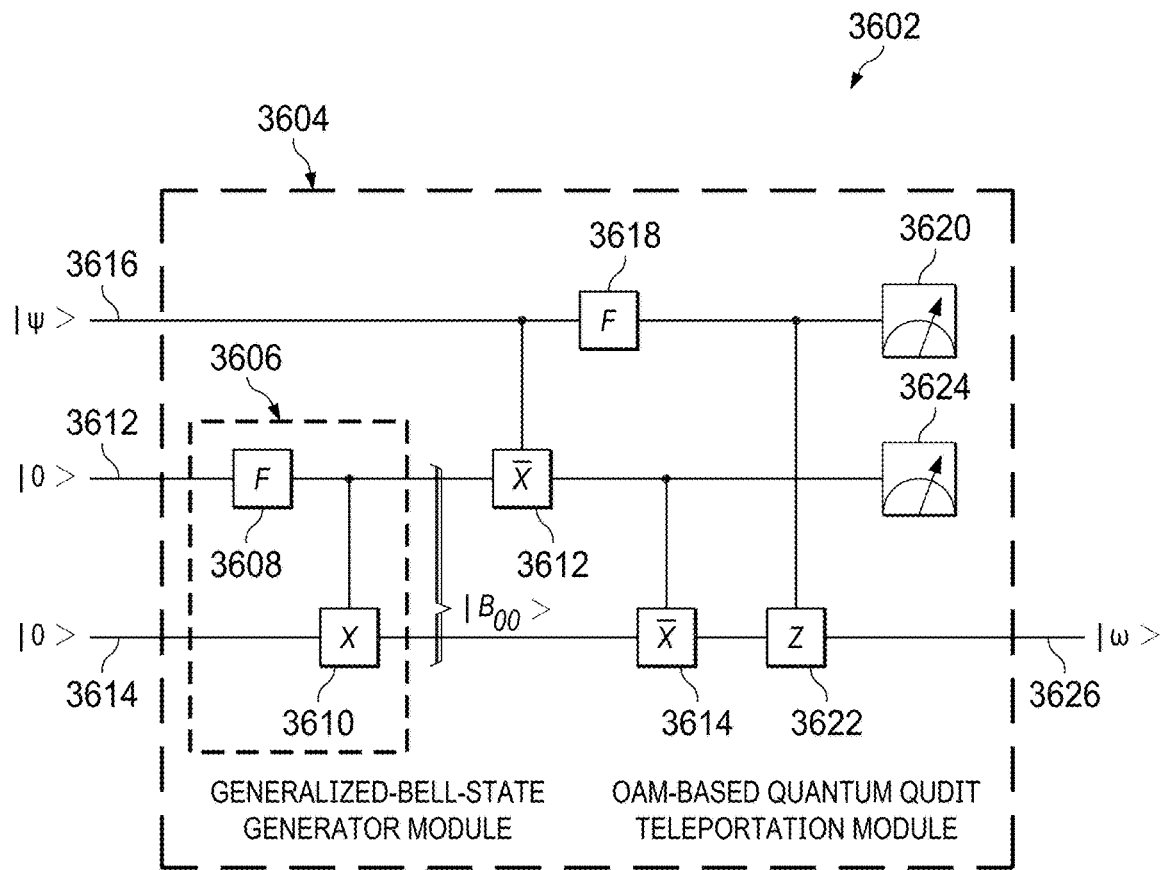
FIG. 36 illustrates an OAM based qudit teleportation module.

By using the basic qudit gates shown in FIG. 34, a more complicated quantum modules can be implemented as shown in FIG. 36. FIG. 36 illustrates an OAM-based qudit teleportation module 3602. The module 3602 comprises an OAM based quantum qudits teleportation module 3604 that includes a generalized bell state generator module 3606. The generalized bell state generator module 3606 comprises a generalized F-gate 3608 and a generalized X-gate 3610. Input 3612 is applied to the generalized F-gate 3608 and input 3614 is provided to generalized X-gate 3610. An output of the generalized F-gate 3608 is also provided as a second input to the generalized X-gate 3610. The OAM based quantum qudit teleportation module 3604 in addition to including the generalized bell state generator module 3606 provides the output from each of the F-gates 3608 to a generalized Xnot-gate 3612 and the output from generalized X-gate 3610 to Xnot-gate 3614. A second input to generalized Xnot-gate 3612 is provided from input 3616. Input 3616 also is provided to generalized F-gate 3618. Xnot-gate 3612 also provides an input to measurement circuitry 3624 for preforming a measurement on the output of a gate. The output of generalized F-gate 3618 is provided as an input to measurement circuitry 3620 and as an input to generalized Z-gate 3622 that also has an input therein from Xnot-gate 3614. The output of the generalized Z-gate 3622 provides the output 3626 of the OAM-waste quantum qudit teleportation module 3602. $|B_{00}\rangle$ Can be used to denote simplest generalized Bell basket as follows:

$$|B_{00}\rangle = CNOT(F \otimes I)|0\rangle|0\rangle = D^{-\frac{1}{2}} \sum_{m=0}^{D-1} |m\rangle|m\rangle$$

Figure 37:
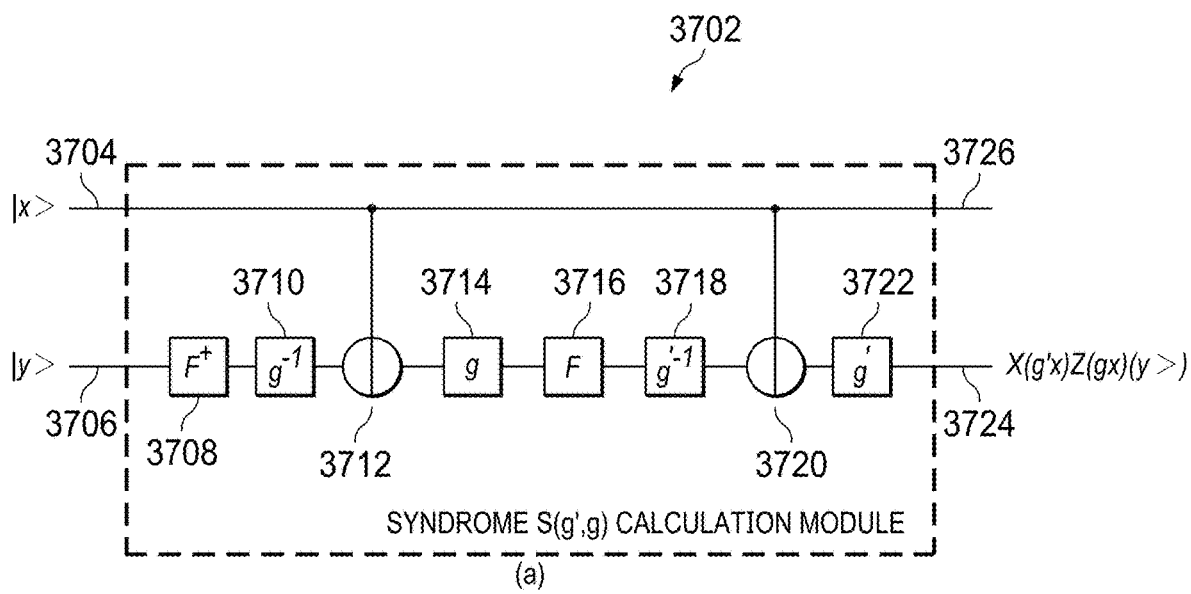
FIG. 37 illustrates a syndrome calculator module.

Another example as shown in FIG. 37 illustrates the syndrome calculator module 3702. The syndrome calculator module 3702 is important in fault-tolerant computing and quantum error correction. The syndrome calculator module 3702 includes an |x⟩ input 3704 and an |y⟩ input 3706. The |y⟩ input 3706 is provided to a generalized F-gate 3708. The output of the generalized F-gate 3708 is provided to an inverse G-function gate 3710 having its output connected to adder circuit 3712 that adds the outputs of |x⟩ input with the output of gate 3710. The adder circuit 3712 also receives an input from the |x⟩ input 3704 and has its output connected to a generalized G-gate 3714. The output of the generalized G-gate is connected to the input of a generalized F-gate 3716. The output of the generalized F-gate 3716 is connected to the input of an inverse G-function gate 3718 whose output is connected to an adder circuit 3720 that adds the outputs of $|x\rangle$ input with the output of gate 3718. The adder circuit 3720 is also connect did to the $|x\rangle$ input 3704. The output of the adder circuit 3720 is connected to the input of and the generalized G-gate 3722 whose output is provided as an out node 3724. The output of the $|x\rangle$ input 3704 is also provided as an output 3726.

Figure 38:
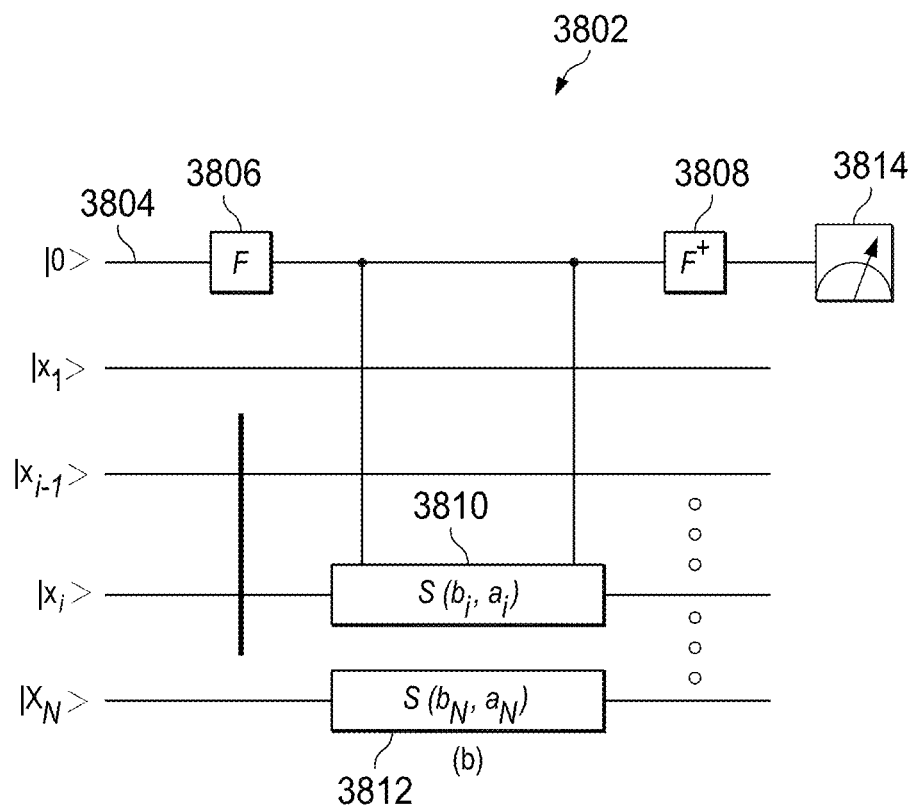
FIG. 38 illustrates a syndrome for identifying quantum error based on syndrome measurements.

In both applications, the syndrome can be determined to identify the quantum error based on syndrome measurements in accordance with the scheme illustrated by the module 3802 illustrated in FIG. 38. An $|0\rangle$ input 3804 is provided to the input of a generalized F-gate 3806. The output of the generalized F-gate 3806 is provided to the input of another generalized F-gate 3808 into the input of a syndrome calculator module 3810 function module 3810 provides a pair of outputs to a further function module 3812 function module 3812 also receives an $|Xn\rangle$ input 3814. The output of generalized F-gate 3808 provided to measurement circuitry 3814.

In this syndrome decoding module 3802, the syndrome calculator module 3810 $S(b_i, a_i)$ corresponds to the i-th generator $g_i = [a_i | b_i]$ of a quantum-check matrix of a nonbinary quantum error correction code:

$$A = \begin{pmatrix} (A)_1 \\ \vdots \\ (A)_{N-K} \end{pmatrix}, (A)_1 = g_i = (a_i | b_i) = [0 \ldots 0a_i \ldots b_N]$$

$$\in GF(q)^{2N}; a_i, b_i, \in GF(q)$$

In the above equation, the parameter $a_i$ is used to denote the action of $X(a_i)$ qudit gate on the i-th qudit location, while with $b_i$ the action of $Z(b_i)$ qudit gate on the i-th qudit location is denoted. Arbitrary error belongs to the multiplicative Pauli group (error group) on qudits $G_N = \{\omega^c X(a)Z(b)|a, b \in GF(q)^N\}$. By representing the error operator as $e = (c|d)$, corresponding to $E = \omega^c X(c)Z(d)$, the syndrome can be calculated as $S(E) = S(c, d) = eA^T$.

The quantum circuit of FIG. 38 will provide non-zero measurement if a detectible error does not commute with a multiple of $g_i$. The correctable qudit error is mapping the code space to qK-dimensional subspace of qN-dimensional Hilbert space. Since there are N–K generators, or equivalently syndrome positions, there are $q^{N-K}$ different cosets. All qudit errors belonging to the same coset have the same syndrome. By selecting the most probable qudit error for the coset representative, which is typically the lowest weight error, The qudit error can be uniquely identified and consequently perform the error correction action. Alternatively, the maximum-likelihood decoding can be used. However, the decoding complexity would be significantly higher.

Figure 39:
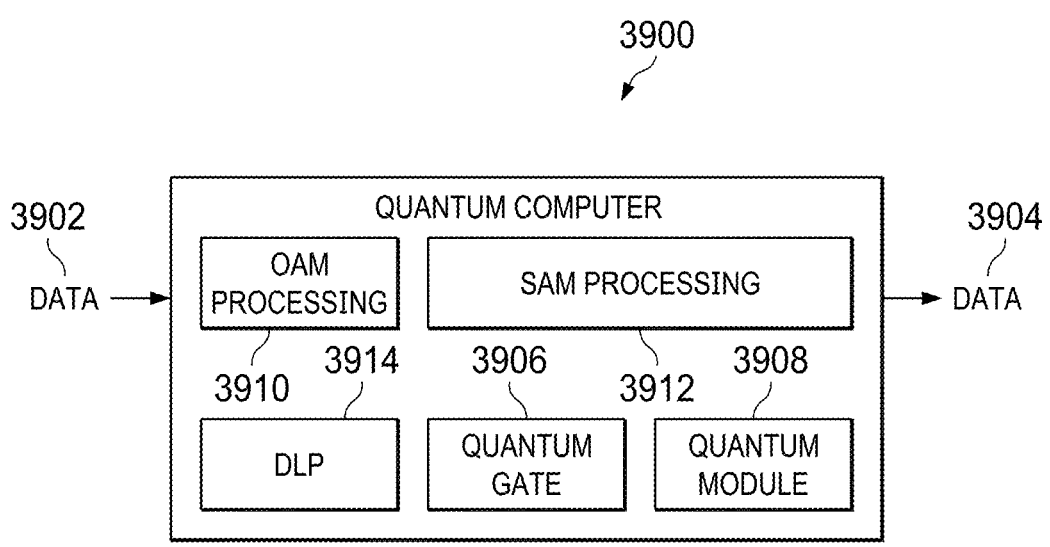
FIG. 39 illustrates a block diagram of a quantum computer.

The implementation of OAM-based single-qudit and generalized-CNOT gates will now be more fully described. The OAM-based single-qudit gate can be implemented in integrated optics, with the help of computer-generated holograms implemented using digital light processor as described above. The quantum state represented by $|\psi\rangle = \Sigma_{I=0}^{D-1} C'_I |I\rangle$ arrives at the input of a single-qudit gate. Referring now to FIG. 39, there is illustrated a block diagram of a quantum computer implemented according to the present disclosure. The quantum computer 3900 receives input data 3902 and provides output data 3904 responsive thereto. The quantum computer utilizes a number of components in order to provide this processing functionality. The quantum computer 3900 includes a combination of quantum gates 3906 and quantum modules 3908 for carrying out the processing functionalities. The structural nature of the quantum gates 3906 and quantum modules 3908 are as described herein. Signals transmitted within the quantum computer 3900 may make a use of a combination of orbital angular momentum processing 130 and spin angular momentum processing 3902. The particular nature of the orbital angular momentum processing 3910 and spin angular momentum processing 3912 are as described herein. The OAM processing of signals is assisted utilizing a digital light processor or other light processing system 3914 as described herein below.

As shown previously in FIG. 35, in OAM demultiplexers 3504, the basekets are separated, before processing, by a set of electro-optical modulators 3506 (E/O MODs). The required phase shift and/or amplitude change are introduced by the electro-optical modulators 3506 to perform the desired single-qudit operation. The basekets are recombined into single-qudit in the OAM multiplexer 3502 to obtain the output quantum state $|\psi\rangle = \Sigma_{I=0}^{D-1} C'_I |I\rangle$. As an illustration, the F-gate is obtained by implementing the E/O modulator 3506 as a concatenation of an attenuator to introduce attenuation $D^{-1/2}$ and a phase modulator 3506 to introduce the phase shift $-(2\pi/p)nm$ in the m-th branch. The generalized Z(b) gate is obtained by introducing the phase shift $(2\pi/p)bm$ in the m-th branch by corresponding phase modulator. The generalized X(a) gate is obtained by using the CGH (Computer Generated Hologram) in the m-th brunch to introduce azimuthal phase shift of the form $\exp(ja\phi)$.

Referring now to FIG. 40, by implementing an E/O modulator 3906 as a concatenation of an amplitude modulator 4002 and a phase modulator 4004 or a single I/Q modulator, the single-qudit gate is straightforward to initialize to arbitrary state by properly adjusting amplitude and phase changes in each branch. For instance, the superposition of all basis kets with the same probability amplitude is obtained by simply introducing the amplitude change $D^{-1/2}$ in each branch, while setting the phase shift to zero.

Referring now to FIG. 41, the generalized-CNOT gate 4102 in which the polarization qubit 4004 serves as a control qubit and OAM qudit 4006 as the target qudit is a quantum gate that is an essential component in the construction of a quantum computer. A generalized CNOT gate can be used to entangle or disentangle EPR states. Any quantum circuit can be simulated to an arbitrary degree of accuracy using a combination of CNOT and single qudit rotations. Here we are concerned instead with implementation in which both control 4004 and target 4006 qudit are OAM states. The holographic interaction between OAM $|I_C$ and OAM $|I_T$ states can be described by the following Hamiltonian:

$$H = gJ_C J_T$$

Referring now to FIG. 42, there is illustrated the operations of the CNOT gate on a quantum register consisting of two qubits. The CNOT gate flips the second qubit (the target qubit) 4006 if and only if the first qubit (the control qubit) 4004 is $|1\rangle$.

The corresponding time-evolution operator is given by:

$$U(t) = \exp[-jtgJ_C J_T] = \exp[-jtgI_C I_T I_4]$$

By choosing $gt = 2\pi/(L_- + L_+)$, the following unitary operator is obtained:

$$C_{l_C}(Z(I_T)) = \exp\left[-j \frac{2\pi}{L_- + L_+} I_C I_T I_4\right]$$

which is clearly generalized-controlled-Z operator. A centralized-CNOT operator can be obtained by transforming the generalized-controlled-Z operator as follows:

$$CNOT_{I_CJ_T} = C_{I_C}(X(I_T)) = (I \otimes F^\dagger)C_{I_C}(Z(I_T))(I \otimes F)$$

Since this OAM interaction does not require the use of nonlinear crystals or highly nonlinear fibers, the OAM states represent an interesting qudit representation for quantum computing, quantum teleportation, and QKD applications. Given that generalized-X, generalized-Z, and generalized-CNOT gates represent the set of universal quantum gates, arbitrary quantum computation is possible by employing the OAM gates described. It has been shown that the following qudit set of gates including generalized-X, generalized-Z, and either generalized-CNOT or generalized controlled-phase is universal.

Bell State

It is also possible to generate the generalized Bell state $|B_{00}\rangle$. An arbitrary generalized-Bell state is generated in the following manner. By applying the same gates as in the figures, but now on kets $|n\rangle$ and $|m\rangle$, to obtain:

$$(F \otimes I)|n\rangle|m\rangle = D^{-\frac{1}{2}} \sum_{m=0}^{D-1} \omega^{-nk}|k\rangle|m\rangle$$

By applying now the generalized-CNOT gate, the desired generalized-Bell state $|B_{mn}\rangle$ is obtained:

$$CNOT(F \otimes I)|n\rangle|m\rangle = D^{-\frac{1}{2}} \sum_{m=0}^{D-1} \omega^{-nk}|k\rangle|m+k\rangle$$

Another approach to generate $|B_{mn}\rangle$ is to start with $|B_{00}\rangle$ and apply the Weyl-gate, defined as $W_{mn} = \Sigma_{d=0}^{D-1} \omega^{-dn} |d+m\rangle \langle d|$, on second qudit in entangled pair.

$$(I \otimes W_{mn})|B_{00}\rangle =$$

$$D^{-\frac{1}{2}} \sum_{k=0}^{D-1} |k\rangle \left( \sum_{d=0}^{D-1} \omega^{-dn} |d=m\rangle \langle d| \right) \langle k| = D^{-\frac{1}{2}} \sum_{k=0}^{D-1} \omega^{-kn}|k\rangle|k+m\rangle$$

The Weyl-gate can easily be implemented by moving from d-th to (d+m) mod D branch and introducing the phase shift $-2\pi dk/D$ in that branch.

Now, all elements required to formulate entanglement assisted protocols based on OAM are available. The multi-dimensional QKD is described more fully below. The proposed qudit gates and modules can be employed to implement important quantum algorithms more efficiently. For example, the basic module to implement the Grover search algorithm, performing a search for an entry in unstructured database, is the Grover qudit operator, which can be represented as:

$$G = (2F^{\otimes n}|O\rangle\langle O|F^{\otimes n} - I)O$$

where F is the QFT qudit gate and O is the oracle operator, defined as:

$$O|x\rangle = (-1)^{f(x)}|x\rangle; x = (x_1 x_2 \ldots x_N), x_i \in GF(q)$$

with f(x) being the search function, generating 1 when the searched item is found, and zero otherwise. Shor factorization and Simon's algorithms are also straightforward to generalize.

The main problem related to OAM-based gates is the imperfect generation of OAM modes (especially using digital light processing). Currently existing CGHs still exhibit the measurable OAM crosstalk. On the other hand, the OAM is very stable degree of freedom, which does not change much unless the OAM modes are propagated over the atmospheric turbulence channels. Moreover, OAM states are preserved after kilometers-length-scale propagation in properly designed optical fibers. The noise affects the photons carrying OAM in the same fashion as the polarization states of photons are affected. The noise is more relevant in photon-number-sates-based optical quantum computing than in OAM-based quantum computing.

Quantum Key Distribution

Figure 43:
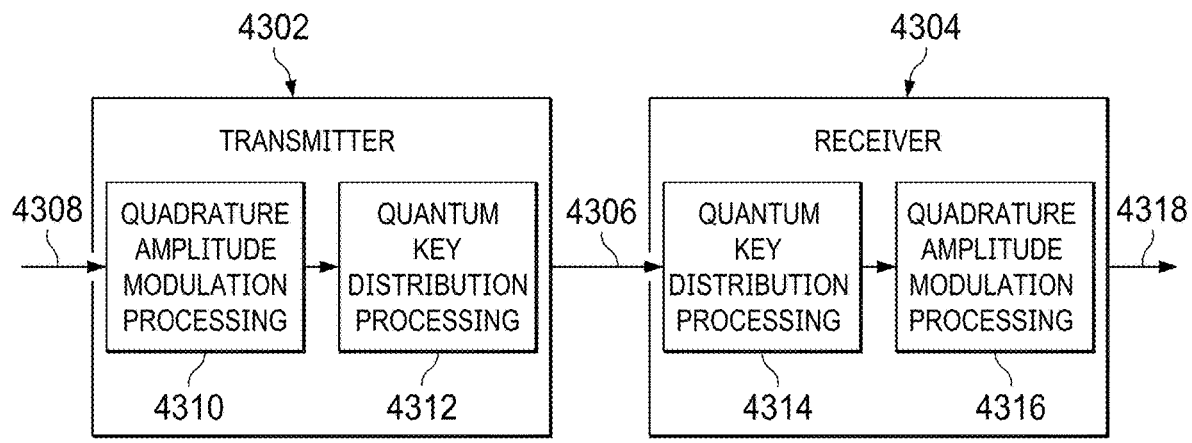
FIG. 43 illustrates a block diagram of an OAM processing system utilizing quantum key distribution.

As described above, one manner for using OAM based quantum computing involves the use in processes such as Quantum Key Distribution (QKD). In current QKD system, the systems are very slow. By implementing the above system of quantum gate computing using OAM, system can increase security and throughput communications while increasing the capacity of computing and processing of the system. The QKD operations would be implemented in a Quantum Module implementing the processes as described above. Referring now to FIG. 43, there is illustrated a further improvement of a system utilizing orbital angular momentum processing, Laguerre Gaussian processing, Hermite Gaussian processing or processing using any orthogonal functions. In the illustration of FIG. 43, a transmitter 4302 and receiver 4304 are interconnected over an optical link 4306. The optical link 4306 may comprise a fiber-optic link or a free-space optic link as described herein above. The transmitter receives a data stream 4308 that is processed via orbital angular momentum processing circuitry 4310. The orbital angular momentum processing circuitry 4310 provide orbital angular momentum twist to various signals on separate channels as described herein above. In some embodiments, the orbital angular momentum processing circuitry may further provide multi-layer overlay modulation to the signal channels in order to further increase system bandwidth.

The OAM processed signals are provided to quantum key distribution processing circuitry 4312. The quantum key distribution processing circuitry 4312 utilizes the principals of quantum key distribution as will be more fully described herein below to enable encryption of the signal being transmitted over the optical link 4306 to the receiver 4304. The received signals are processed within the receiver 4304 using the quantum key distribution processing circuitry 4314. The quantum key distribution processing circuitry 4314 decrypts the received signals using the quantum key distribution processing as will be more fully described herein below. The decrypted signals are provided to orbital angular momentum processing circuitry 4316 which removes any orbital angular momentum twist from the signals to generate the plurality of output signals 4318. As mentioned previously, the orbital angular momentum processing circuitry 4316 may also demodulate the signals using multilayer overlay modulation included within the received signals.

Orbital angular momentum in combination with optical polarization is exploited within the circuit of FIG. 43 in order to encode information in rotation invariant photonic states, so as to guarantee full independence of the communication from the local reference frames of the transmitting unit 4302 and the receiving unit 4304. There are various ways to implement quantum key distribution (QKD), a protocol that exploits the features of quantum mechanics to guarantee unconditional security in cryptographic communications with error rate performances that are fully compatible with real world application environments.

Encrypted communication requires the exchange of keys in a protected manner. This key exchanged is often done through a trusted authority. Quantum key distribution is an alternative solution to the key establishment problem. In contrast to, for example, public key cryptography, quantum key distribution has been proven to be unconditionally secure, i.e., secure against any attack, even in the future, irrespective of the computing power or in any other resources that may be used. Quantum key distribution security relies on the laws of quantum mechanics, and more specifically on the fact that it is impossible to gain information about non-orthogonal quantum states without perturbing these states. This property can be used to establish random keys between a transmitter and receiver and guarantee that the key is perfectly secret from any third party eavesdropping on the line.

Figure 44:
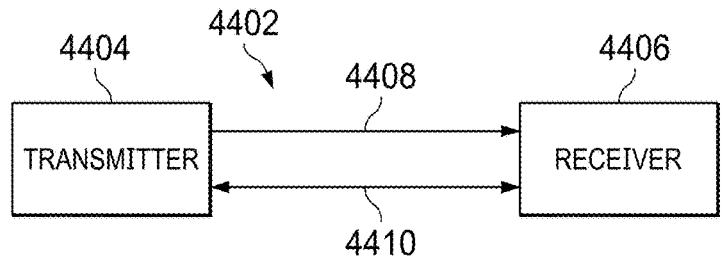
FIG. 44 illustrates a basic quantum key distribution system.

In parallel to the "full quantum proofs" mentioned above, the security of QKD systems has been put on stable information theoretic footing, thanks to the work on secret key agreements done in the framework of information theoretic cryptography and to its extensions, triggered by the new possibilities offered by quantum information. Referring now to FIG. 44, within a basic QKD system, a QKD link 4402 is a point to point connection between a transmitter 4404 and a receiver 4406 that want to share secret keys. The QKD link 4402 is constituted by the combination of a quantum channel 4408 and a classic channel 4410. The transmitter 4404 generates a random stream of classical bits and encodes them into a sequence of non-orthogonal states of light that are transmitted over the quantum channel 4408. Upon reception of these quantum states, the receiver 4406 performs some appropriate measurements leading the receiver to share some classical data over the classical link 4410 correlated with the transmitter bit stream. The classical channel 4410 is used to test these correlations.

If the correlations are high enough, this statistically implies that no significant eavesdropping has occurred on the quantum channel 4408 and thus, that has a very high probability, a perfectly secure, symmetric key can be distilled from the correlated data shared by the transmitter 4404 and the receiver 4406. In the opposite case, the key generation process has to be aborted and started again. The quantum key distribution is a symmetric key distribution technique. Quantum key distribution requires, for authentication purposes, that the transmitter 4404 and receiver 4406 share in advance a short key whose length scales only logarithmically in the length of the secret key generated by an OKD session.

Quantum key distribution on a regional scale has already been demonstrated in a number of countries. However, free-space optical links are required for long distance communication among areas which are not suitable for fiber installation or for moving terminals, including the important case of satellite-based links. The present approach exploits spatial transverse modes of the optical beam, in particular of the OAM degree of freedom, in order to acquire a significant technical advantage that is the insensitivity of the communication to relevant alignment of the user's reference frames. This advantage may be very relevant for quantum key distribution implementation to be upgraded from the regional scale to a national or continental one, or for links crossing hostile ground, and even for envisioning a quantum key distribution on a global scale by exploiting orbiting terminals on a network of satellites.

The OAM Eigen modes are characterized by a twisted wavefront composed of "$l$" intertwined helices, where "$l$" is an integer, and by photons carrying "$\pm lh$" of (orbital) angular momentum, in addition to the more usual spin angular momentum (SAM) associated with polarization. The potentially unlimited value of "$l$" opens the possibility to exploit OAM also for increasing the capacity of communication systems (although the expense of increasing also the channel cross-section size), and terabit classical data transmission based on OAM multiplexing can be demonstrated both in free-space and optical fibers. Such a feature can also be exploited in the quantum domain, for example to expand the number of qubits per photon, or to achieve new functions, such as the rotational invariance of the qubits.

In a free-space QKD, two users (Alice and Bob) must establish a shared reference frame (SRF) in order to communicate with good fidelity. Indeed, the lack of a SRF is equivalent to an unknown relative rotation which introduces noise into the quantum channel, disrupting the communication. When the information is encoded in photon polarization, such a reference frame can be defined by the orientations of Alice's and Bob's "horizontal" linear polarization directions. The alignment of these directions needs extra resources and can impose serious obstacles in long distance free space QKD and/or when the misalignment varies in time. As indicated, we can solve this by using rotation invariant states, which remove altogether the need for establishing a SRF. Such states are obtained as a particular combination of OAM and polarization modes (hybrid states), for which the transformation induced by the misalignment on polarization is exactly balanced by the effect of the same misalignment on spatial modes. These states exhibit a global symmetry under rotations of the beam around its axis and can be visualized as space-variant polarization states, generalizing the well-known azimuthal and radial vector beams, and forming a two-dimensional Hilbert space. Moreover, this rotation-invariant hybrid space can be also regarded as a decoherence-free subspace of the four-dimensional OAM-polarization product Hilbert space, insensitive to the noise associated with random rotations.

The hybrid states can be generated by a particular space-variant birefringent plate having topological charge "q" at its center, named "q-plate". In particular, a polarized Gaussian beam (having zero OAM) passing through a q-plate with q=½ will undergo the following transformation:

$$(\alpha|R\rangle + \beta|R\rangle)_\pi \otimes |0\rangle_O \rightarrow \alpha|L\rangle_\pi \otimes |r\rangle_O + \beta|R\rangle_\pi \otimes |l\rangle_O$$

$|L\rangle_\pi$ and $|R\rangle_\pi$ denote the left and right circular polarization states (eigenstates of SAM with eigenvalues "$\pm h$"), $|0\rangle_O$ represents the transverse Gaussian mode with zero OAM and the $|L\rangle_O$ and $|R\rangle_O$ eigenstates of OAM with $|l|=1$ and with eigenvalues "$\pm lh$"). The states appearing on the right-hand side of equation are rotation-invariant states. The reverse operation to this can be realized by a second q-plate with the same q. In practice, the q-plate operates as an interface between the polarization space and the hybrid one, converting qubits from one space to the other and vice versa in a universal (qubit invariant) way. This in turn means that the initial encoding and final decoding of information in our QKD implementation protocol can be conveniently performed in the polarization space, while the transmission is done in the rotation-invariant hybrid space.

OAM is a conserved quantity for light propagation in vacuum, which is obviously important for communication applications. However, OAM is also highly sensitive to atmospheric turbulence, a feature which limits its potential usefulness in many practical cases unless new techniques are developed to deal with such issues.

Quantum cryptography describes the use of quantum mechanical effects (in particular quantum communication and quantum computation) to perform cryptographic tasks or to break cryptographic systems. Well-known examples of quantum cryptography are the use of quantum communication to exchange a key securely (quantum key distribution) and the hypothetical use of quantum computers that would allow the breaking of various popular public-key encryption and signature schemes (e.g., RSA).

The advantage of quantum cryptography lies in the fact that it allows the completion of various cryptographic tasks that are proven to be impossible using only classical (i.e. non-quantum) communication. For example, quantum mechanics guarantees that measuring quantum data disturbs that data; this can be used to detect eavesdropping in quantum key distribution.

Quantum key distribution (QKD) uses quantum mechanics to guarantee secure communication. It enables two parties to produce a shared random secret key known only to them, which can then be used to encrypt and decrypt messages.

An important and unique property of quantum distribution is the ability of the two communicating users to detect the presence of any third party trying to gain knowledge of the key. This results from a fundamental aspect of quantum mechanics: the process of measuring a quantum system in general disturbs the system. A third party trying to eavesdrop on the key must in some way measure it, thus introducing detectable anomalies. By using quantum superposition or quantum entanglement and transmitting information in quantum states, a communication system can be implemented which detects eavesdropping. If the level of eavesdropping is below a certain threshold, a key can be produced that is guaranteed to be secure (i.e. the eavesdropper has no information about it), otherwise no secure key is possible, and communication is aborted.

The security of quantum key distribution relies on the foundations of quantum mechanics, in contrast to traditional key distribution protocol which relies on the computational difficulty of certain mathematical functions and cannot provide any indication of eavesdropping or guarantee of key security.

Quantum key distribution is only used to reduce and distribute a key, not to transmit any message data. This key can then be used with any chosen encryption algorithm to encrypt (and decrypt) a message, which is transmitted over a standard communications channel. The algorithm most commonly associated with QKD is the one-time pad, as it is provably secure when used with a secret, random key.

Quantum communication involves encoding information in quantum states, or qubits, as opposed to classical communication's use of bits. Usually, photons are used for these quantum states and thus are applicable within quantum computing systems. Quantum key distribution exploits certain properties of these quantum states to ensure its security. There are several approaches to quantum key distribution, but they can be divided into two main categories, depending on which property they exploit. The first of these are prepare and measure protocol. In contrast to classical physics, the act of measurement is an integral part of quantum mechanics. In general, measuring an unknown quantum state changes that state in some way. This is known as quantum indeterminacy, and underlies results such as the Heisenberg uncertainty principle, information distribution theorem, and no cloning theorem. This can be exploited in order to detect any eavesdropping on communication (which necessarily involves measurement) and, more importantly, to calculate the amount of information that has been intercepted. Thus, by detecting the change within the signal, the amount of eavesdropping or information that has been intercepted may be determined by the receiving party.

The second category involves the use of entanglement-based protocols. The quantum states of two or more separate objects can become linked together in such a way that they must be described by a combined quantum state, not as individual objects. This is known as entanglement, and means that, for example, performing a measurement on one object affects the other object. If an entanglement pair of objects is shared between two parties, anyone intercepting either object alters the overall system, revealing the presence of a third party (and the amount of information that they have gained). Thus, again, undesired reception of information may be determined by change in the entangled pair of objects that is shared between the parties when intercepted by an unauthorized third party.

One example of a quantum key distribution (QKD) protocol is the BB84 protocol. The BB84 protocol was originally described using photon polarization states to transmit information. However, any two pairs of conjugate states can be used for the protocol, and optical fiber-based implementations described as BB84 can use phase-encoded states. The transmitter (traditionally referred to as Alice) and the receiver (traditionally referred to as Bob) are connected by a quantum communication channel which allows quantum states to be transmitted. In the case of photons, this channel is generally either an optical fiber, or simply free space, as described previously with respect to FIG. 43. In addition, the transmitter and receiver communicate via a public classical channel, for example using broadcast radio or the Internet. Neither of these channels needs to be secure. The protocol is designed with the assumption that an eavesdropper (referred to as Eve) can interfere in any way with both the transmitter and receiver.

Figure 45:
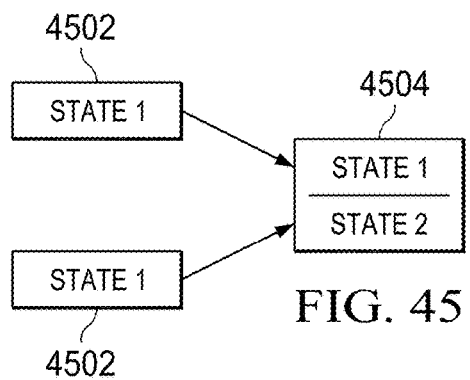
FIG. 45 illustrates the manner in which two separate states are combined into a single conjugate pair within quantum key distribution.
Figure 46:
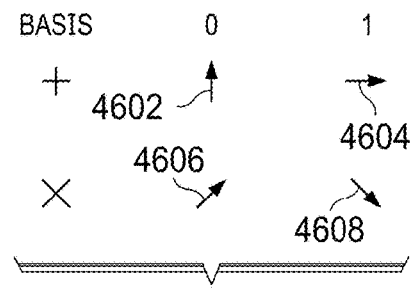
FIG. 46 illustrates one manner in which 0 and 1 bits may be transmitted using different basis within a quantum key distribution system.

Referring now to FIG. 45, the security of the protocol comes from encoding the information in non-orthogonal states. Quantum indeterminacy means that these states cannot generally be measured without disturbing the original state. BB84 uses two pair of states 4502, each pair conjugate to the other pair to form a conjugate pair 4504. The two states 4502 within a pair 4504 are orthogonal to each other. Pairs of orthogonal states are referred to as a basis. The usual polarization state pairs used are either the rectilinear basis of vertical (0 degrees) and horizontal (90 degrees), the diagonal basis of 45 degrees and 135 degrees, or the circular basis of left handedness and/or right handedness. Any two of these basis are conjugate to each other, and so any two can be used in the protocol. In the example of FIG. 46, rectilinear basis is used at 4602 and 4604, respectively, and diagonal basis are used at 4606 and 4608.

Figures 47, 48, 49:
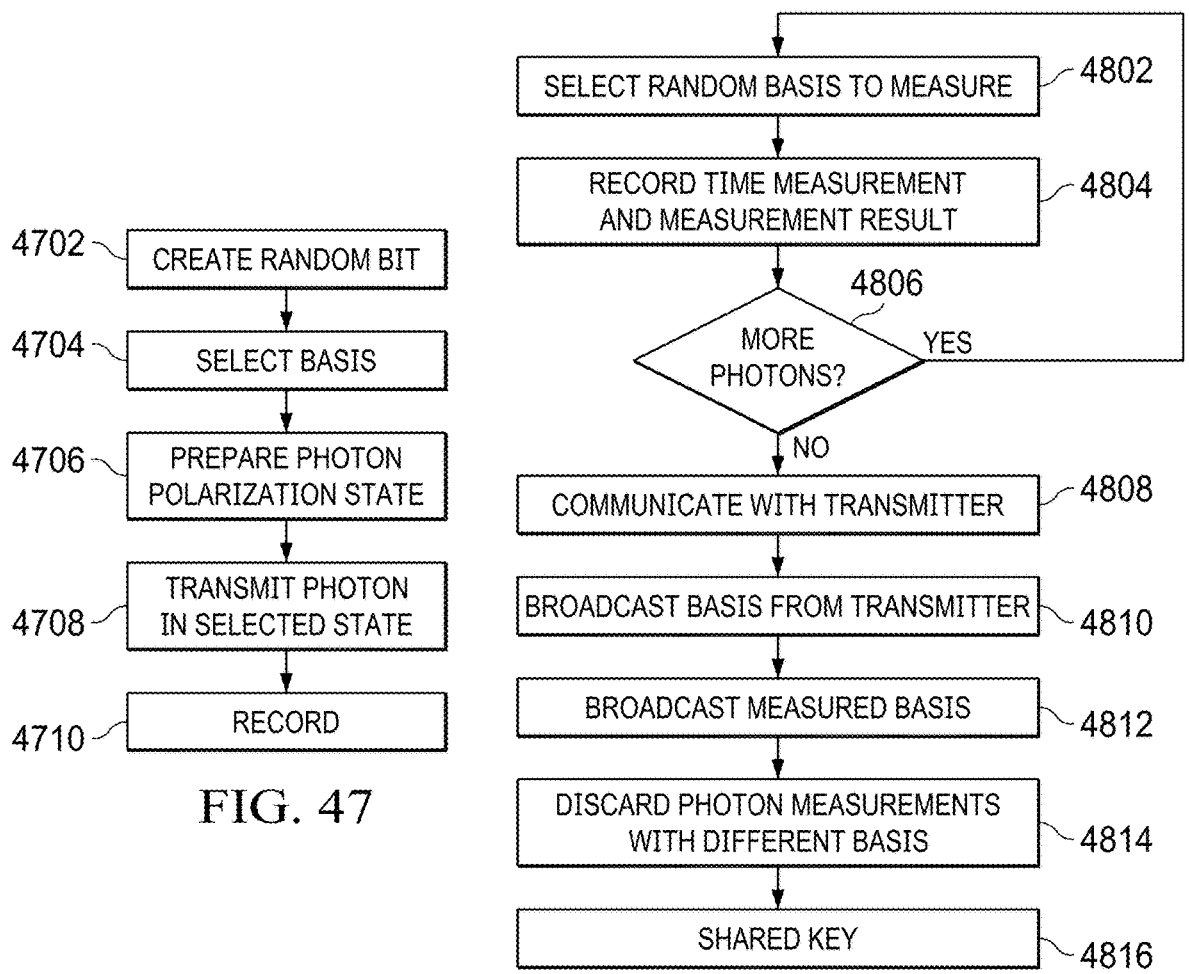
FIG. 47 is a flow diagram illustrating the process for a transmitter transmitting a quantum key.
FIG. 48 illustrates the manner in which the receiver may receive and determine a shared quantum key.
FIG. 49 more particularly illustrates the manner in which a transmitter and receiver may determine a shared quantum key.

The first step in BB84 protocol is quantum transmission. Referring now to FIG. 47 wherein there is illustrated a flow diagram describing the process, wherein the transmitter creates a random bit (0 or 1) at step 4702, and randomly selects at 4704 one of the two basis, either rectilinear or diagonal, to transmit the random bit. The transmitter prepares at step 4706 a photon polarization state depending both on the bit value and the selected basis. So, for example, a 0 is encoded in the rectilinear basis (+) as a vertical polarization state and a 1 is encoded in a diagonal basis (X) as a 135-degree state. The transmitter transmits at step 4708 a single proton in the state specified to the receiver using the quantum channel. This process is repeated from the random bit stage at step 4702 with the transmitter recording the state, basis, and time of each photon that is sent over the optical link.

According to quantum mechanics, no possible measurement distinguishes between the four different polarization states 4602 through 4608 of FIG. 46, as they are not all orthogonal. The only possible measurement is between any two orthogonal states (and orthonormal basis). So, for example, measuring in the rectilinear basis gives a result of horizontal or vertical. If the photo was created as horizontal or vertical (as a rectilinear eigenstate), then this measures the correct state, but if it was created as 45 degrees or 135 degrees (diagonal eigenstate), the rectilinear measurement instead returns either horizontal or vertical at random. Furthermore, after this measurement, the proton is polarized in the state it was measured in (horizontal or vertical), with all of the information about its initial polarization lost.

Referring now to FIG. 48, as the receiver does not know the basis the photons were encoded in, the receiver can only select a basis at random to measure in, either rectilinear or diagonal. At step 4802, the transmitter does this for each received photon, recording the time measurement basis used and measurement result at step 4804. At step 4806, a determination is made if there are further protons present and, if so, control passes back to step 4802. Once inquiry step 4806 determines the receiver had measured all of the protons, the transceiver communicates at step 4808 with the transmitter over the public communications channel. The transmitter broadcast the basis for each photon that was sent at step 4810 and the receiver broadcasts the basis each photon was measured in at step 4812. Each of the transmitter and receiver discard photon measurements where the receiver used a different basis at step 4814 which, on average, is one-half, leaving half of the bits as a shared key, at step 4816. This process is more fully illustrated in FIG. 49.

The transmitter transmits the random bit 01101001. For each of these bits respectively, the transmitter selects the sending basis of rectilinear, rectilinear, diagonal, rectilinear, diagonal, diagonal, diagonal, and rectilinear. Thus, based upon the associated random bits selected and the random sending basis associated with the signal, the polarization indicated in line 4902 is provided. Upon receiving the photon, the receiver selects the random measuring basis as indicated in line 4904. The photon polarization measurements from these basis will then be as indicated in line 4906. A public discussion of the transmitted basis and the measurement basis are discussed at 4908 and the secret key is determined to be 0101 at 4910 based upon the matching bases for transmitted photons 1, 3, 6, and 8.

Figure 50:
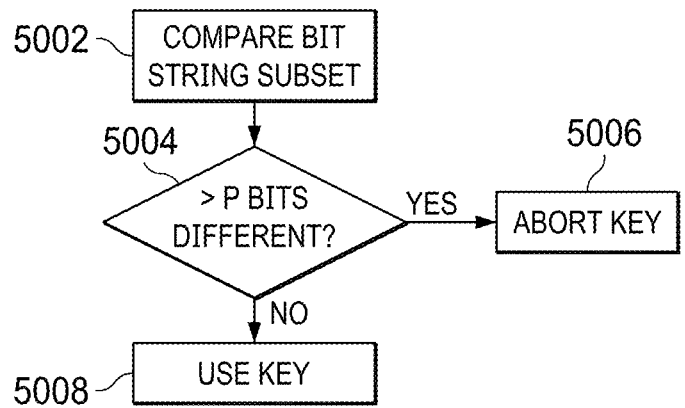
FIG. 50 is a flow diagram illustrating the process for determining whether to keep or abort a determined key.

Referring now to FIG. 50, there is illustrated the process for determining whether to keep or abort the determined key based upon errors detected within the determined bit string. To check for the presence of eavesdropping, the transmitter and receiver compare a certain subset of their remaining bit strings at step 5002. If a third party has gained any information about the photon's polarization, this introduces errors within the receiver's measurements. If more than P bits differ at inquiry step 5004, the key is aborted at step 5006, and the transmitter and receiver try again, possibly with a different quantum channel, as the security of the key cannot be guaranteed. P is chosen so that if the number of bits that is known to the eavesdropper is less than this, privacy amplification can be used to reduce the eavesdropper's knowledge of the key to an arbitrarily small amount by reducing the length of the key. If inquiry step 5004 determines that the number of bits is not greater than P, then the key may be used at step 5008.

The E91 protocol comprises another quantum key distribution scheme that uses entangled pairs of protons. This protocol may also be used with entangled pairs of protons using orbital angular momentum processing, Laguerre Gaussian processing, Hermite Gaussian processing or processing using any orthogonal functions for Q-bits. The entangled pairs can be created by the transmitter, by the receiver, or by some other source separate from both of the transmitter and receiver, including an eavesdropper. The photons are distributed so that the transmitter and receiver each end up with one photon from each pair. The scheme relies on two properties of entanglement. First, the entangled states are perfectly correlated in the sense that if the transmitter and receiver both measure whether their particles have vertical or horizontal polarizations, they always get the same answer with 100 percent probability. The same is true if they both measure any other pair of complementary (orthogonal) polarizations. However, the particular results are not completely random. It is impossible for the transmitter to predict if the transmitter, and thus the receiver, will get vertical polarizations or horizontal polarizations. Second, any attempt at eavesdropping by a third party destroys these correlations in a way that the transmitter and receiver can detect. The original Ekert protocol (E91) consists of three possible states and testing Bell inequality violation for detecting eavesdropping.

Presently, the highest bit rate systems currently using quantum key distribution demonstrate the exchange of secure keys at 1 Megabit per second over a 20-kilometer optical fiber and 10 Kilobits per second over a 100 kilometer fiber.

The longest distance over which quantum key distribution has been demonstrated using optical fiber is 148 kilometers. The distance is long enough for almost all of the spans found in today's fiber-optic networks. The distance record for free-space quantum key distribution is 134 kilometers using BB84 enhanced with decoy states.

Figure 51:
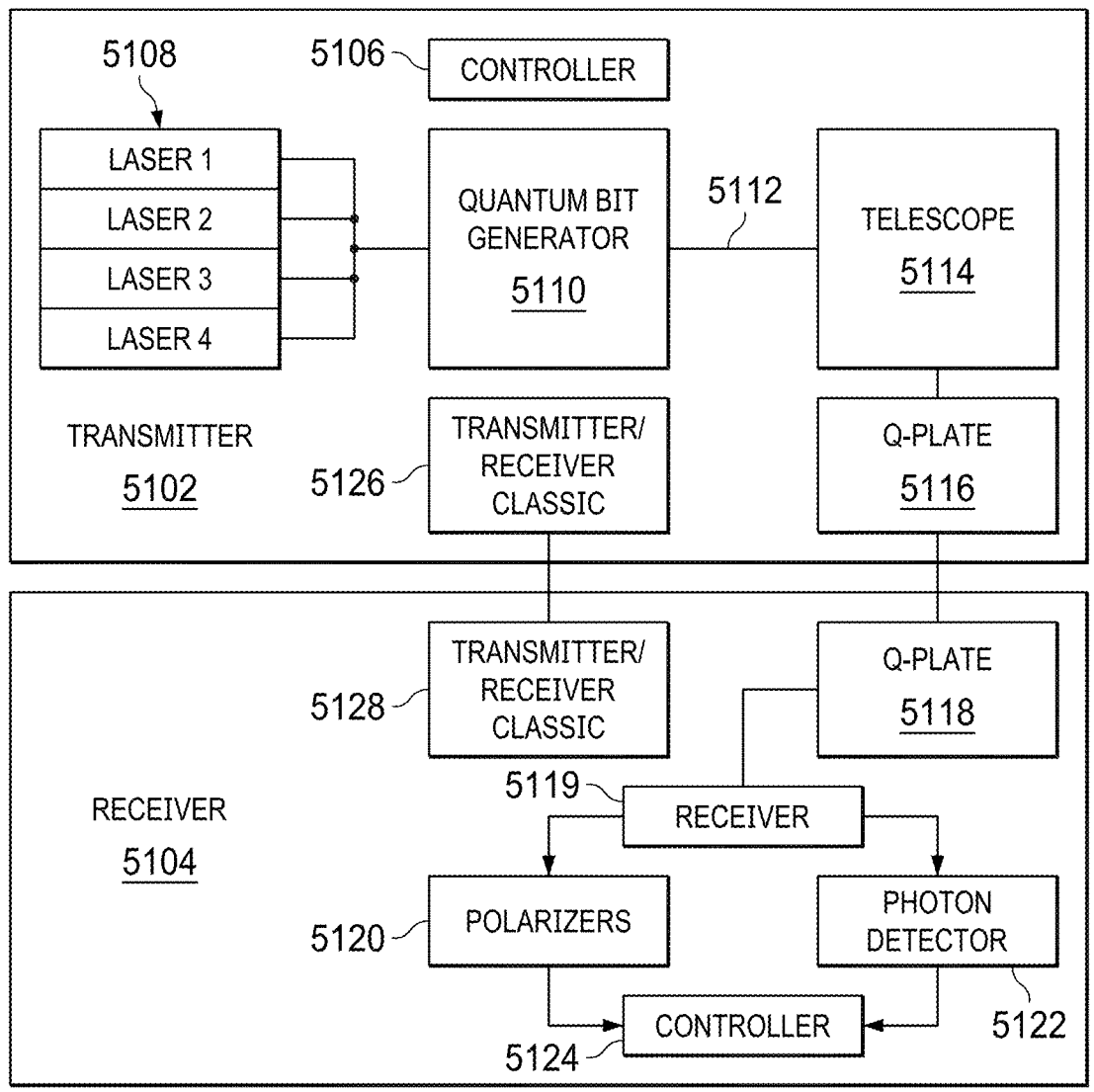
FIG. 51 illustrates a functional block diagram of a transmitter and receiver utilizing a free-space quantum key distribution system.

Referring now to FIG. 51, there is illustrated a functional block diagram of a transmitter 5102 and receiver 5104 that can implement alignment of free-space quantum key distribution. The system can implement the BB84 protocol with decoy states. The controller 5106 enables the bits to be encoded in two mutually unbiased bases Z={|0>, |1>} and X={|+>, |–>}, where |0> and |1> are two orthogonal states spanning the qubit space and $|\pm\rangle = 1/\sqrt{2}$ (|0⟩+|1⟩). The transmitter controller 5106 randomly chooses between the Z and X basis to send the classical bits 0 and 1. Within hybrid encoding, the Z basis corresponds to $\{|L\rangle_\pi \otimes |r\rangle_O, |R\rangle_\pi \otimes |l\rangle_O\}$ while the X basis states correspond to $1/\sqrt{2}$ $(|L\rangle_\pi \otimes |r\rangle_O \pm |R\rangle_\pi \otimes |l\rangle_O)$. The transmitter 5102 uses four different polarized attenuated lasers 5108 to generate quantum bits through the quantum bit generator 5110. Photons from the quantum bit generator 5110 are delivered via a single mode fiber 5112 to a telescope 5114. Polarization states |H>, |V>, |R>, |L> are transformed into rotation invariant hybrid states by means of a q-plate 5116 with q=½. The photons can then be transmitted to the receiving station 5104 where a second q-plate transform 5118 transforms the signals back into the original polarization states |H>, |V>, |R>, |L>, as defined by the receiver reference frame. Qubits can then be analyzed by polarizers 5120 and single photon detectors 5122. The information from the polarizers 5120 and photo detectors 5122 may then be provided to the receiver controller 5124 such that the shifted keys can be obtained by keeping only the bits corresponding to the same basis on the transmitter and receiver side as determined by communications over a classic channel between the transceivers 5126, 5128 in the transmitter 5102 and receiver 5104.

Figure 52:
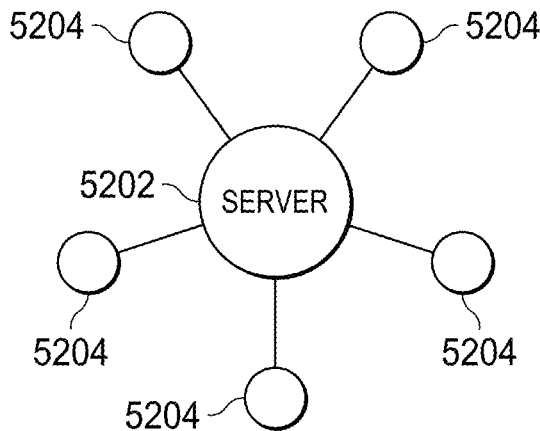
FIG. 52 illustrates a network cloud-based quantum key distribution system.

Referring now to FIG. 52, there is illustrated a network cloud-based quantum key distribution system including a central server 5202 and various attached nodes 5204 in a hub and spoke configuration. Trends in networking are presenting new security concerns that are challenging to meet with conventional cryptography, owing to constrained computational resources or the difficulty of providing suitable key management. In principle, quantum cryptography, with its forward security and lightweight computational footprint, could meet these challenges, provided it could evolve from the current point to point architecture to a form compatible with multimode network architecture. Trusted quantum key distribution networks based on a mesh of point to point links lacks scalability, require dedicated optical fibers, are expensive and not amenable to mass production since they only provide one of the cryptographic functions, namely key distribution needed for secure communications. Thus, they have limited practical interest.

A new, scalable approach such as that illustrated in FIG. 52 provides quantum information assurance that is network-based quantum communications which can solve new network security challenges. In this approach, a BB84 type quantum communication between each of N client nodes 5204 and a central sever 5202 at the physical layer support a quantum key management layer, which in turn enables secure communication functions (confidentiality, authentication, and nonrepudiation) at the application layer between approximately N2 client pairs. This network-based communication "hub and spoke" topology can be implemented in a network setting, and permits a hierarchical trust architecture that allows the server 5202 to act as a trusted authority in cryptographic protocols for quantum authenticated key establishment. This avoids the poor scaling of previous approaches that required a pre-existing trust relationship between every pair of nodes. By making a server 5202, a single multiplex QC (quantum communications) receiver and the client nodes 5204 QC transmitters, this network can simplify complexity across multiple network nodes. In this way, the network-based quantum key distribution architecture is scalable in terms of both quantum physical resources and trust. One can at time multiplex the server 5202 with three transmitters 5204 over a single mode fiber, larger number of clients could be accommodated with a combination of temporal and wavelength multiplexing as well as orbital angular momentum multiplexed with wave division multiplexing to support much higher clients.

Figure 53:
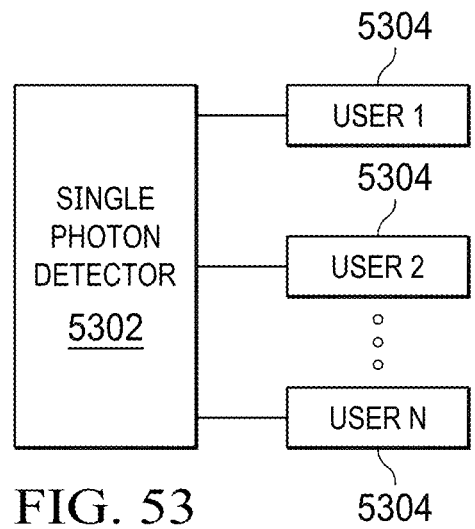
FIG. 53 illustrates a high-speed single photon detector in communication with a plurality of users.
Figure 54:
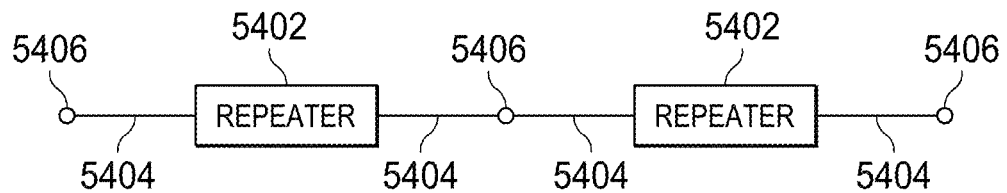
FIG. 54 illustrates a nodal quantum key distribution network.

Referring now to FIGS. 53 and 54, there are illustrated various components of multi-user orbital angular momentum-based quantum key distribution multi-access network. FIG. 53 illustrates a high-speed single photon detector 5302 positioned at a network node that can be shared between multiple users 5304 using conventional network architectures, thereby significantly reducing the hardware requirements for each user added to the network. In an embodiment, the single photon detector 5302 may share up to 64 users. This shared receiver architecture removes one of the main obstacles restricting the widespread application of quantum key distribution. The embodiment presents a viable method for realizing multi-user quantum key distribution networks with resource efficiency.

Referring now also to FIG. 54, in a nodal quantum key distribution network, multiple trusted repeaters 5402 are connected via point to point links 5404 between node 5406. The repeaters are connected via point to point links between a quantum transmitter and a quantum receiver. These point to point links 5404 can be realized using long distance optical fiber lengths and may even utilize ground to satellite quantum key distribution communication. While point to point connections 5404 are suitable to form a backbone quantum core network, they are less suitable to provide the last-mile service needed to give a multitude of user's access to the quantum key distribution infrastructure. Reconfigurable optical networks based on optical switches or wavelength division multiplexing may achieve more flexible network structures, however, they also require the installation of a full quantum key distribution system per user which is prohibitively expensive for many applications.

The quantum key signals used in quantum key distribution need only travel in one direction along a fiber to establish a secure key between the transmitter and the receiver. Single photon quantum key distribution with the sender positioned at the network node 5406 and the receiver at the user premises therefore lends itself to a passive multi-user network approach. However, this downstream implementation has two major shortcomings. Firstly, every user in the network requires a single photon detector, which is often expensive and difficult to operate. Additionally, it is not possible to deterministically address a user. All detectors, therefore, have to operate at the same speed as a transmitter in order not to miss photons, which means that most of the detector bandwidth is unused.

Most systems associated with a downstream implementation can be overcome. The most valuable resource should be shared by all users and should operate at full capacity. One can build an upstream quantum access network in which the transmitters are placed at the end user location and a common receiver is placed at the network node. This way, an operation with up to 64 users is feasible, which can be done with multi-user quantum key distribution over a 1×64 passive optical splitter.

The above described QKD scheme is applicable to twisted pair, coaxial cable, fiber optic, RF satellite, RF broadcast, RF point-to point, RF point-to-multipoint, RF point-to-point (backhaul), RF point-to-point (fronthaul to provide higher throughput CPRI interface for cloudification and virtualization of RAN and cloudified HetNet), free-space optics (FSO), Internet of Things (IOT), Wifi, Bluetooth, as a personal device cable replacement, RF and FSO hybrid system, Radar, electromagnetic tags and all types of wireless access. The method and system are compatible with many current and future multiple access systems, including EV-DO, UMB, WIMAX, WCDMA (with or without), multimedia broadcast multicast service (MBMS)/multiple input multiple output (MIMO), HSPA evolution, and LTE. The techniques would be useful for combating denial of service attacks by routing communications via alternate links in case of disruption, as a technique to combat Trojan Horse attacks which does not require physical access to the endpoints and as a technique to combat faked-state attacks, phase remapping attacks and time-shift attacks.

Thus, using various configurations of the above described orbital angular momentum processing, multi-layer overlay modulation, and quantum key distribution within various types of communication networks and more particularly optical fiber networks and free-space optic communication network, a variety of benefits and improvements in system bandwidth and capacity maybe achieved.

Defense Industry Connectivity & Computing

The defense industry requires broadband capabilities possessing the highest level of security in an incredibly complex computing scenario. The bandwidth and security qualities of Free-Space Optics (FSO) make it an attractive technology for military and commercial communications and computing. Photons have a very weak interaction with the environment that makes them perfectly suitable for encoding and transmitting quantum information. However, though photon-photon interactions is challenging to create entangled states, there have been a huge progress in using photonics and multi-photon entanglements have already been achieved. Alternatively, photon-matter interaction can also be used to directly create deterministic gates. We can also use graphene that can provide a strong nonlinearity without the technical drawbacks of atomic based quantum systems. There have been even some proposals on use of graphene that can provide a strong nonlinearity without the technical drawbacks of those atomic systems as described in A. Calafell, "Quantum computing with graphene plasmons," npj Quantum Information, May 2019 and U.S. patent application Ser. No. 16/660,246, filed Oct. 22, 2019, entitled QUANTUM MECHANICAL FRAMEWORK FOR INTERACTION OF OAM WITH MATTER AND APPLICATIONS IN SOLID STATES, BIOSCIENCES AND QUANTUM COMPUTING, each of which are incorporated herein by reference in their entirety.

FSO communications uses modulated collimated light, usually in the form of an infrared (IR) laser, to transmit data. This affords FSO many appealing qualities such as (i) very high bandwidth capability, (ii) a high level of security through a low probability of detection (LPD) (iii) a low probability of intercept (LPI), and (iv) a signal that is resistant to radio frequency (RF) interference or FCC regulations. FSO also allows us to perform quantum teleportation which is critical for defense industry. Therefore, we see the convergence of both broadband, secure communications, quantum computing and quantum teleportation in a photonics approach.

Spin-Orbital Entanglement

Higher data transmission capacity is one of the primary pursuits in optical communications. Investigation in using different physical properties of a light for data encoding and channel addressing, including amplitude, phase, wavelength, and polarization are a few of the approaches. More recently, spatially orthogonal modes and spatial positions have been under intense investigation. A typical method of increasing the transmission capacity in optical communication systems is the multiplexing of multiple independent data channels. For example, multiple independent data channels can be located on different wavelengths, polarizations, or spatial channels, corresponding to wavelength-division multiplexing (WDM), polarization-division multiplexing (PDM), and space-division multiplexing (SDM), respectively.

A special case of SDM is the utilization of orthogonal spatially overlapping and co-propagating spatial modes, known as mode-division-multiplexing (MDM) where each mode can carry an independent data channel, and the orthogonality enables efficient multiplexing/demultiplexing and low inter-modal crosstalk among multiple modes. There are several different types of orthogonal modal basis sets that are potential candidates for such MDM systems. One such set is orbital angular momentum (OAM).

A light wave can be interpreted quantum mechanically and thus can be viewed to carry both spin angular momentum (SAM) and OAM. Contrary to SAM (e.g., circularly polarized light), which is identified by the electric field direction, OAM can be interpreted to characterize the "twist" of a helical phase front. Owing to the helical phase structure, an OAM-carrying beam usually has an annular "ring" intensity profile with a phase singularity at the beam center. Depending on the discrete "twisting" rate of the helical phase, OAM beams can be quantified as different states, which are orthogonal while propagating coaxially.

This property allows OAM beams to be potentially useful in improving the performance of optical communication systems. Specifically, OAM states could be used as a different dimension to create an additional set of data carriers in an SDM/MDM system. Importantly, OAM multiplexing does not rely on the wavelength or polarization, indicating that OAM could be used in addition to WDM and PDM techniques to improve system capacity. Compared to other MDM methods, OAM might have some implementation advantages stemming from the circular symmetry of the modes, which make it well-suited for many optical component technologies.

In conjunction with high capacity communications using SAM and OAM, one can use these two properties to entangle them together creating a hyper-entangled photonic state that can be used for multi-dimensional QKD as well as quantum computing. Multiple Orbital Angular Momentum (OAM) modes can be used as a new degree of freedom for quantum computing and a multi-dimensional QKD.

Free Space Optics System Using OAM

Achieving higher data capacity is perhaps one of the primary interest of the communications community. This is led to the investigation of using different physical properties of a light wave for communications, including amplitude, phase, wavelength and polarization. Orthogonal modes in spatial positions are also under investigation and seemed to be useful as well. Generally these investigative efforts can be summarized in 2 categories: 1) encoding and decoding more bets on a single optical pulse; a typical example is the use of advanced modulation formats, which encode information on amplitude, phase and polarization states, and 2) multiplexing and demultiplexing technologies that allow parallel propagation of multiple independent data channels, each of which is addressed by different light property (e.g., wavelength, polarization and space, corresponding to wavelength-division multiplexing (WDM), polarization-division multiplexing (PDM) and space division multiplexing (SDM), respectively).

The recognition that orbital angular momentum (OAM) has applications in communication has made it an interesting research topic. It is well-known that a photon can carry both spin angular momentum and orbital angular momentum. Contrary to spin angular momentum (e.g., circularly polarized light), which is identified by the electrical field erection, OAM is usually carried by a light beam with a helical phase front. Due to the helical phase structure, an OAM carrying beam usually has an annular intensity profile with a phase singularity at the beam center. Importantly, depending on discrete twisting speed of the helical phase, OAM beams can be quantified is different states, which are completely distinguishable while propagating coaxially. This property allows OAM beams to be potentially useful in either of the two aforementioned categories to help improve the performance of a free space or fiber communication system. Specifically, OAM states could be used as a different dimension to encode bits on a single pulse (or a single photon) or be used to create additional data carriers in an SDM system.

There are some potential benefits of using OAM for communications and quantum computing, some specially designed novel fibers allow less mode coupling and cross talk while propagating in fibers. In addition, OAM beams with different states share a ring-shaped beam profile, which indicate rotational insensitivity for receiving the beams in communications systems or quantum computers. Since the distinction of OAM beams does not rely on the wavelength or polarization, OAM multiplexing could be used in addition to WDM and PDM techniques so that potentially improve the system performance may be provided. These techniques may also be combined with MLO modulation as described above.

Figure 55:
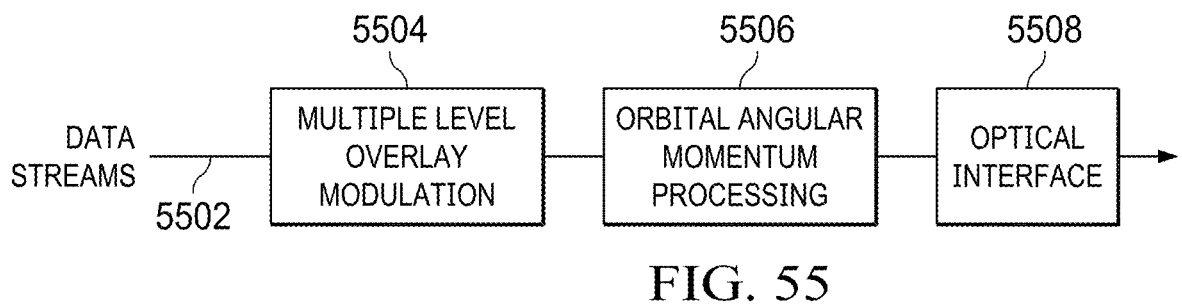
FIG. 55 illustrates a general block diagram for processing a plurality of data streams within an optical communication system.

Referring now to FIG. 55, there is illustrated a general block diagram for processing a plurality of data streams 5502 for transmission in an optical communication system. The multiple data streams 5502 are provided to the multi-layer overlay modulation circuitry 5504 wherein the signals are modulated using the multi-layer overlay modulation technique. The modulated signals are provided to orbital angular momentum processing circuitry 5506 which applies a twist to each of the wave fronts being transmitted on the wavelengths of the optical communication channel. The twisted waves are transmitted through the optical interface 5508 over an optical or other communications link such as an optical fiber or free space optics communication system. FIG. 55 may also illustrate an RF mechanism wherein the interface 5508 would comprise and RF interface rather than an optical interface.

Various techniques for applying OAM to signals have already been described above with respect to FIGS. 11-18

Figure 56:
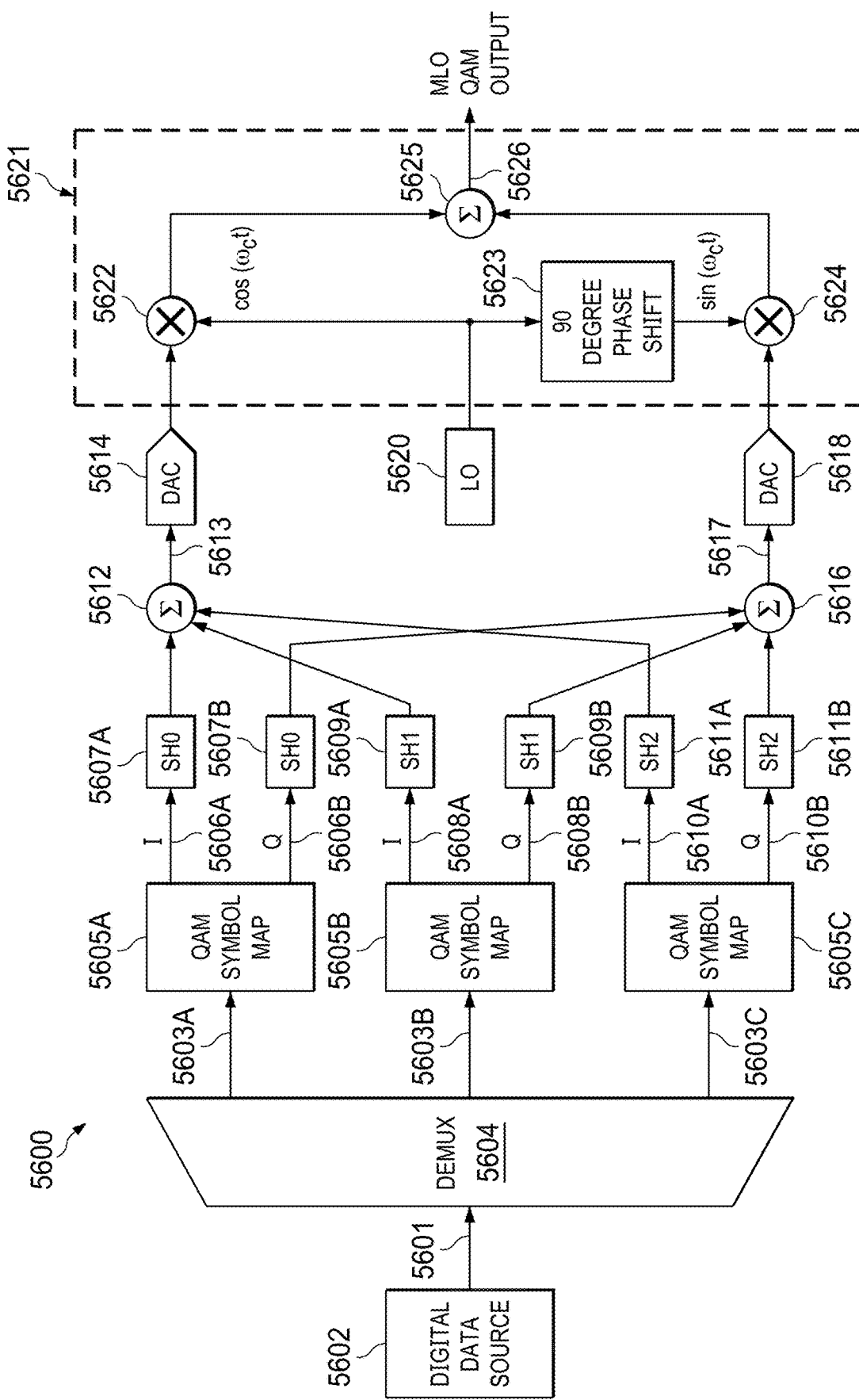
FIG. 56 illustrates a multiple level overlay modulation system.

Referring now to FIG. 56, the reference number 5600 generally indicates an embodiment of a multiple level overlay (MLO) modulation system, although it should be understood that the term MLO and the illustrated system 5600 are examples of embodiments. The MLO system may comprise one such as that disclosed in U.S. Pat. No. 8,503,546 entitled Multiple Layer Overlay Modulation which is incorporated herein by reference. In one example, the modulation system 5600 would be implemented within the multiple level overlay modulation box 5504 of FIG. 55. System 5600 takes as input an input data stream 5601 from a digital source 5602, which is separated into three parallel, separate data streams, 5603A-5603C, of logical 1s and 0s by input stage demultiplexer (DEMUX) 5604. Data stream 5601 may represent a data file to be transferred, or an audio or video data stream. It should be understood that a greater or lesser number of separated data streams may be used. In some of the embodiments, each of the separated data streams 5603A-5603C has a data rate of 1/N of the original rate, where N is the number of parallel data streams. In the embodiment illustrated in FIG. 56, N is 3.

Each of the separated data streams 5603A-5603C is mapped to a quadrature amplitude modulation (QAM) symbol in an M-QAM constellation, for example, 16 QAM or 64 QAM, by one of the QAM symbol mappers 5605A-C. The QAM symbol mappers 5605A-C are coupled to respective outputs of DEMUX 5604, and produced parallel in phase (I) 5606A, 5608A, and 5610A and quadrature phase (Q) 5606B, 5608B, and 5610B data streams at discrete levels. For example, in 64 QAM, each I and Q channel uses 8 discrete levels to transmit 3 bits per symbol. Each of the three I and Q pairs, 5606A-5606B, 5608A-5608B, and 5610A-5610B, is used to weight the output of the corresponding pair of function generators 5607A-5607B, 5609A-5609B, and 5611A-5611B, which in some embodiments generate signals such as the modified Hermite polynomials described above and weights them based on the amplitude value of the input symbols. This provides 2N weighted or modulated signals, each carrying a portion of the data originally from income data stream 5601, and is in place of modulating each symbol in the I and Q pairs, 5606A-5606B, 5608A-5608B, and 5610A-5610B with a raised cosine filter, as would be done for a prior art QAM system. In the illustrated embodiment, three signals are used, SH0, SH1, and SH2, which correspond to modifications of H0, H1, and H2, respectively, although it should be understood that different signals may be used in other embodiments.

While the description relates to the application of QLO modulation to improve operation of a quadrature amplitude modulation (QAM) system, the application of QLO modulation will also improve the spectral efficiency of other legacy modulation schemes.

The weighted signals are not subcarriers, but rather are sublayers of a modulated carrier, and are combined, superimposed in both frequency and time, using summers 5612 and 5616, without mutual interference in each of the I and Q dimensions, due to the signal orthogonality. Summers 5612 and 5616 act as signal combiners to produce composite signals 5613 and 5617. The weighted orthogonal signals are used for both I and Q channels, which have been processed equivalently by system 5600, and are summed before the QAM signal is transmitted. Therefore, although new orthogonal functions are used, some embodiments additionally use QAM for transmission. Because of the tapering of the signals in the time domain, as will be shown in FIGS. 18A through 18K, the time domain waveform of the weighted signals will be confined to the duration of the symbols. Further, because of the tapering of the special signals and frequency domain, the signal will also be confined to frequency domain, minimizing interface with signals and adjacent channels.

The composite signals 5613 and 5617 are converted to analogue signals 5615 and 5619 using digital to analogue converters 5614 and 5618 and are then used to modulate a carrier signal at the frequency of local oscillator (LO) 5620, using modulator 5621. Modulator 5621 comprises mixers 5622 and 5624 coupled to DACs 5614 and 5618, respectively. Ninety-degree phase shifter 5623 converts the signals from LO 5620 into a Q component of the carrier signal. The output of mixers 5622 and 5624 are summed in summer 5625 to produce output signals 5626.

MLO can be used with a variety of transport mediums, such as wire, optical, and wireless, and may be used in conjunction with QAM. This is because MLO uses spectral overlay of various signals, rather than spectral overlap. Bandwidth utilization efficiency may be increased by an order of magnitude, through extensions of available spectral resources into multiple layers. The number of orthogonal signals is increased from two, cosine and sine, in the prior art, to a number limited by the accuracy and jitter limits of generators used to produce the orthogonal polynomials. In this manner, MLO extends each of the I and Q dimensions of QAM to any multiple access techniques such as GSM, code division multiple access (CDMA), wide band CDMA (WCDMA), high speed downlink packet access (HSPDA), evolution-data optimized (EV-DO), orthogonal frequency division multiplexing (OFDM), world-wide interoperability for microwave access (WIMAX), and long term evolution (LTE) systems. MLO may be further used in conjunction with other multiple access (MA) schemes such as frequency division duplexing (FDD), time division duplexing (TDD), frequency division multiple access (FDMA), and time division multiple access (TDMA). Overlaying individual orthogonal signals over the same frequency band allows creation of a virtual bandwidth wider than the physical bandwidth, thus adding a new dimension to signal processing. This modulation is applicable to twisted pair, coaxial cable, fiber optic, RF satellite, RF broadcast, RF point-to-point, RF point-to-multipoint, RF point-to-point (backhaul), RF point-to-point (fronthaul to provide higher throughput CPRI interface for cloudification and virtualization of RAN and cloudified HetNet), free-space optics (FSO), Internet of Things (IOT), Wifi, Bluetooth, as a personal device cable replacement, RF and FSO hybrid system, Radar, electromagnetic tags and all types of wireless access. The method and system are compatible with many current and future multiple access systems, including EV-DO, UMB, WIMAX, WCDMA (with or without), multimedia broadcast multicast service (MBMS)/multiple input multiple output (MIMO), HSPA evolution, and LTE.

Figure 57:
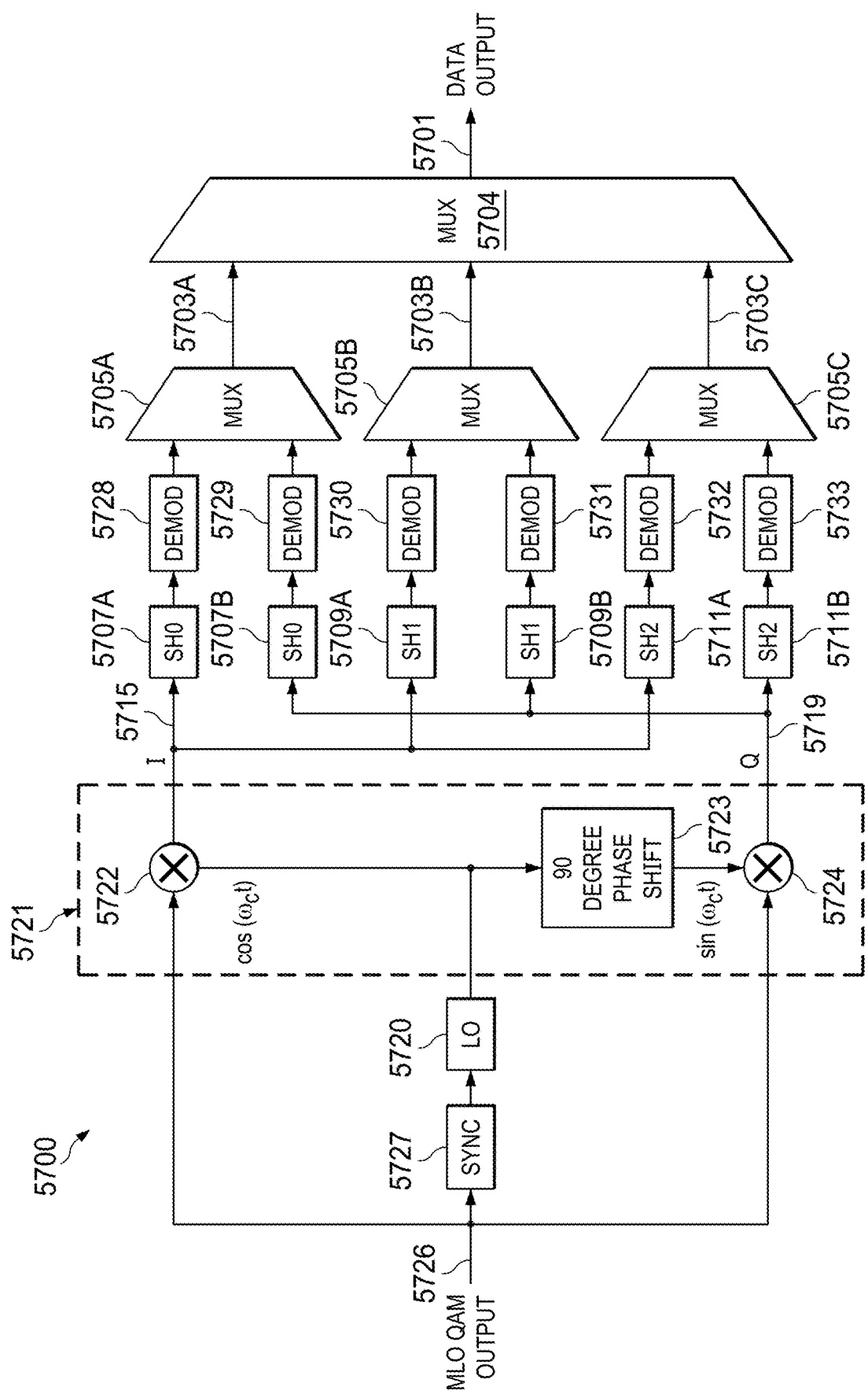
FIG. 57 illustrates a multiple level overlay demodulator.

Referring now back to FIG. 57, an MLO demodulator 5700 is illustrated, although it should be understood that the term MLO and the illustrated system 5700 are examples of embodiments. The modulator 5700 takes as input an MLO signal 5726 which may be similar to output signal 5726 from system 5600. Synchronizer 5727 extracts phase information, which is input to local oscillator 5720 to maintain coherence so that the modulator 5721 can produce base band to analogue I signal 5715 and Q signal 5719. The modulator 5721 comprises mixers 5722 and 5724, which, coupled to OL 5720 through 90-degree phase shifter 5723. I signal 5715 is input to each of signal filters 5707A, 5709A, and 5711A, and Q signal 5719 is input to each of signal filters 5707B, 5709B, and 5711B. Since the orthogonal functions are known, they can be separated using correlation or other techniques to recover the modulated data. Information in each of the I and Q signals 5715 and 5719 can be extracted from the overlapped functions which have been summed within each of the symbols because the functions are orthogonal in a correlative sense.

In some embodiments, signal filters 5707A-5707B, 5709A-5709B, and 5711A-5711B use locally generated replicas of the polynomials as known signals in match filters. The outputs of the match filters are the recovered data bits, for example, equivalence of the QAM symbols 5706A-5706B, 5708A-5708B, and 5710A-5710B of system 5700. Signal filters 5707A-5707B, 5709A-5709B, and 5711A-5711B produce 2n streams of n, I, and Q signal pairs, which are input into demodulators 5728-5733. Demodulators 5728-5733 integrate the energy in their respective input signals to determine the value of the QAM symbol, and hence the logical 1s and 0s data bit stream segment represented by the determined symbol. The outputs of the modulators 5728-5733 are then input into multiplexers (MUXs) 5705A-5705C to generate data streams 5703A-5703C. If system 5700 is demodulating a signal from system 5600, data streams 5703A-5703C correspond to data streams 5603A-5603C. Data streams 5703A-5703C are multiplexed by MUX 5704 to generate data output stream 5701. In summary, MLO signals are overlayed (stacked) on top of one another on transmitter and separated on receiver.

MLO may be differentiated from CDMA or OFDM by the manner in which orthogonality among signals is achieved. MLO signals are mutually orthogonal in both time and frequency domains and can be overlaid in the same symbol time bandwidth product. Orthogonality is attained by the correlation properties, for example, by least sum of squares, of the overlaid signals. In comparison, CDMA uses orthogonal interleaving or displacement of signals in the time domain, whereas OFDM uses orthogonal displacement of signals in the frequency domain.

Bandwidth efficiency may be increased for a channel by assigning the same channel to multiple users. This is feasible if individual user information is mapped to special orthogonal functions. CDMA systems overlap multiple user information and views time intersymbol orthogonal code sequences to distinguish individual users, and OFDM assigns unique signals to each user, but which are not overlaid, are only orthogonal in the frequency domain. Neither CDMA nor OFDM increases bandwidth efficiency. CDMA uses more bandwidth than is necessary to transmit data when the signal has a low signal to noise ratio (SNR). OFDM spreads data over many subcarriers to achieve superior performance in multipath radiofrequency environments. OFDM uses a cyclic prefix OFDM to mitigate multipath effects and a guard time to minimize intersymbol interference (ISI), and each channel is mechanistically made to behave as if the transmitted waveform is orthogonal. (Sync function for each subcarrier in frequency domain.)

In contrast, MLO uses a set of functions which effectively form an alphabet that provides more usable channels in the same bandwidth, thereby enabling high bandwidth efficiency. Some embodiments of MLO do not require the use of cyclic prefixes or guard times, and therefore, outperforms OFDM in spectral efficiency, peak to average power ratio, power consumption, and requires fewer operations per bit. In addition, embodiments of MLO are more tolerant of amplifier nonlinearities than are CDMA and OFDM systems.

Figure 58:
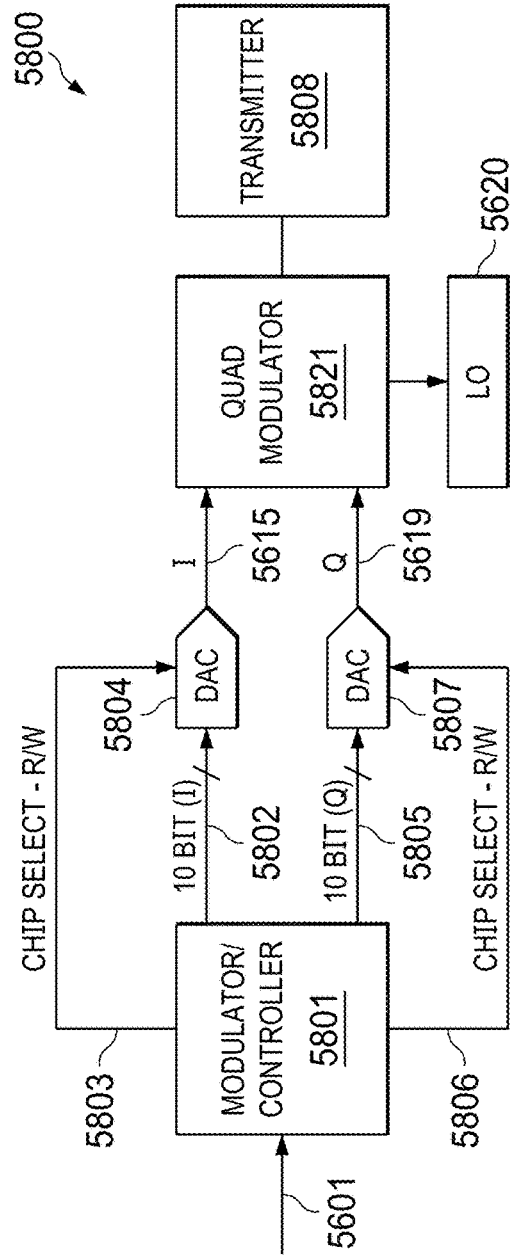
FIG. 58 illustrates a multiple level overlay transmitter system.

FIG. 58 illustrates an embodiment of an MLO transmitter system 5800, which receives input data stream 5801. System 5800 represents a modulator/controller, which incorporates equivalent functionality of DEMUX 5804, QAM symbol mappers 5605A-C, function generators 5607A-5607B, 5609A-5609B, and 5611A-5611B, and summers 5612 and 5616 of system 5600, shown in FIG. 56. However, it should be understood that modulator/controller 5801 may use a greater or lesser quantity of signals than the three illustrated in system 5600. Modulator/controller 5801 may comprise an application specific integrated circuit (ASIC), a field programmable gate array (FPGA), and/or other components, whether discrete circuit elements or integrated into a single integrated circuit (IC) chip.

Modulator/controller 5801 is coupled to DACs 5804 and 5807, communicating a 10 bit I signal 5802 and a 10-bit Q signal 5805, respectively. In some embodiments, I signal 5802 and Q signal 5805 correspond to composite signals 5613 and 5617 of system 5600. It should be understood, however, that the 10-bit capacity of I signal 5802 and Q signal 5805 is merely representative of an embodiment. As illustrated, modulator/controller 5801 also controls DACs 5804 and 5807 using control signals 5803 and 5806, respectively. In some embodiments, DACs 5804 and 5807 each comprise an AD 5433, complementary metal oxide semiconductor (CMOS) 10 bit current output DAC. In some embodiments, multiple control signals are sent to each of DACs 5804 and 5807.

DACs 5804 and 5807 output analogue signals 5615 and 5619 to quadrature modulator 5621, which is coupled to LO 5620. The output of modulator 5620 is illustrated as coupled to a transmitter 5808 to transmit data wirelessly, although in some embodiments, modulator 5581 may be coupled to a fiber-optic modem, a twisted pair, a coaxial cable, or other suitable transmission media.

Figure 59:
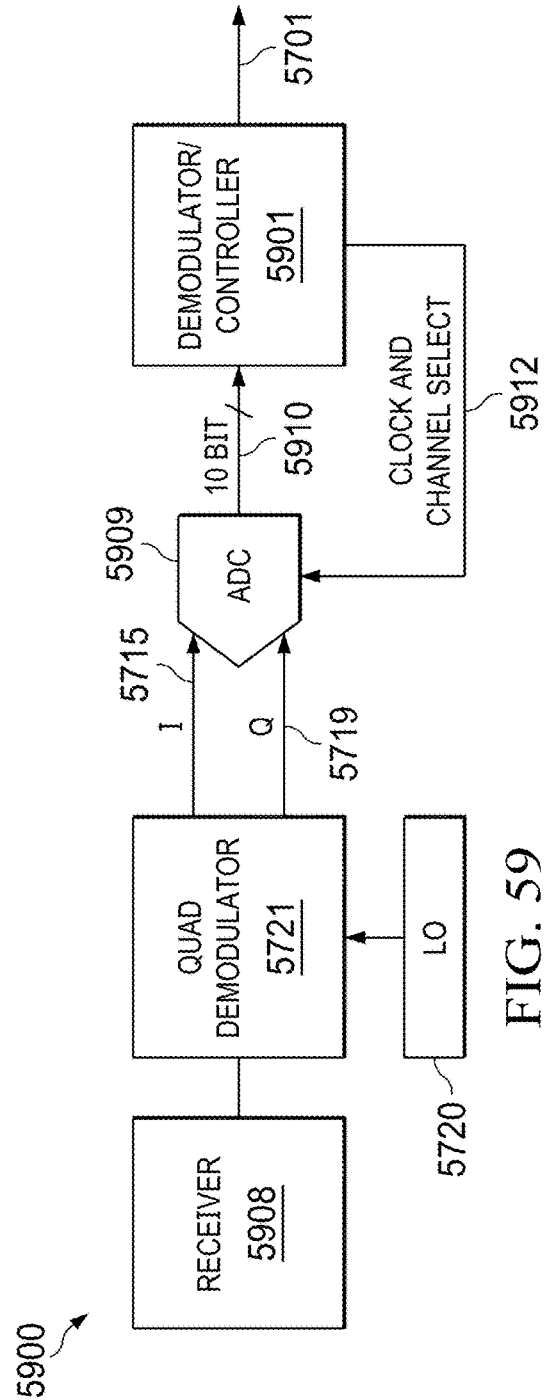
FIG. 59 illustrates a multiple level overlay receiver system.

FIG. 59 illustrates an embodiment of an MLO receiver system 5900 capable of receiving and demodulating signals from system 5800. System 5900 receives an input signal from a receiver 5808 that may comprise input medium, such as RF, wired or optical. The modulator 6121 driven by LO 6120 converts the input to baseband I signal 6115 and Q signal 6119. I signal 6115 and Q signal 6119 are input to analogue to digital converter (ADC) 5909.

ADC 5909 outputs 10-bit signal 5910 to demodulator/controller 5901 and receives a control signal 5912 from demodulator/controller 5901. Demodulator/controller 5901 may comprise an application specific integrated circuit (ASIC), a field programmable gate array (FPGA), and/or other components, whether discrete circuit elements or integrated into a single integrated circuit (IC) chip. Demodulator/controller 5901 correlates received signals with locally generated replicas of the signal set used, in order to perform demodulation and identify the symbols sent. Demodulator/controller 5901 also estimates frequency errors and recovers the data clock, which is used to read data from the ADC 5909. The clock timing is sent back to ADC 5909 using control signal 5912, enabling ADC 5909 to segment the digital I and Q signals 6117 and 6119. In some embodiments, multiple control signals are sent by demodulator/controller 5901 to ADC 5909. Demodulator/controller 5901 also outputs data signal 6101.

Hermite-Gaussian polynomials are a classical orthogonal polynomial sequence, which are the Eigenstates of a quantum harmonic oscillator. Signals based on Hermite-Gaussian polynomials possess the minimal time-bandwidth product property described above and may be used for embodiments of MLO systems. However, it should be understood that other signals may also be used, for example orthogonal polynomials such as Jacobi polynomials, Gegenbauer polynomials, Legendre polynomials, Chebyshev polynomials, and Laguerre-Gaussian polynomials. Q-functions are another class of functions that can be employed as a basis for MLO signals.

In quantum mechanics, a coherent state is a state of a quantum harmonic oscillator whose dynamics most closely resemble the oscillating behavior of a classical harmonic oscillator system. A squeezed coherent state is any state of the quantum mechanical Hilbert space, such that the uncertainty principle is saturated. That is, the product of the corresponding two operators takes on its minimum value. In embodiments of an MLO system, operators correspond to time and frequency domains wherein the time-bandwidth product of the signals is minimized. The squeezing property of the signals allows scaling in time and frequency domain simultaneously, without losing mutual orthogonality among the signals in each layer. This property enables flexible implementations of MLO systems in various communications systems.

Because signals with different orders are mutually orthogonal, they can be overlaid to increase the spectral efficiency of a communication channel. For example, when n=0, the optimal baseband signal will have a time-bandwidth product of ½, which is the Nyquist Inter-Symbol Interference (ISI) criteria for avoiding ISI. However, signals with time-bandwidth products of 3/2, 5/2, 7/2, and higher, can be overlaid to increase spectral efficiency.

An embodiment of an MLO system uses functions based on modified Hermite polynomials, 4n, and are defined by:

$$\psi_n(t,\xi) = \frac{(\tanh\xi)^{n/2}}{2^{n/2}(n!\cosh\xi)^{1/2}} e^{\frac{1}{2}t^2[1-\tanh\xi]} H_n\left(\frac{t}{\sqrt{2\cosh\xi\sinh\xi}}\right)$$

where t is time, and $\xi$ is a bandwidth utilization parameter. Plots of $\Psi_n$ for n ranging from 0 to 9, along with their Fourier transforms (amplitude squared), are shown in FIGS. 5A-5K. The orthogonality of different orders of the functions may be verified by integrating:

$$\iint \psi_n(t,\xi)\psi_m(t,\xi)dtd\xi$$

The Hermite polynomial is defined by the contour integral:

$$H_n(z) = \frac{n!}{2\pi i}\oint e^{-t^2+2tz}t^{-n-1}dt$$

where the contour encloses the origin and is traversed in a counterclockwise direction. Hermite polynomials are described in Mathematical Methods for Physicists, by George Arfken, for example on page 416, the disclosure of which is incorporated by reference.

Figure 60:
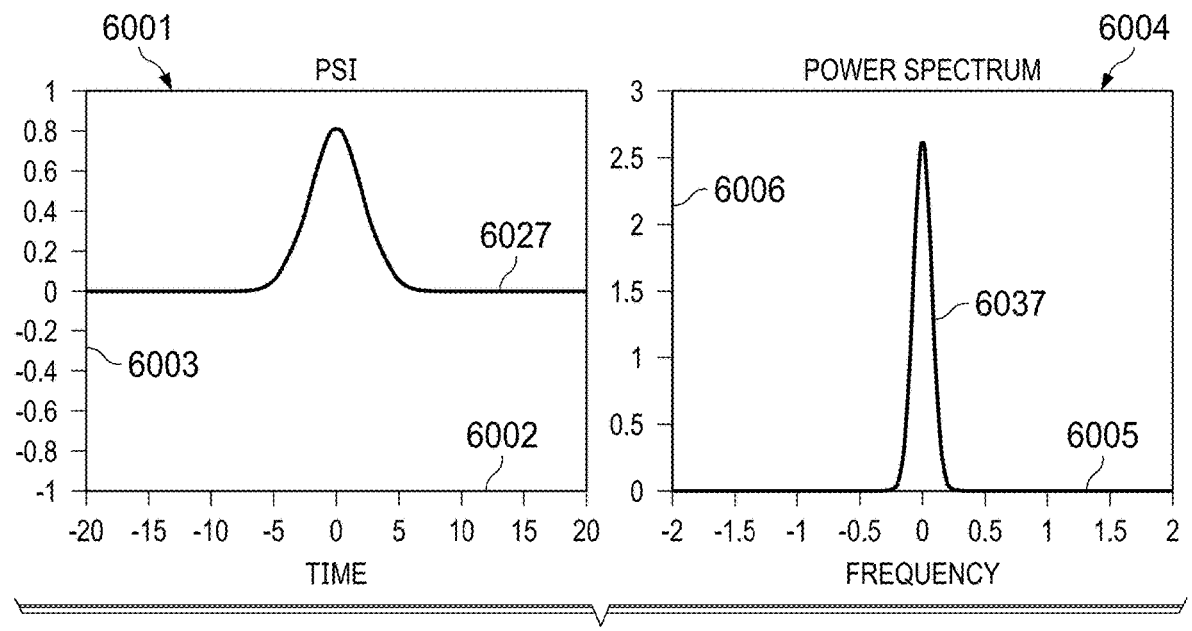
FIG. 60 illustrates representative multiple level overlay signals and their respective spectral power densities.

FIG. 60 illustrates representative MLO signals and their respective spectral power densities based on the modified Hermite polynomials $\Psi_n$ for n ranging from 0 to 9. FIG. 60 shows plots 6001 and 6004. Plot 6001 comprises a curve 6027 representing $\Psi_0$ plotted against a time axis 6002 and an amplitude axis 6003. As can be seen in plot 6001, curve 6027 approximates a Gaussian curve. Plot 6004 comprises a curve 6037 representing the power spectrum of $\Psi_0$ plotted against a frequency axis 6005 and a power axis 6006. As can be seen in plot 6004, curve 6037 also approximates a Gaussian curve. Frequency domain curve 6007 is generated using a Fourier transform of time domain curve 6027. The units of time and frequency on axis 6002 and 6005 are normalized for baseband analysis, although it should be understood that since the time and frequency units are related by the Fourier transform, a desired time or frequency span in one domain dictates the units of the corresponding curve in the other domain. For example, various embodiments of MLO systems may communicate using symbol rates in the megahertz (MHz) or gigahertz (GHz) ranges and the non-0 duration of a symbol represented by curve 6027, i.e., the time period at which curve 6027 is above 0 would be compressed to the appropriate length calculated using the inverse of the desired symbol rate. For an available bandwidth in the megahertz range, the non-0 duration of a time domain signal will be in the microsecond range.

MLO signals used in a modulation layer have minimum time-bandwidth products, which enable improvements in spectral efficiency, and are quadratically integrable. This is accomplished by overlaying multiple demultiplexed parallel data streams, transmitting them simultaneously within the same bandwidth. The key to successful separation of the overlaid data streams at the receiver is that the signals used within each symbols period are mutually orthogonal. MLO overlays orthogonal signals within a single symbol period. This orthogonality prevents ISI and inter-carrier interference (ICI).

Because MLO works in the baseband layer of signal processing, and some embodiments use QAM architecture, conventional wireless techniques for optimizing air interface, or wireless segments, to other layers of the protocol stack will also work with MLO. Techniques such as channel diversity, equalization, error correction coding, spread spectrum, interleaving and space-time encoding are applicable to MLO. For example, time diversity using a multipath-mitigating rake receiver can also be used with MLO. MLO provides an alternative for higher order QAM, when channel conditions are only suitable for low order QAM, such as in fading channels. MLO can also be used with CDMA to extend the number of orthogonal channels by overcoming the Walsh code limitation of CDMA. MLO can also be applied to each tone in an OFDM signal to increase the spectral efficiency of the OFDM systems.

Embodiments of MLO systems amplitude modulate a symbol envelope to create sub-envelopes, rather than sub-carriers. For data encoding, each sub-envelope is independently modulated according to N-QAM, resulting in each sub-envelope independently carrying information, unlike OFDM. Rather than spreading information over many sub-carriers, as is done in OFDM, for MLO, each sub-envelope of the carrier carries separate information. This information can be recovered due to the orthogonality of the sub-envelopes defined with respect to the sum of squares over their duration and/or spectrum. Pulse train synchronization or temporal code synchronization, as needed for CDMA, is not an issue, because MLO is transparent beyond the symbol level. MLO addresses modification of the symbol, but since CDMA and TDMA are spreading techniques of multiple symbol sequences over time. MLO can be used along with CDMA and TDMA.

Figure 61:
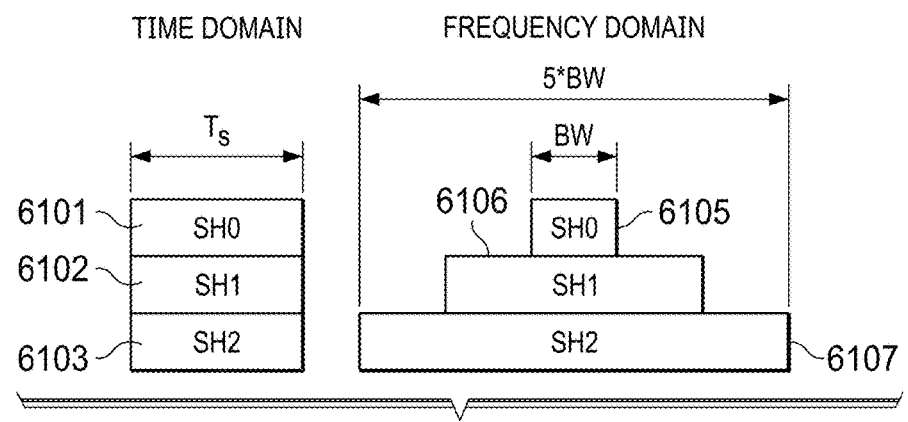
FIG. 61 illustrates comparisons of multiple level overlay signals within the time and frequency domain.

FIG. 61 illustrates a comparison of MLO signal widths in the time and frequency domains. Time domain envelope representations 6101-6103 of signals SH0-SH3 are illustrated as all having a duration $T_S$. SH0-SH3 may represent $PSI_0$-$PSI_2$ or may be other signals. The corresponding frequency domain envelope representations are 6105-6107, respectively. SH0 has a bandwidth BW, SH1 has a bandwidth three times BW, and SH2 has a bandwidth of 5BW, which is five times as great as that of SH0. The bandwidth used by an MLO system will be determined, at least in part, by the widest bandwidth of any of the signals used. The highest order signal must set within the available bandwidth. This will set the parameters for each of the lower order signals in each of the layers and enable the signals to fit together without interference. If each layer uses only a single signal type within identical time windows, the spectrum will not be fully utilized, because the lower order signals will use less of the available bandwidth than is used by the higher order signals.

FIG. 62 illustrates a spectral alignment of MLO signals that accounts for the differing bandwidths of the signals, and makes spectral usage more uniform, using SH0-SH3. Blocks 6201-6204 are frequency domain blocks of an OFDM signal with multiple subcarriers. Block 6203 is expanded to show further detail. Block 6203 comprises a first layer 6203x comprised of multiple SH0 envelopes 6203a-6203o. A second layer 6203y of SH1 envelopes 6203p-6203t has one third the number of envelopes as the first layer. In the illustrated example, first layer 6203x has 15 SH0 envelopes, and second layer 6203y has five SH1 envelopes. This is because, since the SH1 bandwidth envelope is three times as wide as that of SH0, 15 SH0 envelopes occupy the same spectral width as five SH1 envelopes. The third layer 6203z of block 6203 comprises three SH2 envelopes 6203u-6203w, because the SH2 envelope is five times the width of the SH0 envelope.

The total required bandwidth for such an implementation is a multiple of the least common multiple of the bandwidths of the MLO signals. In the illustrated example, the least common multiple of the bandwidth required for SH0, SH1, and SH2 is 15BW, which is a block in the frequency domain. The OFDM-MLO signal can have multiple blocks, and the spectral efficiency of this illustrated implementation is proportional to (15+5+3)/15.

FIGS. 63-64 illustrate a situation wherein the frequency domain envelopes 6320-6324 are each located in a separate layer within a same physical band width 6325. However, each envelope rather than being centered on a same center frequency as shown in FIG. 61 has its own center frequency 6426-6430 shifted in order to allow a slided overlay. The purposed of the slided center frequency is to allow better use of the available bandwidth and insert more envelopes in a same physical bandwidth.

Since each of the layers within the MLO signal comprises a different channel, different service providers may share a same bandwidth by being assigned to different MLO layers within a same bandwidth. Thus, within a same bandwidth, service provider one may be assigned to a first MLO layer, service provider two may be assigned to a second MLO layer and so forth.

Figures 65, 68:
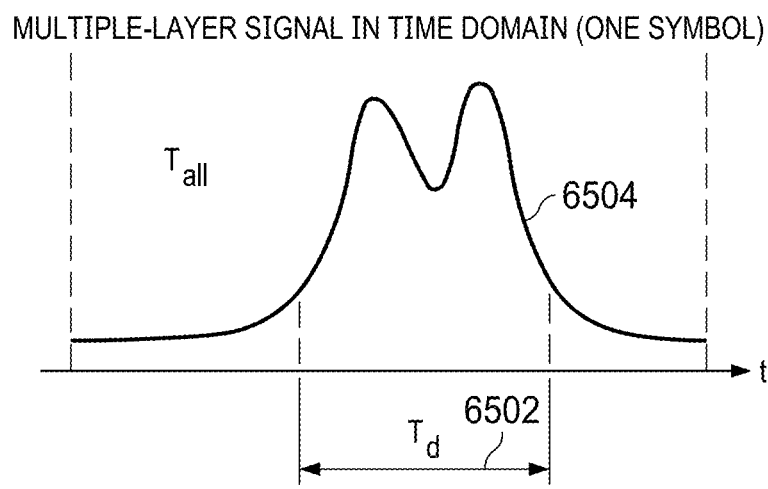
FIG. 65 illustrates the creation of inter-symbol interference in overlapped multilayer signals.
FIG. 68 illustrates truncated orthogonal functions.

However, as illustrated in FIG. 65, the truncation of the superQAM signals 6802-6806 that enables the signals to be layered together within a bandwidth $T_d$ 6502 creates a single signal 6504 having the interlayer interference between each of the layers containing a different signal produced by the QLO process. The ILI is caused between a specific bit within a specific layer having an effect on other bits within another layer of the same symbol.

Figure 66:
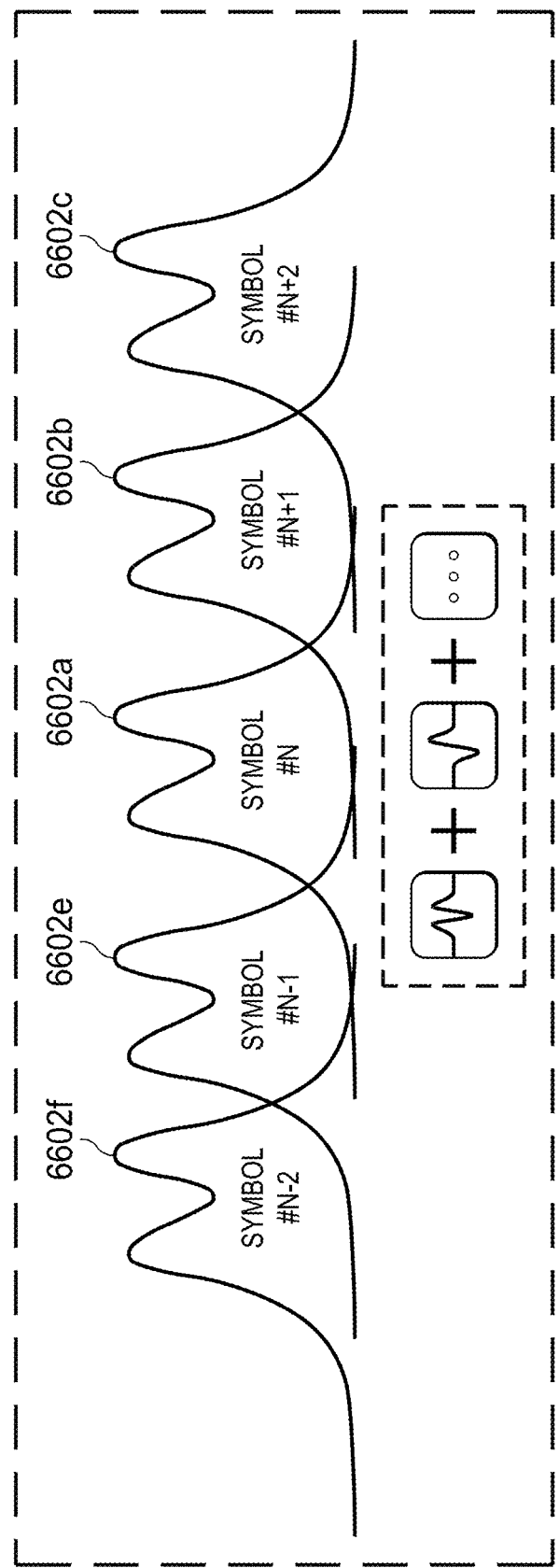
FIG. 66 illustrates overlapped multilayer signals.
Figure 69:
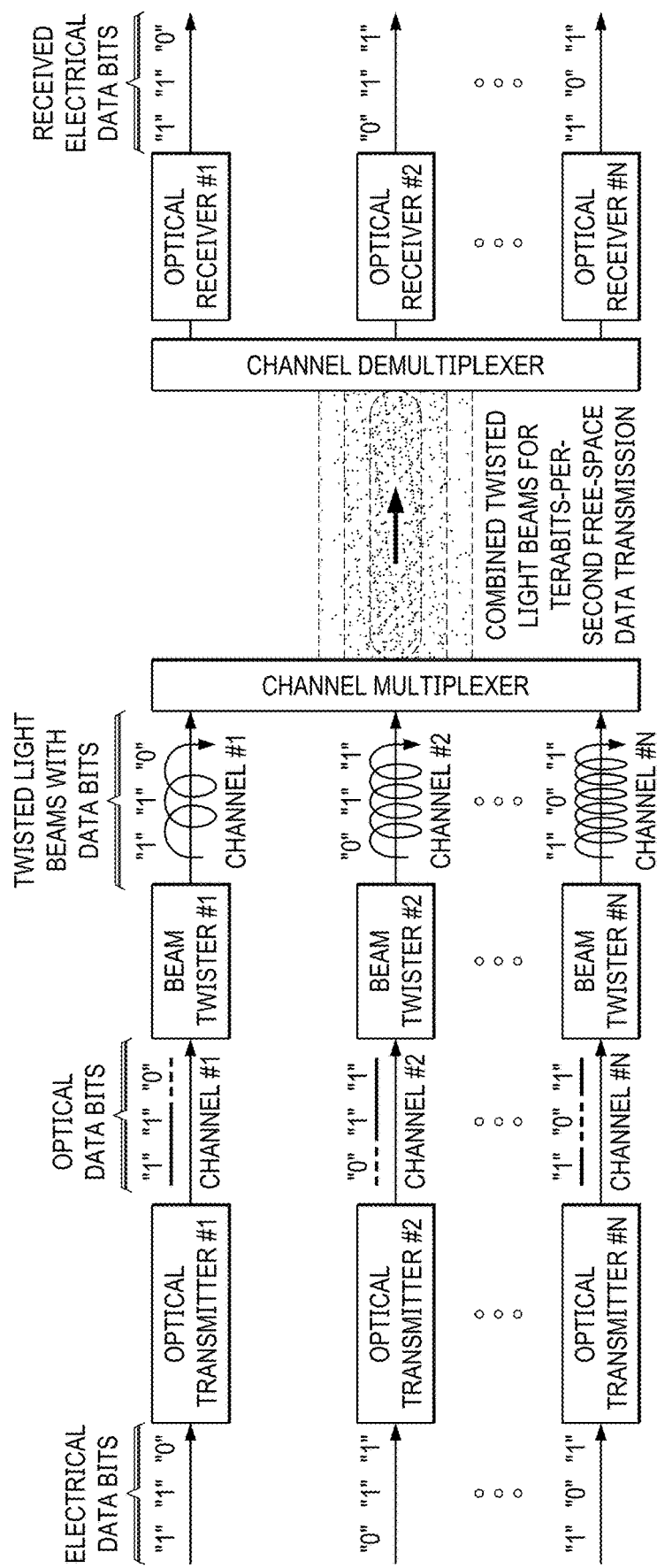
FIG. 69 illustrates a typical OAM multiplexing scheme.

The bandwidth efficiency of MLO may be enhanced by allowing inter-symbol interference (ISI). To realize this enhancement, designing transmitter side parameters as well as developing receiver side detection algorithms and error performance evaluation can be performed. One manner in which ISI may be created is when multilayer signals such as that illustrated in FIG. 69 are overlapped with each other in the manner illustrated in FIG. 66. Multiple signal symbols 6602 are overlapped with each other in order to enable to enable more symbols to be located within a single bandwidth. The portions of the signal symbols 6602 that are overlapping cause the creation of ISI. Thus, a specific bit at a specific layer will have an effect on the bits of nearby symbols.

The QLO transmission and reception system can be designed to have a particular known overlap between symbols. The system can also be designed to calculate the overlaps causing ISI (symbol overlap) and ILI (layer overlay). The ISI and ILI can be expressed in the format of a NM*NM matrix derived from a N*NM matrix. N comprises the number of layers and M is the number of symbols when considering ISI. Referring now to FIG. 67, there is illustrated a fixed channel matrix $H_{xy}$ which is a N*NM matrix. From this we can calculate another matrix which is $H_{yx}$ which is a NM*NM matrix. The ISI and ILI can be canceled by (a) applying a filter of $H_{yx}^{-1}$ to the received vector or (b) pre-distorting the transmitted signal by the SVD (singular value decomposition) of $H_{yx}^{-1}$. Therefore, by determining the matrix $H_{xy}$ of the fixed channel, the signal may be mathematically processed to remove ISL and ILI.

When using orthogonal functions such as Hermite Gaussian (HG) functions, the functions are all orthogonal for any permutations of the index if infinitely extended. However, when the orthogonal functions are truncated as discussed herein above, the functions become pseudo-orthogonal. This is more particularly illustrated in FIG. 68. In this case, orthogonal functions are represented along each of the axes. At the intersection of the same orthogonal functions, functions are completely correlated and a value of "1" is indicated. Thus, a diagonal of "1" exists with each of the off-diagonal elements comprising a "0" since these functions are completely orthogonal with each other. When truncated HG choose functions are used the 0 values will not be exactly 0 since the functions are no longer orthogonal but are pseudo-orthogonal.

However, the HG functions can be selected in a manner that the functions are practically orthogonal. This is achieved by selecting the HG signals in a sequence to achieve better orthogonality. Thus, rather than selecting the initial three signals in a three signal HG signal sequence (P0 P1 P2), various other sequences that do not necessarily comprise the first three signals of the HG sequence may be selected as shown below.

| |
|---|
| P0 P1 P4 |
| P0 P1 P6 |
| P0 P2 P3 |
| P0 P2 P5 |
| P0 P3 P4 |
| P0 P3 P6 |
| P0 P4 P5 |
| P0 P5 P6 |
| P1 P3 P6 |
| P2 P5 P6 |

Similar selection of sequences may be done to achieve better orthogonality with two signals, four signals, etc.

The techniques described herein are applicable to a wide variety of communication band environments. They may be applied across the visible and invisible bands and include RF, Fiber, Freespace optical and any other communications bands that can benefit from the increased bandwidth provided by the disclosed techniques.

Application of OAM to Optical Communication

Utilization of OAM for optical communications is based on the fact that coaxially propagating light beams with different OAM states can be efficiently separated. This is certainly true for orthogonal modes such as the LG beam. Interestingly, it is also true for general OAM beams with cylindrical symmetry by relying only on the azimuthal phase. Considering any two OAM beams with an azimuthal index of $\ell$ 1 and $\ell$ 2, respectively:

$$U_1(r,\theta,z) = A_1(r,z)\exp(i\ell_1\theta) \quad (12)$$

where r and z refers to the radial position and propagation distance respectively, one can quickly conclude that these two beams are orthogonal in the sense that:

$$\int_0^{2\pi} U_1 U_2^* d\theta = \begin{cases} 0 & \text{if } \ell_1 \neq \ell_2 \\ A_1 A_2^* & \text{if } \ell_1 = \ell_2 \end{cases} \quad (13)$$

There are two different ways to take advantage of the distinction between OAM beams with different $\rangle$ states in communications. In the first approach, N different OAM states can be encoded as N different data symbols representing "0", "1", . . . , "N−1", respectively. A sequence of OAM states sent by the transmitter therefore represents data information. At the receiver, the data can be decoded by checking the received OAM state. This approach seems to be more favorable to the quantum communications community, since OAM could provide for the encoding of multiple bits (log 2(N)) per photon due to the infinitely countable possibilities of the OAM states, and so could potentially achieve a higher photon efficiency. The encoding/decoding of OAM states could also have some potential applications for on-chip interconnection to increase computing speed or data capacity.

The second approach is to use each OAM beam as a different data carrier in an SDM (Spatial Division Multiplexing) system. For an SDM system, one could use either a multi-core fiber/free space laser beam array so that the data channels in each core/laser beam are spatially separated, or use a group of orthogonal mode sets to carry different data channels in a multi-mode fiber (MMF) or in free space. Greater than 1 petabit/s data transmission in a multi-core fiber and up to 6 linearly polarized (LP) modes each with two polarizations in a single core multi-mode fiber has been reported. Similar to the SDM using orthogonal modes, OAM beams with different states can be spatially multiplexed and demultiplexed, thereby providing independent data carriers in addition to wavelength and polarization. Ideally, the orthogonality of OAM beams can be maintained in transmission, which allows all the data channels to be separated and recovered at the receiver. A typical embodiments of OAM multiplexing is conceptually depicted in FIG. 69. An obvious benefit of OAM multiplexing is the improvement in system spectral efficiency, since the same bandwidth can be reused for additional data channels.

OAM Beam Generation and Detection

Many approaches for creating OAM beams have been proposed and demonstrated. One could obtain a single or multiple OAM beams directly from the output of a laser cavity, or by converting a fundamental Gaussian beam into an OAM beam outside a cavity. The converter could be a spiral phase plate, diffractive phase holograms, metalmaterials, cylindrical lens pairs, q-plates or fiber structures. There are also different ways to detect an OAM beam, such as using a converter that creates a conjugate helical phase or using a plasmonic detector.

Mode Conversion Approaches

Figure 70:
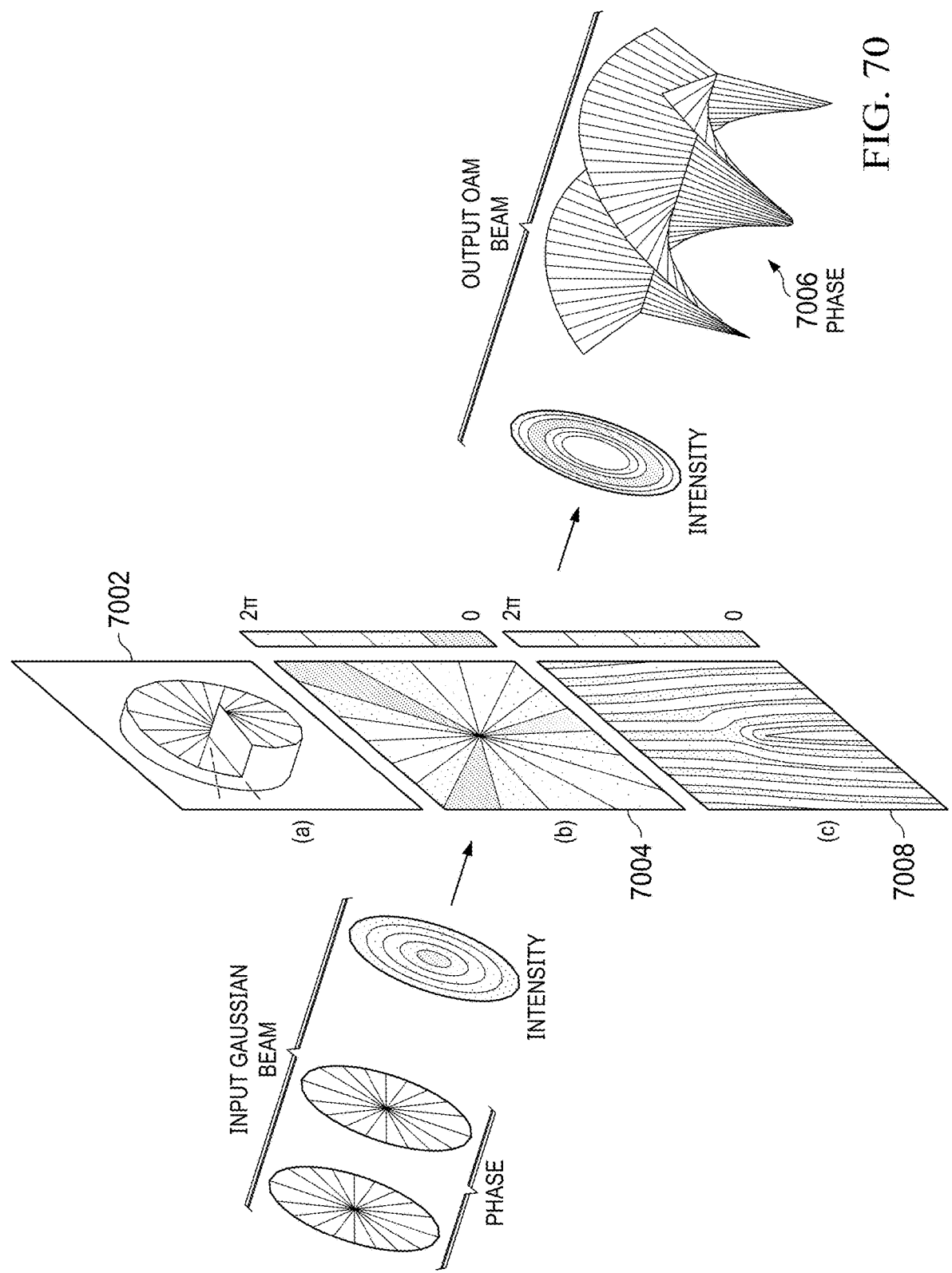
FIG. 70 illustrates various manners for converting a Gaussian beam into an OAM beam.

Referring now to FIG. 70, among all external-cavity methods, perhaps the most straightforward one is to pass a Gaussian beam through a coaxially placed spiral phase plate (SPP) 7002. An SPP 7002 is an optical element with a helical surface, as shown in FIG. 17E. To produce an OAM beam with a state of $\ell$, the thickness profile of the plate should be machined as $\ell\lambda\theta/2\pi(n-1)$, where n is the refractive index of the medium. A limitation of using an SPP 7002 is that each OAM state requires a different specific plate. As an alternative, reconfigurable diffractive optical elements, e.g., a pixelated spatial light modulator (SLM) 7004, or a digital micro-mirror device can be programmed to function as any refractive element of choice at a given wavelength. As mentioned above, a helical phase profile $\exp(i\ell\theta)$ converts a linearly polarized Gaussian laser beam into an OAM mode, whose wave front resembles an $\ell$-fold corkscrew 7006, as shown at 7004. Importantly, the generated OAM beam can be easily changed by simply updating the hologram loaded on the SLM 7004. To spatially separate the phase-modulated beam from the zeroth-order non-phase-modulated reflection from the SLM, a linear phase ramp is added to helical phase code (i.e., a "fork"-like phase pattern 7008 to produce a spatially distinct first-order diffracted OAM beam, carrying the desired charge. It should also be noted that the aforementioned methods produce OAM beams with only an azimuthal index control. To generate a pure LG_(l,p) mode, one must jointly control both the phase and the intensity of the wavefront. This could be achieved using a phase only SLM with a more complex phase hologram.

Figure 71:
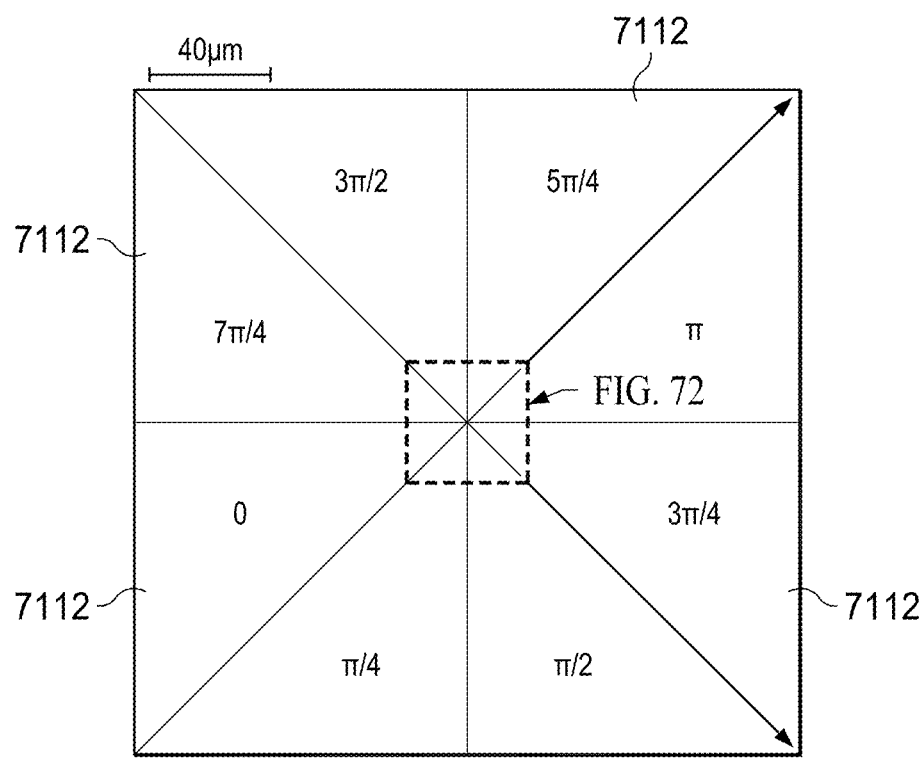
FIG. 71 illustrates a fabricated metasurface phase plate.
Figure 72:
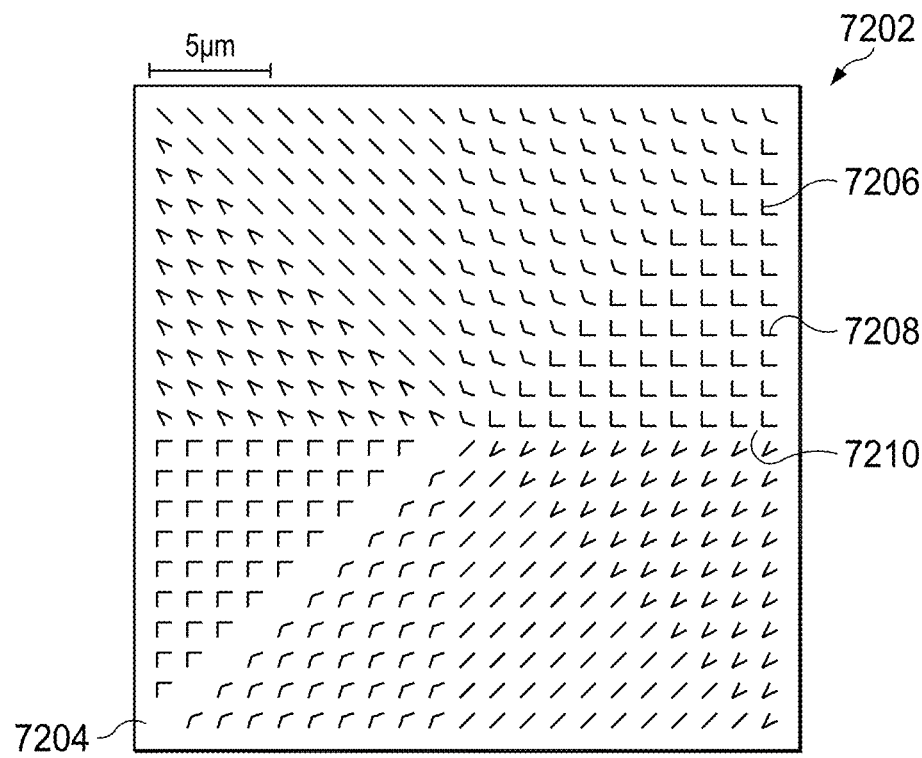
FIG. 72 illustrates a magnified structure of the metasurface phase plate.
Figure 73:
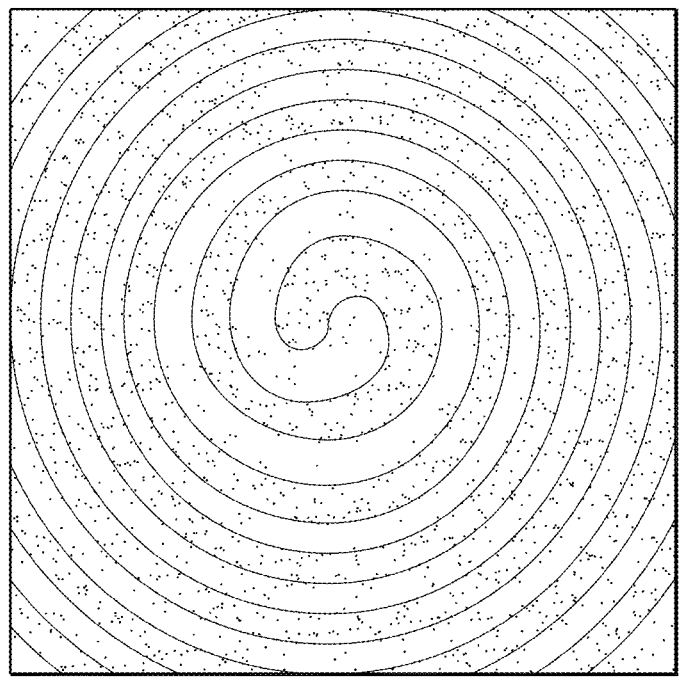
FIG. 73 illustrates an OAM beam generated using the phase plate with $\ell=+1$.

Some novel material structures, such as metal-surface, can also be used for OAM generation. A compact metal-surface could be made into a phase plate by manipulation of the structure caused spatial phase response. As shown in FIGS. 71 and 72, a V-shaped antenna array 7202 is fabricated on the metal surface 7204, each of which is composed of two arms 7206, 7208 connected atone end 7210. A light reflected by this plate would experience a phase change ranging from 0 to 2π, determined by the length of the arms and angle between two arms. To generate an OAM beam, the surface is divided into 8 sectors 7112, each of which introduces a phase shift from 0 to 7π/4 with a step of π/4. The OAM beam with ℓ =+1 is obtained after the reflection, as shown in FIG. 73.

Figure 74:
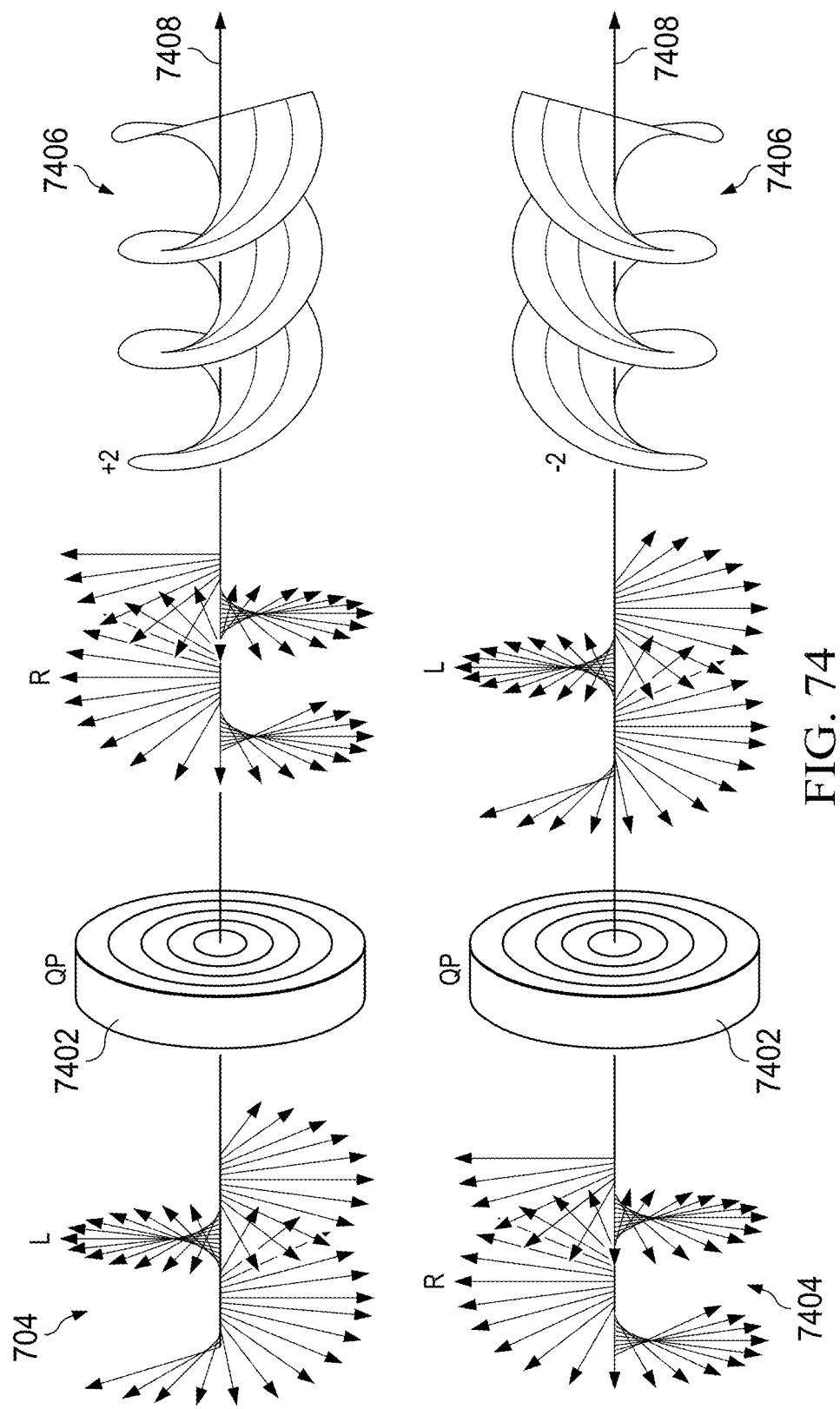
FIG. 74 illustrates the manner in which a q-plate can convert a left circularly polarized beam into a right circular polarization or vice-versa.

Referring now to FIG. 74, another interesting liquid crystal-based device named "q-plate" 7402 is also used as a mode converter which converts a circularly polarized beam 7404 into an OAM beam 7406. A q-plate is essentially a liquid crystal slab with a uniform birefringent phase retardation of π and a spatially varying transverse optical axis 7408 pattern. Along the path circling once around the center of the plate, the optical axis of the distributed crystal elements may have a number of rotations defined by the value of q. A circularly polarized beam 7404 passing through this plate 7402 would experience a helical phase change of exp (iℓθ) with ℓ =2q, as shown in FIG. 74.

Note that almost all the mode conversion approaches can also be used to detect an OAM beam. For example, an OAM beam can be converted back to a Gaussian-like non-OAM beam if the helical phase front is removed, e.g., by passing the OAM beam through a conjugate SPP or phase hologram.

Intra-Cavity Approaches

Figure 75:
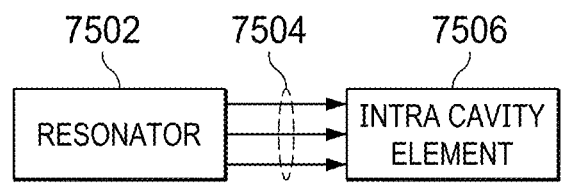
FIG. 75 illustrates the use of a laser resonator cavity for producing an OAM beam.

Referring now to FIG. 75, OAM beams are essentially higher order modes and can be directly generated from a laser resonator cavity. The resonator 7502 supporting higher order modes usually produce the mixture of multiple modes 7504, including the fundamental mode. In order to avoid the resonance of fundamental Gaussian mode, a typical approach is to place an intra-cavity element 7506 (spiral phase plate, tiled mirror) to force the oscillator to resonate on a specific OAM mode. Other reported demonstrations include the use of an annular shaped beam as laser pump, the use of thermal lensing, or by using a defect spot on one of the resonator mirrors.

OAM Beams Multiplexing and Demultiplexing

One of the benefits of OAM is that multiple coaxially propagating OAM beams with different t states provide additional data carriers as they can be separated based only on the twisting wavefront. Hence, one of the critical techniques is the efficient multiplexing/demultiplexing of OAM beams of different ℓ states, where each carries an independent data channel and all beams can be transmitted and received using a single aperture pair. Several multiplexing and demultiplexing techniques have been demonstrated, including the use of an inverse helical phase hologram to down-convert the OAM into a Gaussian beam, a mode sorter, free-space interferometers, a photonic integrated circuit, and q-plates. Some of these techniques are briefly described below.

Beam Splitter and Inverse Phase Hologram

Figure 76:
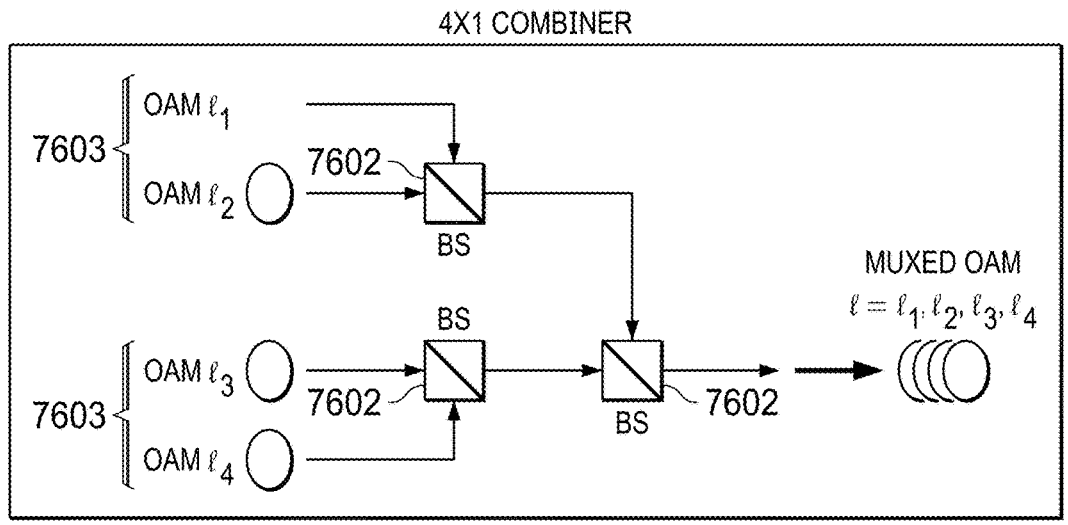
FIG. 76 illustrates spatial multiplexing using cascaded beam splitters.
Figure 77:
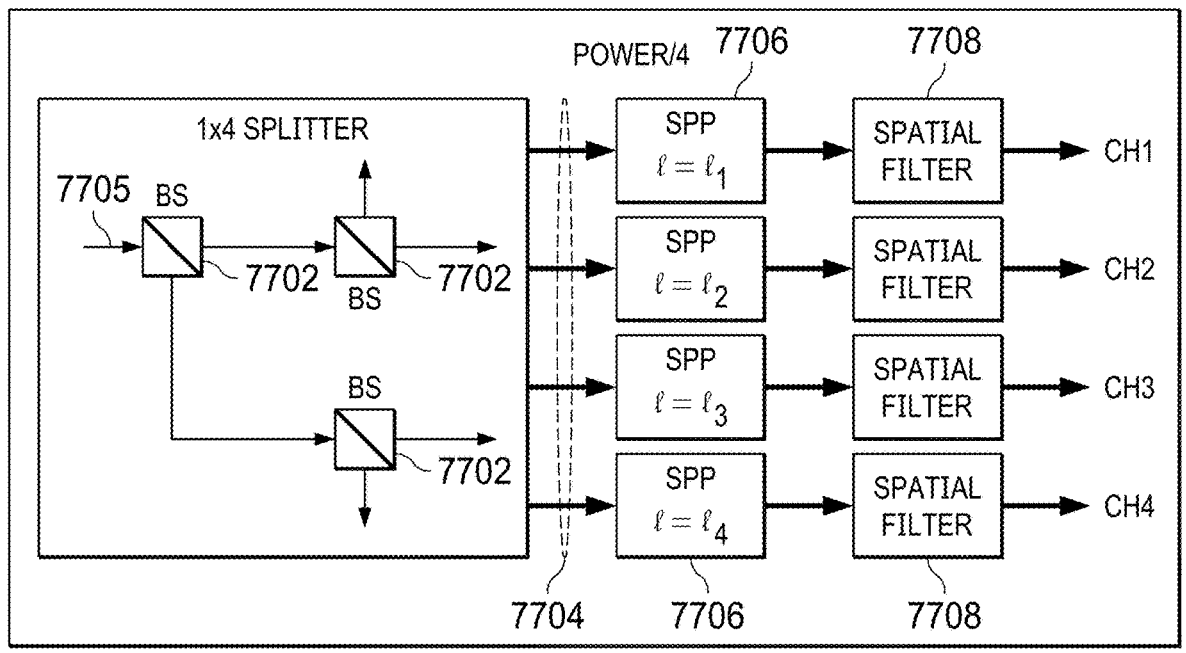
FIG. 77 illustrated de-multiplexing using cascaded beam splitters and conjugated spiral phase holograms.

A straightforward way of multiplexing is simply to use cascaded 3-dB beam splitters (BS) 7602. Each BS 7602 can coaxially multiplex two beams 7603 that are properly aligned, and cascaded N BSs can multiplex N+1 independent OAM beams at most, as shown in FIG. 76. Similarly, at the receiver end, the multiplexed beam 7605 is divided into four copies 7604 by BS 7602. To demultiplex the data channel on one of the beams (e.g., with l=l_i), a phase hologram 7606 with a spiral charge of [(−1)]_i is applied to all the multiplexed beams 7604. As a result, the helical phase on the target beam is removed, and this beam evolves into a fundamental Gaussian beam, as shown in FIG. 77. The down-converted beam can be isolated from the other beams, which still have helical phase fronts by using a spatial mode filter 7708 (e.g., a single mode fiber only couples the power of the fundamental Gaussian mode due to the mode matching theory). Accordingly, each of the multiplexed beams 7704 can be demultiplexed by changing the spiral phase hologram 7706. Although this method is very power-inefficient since the BSs 7702 and the spatial mode filter 7706 cause a lot of power loss, it was used in the initial lab demonstrations of OAM multiplexing/demultiplexing, due to the simplicity of understanding and the reconfigurability provided by programmable SLMs.

Optical Geometrical Transformation-Based Mode Sorter

Figure 78:
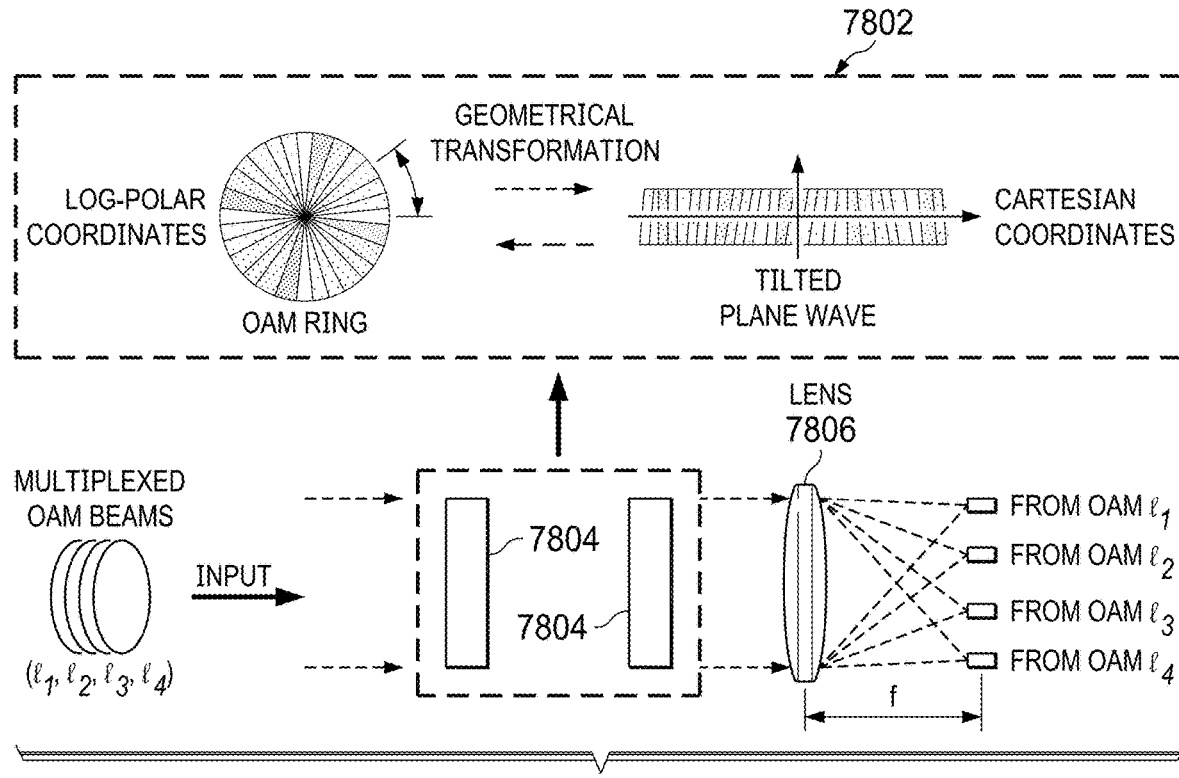
FIG. 78 illustrates a log polar geometrical transformation based on OAM multiplexing and de-multiplexing.

Referring now to FIG. 78, another method of multiplexing and demultiplexing, which could be more power-efficient than the previous one (using beam splitters), is the use of an OAM mode sorter. This mode sorter usually comprises three optical elements, including a transformer 7802, a corrector 7804, and a lens 7806, as shown in FIG. 78. The transformer 7802 performs a geometrical transformation of the input beam from log-polar coordinates to Cartesian coordinates, such that the position (x,y) in the input plane is mapped to a new position (u,v) in the output plane, where $$u = -a\ln\left(\frac{\sqrt{x^2 + y^2}}{b}\right),$$

v=a arctan(y/x). Here, a and b are scaling constants. The corrector 7804 compensates for phase errors and ensures that the transformed beam is collimated. Considering an input OAM beam with a ring-shaped beam profile, it can be unfolded and mapped into a rectangular-shaped plane wave with a tilted phase front. Similarly, multiple OAM beams having different l states will be transformed into a series of plane waves each with a different phase tilt. A lens 7806 focuses these tilted plane waves into spatially separated spots in the focal plane such that all the OAM beams are simultaneously demultiplexed. As the transformation is reciprocal, if the mode sorter is used in reverse it can become a multiplexer for OAM. A Gaussian beam array placed in the focal plane of the lens 7806 is converted into superimposed plane waves with different tilts. These beams then pass through the corrector and the transformer sequentially to produce properly multiplexed OAM beams.

Free Space Communications

The first proof-of-concept experiment using OAM for free space communications transmitted eight different OAM states each representing a data symbol one at a time. The azimuthal index of the transmitted OAM beam is measured at the receiver using a phase hologram modulated with a binary grating. To effectively use this approach, fast switching is required between different OAM states to achieve a high data rate. Alternatively, classic communications using OAM states as data carriers can be multiplexed at the transmitter, co-propagated through a free space link, and demultiplexed at a receiver. The total data rate of a free space communication link has reached 100 Tbit/s or even beyond by using OAM multiplexing. The propagation of OAM beams through a real environment (e.g., across a city) is also under investigation.

Basic Link Demonstrations

Figure 79:
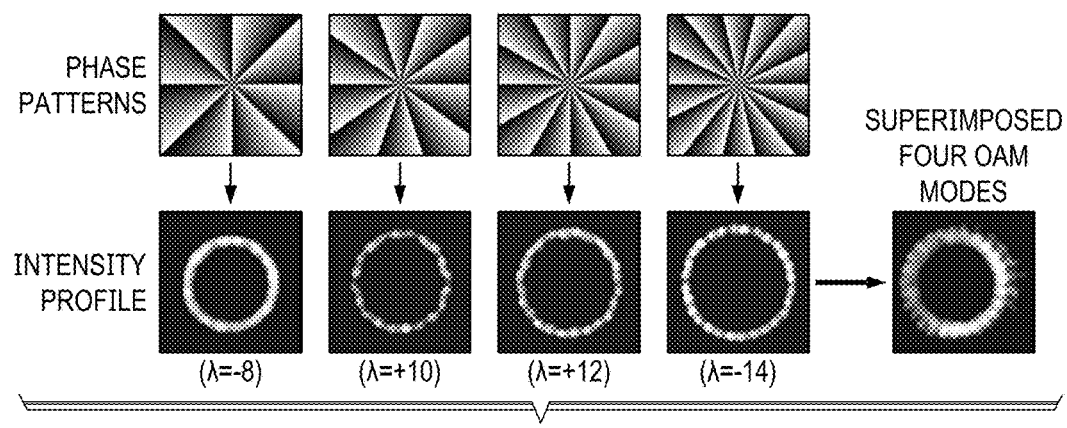
FIG. 79 illustrates an intensity profile of generated OAM beams and their multiplexing.
Figure 80:
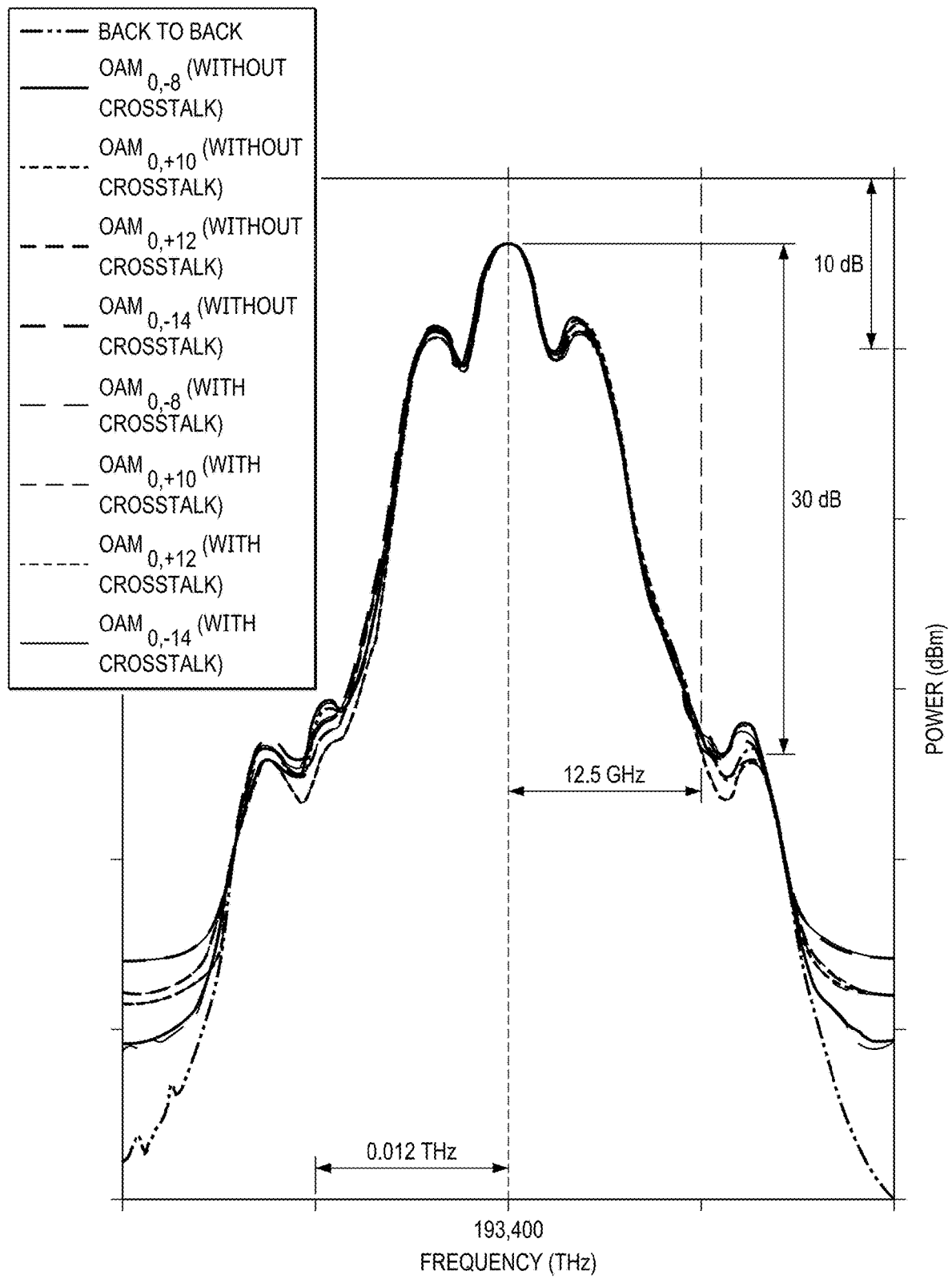
FIG. 80 illustrates the optical spectrum of each channel after each multiplexing for the OAM beams.
Figure 81:
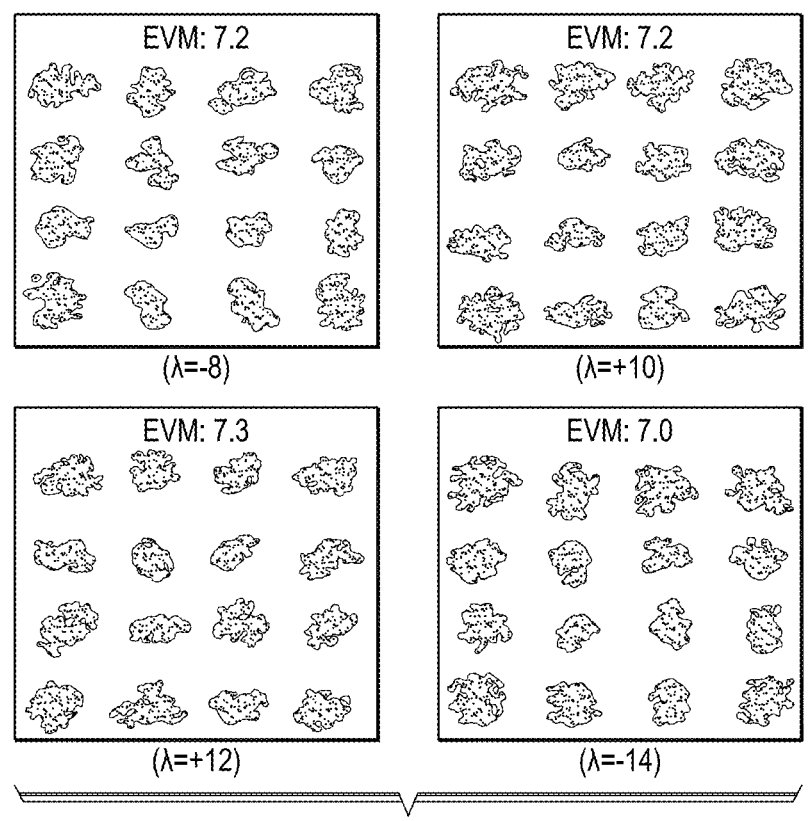
FIG. 81 illustrates the recovered constellations of 16-QAM signals carried on each OAM beam.

Referring now to FIGS. 79-81, initial demonstrates of using OAM multiplexing for optical communications include free space links using a Gaussian beam and an OAM beam encoded with OOK data. Four monochromatic Gaussian beams each carrying an independent 50.8 Gbit/s (4×12.7 Gbit/s) 16-QAM signal were prepared from an IQ modulator and free-space collimators. The beams were converted to OAM beams with ℓ =−8, +10, +12 and −14, respectively, using 4 SLMs each loaded with a helical phase hologram, as shown in FIG. 80. After being coaxially multiplexed using cascaded 3 dB-beam splitters, the beams were propagated through ~1 m distance in free-space under lab conditions. The OAM beams were detected one at a time, using an inverse helical phase hologram and a fiber collimator together with a SMF. The 16-QAM data on each channel was successfully recovered, and a spectral efficiency of 12.8 bit/s/Hz in this data link was achieved, as shown in FIGS. 80 and 81.

A following experiment doubled the spectral efficiency by adding the polarization multiplexing into the OAM-multiplexed free-space data link. Four different OAM beams (ℓ =+4, +8, −8, +16) on each of two orthogonal polarizations (eight channels in total) were used to achieve a Terabit/s transmission link. The eight OAM beams were multiplexed and demultiplexed using the same approach as mentioned above. The measured crosstalk among channels carried by the eight OAM beams is shown in Table 1, with the largest crosstalk being ~−18.5 dB. Each of the beams was encoded with a 42.8 Gbaud 16-QAM signal, allowing a total capacity of ~1.4 (42.8×4×4×2) Tbit/s.

Figure 82:
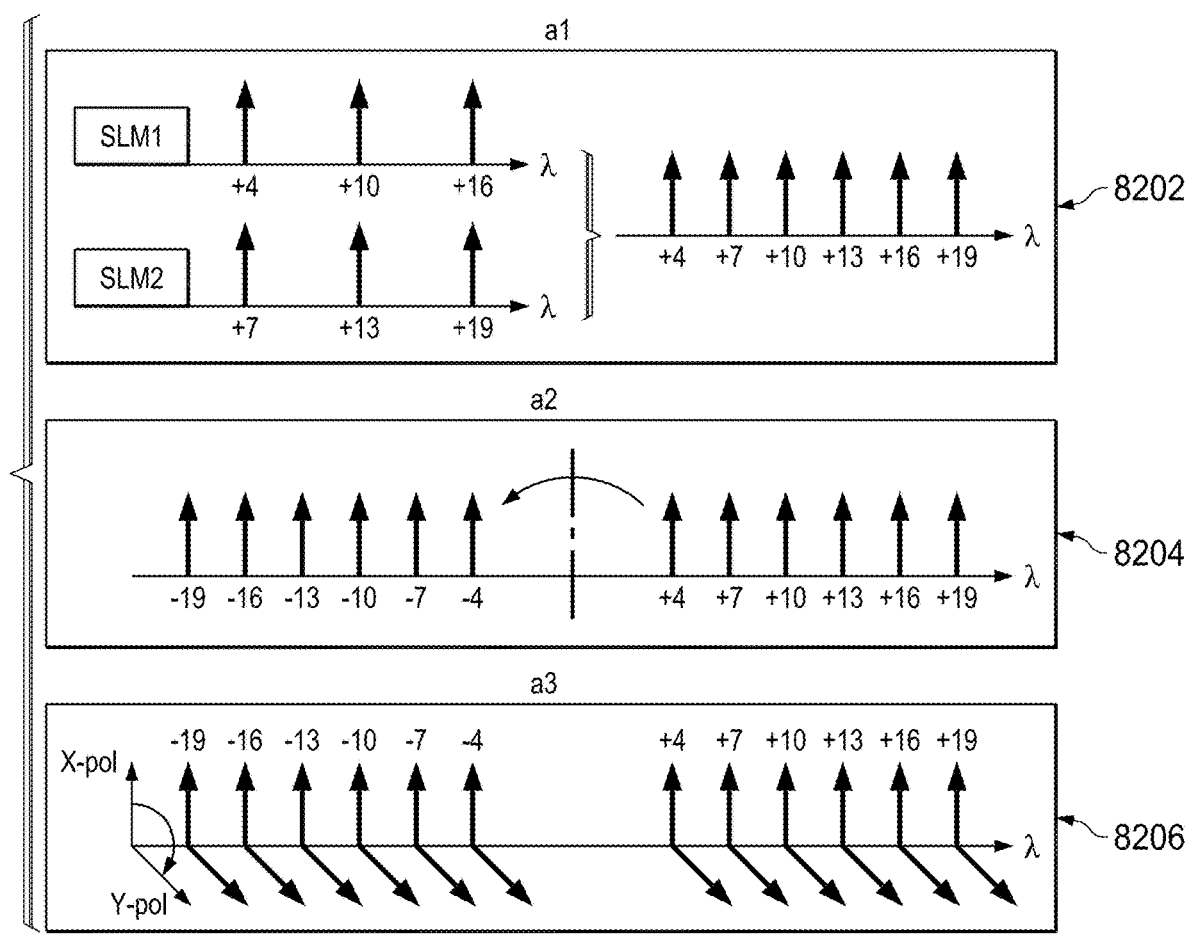
FIG. 82 illustrates the steps to produce 24 multiplex OAM beams.
Figure 83:
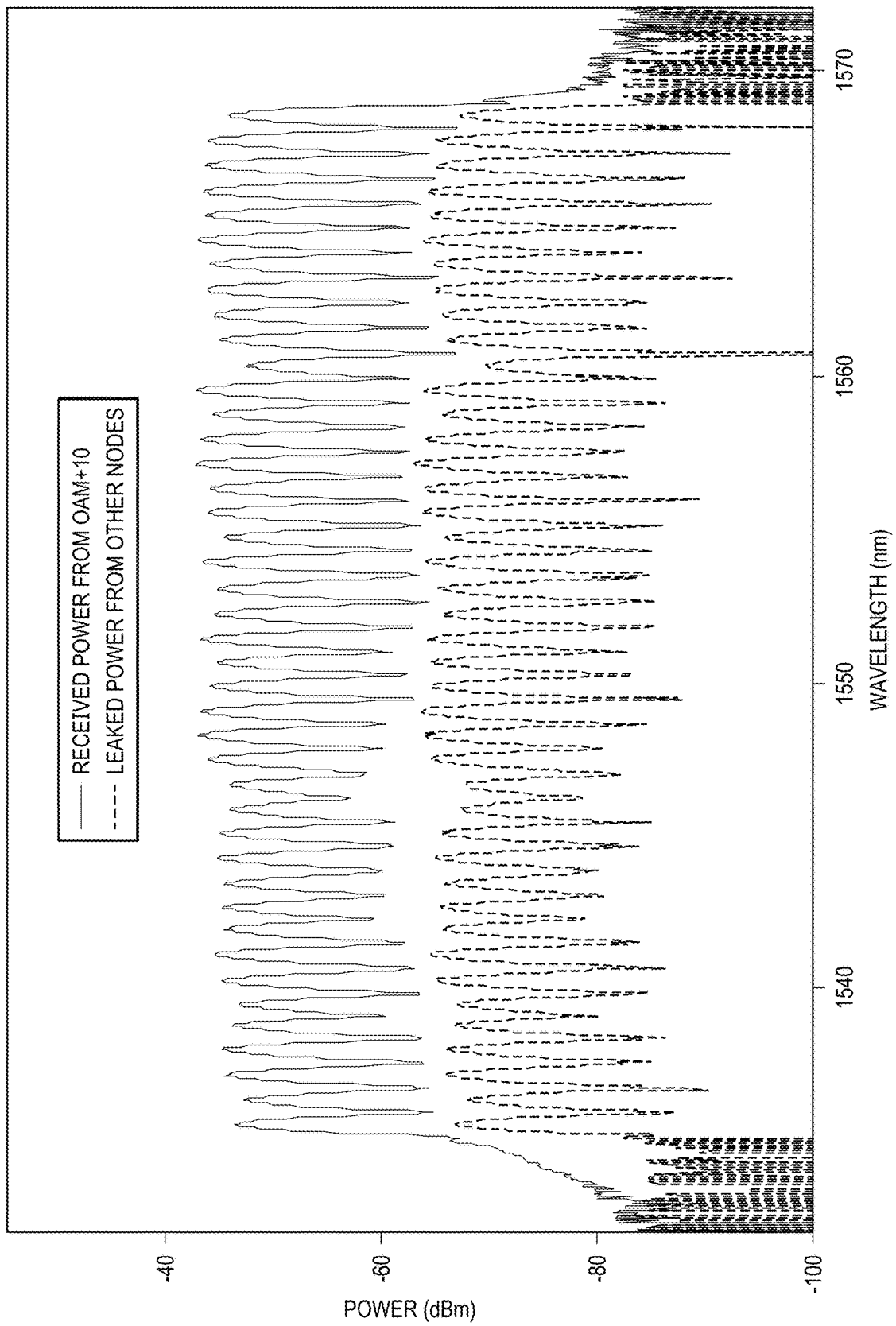
FIG. 83 illustrates the optical spectrum of a WDM signal carrier on an OAM beam.

The capacity of the free-space data link was further increased to 100 Tbit/s by combining OAM multiplexing with PDM (phase division multiplexing) and WDM (wave division multiplexing). In this experiment, 24 OAM beams (ℓ =±4, ±7, ±10, ±13, ±16, and ±19, each with two polarizations) were prepared using 2 SLMs, the procedures for which are shown in FIG. 82 at 8202-8206. Specifically, one SLM generated a superposition of OAM beams with ℓ =+4, +10, and +16, while the other SLM generated another set of three OAM beams with ℓ =+7, +13, and +19. These two outputs were multiplexed together using a beam splitter, thereby multiplexing six OAM beams: ℓ =+4, +7, +10, +13, +16, and +19. Secondly, the six multiplexed OAM beams were split into two copies. One copy was reflected five times by three mirrors and two beam splitters, to create another six OAM beams with inverse charges (FIG. 83). There was a differential delay between the two light paths to de-correlate the data. These two copies were then combined again to achieve 12 multiplexed OAM beams with ℓ =±4, ±7, ±10, ±13, ±16, and ±19 (FIG. 83). These 12 OAM beams were split again via a beam splitter. One of these was polarization-rotated by 90 degrees, delayed by ~33 symbols, and then recombined with the other copy using a polarization beam splitter (PBS), finally multiplexing 24 OAM beams (with ℓ =±4, ±7, ±10, ±13, ±16, and ±19 on two polarizations). Each of the beam carried a WDM signal comprising 100 GHz-spaced 42 wavelengths (1,536.34-1,568.5 nm), each of which was modulated with 100 Gbit/s QPSK data. The observed optical spectrum of the WDM signal carried on one of the demultiplexed OAM beams (ℓ =+10).

Atmospheric Turbulence Effects on OAM Beams

One of the critical challenges for a practical free-space optical communication system using OAM multiplexing is atmospheric turbulence. It is known that inhomogeneities in the temperature and pressure of the atmosphere lead to random variations in the refractive index along the transmission path and can easily distort the phase front of a light beam. This could be particularly important for OAM communications, since the separation of multiplexed OAM beams relies on the helical phase front. As predicted by simulations in the literature, these refractive index inhomogeneities may cause inter-modal crosstalk among data channels with different OAM states.

Figure 84:
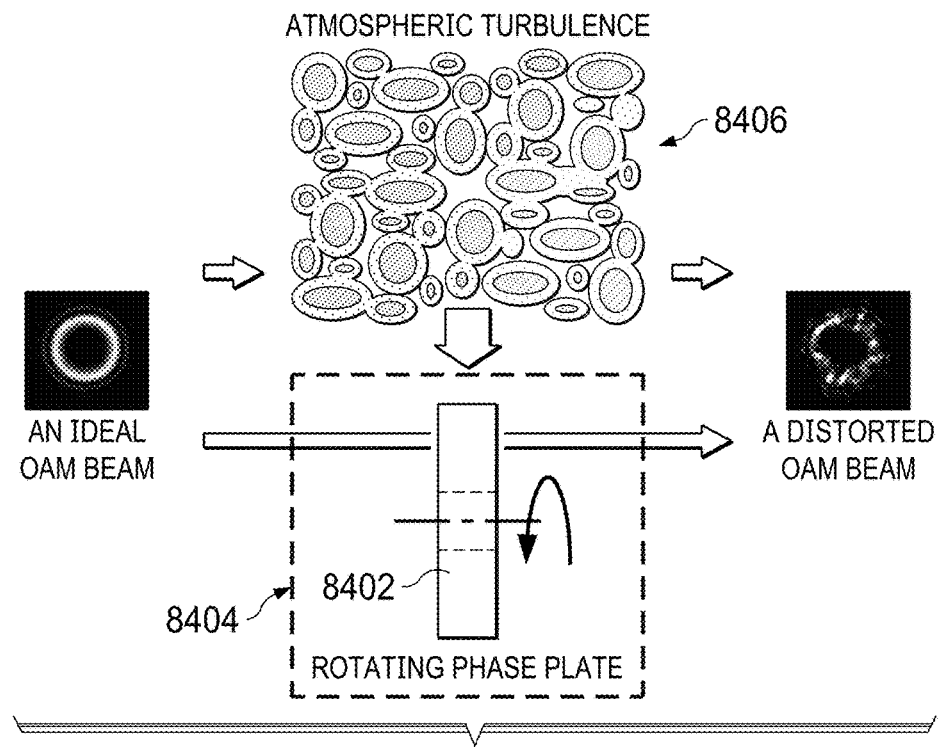
FIG. 84 illustrates a turbulence emulator.
Figure 85:
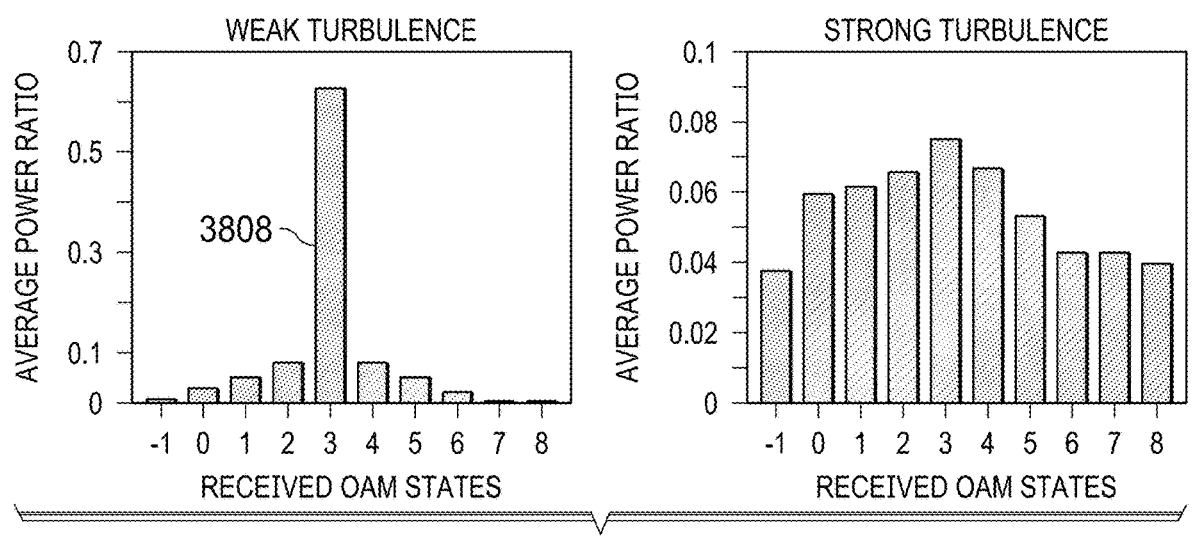
FIG. 85 illustrates the measured power distribution of an OAM beam after passing through turbulence with a different strength.

The effect of atmospheric turbulence is also experimentally evaluated. For the convenience of estimating the turbulence strength, one approach is to emulate the turbulence in the lab using an SLM or a rotating phase plate. FIG. 84 illustrates an emulator built using a thin phase screen plate 8402 that is mounted on a rotation stage 8404 and placed in the middle of the optical path. The pseudo-random phase distribution machined on the plate 8402 obeys Kolmogorov spectrum statistics, which are usually characterized by a specific effective Fried coherence length r0. The strength of the simulated turbulence 8406 can be varied either by changing to a plate 8402 with a different r0, or by adjusting the size of the beam that is incident on the plate. The resultant turbulence effect is mainly evaluated by measuring the power of the distorted beam distributed to each OAM mode using an OAM mode sorter. It was found that, as the turbulence strength increases, the power of the transmitted OAM mode would leak to neighboring modes and tend to be equally distributed among modes for stronger turbulence. As an example, FIG. 85 shows the measured average power (normalized) l=3 beam under different emulated turbulence conditions. It can be seen that the majority of the power is still in the transmitted OAM mode 8408 under weak turbulence, but it spreads to neighboring modes as the turbulence strength increases.

Turbulence Effects Mitigation Techniques

One approach to mitigate the effects of atmospheric turbulence on OAM beams is to use an adaptive optical (AO) system. The general idea of an AO system is to measure the phase front of the distorted beam first, based on which an error correction pattern can be produced and can be applied onto the beam transmitter to undo the distortion.

TABLE 1

| Measured Crosstalk | | OAM$_{+4}$ | | OAM$_{+8}$ | | OAM$_{-8}$ | | OAM$_{+16}$ | |
|---|---|---|---|---|---|---|---|---|---|
| | | X-Pol. | Y-Pol. | X-Pol. | Y-Pol. | X-Pol. | Y-Pol. | X-Pol. | Y-Pol. |
| OAM$_{+4}$ (dB) | X-Pol. | | −23.2 | −26.7 | −30.8 | −30.5 | −27.7 | −24.6 | −30.1 |
| | Y-Pol. | −25.7 | | | | | | | |
| OAM$_{+8}$ (dB) | X-Pol. | −26.6 | −23.5 | | −21.6 | −18.9 | −25.4 | −23.9 | −28.8 |
| | Y-Pol. | | | −25.0 | | | | | |
| OAM$_{-8}$ (dB) | X-Pol. | −27.5 | −33.9 | −27.6 | −30.8 | | −20.5 | −26.5 | −21.6 |
| | Y-Pol. | | | | | −26.8 | | | |
| OAM$_{+16}$ (dB) | X-Pol. | −24.5 | −31.2 | −23.7 | −23.3 | −25.8 | −26.1 | | −30.2 |
| | Y-Pol. | | | | | | | −24.0 | |
| Total from other OAMs * (dB) | | −21.8 | −21.0 | −21.2 | −21.4 | −18.5 | −21.2 | −22.2 | −20.7 |

Figure 86:
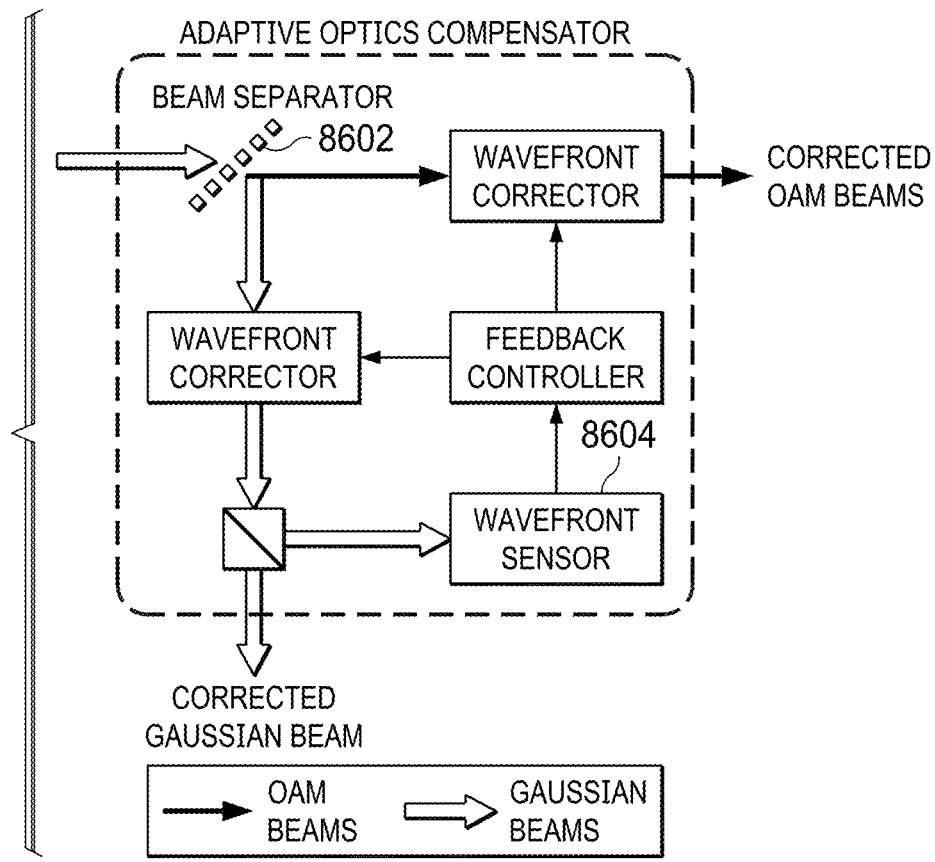
FIG. 86 illustrates how turbulence effects mitigation using adaptive optics.
Figure 87:
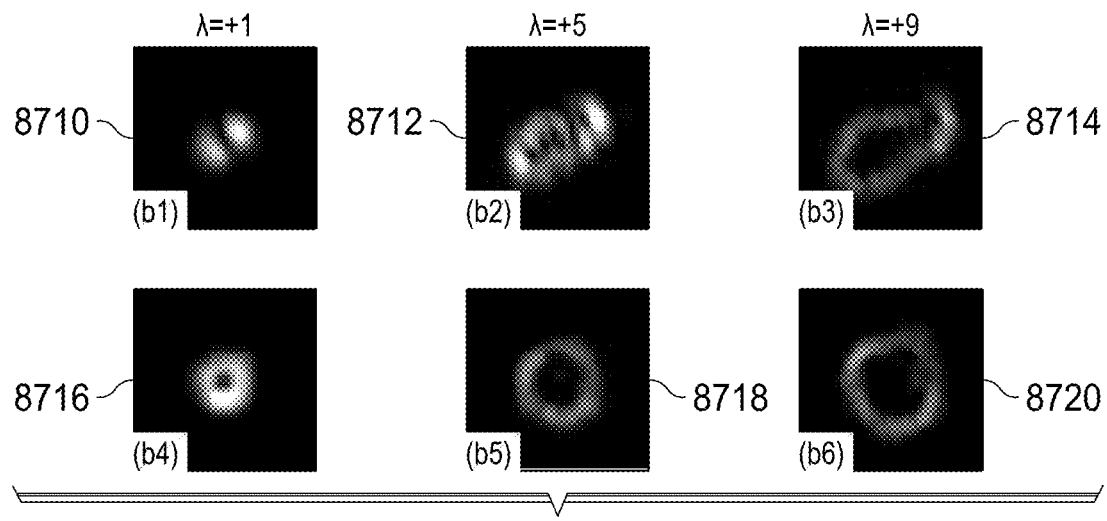
FIG. 87 illustrates experimental results of distortion mitigation using adaptive optics.

As for OAM beams with helical phase fronts, it is challenging to directly measure the phase front using typical wavefront sensors due to the phase singularity. A modified AO system can overcome this problem by sending a Gaussian beam as a probe beam to sense the distortion, as shown in FIG. 86. Due to the fact that turbulence is almost independent of the light polarization, the probe beam is orthogonally polarized as compared to all other beams for the sake of convenient separation at beam separator 8602. The correction phase pattern can be derived based on the probe beam distortion that is directly measured by a wavefront sensor 8604. It is noted that this phase correction pattern can be used to simultaneously compensate multiple coaxially propagating OAM beams. FIG. 87 at 8710-8720 illustrate the intensity profiles of OAM beams with l=1, 5 and 9, respectively, for a random turbulence realization with and without mitigation. From the far-field images, one can see that the distorted OAM beams (upper), up to 1=9, were partially corrected, and the measured power distribution also indicates that the channel crosstalk can be reduced.

Another approach for combating turbulence effects is to partially move the complexity of optical setup into the electrical domain and use digital signal processing (DSP) to mitigate the channel crosstalk. A typical DSP method is the multiple-input-multiple-output (MIMO) equalization, which is able to blindly estimate the channel crosstalk and cancel the interference. The implementation of a 4×4 adaptive MIMO equalizer in a four-channel OAM multiplexed free space optical link using heterodyne detection may be used. Four OAM beams (l=+2, +4, +6 and +8), each carrying 20 Gbit/s QPSK data, were collinearly multiplexed and propagated through a weak turbulence emulated by the rotating phase plate under laboratory condition to introduce distortions. After demultiplexing, four channels were coherently detected and recorded simultaneously. The standard constant modulus algorithm is employed in addition to the standard procedures of coherent detection to equalize the channel interference. Results indicate that MIMO equalization could be helpful to mitigate the crosstalk caused by either turbulence or imperfect mode generation/detection, and improve both error vector magnitude (EVM) and the bit-error-rate (BER) of the signal in an OAM-multiplexed communication link. MIMO DSP may not be universally useful as outage could happen in some scenarios involving free space data links. For example, the majority power of the transmitted OAM beams may be transferred to other OAM states under a strong turbulence without being detected, in which case MIMO would not help to improve the system performance.

OAM Free Space Link Design Considerations

Figure 88:
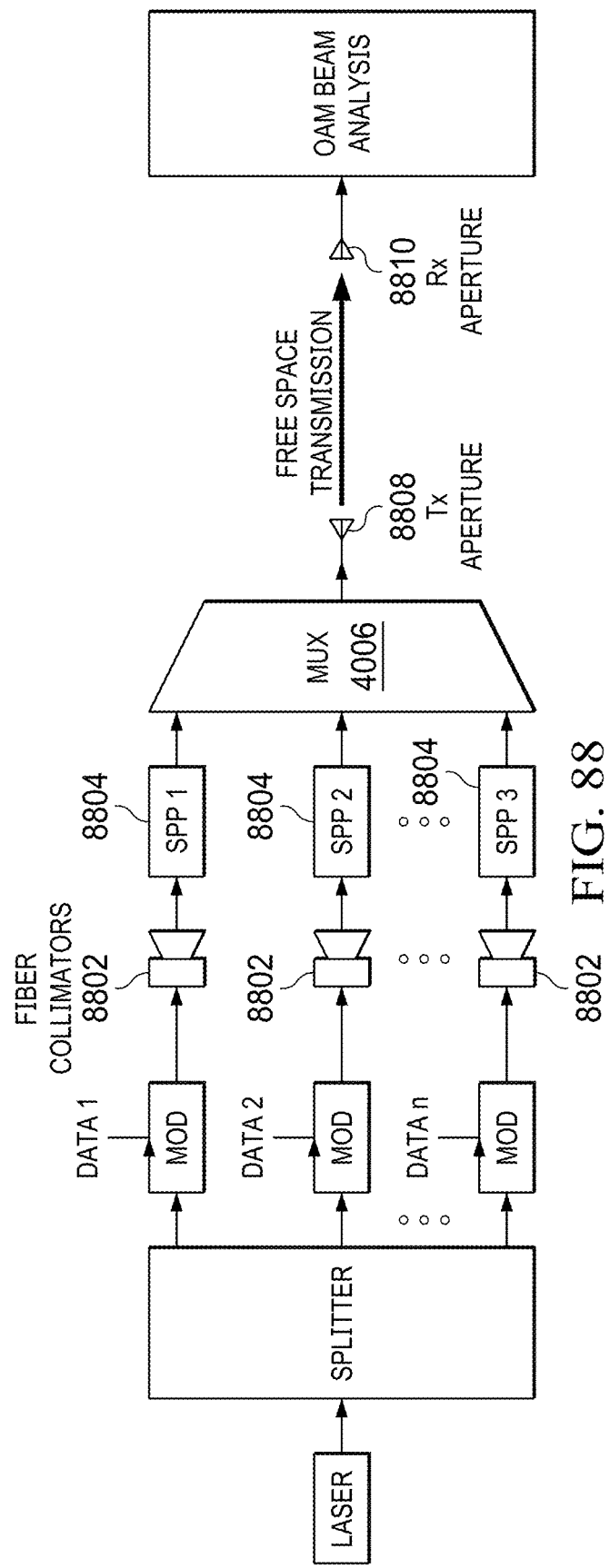
FIG. 88 illustrates a free-space optical data link using OAM.

To date, most of the experimental demonstrations of optical communication links using OAM beams took place in the lab conditions. There is a possibility that OAM beams may also be used in a free space optical communication link with longer distances. To design such a data link using OAM multiplexing, several important issues such as beam divergence, aperture size and misalignment of two transmitter and receiver, need to be resolved. To study how those parameters affect the performance of an OAM multiplexed system, a simulation model was described by Xie et al, the schematic setup of which is shown in FIG. 88. Each of the different collimated Gaussian beams 8802 at the same wavelength is followed by a spiral phase plate 8804 with a unique order to convert the Gaussian beam into a data-carrying OAM beam. Different orders of OAM beams are then multiplexed at multiplexor 8806 to form a concentric-ring-shape and coaxially propagate from transmitter 8808 through free space to the receiver aperture located at a certain propagation distance. Propagation of multiplexed OAM beams is numerically propagated using the Kirchhoff-Fresnel diffraction integral. To investigate the signal power and crosstalk effect on neighboring OAM channels, power distribution among different OAM modes is analyzed through a modal decomposition approach, which corresponds to the case where the received OAM beams are demultiplexed without power loss and the power of a desired OAM channel is completely collected by its receiver 8810.

Beam Divergence

Figure 89:
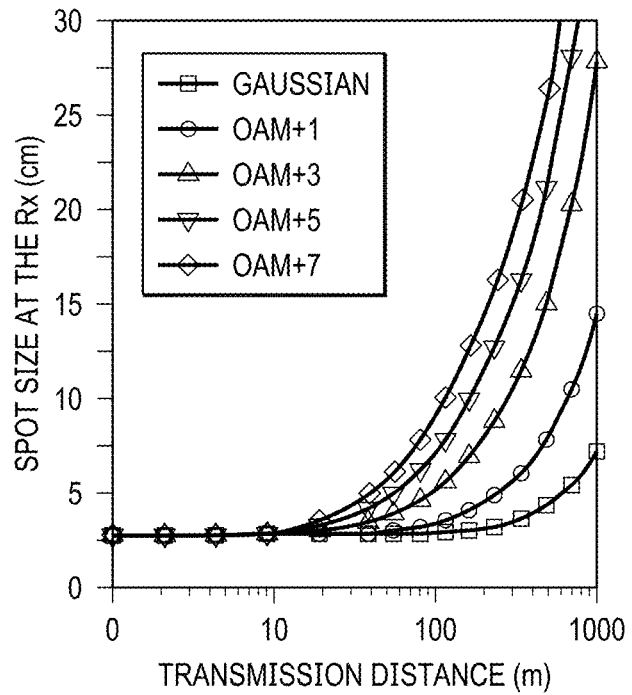
FIG. 89 illustrates simulated spot sized of different orders of OAM beams as a function of transmission distance for a 3 cm transmitted beam.
Figure 90:
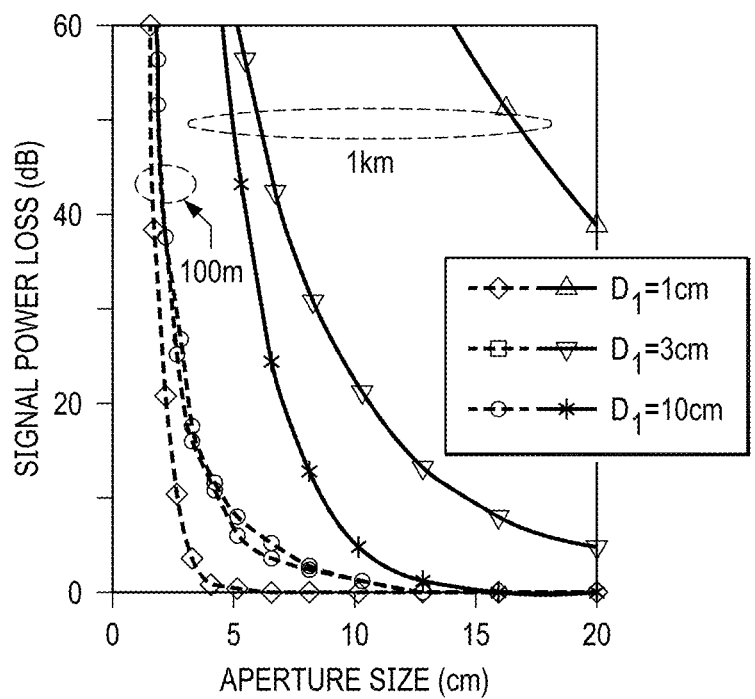
FIG. 90 illustrates simulated power loss as a function of aperture size.

For a communication link, it is generally preferable to collect as much signal power as possible at the receiver to ensure a reasonable signal-to-noise ratio (SNR). Based on the diffraction theory, it is known that a collimated OAM beam diverges while propagating in free space. Given the same spot size of three cm at the transmitter, an OAM beam with a higher azimuthal index diverges even faster, as shown in FIG. 89. On the other hand, the receiving optical element usually has a limited aperture size and may not be able to collect all of the beam power. The calculated link power loss as a function of receiver aperture size is shown in FIG. 90, with different transmission distances and various transmitted beam sizes. Unsurprisingly, the power loss of a 1-km link is higher than that of a 100-m link under the same transmitted beam size due to larger beam divergence. It is interesting to note that a system with a transmitted beam size of 3 cm suffers less power loss than that of 1 cm and 10 cm over a 100-m link. The 1-cm transmitted beam diverges faster than the 3 cm beam due to its larger diffraction. However, when the transmitted beam size is 10 cm, the geometrical characteristics of the beam dominate over the diffraction, thus leading larger spot size at the receiver than the 3 cm transmitted beam. A trade-off between the diffraction, geometrical characteristics and the number of OAMs of the beam therefore needs to be carefully considered in order to achieve a proper size received beam when designing a link.

Misalignment Tolerance

Figure 91:
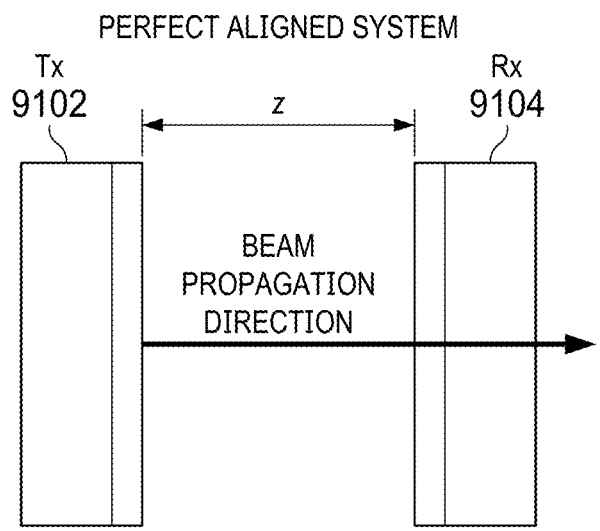
FIG. 91 illustrates a perfectly aligned system between a transmitter and receiver.
Figure 92:
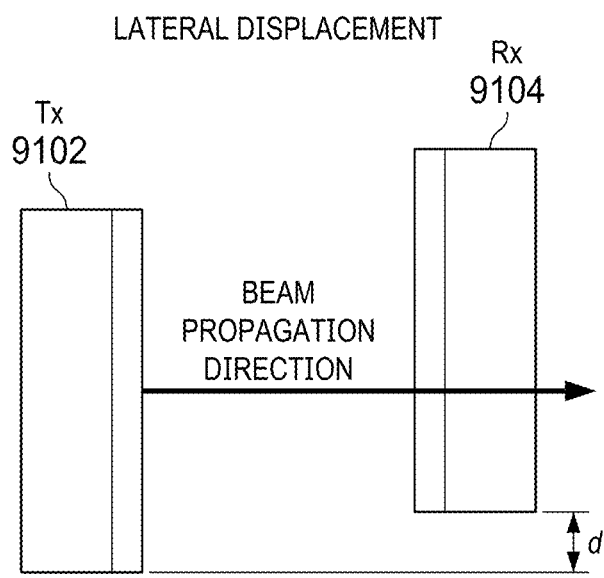
FIG. 92 illustrates a system with lateral displacement of alignment between a transmitter and receiver.
Figure 93:
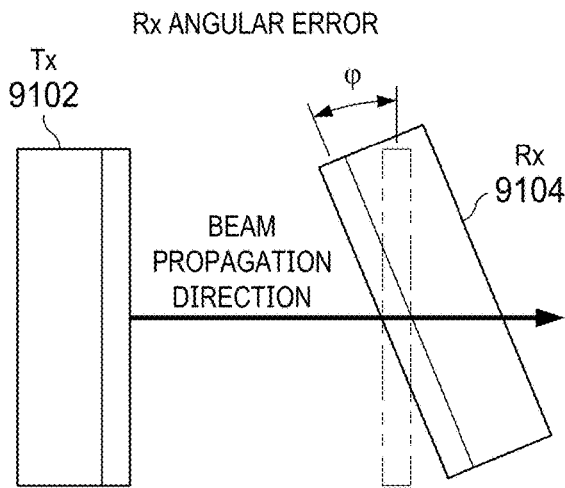
FIG. 93 illustrates a system with receiver angular error for alignment between a transmitter and receiver.

Referring now to FIGS. 91-93, besides the power loss due to limited-size aperture and beam divergence, another issue that needs further discussion is the potential misalignment between the transmitter and the receiver. In an ideal OAM multiplexed communication link, transmitter and receiver would be perfectly aligned, (i.e., the center of the receiver would overlap with the center of the transmitted beam 9102, and the receiver plane 9104 would be perpendicular to the line connecting their centers, as shown in FIG. 91). However, due to difficulties in aligning because of substrate distances, and jitter and vibration of the transmitter/receiver platform, the transmitter and receiver may have relative lateral shift (i.e., lateral displacement) (FIG. 92) or angular shift (i.e., receiver angular error) (FIG. 93). Both types of misalignment may lead to degradation of system performance.

Figure 94:
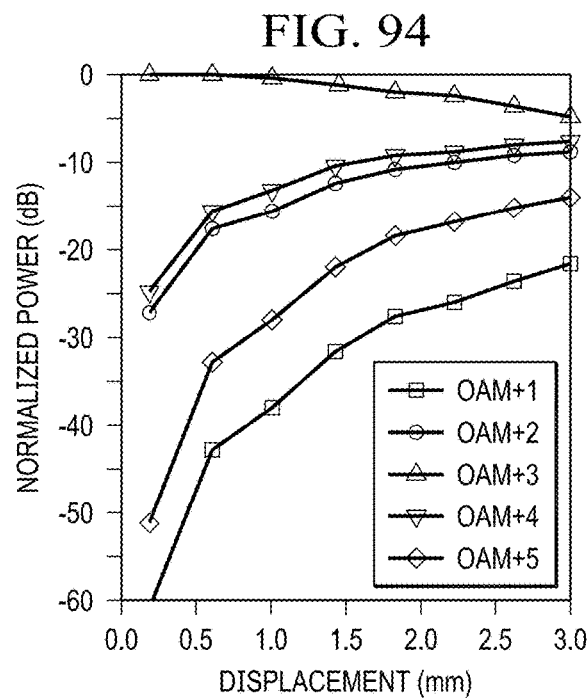
FIG. 94 illustrates simulated power distribution among different OAM modes with a function of lateral displacement.

Focusing on a link distance of 100 m, FIG. 94 show the power distribution among different OAM modes due to lateral displacement and receiver angular error when only $\ell =+3$ is transmitted with a transmitted beam size of 3 cm. In order to investigate the effect of misalignment, the receiver aperture size is chosen to be 10 cm, which could cover the whole OAM beam at the receiver. As the lateral displacement or receiver angular error increases, power leakage to other modes (i.e., channel crosstalk) increases while the power on $\ell =+3$ state decreases. This is because larger lateral displacement or receiver angular causes larger phase profile mismatch between the received OAM beams and receiver. The power leakage to $\ell =+1$ and $\ell =+5$ is greater than that of $\ell =+2$ and $\ell =+3$ due to their larger mode spacing with respect to ℓ =+3. Therefore, a system with larger mode spacing (which also uses higher order OAM states suffers less crosstalk. However, such a system may also have a larger power loss due to the fast divergence of higher order OAM beams, as discussed above. Clearly, this trade-off between channel crosstalk and power loss shall be considered when choosing the mode spacing in a specific OAM multiplexed link.

Figure 95A:
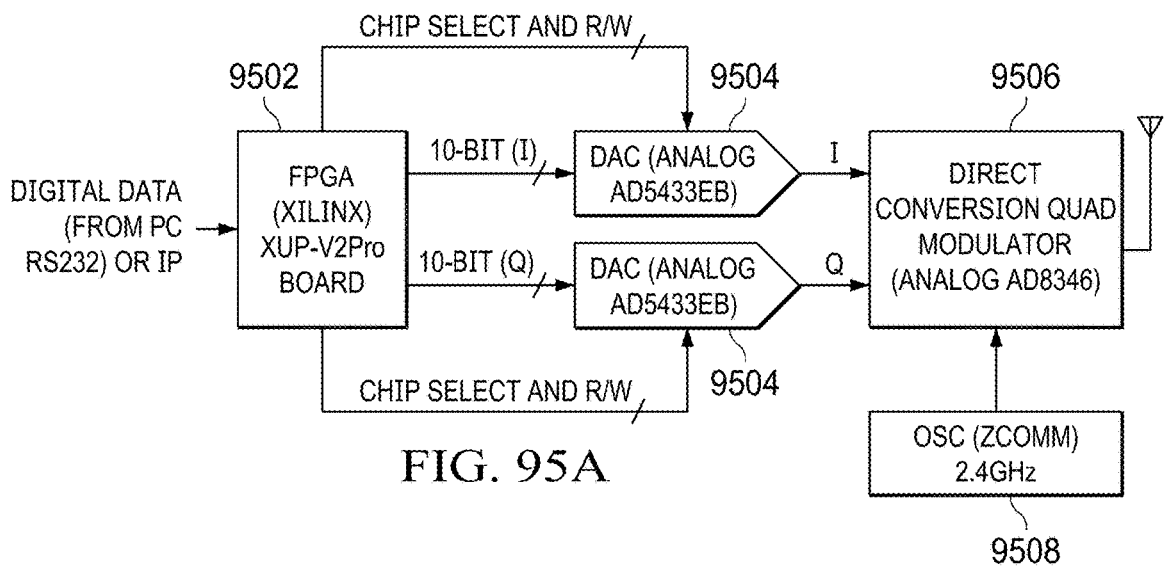
FIG. 95A is a block diagram of a transmitter subsystem for use with multiple level overlay.
Figure 95B:
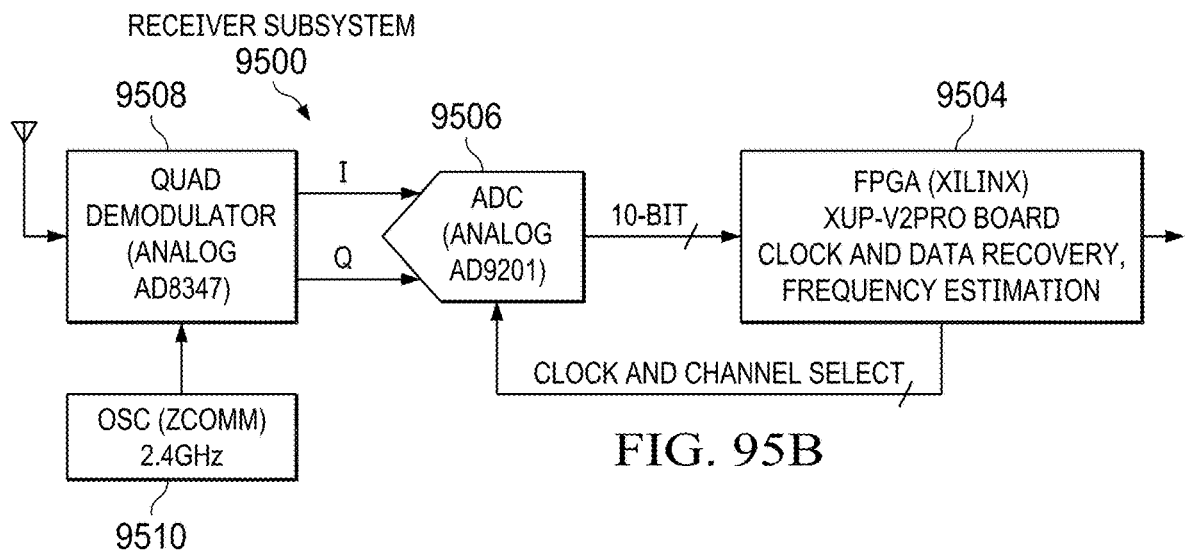
FIG. 95B is a block diagram of a receiver subsystem using multiple level overlay.

Referring now to FIGS. 95A and 95B, there are more particularly illustrated the transmit subsystem (FIG. 95A) and the receiver subsystem (FIG. 95B). The transceiver is realized using basic building blocks available as Commercially Off The Shelf products. Modulation, demodulation and Special Hermite correlation and de-correlation are implemented on a FPGA board. The FPGA board 9502 at the receiver 9500 estimated the frequency error and recovers the data clock (as well as data), which is used to read data from the analog-to-digital (ADC) board 9506. The FGBA board 9500 also segments the digital I and Q channels.

On the transmitter side 9500, the FPGA board 9502 realizes the special hermite correlated QAM signal as well as the necessary control signals to control the digital-to-analog (DAC) boards 9504 to produce analog I&Q baseband channels for the subsequent up conversion within the direct conversion quad modulator 9506. The direct conversion quad modulator 9506 receives an oscillator signal from oscillator 9508.

The ADC 9506 receives the I&Q signals from the quad demodulator 9508 that receives an oscillator signal from 9510. Neither power amplifier in the transmitter nor an LNA in the receiver is used since the communication will take place over a short distance. The frequency band of 2.4-2.5 GHz (ISM band) is selected, but any frequency band of interest may be utilized.

MIMO uses diversity to achieve some incremental spectral efficiency. Each of the signals from the antennas acts as an independent orthogonal channel. With QLO, the gain in spectral efficiency comes from within the symbol and each QLO signal acts as independent channels as they are all orthogonal to one another in any permutation. However, since QLO is implemented at the bottom of the protocol stack (physical layer), any technologies at higher levels of the protocol (i.e. Transport) will work with QLO. Therefore, one can use all the conventional techniques with QLO. This includes RAKE receivers and equalizers to combat fading, cyclical prefix insertion to combat time dispersion and all other techniques using beam forming and MIMO to increase spectral efficiency even further.

When considering spectral efficiency of a practical wireless communication system, due to possibly different practical bandwidth definitions (and also not strictly bandlimited nature of actual transmit signal), the following approach would be more appropriate.

Figure 96:
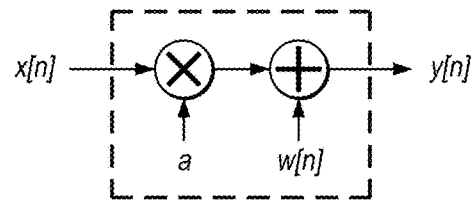
FIG. 96 illustrates an equivalent discreet time orthogonal channel of modified multiple level overlay.

Referring now to FIG. 96, consider the equivalent discrete time system, and obtain the Shannon capacity for that system (will be denoted by Cd). Regarding the discrete time system, for example, for conventional QAM systems in AWGN, the system will be:

$$y[n]=a\,x[n]+w[n]$$

where a is a scalar representing channel gain and amplitude scaling, x[n] is the input signal (QAM symbol) with unit average energy (scaling is embedded in a), y[n] is the demodulator (matched filter) output symbol, and index n is the discrete time index.

The corresponding Shannon capacity is:

$$C_d=\log_2(1+|a|^2/\sigma^2)$$

where σ2 is the noise variance (in complex dimension) and |a|2/σ2 is the SNR of the discrete time system.

Second, compute the bandwidth W based on the adopted bandwidth definition (e.g., bandwidth defined by −40 dBc out of band power). If the symbol duration corresponding to a sample in discrete time (or the time required to transmit $C_d$ bits) is T, then the spectral efficiency can be obtained as:

$$C/W=C_d/(T\,W)\text{ bps/Hz}$$

In discrete time system in AWGN channels, using Turbo or similar codes will give performance quite close to Shannon limit $C_d$. This performance in discrete time domain will be the same regardless of the pulse shape used. For example, using either SRRC (square root raised cosine) pulse or a rectangle pulse gives the same $C_d$ (or $C_d/T$). However, when we consider continuous time practical systems, the bandwidths of SRRC and the rectangle pulse will be different. For a typical practical bandwidth definition, the bandwidth for a SRRC pulse will be smaller than that for the rectangle pulse and hence SRRC will give better spectral efficiency. In other words, in discrete time system in AWGN channels, there is little room for improvement. However, in continuous time practical systems, there can be significant room for improvement in spectral efficiency.

Figure 97:
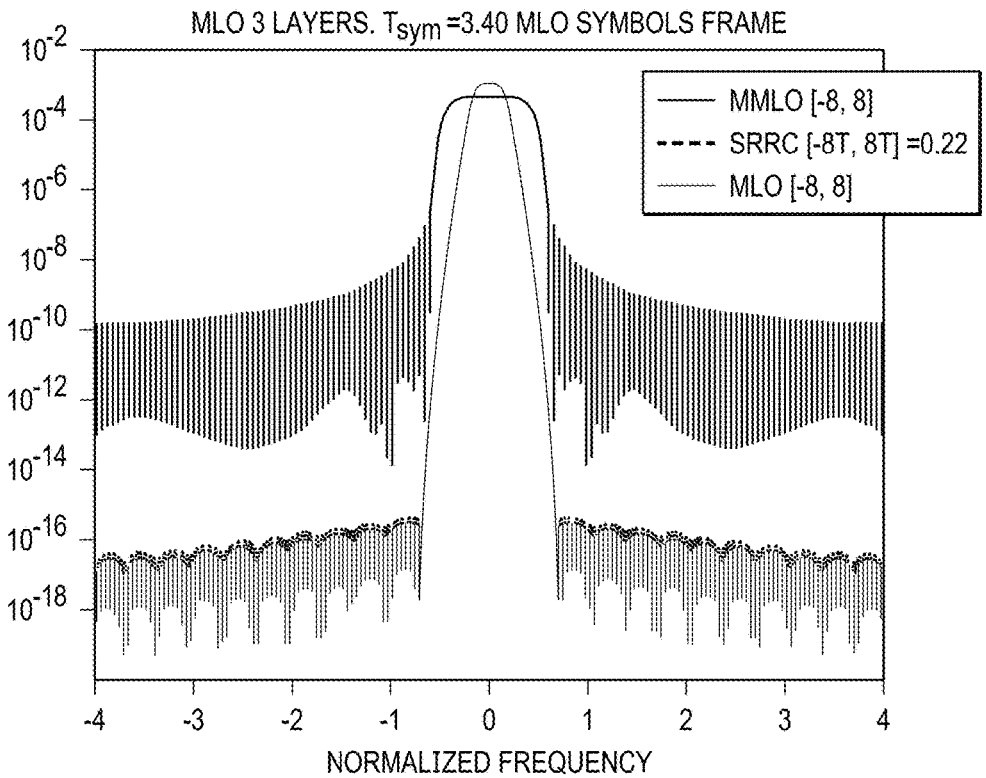
FIG. 97 illustrates the PSDs of multiple layer overlay, modified multiple layer overlay and square root raised cosine.
Figure 98:
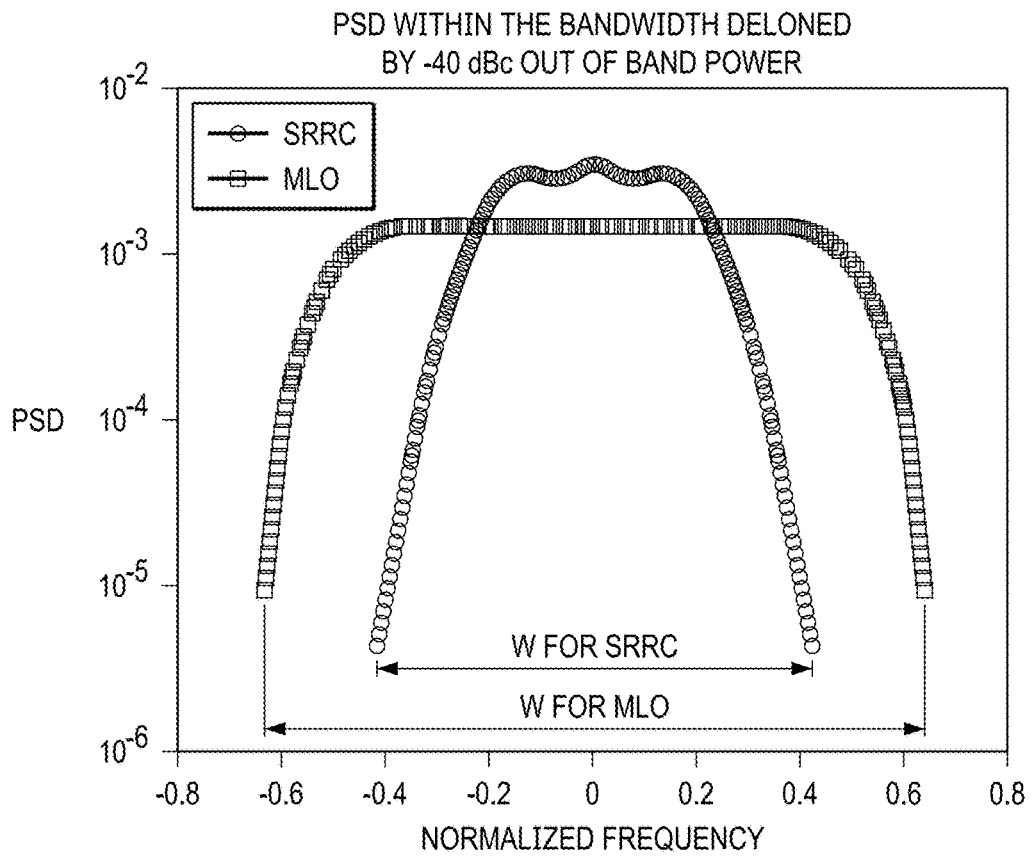
FIG. 98 illustrates a bandwidth comparison based on −40 dBc out of band power bandwidth between multiple layer overlay and square root raised cosine.

Referring now to FIG. 97, there is illustrated a PSD plot (BLANK) of MLO, modified MLO (MMLO) and square root raised cosine (SRRC). From the illustration in FIG. 74, demonstrates the better localization property of MLO. An advantage of MLO is the bandwidth. FIG. 74 also illustrates the interferences to adjacent channels will be much smaller for MLO. This will provide additional advantages in managing, allocating or packaging spectral resources of several channels and systems, and further improvement in overall spectral efficiency. If the bandwidth is defined by the −40 dBc out of band power, the within-bandwidth PSDs of MLO and SRRC are illustrated in FIG. 98. The ratio of the bandwidths is about 1.536. Thus, there is significant room for improvement in spectral efficiency.

Figure 99:
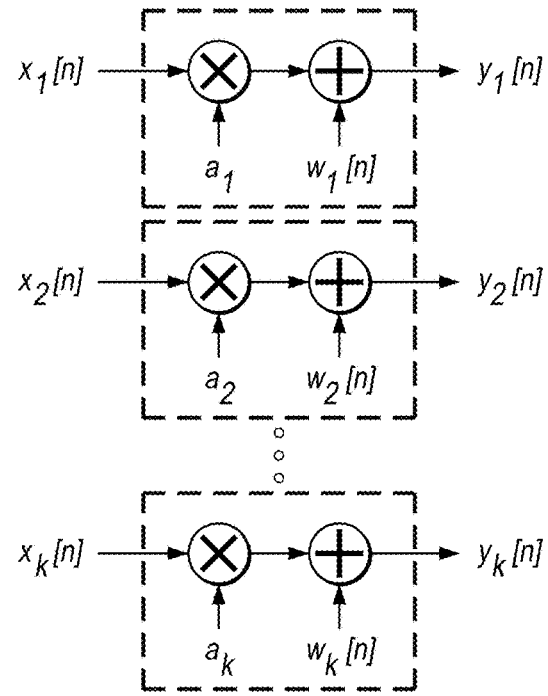
FIG. 99 illustrates equivalent discrete time parallel orthogonal channels of modified multiple layer overlay.

Modified MLO systems are based on block-processing wherein each block contains N MLO symbols and each MLO symbol has L layers. MMLO can be converted into parallel (virtual) orthogonal channels with different channel SNRs as illustrated in FIG. 99. The outputs provide equivalent discrete time parallel orthogonal channels of MMLO.

Figure 100:
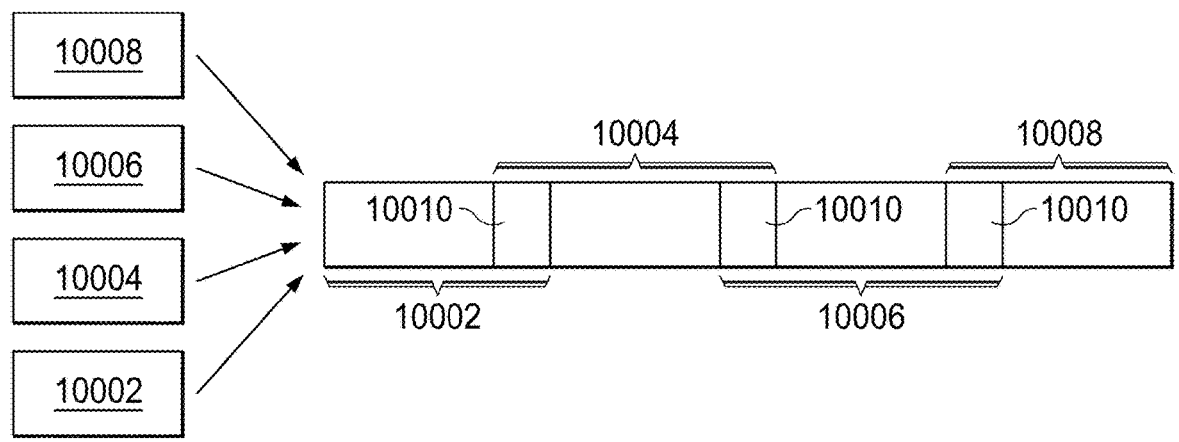
FIG. 100 illustrates four MLO symbols that are included in a single block.

Referring now to FIG. 100, there are illustrated four MLO symbols that are included in a single block 10000. The four symbols 10002-10008 are combined together into the single block 10000. The adjacent symbols 10002-10008 each have an overlapping region 10010. This overlapping region 10010 causes intersymbol interference between the symbols which must be accounted for when processing data streams.

Figure 101:
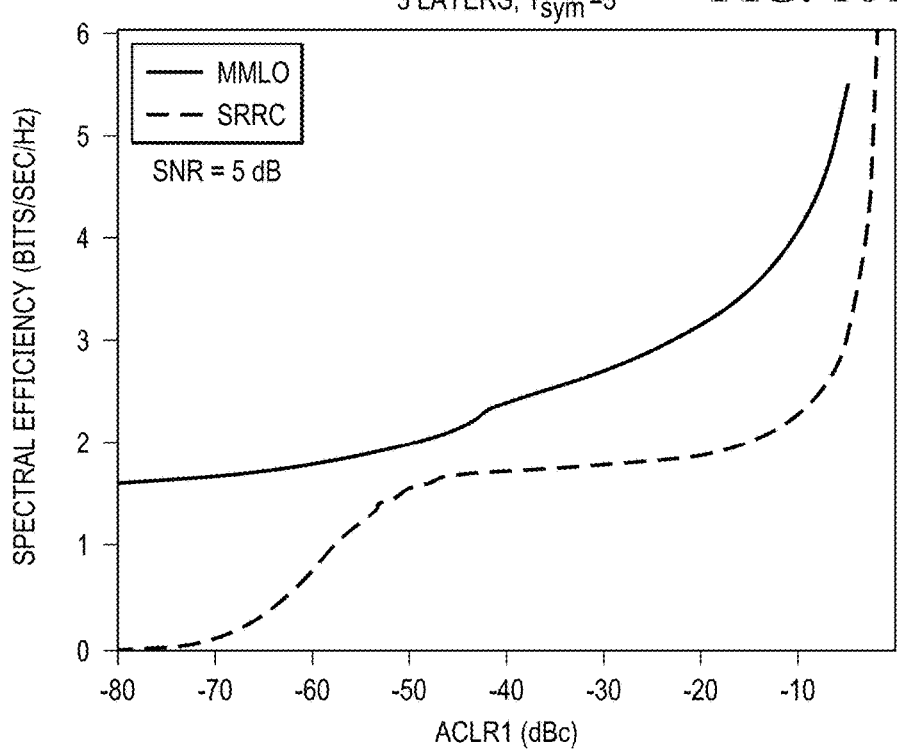
FIG. 101 illustrates a spectral efficiency comparison based on ACLR1 between modified multiple layer overlay and square root raised cosine.

Note that the intersymbol interference caused by pulse overlapping of MLO has been addressed by the parallel orthogonal channel conversion. As an example, the power gain of a parallel orthogonal virtual channel of MMLO with three layers and 40 symbols per block is illustrated in FIG. 101. FIG. 101 illustrates the channel power gain of the parallel orthogonal channels of MMLO with three layers and $T_{sim}$=3. By applying a water filling solution, an optimal power distribution across the orthogonal channels for a fixed transmit power may be obtained. The transmit power on the $k^{th}$ orthogonal channel is denoted by $P_k$. Then the discrete time capacity of the MMLO can be given by:

$$C_d=\sum_{k=1}^{k}\log_2\left(1+\frac{P_k|a_k|^2}{\sigma_k^2}\right)\text{ bits per block}$$

Note that K depends on the number of MLO layers, the number of MLO symbols per block, and MLO symbol duration.

For MLO pulse duration defined by $[-t_1, t_1]$, and symbol duration $T_{mlo}$, the MMLO block length is:

$$T_{block} = (N-1)T_{mlo} + 2t_1$$

Suppose the bandwidth of MMLO signal based on the adopted bandwidth definition (ACLR, OBP, or other) is $W_{mmlo}$, then the practical spectral efficiency of MMLO is given by:

$$\frac{C_d}{W_{mmlo}T_{block}} = \frac{1}{W_{mmlo}\{(N-1)T_{mlo} + 2t_1\}} \sum_{k=1}^{K} \log_2\left(1 + \frac{P_k|a_k|^2}{\sigma_k^2}\right) \frac{bps}{Hz}$$

Figure 102:
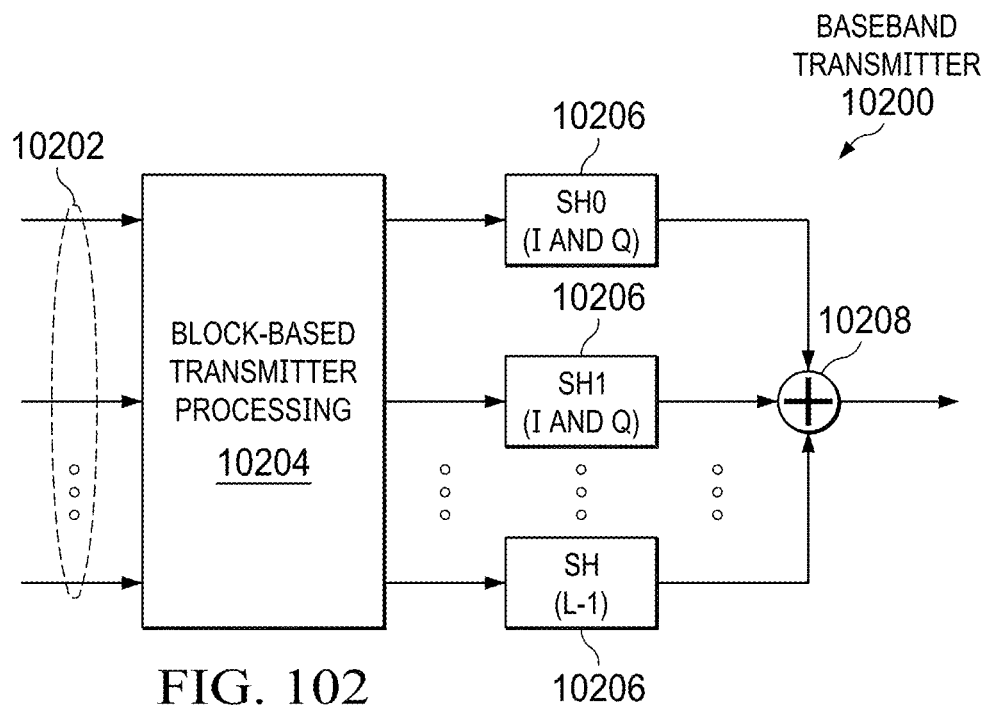
FIG. 102 illustrates a block diagram of a baseband transmitter for a low pass equivalent modified multiple layer overlay system.
Figure 103:
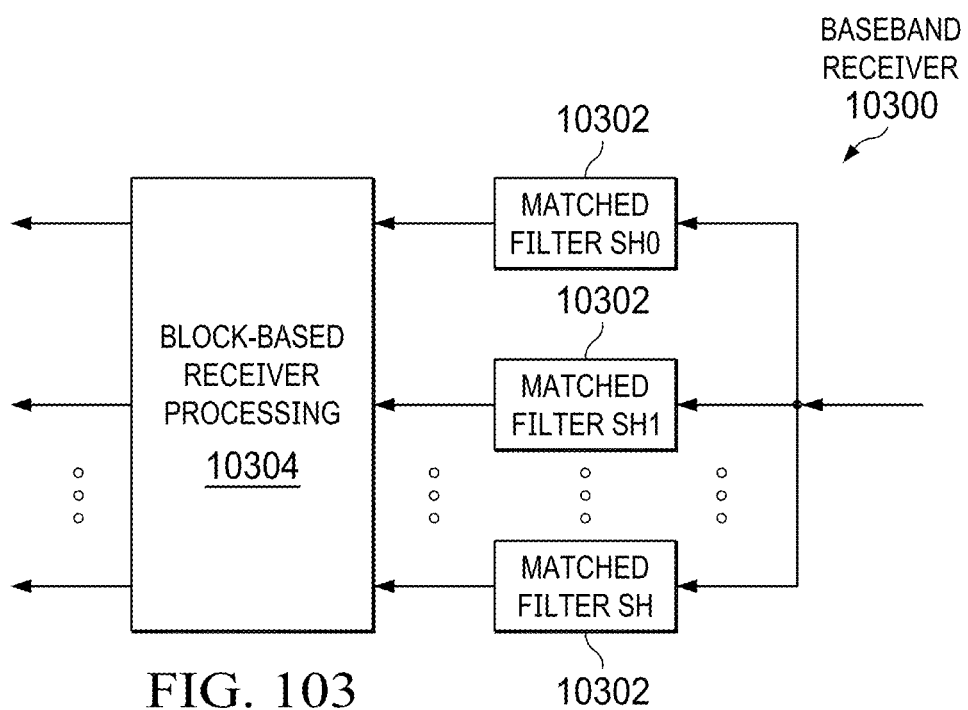
FIG. 103 illustrates a block diagram of a baseband receiver for a low pass equivalent modified multiple layer overlay system.

Referring now to FIGS. 102 and 103, there are provided basic block diagrams of low-pass-equivalent MMLO transmitters (FIG. 102) and receivers (FIG. 103). The low-pass-equivalent MMLO transmitter 10200 receives a number of input signals 10202 at a block-based transmitter processing 10204. The transmitter processing outputs signals to the SH(L-1) blocks 10206 which produce the I&Q outputs. These signals are then all combined together at a combining circuit 10208 for transmission.

Within the baseband receiver (FIG. 103) 10300, the received signal is separated and applied to a series of match filters 10302. The outputs of the match filters are then provided to the block-based receiver processing block 10304 to generate the various output streams.

Consider a block of N MLO-symbols with each MLO symbol carrying L symbols from L layers. Then there are NL symbols in a block. Define c(m, n)=symbol transmitted by the m-th MLO layer at the n-th MLO symbol. Write all NL symbols of a block as a column vector as follows: c=[c(0,0), c(1,0), . . . , c(L-1, 0), c(0,1), c(1,1), . . . , c(L-1, 1), . . . , c(L-1, N-1)]T. Then the outputs of the receiver matched filters for that transmitted block in an AWGN channel, defined by the column vector y of length NL, can be given as y=H c+n, where H is an NL X NL matrix representing the equivalent MLO channel, and n is a correlated Gaussian noise vector.

By applying SVD to H, we have H=U D VH where D is a diagonal matrix containing singular values. Transmitter side processing using V and the receiver side processing UH, provides an equivalent system with NL parallel orthogonal channels, (i.e., y=H Vc+n and UH y=Dc+UH n). These parallel channel gains are given by diagonal elements of D. The channel SNR of these parallel channels can be computed. Note that by the transmit and receive block-based processing, we obtain parallel orthogonal channels and hence the ISI issue has be resolved.

Since the channel SNRs of these parallel channels are not the same, we can apply the optimal Water filling solution to compute the transmit power on each channel given a fixed total transmit power. Using this transmit power and corresponding channel SNR, we can compute capacity of the equivalent system as given in the previous report.

Issues of Fading, Multipath, and Multi-Cell Interference

Techniques used to counteract channel fading (e.g., diversity techniques) in conventional systems can also be applied in MMLO. For slowly varying multi-path dispersive channels, if the channel impulse response can be fed back, it can be incorporated into the equivalent system mentioned above, by which the channel induced ISI and the intentionally introduced MMLO ISI can be addressed jointly. For fast time-varying channels or when channel feedback is impossible, channel equalization needs to be performed at the receiver. A block-based frequency-domain equalization can be applied, and an oversampling would be required.

If we consider the same adjacent channel power leakage for MMLO and the conventional system, then the adjacent cells' interference power would be approximately the same for both systems. If interference cancellation techniques are necessary, they can also be developed for MMLO.

Channel fading can be another source of intersymbol interference (ISI) and interlayer interference (ILI). One manner for representing small-scale signal fading is the use of statistical models. White Gaussian noise may be used to model system noise. The effects of multipath fading may be modeled using Rayleigh or Rician probability density functions. Additive white Gaussian noise (AWGN) may be represented in the following manner. A received signal is:

$$r(t) = s(t) + n(t)$$

where: r(t)=a received signal; s(t)=a transmitted signal; and n(t)=random noise signal Rayleigh fading functions are useful for predicting bit error rate (BER) any multipath environment. When there is no line of sight (LOS) or dominate received signal, the power the transmitted signal may be represented by:

$$P_r(r) = \begin{cases} \frac{r}{\sigma^2} e^{\frac{-r^2}{2\sigma^2}}, & r \geq 0 \\ 0, & r < 0 \end{cases}$$

where:
σ=rms value of received signal before envelope detection,
σ=time average power of the received signal before envelope detection.

Figure 104:
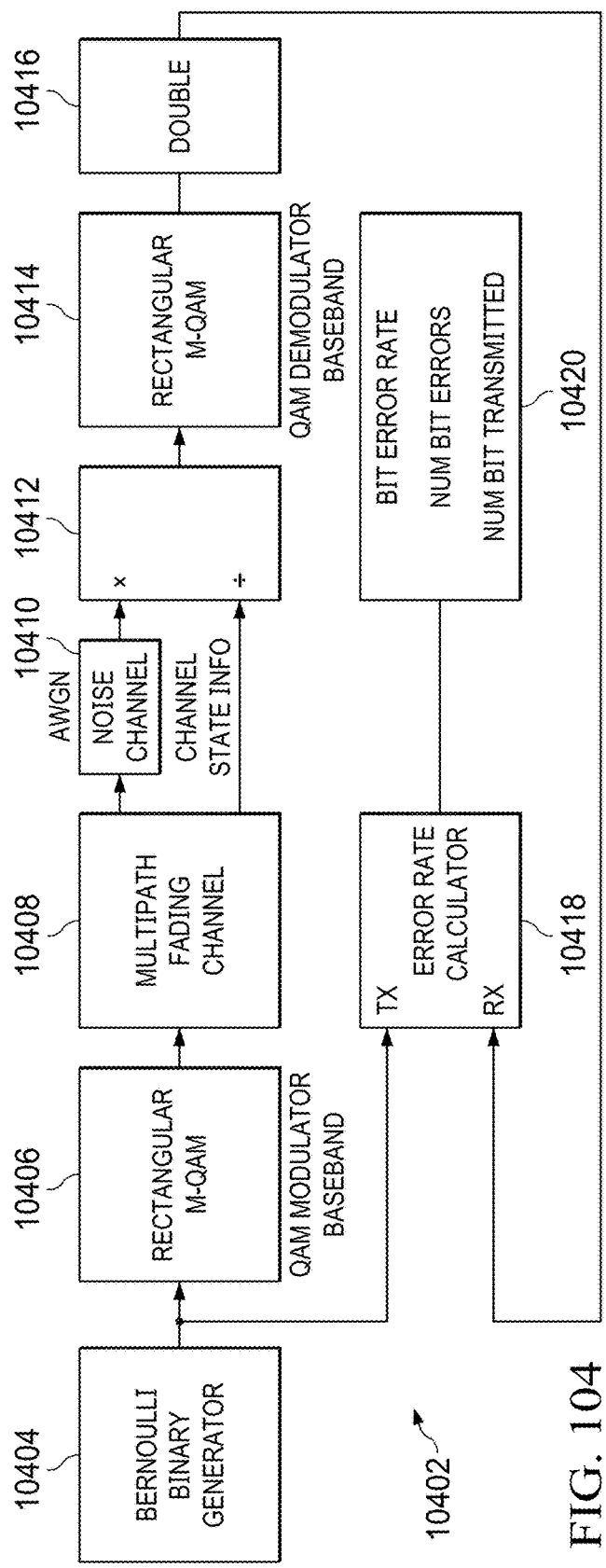
FIG. 104 illustrates a channel simulator.

In a similar manner, Rician functions may be used in situations where there is a line of sight or dominant signal within a transmitted signal. In this case, the power of the transmitted signal can be represented by:

$$P_r(r) \begin{cases} \frac{r}{\sigma^2} e^{\frac{-(r^2 + A^2)}{2\sigma^2}} II_0\left(\frac{A_r}{\sigma^2}\right), & A \geq r \geq 0 \\ 0, & r < 0 \end{cases}$$

where
A=peak amplitude of LOS component
$II_0$=modified Bessel Function of the first kind and zero-order These functions may be implemented in a channel simulation to calculate fading within a particular channel using a channel simulator such as that illustrated in FIG. 104. The channel simulator 10402 includes a Bernoulli binary generator 10404 for generating an input signal that is provided to a rectangular M-QAM modulator 10406 that generates a QAM signal at baseband. Multipath fading channel block 10408 uses the Rician equations to simulate multipath channel fading. The simulated multipath fading channel is provided to a noise channel simulator 10410. The noise channel simulator 10410 simulates AWGN noise. The multipath fading channel simulator 10408 further provides channel state information to arithmetic processing block 10412 which utilizes the simulated multipath fading information and the AWGN information into a signal that is demodulated at QAM demodulator block 10414. The demodulated simulated signal is provided to the doubler block 10416 which is input to a receive input of an error rate calculator 10418. The error rate calculator 10418 further receives at a transmitter input, the simulated transmission signal from the Bernoulli binary generator 10404. The error rate calculator 10418 uses the transmitter input and the received input to provide in error rate calculation to a bit error rate block 10420 that determines the channel bit error rate. This type of channel simulation for determining bit error rate will enable a determination of the amount of QLO that may be applied to a signal in order to increase throughput without overly increasing the bit error rate within the channel.

Scope and System Description

This report presents the symbol error probability (or symbol error rate) performance of MLO signals in additive white Gaussian noise channel with various inter-symbol interference levels. As a reference, the performance of the conventional QAM without ISI is also included. The same QAM size is considered for all layers of MLO and the conventional QAM.

The MLO signals are generated from the Physicist's special Hermite functions:

$$f_n(t, \alpha) = \sqrt{\frac{\alpha}{\sqrt{\pi}\, n! 2^n}}\, H_n(\alpha t) e^{-\frac{\alpha^2 t^2}{2}}$$

where $H_n(\alpha t)$ is the $n^{th}$ order Hermite polynomial. Note that the functions used in the lab setup correspond to $$\alpha = \frac{1}{\sqrt{2}}$$

and, for consistency, $$\alpha = \frac{1}{\sqrt{2}}$$

is used in this report.

MLO signals with 3, 4 or 10 layers corresponding to n=0~2, 0~3, or 0~9 are used and the pulse duration (the range of t) is [−8, 8] in the above function.

AWGN channel with perfect synchronization is considered.

The receiver consists of matched filters and conventional detectors without any interference cancellation, i.e., QAM slicing at the matched filter outputs.

$$\% \text{ pulse-overlapping} = \frac{T_p - T_{sym}}{T_p} \times 100\%$$

where Tp is the pulse duration (16 in the considered setup) and Tsym is the reciprocal of the symbol rate in each MLO layer. The considered cases are listed in the following table.

TABLE 7

| % of Pulse Overlapping | $T_{sym}$ | $T_p$ |
|---|---|---|
| 0% | 16 | 16 |
| 12.5% | 14 | 16 |

TABLE 7-continued

| % of Pulse Overlapping | $T_{sym}$ | $T_p$ |
|---|---|---|
| 18.75% | 13 | 16 |
| 25% | 12 | 16 |
| 37.5% | 10 | 16 |
| 43.75% | 9 | 16 |
| 50% | 8 | 16 |
| 56.25% | 7 | 16 |
| 62.5% | 6 | 16 |
| 75% | 4 | 16 |

Derivation of the Signals Used in Modulation

To do that, it would be convenient to express signal amplitude s(t) in a complex form close to quantum mechanical formalism. Therefore, the complex signal can be represented as:

$$\psi(t) = s(t) + j\sigma(t)$$

where $s(t) \equiv$ real signal $\sigma(t) \equiv$ imaginary signal (quadrature)

$$\sigma(t) = \frac{1}{\pi} \int_{-\infty}^{\infty} s(\tau) \frac{d\tau}{\tau - t}$$

$$s(t) = -\frac{1}{\pi} \int_{-\infty}^{\infty} \sigma(t) \frac{d\tau}{\tau - t}$$

Where s(t) and σ(t) are Hilbert transforms of one another and since σ(t) is quadratures of s(t), they have similar spectral components. That is if they were the amplitudes of sound waves, the ear could not distinguish one form from the other.

Let us also define the Fourier transform pairs as follows:

$$\psi(t) = \frac{1}{\pi} \int_{-\infty}^{\infty} \varphi(f) e^{j\omega t} df$$

$$\varphi(f) = \frac{1}{\pi} \int_{-\infty}^{\infty} \psi(t) e^{-j\omega t} dt$$

$$\psi^*(t)\psi(t) = [s(t)]^2 + [\sigma(t)]^2 + \cdots \equiv \text{signal power}$$

Let's also normalize all moments to $M_0$:

$$M_0 = \int_0^T s(t) dt$$

$$M_0 = \int_0^T \varphi^* \varphi\, df$$

Then the moments are as follows:

$$M_0 = \int_0^T s(t) dt$$

$$M_1 = \int_0^T t s(t) dt$$

$$M_2 = \int_0^T t^2 s(t) dt$$

$$M_{N-1} = \int_0^T t^{N-1} s(t) dt$$

In general, one can consider the signal s(t) be represented by a polynomial of order N, to fit closely to s(t) and use the coefficient of the polynomial as representation of data. This is equivalent to specifying the polynomial in such a way that its first N "moments" $M_j$ shall represent the data. That is, instead of the coefficient of the polynomial, we can use the moments. Another method is to expand the signal s(t) in terms of a set of N orthogonal functions $\varphi_k(t)$, instead of powers of time. Here, we can consider the data to be the coefficients of the orthogonal expansion. One class of such orthogonal functions are sine and cosine functions (like in Fourier series).

Therefore, we can now represent the above moments using the orthogonal function $\psi$ with the following moments:

$$\bar{t} = \frac{\int \psi^*(t) t \psi(t) dt}{\int \psi^*(t) \psi(t) dt} \quad \bar{t}^2 = \frac{\int \psi^*(t) t^2 \psi(t) dt}{\int \psi^*(t) \psi(t) dt}$$

$$\bar{t}^n = \frac{\int \psi^*(t) t^n \psi(t) dt}{\int \psi^*(t) \psi(t) dt}$$

Similarly, $$\bar{f} = \frac{\int \varphi^*(f) f \varphi(f) df}{\int \varphi^*(f) \varphi(f) df} \quad \bar{f}^2 = \frac{\int \varphi^*(f) f^2 \varphi(f) df}{\int \varphi^*(f) \varphi(f) df}$$

$$\bar{f}^n = \frac{\int \varphi^*(f) f^n \varphi(f) df}{\int \varphi^*(f) \varphi(f) df}$$

If we did not use complex signal, then:

$$\bar{f} = 0$$

To represent the mean values from time to frequency domains, replace:

$$\varphi(f) \rightarrow \psi(t)$$

$$f \rightarrow \frac{1}{2\pi j} \frac{d}{dt}$$

These are equivalent to somewhat mysterious rule in quantum mechanics where classical momentum becomes an operator:

$$P_x \rightarrow \frac{h}{2\pi j} \frac{\partial}{\partial x}$$

Therefore, using the above substitutions, we have:

$$\bar{f} = \frac{\int \varphi^*(f) f \varphi(f) df}{\int \varphi^*(f) \varphi(f) df} = \frac{\int \psi^*(t) \left(\frac{1}{2\pi j}\right) \frac{d\psi(t)}{dt} dt}{\int \psi^*(t) \psi(t) dt} = \left(\frac{1}{2\pi j}\right) \frac{\int \psi^* \frac{d\psi}{dt} dt}{\int \psi^* \psi dt}$$

And $$\bar{f}^2 = \frac{\int \varphi^*(f) f^2 \varphi(f) df}{\int \varphi^*(f) \varphi(f) df} = \frac{\int \psi^* \left(\frac{1}{2\pi j}\right)^2 \frac{d^2}{dt^2} \psi dt}{\int \psi^* \psi dt} = -\left(\frac{1}{2\pi}\right)^2 \frac{\int \psi^* \frac{d^2}{dt^2} \psi dt}{\int \psi^* \psi dt}$$

$$\bar{t}^2 = \frac{\int \psi^* t^2 \psi dt}{\int \psi^* \psi dt}$$

We can now define an effective duration and effective bandwidth as:

$$\Delta t = \sqrt{\overline{2\pi(t-\bar{t})^2}} = 2\pi \cdot \text{rms in time}$$

$$\Delta f = \sqrt{\overline{2\pi(f-\bar{f})^2}} = 2\pi \cdot \text{rms in frequency}$$

But we know that:

$$\overline{(t-\bar{t})^2} = \overline{t^2} - (\bar{t})^2$$

$$\overline{(f-\bar{f})^2} = \overline{f^2} - (\bar{f})^2$$

We can simplify if we make the following substitutions:

$$\tau = t - \bar{t}$$

$$\Psi(\tau) = \Psi(t) e^{-j\bar{\omega}\tau}$$

$$\omega_0 = \bar{\omega} = 2\pi \bar{f} = 2\pi f_0$$

We also know that:

$$(\Delta t)^2 (\Delta f)^2 = (\Delta t \Delta f)^2$$

And therefore:

$$(\Delta t \Delta f)^2 = \frac{1}{4} \left[ 4 \frac{\int \Psi^*(\tau) \tau^2 \Psi(\tau) d\tau \int \frac{d\Psi^*}{d\tau} \frac{d\Psi}{d\tau} d\tau}{(\int \Psi^*(\tau) \psi(\tau) d\tau)^2} \right] \geq \left(\frac{1}{4}\right)$$

$$(\Delta t \Delta f) \geq \left(\frac{1}{2}\right)$$

Now instead of $$(\Delta t \Delta f) \geq \left(\frac{1}{2}\right)$$

we are interested to force the equality $$(\Delta t \Delta f) = \left(\frac{1}{2}\right)$$

and see what signals satisfy the equality. Given the fixed bandwidth Δf, the most efficient transmission is one that minimizes the time-bandwidth product $$(\Delta t \Delta f) = \left(\frac{1}{2}\right)$$

For a given bandwidth Δf, the signal that minimizes the transmission in minimum time will be a Gaussian envelope. However, we are often given not the effective bandwidth, but always the total bandwidth $f_2-f_1$. Now, what is the signal shape which can be transmitted through this channel in the shortest effective time and what is the effective duration?

$$\Delta t = \frac{\frac{1}{(2\pi)^2}\int_{f_1}^{f_2}\frac{d\varphi^*}{df}\frac{d\varphi}{df}}{\int_{f_1}^{f_2}\varphi^*\varphi df} \to \min$$

Where $\varphi(f)$ is zero outside the range $f_2-f_1$.

To do the minimization, we would use the calculus of variations (Lagrange's Multiplier technique). Note that the denominator is constant and therefore we only need to minimize the numerator as:

$$\Delta t \to \min \to \delta\int_{f_1}^{f_2}\left(\frac{d\varphi^*}{df}\frac{d\varphi}{df}+\Lambda\varphi^*\varphi\right)df = 0$$

First *Trem*

$$\delta\int_{f_1}^{f_2}\frac{d\varphi^*}{df}\frac{d\varphi}{df}df =$$

$$\int\left(\frac{d\varphi^*}{df}\delta\frac{d\varphi}{df}+\frac{d\varphi}{df}\delta\frac{d\varphi^*}{df}\right)df = \int\left(\frac{d\varphi^*}{df}\frac{d\delta\varphi}{df}+\frac{d\varphi}{df}\frac{d\delta\varphi^*}{df}\right)df =$$

$$\left[\frac{d\varphi^*}{df}\delta\varphi+\frac{d\varphi}{df}\delta\varphi^*\right]_{f_1}^{f_2}-\int\left(\frac{d^2\varphi^*}{df^2}\delta\varphi+\frac{d^2\varphi}{df^2}\delta\varphi^*\right)df =$$

$$\int\left(\frac{d^2\varphi^*}{df^2}\delta\varphi+\frac{d^2\varphi}{df^2}\delta\varphi^*\right)df$$

Second *Trem*

$$\delta\int_{f_1}^{f_2}(\Lambda\varphi^*\varphi)df = \Lambda\int_{f_1}^{f_2}(\varphi^*\delta\varphi+\varphi\delta\varphi^*)df$$

Both *Trems*

$$= \int\left[\left(\frac{d^2\varphi^*}{df^2}+\Lambda\varphi^*\right)\delta\varphi+\left(\frac{d^2\varphi}{df^2}+\Lambda\varphi\right)\delta\varphi^*\right]df = 0$$

This is only possible if and only if:

$$\left(\frac{d^2\varphi}{df^2}+\Lambda\varphi\right) = 0$$

The solution to this is of the form $$\varphi(f) = \sin k\pi\left(\frac{f-f_1}{f_2-f_1}\right)$$

Now if we require that the wave vanishes at infinity, but still satisfy the minimum time-bandwidth product:

$$(\Delta t \Delta f) = \left(\frac{1}{2}\right)$$

Then we have the wave equation of a Harmonic Oscillator:

$$\frac{d^2\Psi(\tau)}{d\tau^2}+(\lambda-\alpha^2\tau^2)\Psi(\tau) = 0$$

which vanishes at infinity only if:

$$\lambda = \alpha(2n+1)$$

$$\psi_n = e^{-\frac{1}{2}\omega^2\tau^2}\frac{d^n}{d\tau^n}e^{-\alpha^2\tau^2}\infty H_n(\tau)$$

Where $H_n(\tau)$ is the Hermit functions and:

$(\Delta t \Delta f) = \frac{1}{2}(2n+1)$

So Hermit functions $H_n(\tau)$ occupy information blocks of 1/2, 3/2, 5/2 ... with 1/2 as the minimum information quanta.

Squeezed States

Here we would derive the complete Eigen functions in the most generalized form using quantum mechanical approach of Dirac algebra. We start by defining the following operators:

$$b = \sqrt{\frac{m\omega'}{2\hbar}}\left(x+\frac{ip}{m\omega'}\right)$$

$$b^+ = \sqrt{\frac{m\omega'}{2\hbar}}\left(x-\frac{ip}{m\omega'}\right)$$

$[b, b^+] = 1$ $a = \lambda b - \mu b^+$ $a^+ = \lambda b^+ - \mu b$

Now we are ready to define Δx and Δp as:

$$(\Delta x)^2 = \frac{\hbar}{2m\omega}\left(\frac{\omega}{\omega'}\right) = \frac{\hbar}{2m\omega}(\lambda-\mu)^2$$

$$(\Delta p)^2 = \frac{\hbar m\omega}{2}\left(\frac{\omega'}{\omega}\right) = \frac{\hbar m\omega}{2}(\lambda+\mu)^2$$

$$(\Delta x)^2(\Delta p)^2 = \frac{\hbar^2}{4}(\lambda^2-\mu^2)^2$$

$$\Delta x \Delta p = \frac{\hbar}{2}(\lambda^2-\mu^2) = \frac{\hbar}{2}$$

Now let parameterize differently and instead of two variables λ and μ, we would use only one variable ξ as follows:

λ=sin *h*ξ

μ=cos *h*ξ

λ+μ=$e^\xi$

λ-μ=$-e^{-\xi}$

Now the Eigen states of the squeezed case are:

$$b|\beta\rangle = \beta|\beta\rangle$$

$$(\lambda a + \mu a^+)|\beta\rangle = \beta|\beta\rangle$$

$$b = UaU^+$$

$$U = e^{\xi/2(a^2 - a^{+2})}$$

$$U^+(\xi)aU(\xi) = a\cosh\xi - a^+\sinh\xi$$

$$U^+(\xi)a^+U(\xi) = a^+\cosh\xi - a\sinh\xi$$

We can now consider the squeezed operator:

$$|\alpha, \xi\rangle = U(\xi)D(\alpha)|0\rangle$$

$$D(\alpha) = e^{\frac{-|\alpha|^2}{2}} e^{\alpha a^+} e^{-\alpha^* a}$$

$$|\alpha\rangle = \sum_{n=0}^{\infty} \frac{\alpha^n}{\sqrt{n!}} e^{\frac{-|\alpha|^2}{2}} |n\rangle$$

$$|\alpha\rangle = e^{\frac{-|\alpha|^2}{2} + \alpha a^+}|0\rangle$$

For a distribution P(n) we would have:

$$P(n) = |\langle n||\beta, \xi\rangle|^2$$

$$\langle \alpha||\beta, \xi\rangle = \sum_{n=0}^{\infty} \frac{\alpha^n}{\sqrt{n!}} e^{\frac{-|\alpha|^2}{2}} \langle n||\beta, \xi\rangle$$

$$e^{2zt-t^2} = \sum_{n=0}^{\infty} \frac{H_n(z)t^n}{n!}$$

Therefore, the final result is:

$$\langle n||\beta, \xi\rangle = \frac{(\tanh\xi)^{n/2}}{2^{n/2}(n!\cosh\xi)^2} e^{-1/2(|\beta|^2 - \beta^2\tanh\xi)} H_n\left(\frac{\beta}{2\sinh\xi\cosh\xi}\right)$$

Figure 105:
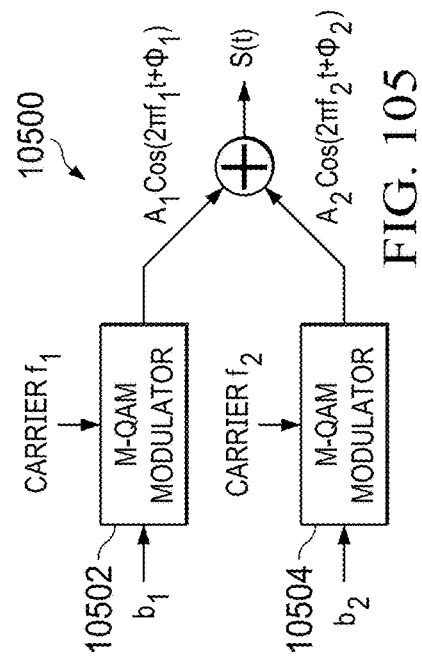
FIG. 105 illustrates the generation of bit streams for a QAM modulator.

Another issue of concern with the use of QLO with QAM is a desire to improve bit error rate (BER) performance without impacting the information rate or bandwidth requirements of the queue a low signal. One manner for improving BER performance utilizes two separate oscillators that are separated by a known frequency $\Delta f$. Signals generated in this fashion will enable a determination of the BER. Referring now to FIG. 105, there is illustrated the generation of two-bit streams b1 and B2 that are provided to a pair of QAM modulators 10502 and 10504 by a transmitter 10500. Modulator 10502 receives a first carrier frequency F1 and modulator 10504 receives a second carrier frequency F2. The frequencies F1 and at two are separated by a known value $\Delta f$. The signals for each modulator are generated and combined at a summing circuit 10506 to provide the output s(t). The variables in the outputs of the QAM modulators are $A_i$ (amplitude), $f_i$ (frequency) and $\phi_i$ (phase).

Therefore, each constituent QAM modulation occupies a bandwidth:

$$BW = r_S = \frac{r_b}{\log_2 m} \text{ symbols/sec}$$

where $r_s$ equals the symbol rate of each constituent QAM signal.

The total bandwidth of signal s(t) is:

$$W = r_s\left(1 + \frac{\Delta f}{r_s}\right) = r_s + \Delta f \quad H_z$$

Therefore, the spectral efficiency η of this two-oscillator system is:

$$\eta = \frac{2r_b}{W}$$

but $$r_b = r_2 \log_2 m$$

$$\eta = \frac{2r_b}{W} = \frac{2r_s \log_2 m}{r_s\left(1 + \frac{\Delta f}{r_s}\right)} = \frac{2\log_2 m}{1 + \frac{\Delta f}{r_s}} \text{ bits/sec/Hz}$$

The narrowband noise over the signal s(t) is:

$$n(t) = n_I(t)\cos(2\pi f_0 t) - n_q(t)\sin(2\pi f_0 t)$$

Where: $n_I(t)$=noise in I $N_q(t)$=noise in Q

Each noise occupies a bandwidth of W [Hz] and the average power of each component is $N_0 W$. $N_0$ is the noise power spectral density in Watts/Hz. The value of $f_0$ is the mean value of $f_1$ and $f_2$.

Figure 106:
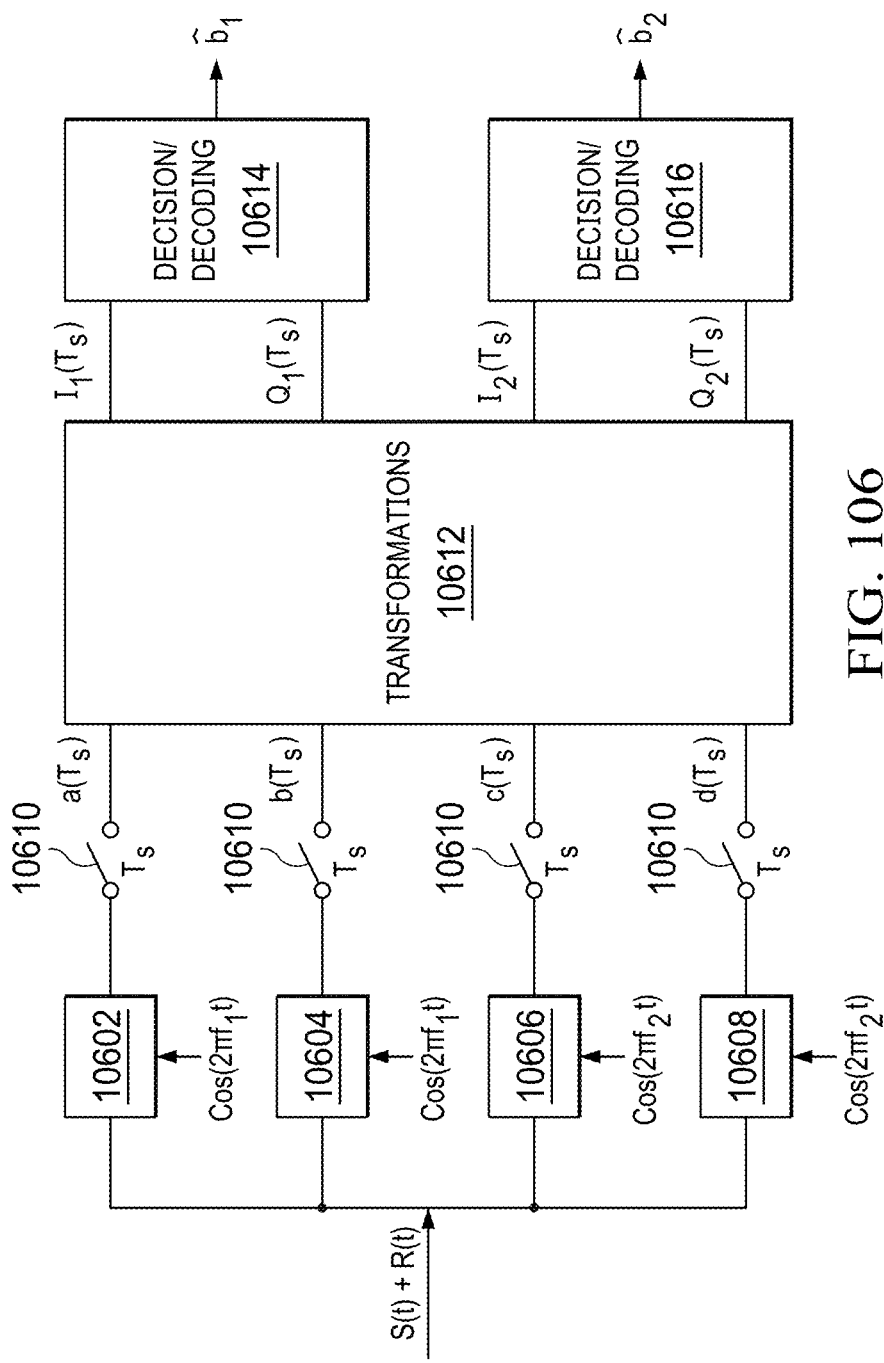
FIG. 106 illustrates a block diagram of a receiver.

Referring now to FIG. 106, there is illustrated a receiver side block diagram for demodulating the signal generated with respect to FIG. 106. The received signal s(t)+n(t) is provided to a number of cosine filters 10602-10608. Cosine filters 10602 and 10604 filter with respect to carrier frequency $f_1$ and cosine filters 10606 and 10608 filter the received signal for carrier frequency $f_2$. Each of the filters 10602-10608 provide an output to a switch 10610 that provides a number of outputs to a transformation block 10612. Transformation block 10612 provides two output signals having a real portion and an imaginary portion. Each of the real and imaginary portions associated with a signal are provided to an associated decoding circuit 10614, 10616 to provide the decoded signals $b_1$ and $b_2$.

$$\begin{bmatrix} a(T_s) \\ b(T_s) \\ c(T_s) \\ d(T_s) \end{bmatrix} = T_s \begin{bmatrix} 1 & 0 & K_1 & K_2 \\ 0 & 1 & -K_2 & K_1 \\ K_1 & -K_2 & 1 & 0 \\ K_2 & K_1 & 0 & 1 \end{bmatrix} \begin{bmatrix} A_1(\cos\varphi_1) \\ A_1(\sin\varphi_1) \\ A_2(\cos\varphi_2) \\ A_2(\sin\varphi_2) \end{bmatrix} + \begin{bmatrix} N_{I1}(T_s) \\ N_{Q1}(T_s) \\ N_{I2}(T_s) \\ N_{Q2}(T_s) \end{bmatrix}$$

$$|A\rangle \quad \underset{(\text{nonsingular so it has } M^{-1})}{M} \quad |S\rangle \quad |N\rangle$$

$$|A\rangle = T_s M|S\rangle + |N\rangle$$

Where $$N_{I\frac{1}{2+}^-}(T_s) = \int_0^{T_s} \eta_s(t)\cos\left(\frac{2\eta\Delta f}{2}t\right) \mp \eta_G(t)\sin\left(\frac{2\eta\Delta f}{2}t\right)dt$$

$$N_{Q\frac{1}{2+}^-}(T_s) = \int_0^{T_s} \eta_I(t)din\left(\frac{2\eta\Delta f}{2}t\right) \mp \eta_Q(t)\cos\left(\frac{2\eta\Delta f}{2}t\right)dt$$

$$|A\rangle = T_s\mathsf{M}|S\rangle + |N\rangle$$

Multiply by $$\frac{1}{T_s}\mathsf{M}^{-1}$$

$$\frac{1}{T_s}\mathsf{M}^{-1}|A\rangle = |S\rangle + \frac{1}{T_s}\mathsf{M}^{-1}|N\rangle = |S\rangle + |\tilde{N}\rangle$$

Output $|O\rangle$ $|\tilde{N}\rangle$ $$\begin{bmatrix} I_1(T_s) \\ Q_1(T_s) \\ I_2(T_s) \\ Q_1(T_s) \end{bmatrix}_{|O\rangle} = \begin{bmatrix} A_1(\cos\varphi_1) \\ A_1(\sin\varphi_1) \\ A_2(\cos\varphi_2) \\ A_2(\sin\varphi_2) \end{bmatrix}_{|S\rangle} + \begin{bmatrix} \tilde{N}_{I1}(T_s) \\ \tilde{N}_{Q1}(T_s) \\ \tilde{N}_{I2}(T_s) \\ \tilde{N}_{Q2}(T_s) \end{bmatrix}_{|\tilde{N}\rangle}$$

Then the probability of correct decision $P_e$ is $$P_e \approx (1-P_e)^4 \approx 1-4P_e \text{ for } P_e \ll 1$$

$P_e$=well known error probability in one dimension for each constituent m-QAM modulation.
Therefore, one can calculate BER.

$P_e$ comprises the known error probability in one dimension for each constituent member of the QAM modulation. Using the known probability error, the bit error rate for the channel based upon the known difference between frequencies $f_1$ and $f_2$ may be calculated.

Adaptive Processing

Figure 107:
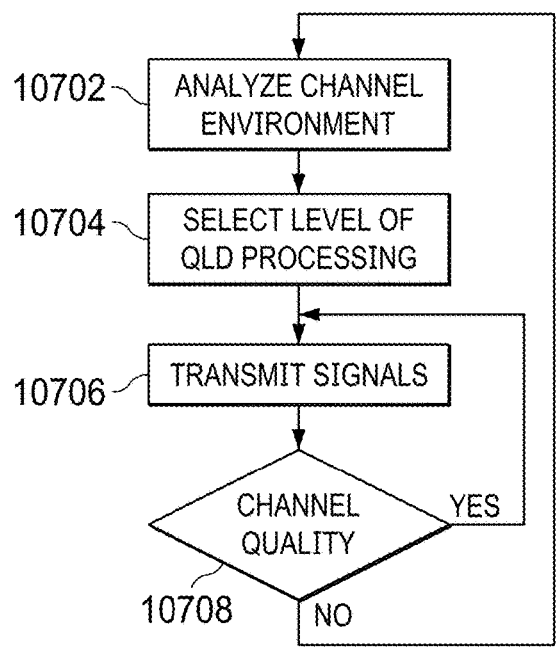
FIG. 107 is a flow diagram illustrating an adaptive QLO process.

The processing of signals using QLO may also be adaptively selected to combat channel impairments and interference. The process for adaptive QLO is generally illustrated in FIG. 107. First at step 10702 an analysis of the channel environment is made to determine the present operating environment. The level of QLO processing is selected at step 10704 based on the analysis and used to configure communications. Next, at step 10706, the signals are transmitted at the selected level of QLO processing. Inquiry step 10708 determines if sufficient channel quality has been achieved. If so, the system continues to transmit and the selected QLO processing level at step 10706. If not, control passes back to step 10702 to adjust the level of QLO processing to achieve better channel performance.

Figure 108:
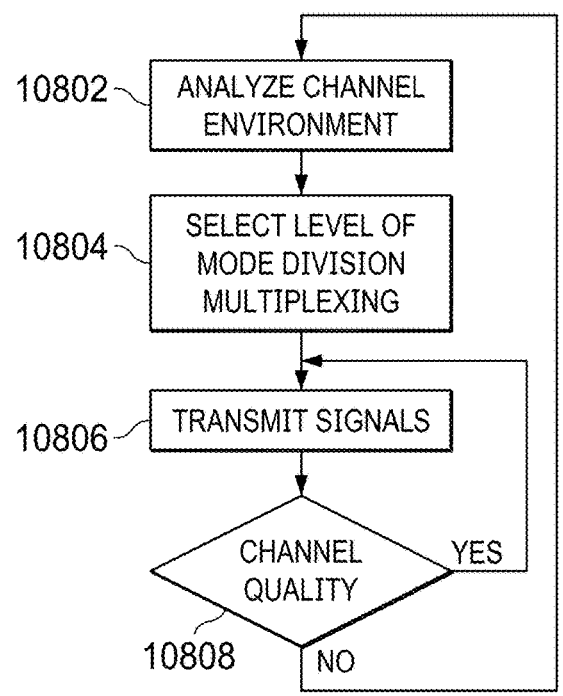
FIG. 108 is a flow diagram illustrating an adaptive MDM process.

The processing of signals using mode division multiplexing (MDM) may also be adaptively selected to combat channel impairments and interference and maximize spectral efficiency. The process for adaptive MDM is generally illustrated in FIG. 108. First at step 10802 an analysis of the channel environment is made to determine the present operating environment. The level of MDM processing is selected at step 10804 based on the analysis and used to configure communications. Next, at step 10806, the signals are transmitted at the selected level of MDM processing. Inquiry step 10808 determines if sufficient channel quality has been achieved. If so, the system continues to transmit and the selected MDM processing level at step 10806. If not, control passes back to step 10802 to adjust the level of MDM processing to achieve better channel performance.

Figure 109:
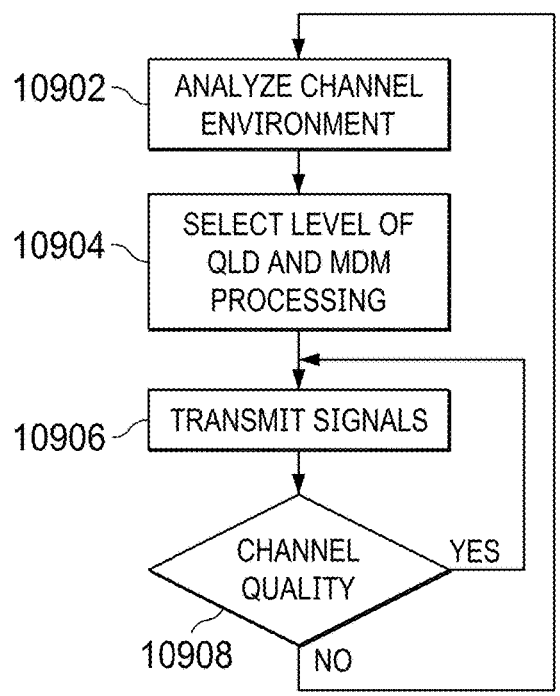
FIG. 109 is a flow diagram illustrating an adaptive QLO and MDM process

The processing of signals using an optimal combination of QLO and MDM may also be adaptively selected to combat channel impairments and interference and maximize spectral efficiency. The process for adaptive QLO and MDM is generally illustrated in FIG. 109. First at step 10902 an analysis of the channel environment is made to determine the present operating environment. A selected combination of a level of QLO process and a level of MDM processing are selected at step 10904 based on the analysis and used to configure communications. Next, at step 10906, the signals are transmitted at the selected level of QLO and MDM processing. Inquiry step 10908 determines if sufficient channel quality has been achieved. If so, the system continues to transmit and the selected combination of QLO and MDM processing levels at step 10906. If not, control passes back to step 10902 to adjust the levels of QLO and MDM processing to achieve better channel performance. Adjustments through the steps continue until a most optimal combination of QLO and MDM processing is achieved to maximize spectral efficiency using a 2-dimensional optimization.

Figure 110:
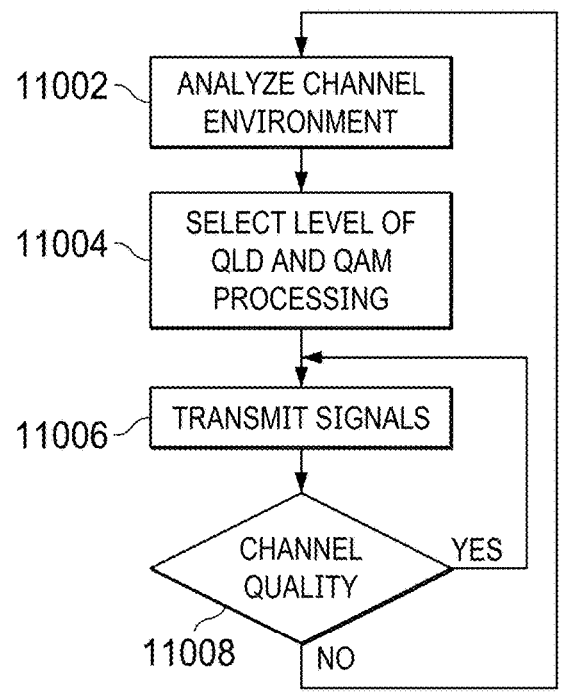
FIG. 110 is a flow diagram illustrating an adaptive QLO and QAM process.

The processing of signals using an optimal combination of QLO and QAM may also be adaptively selected to combat channel impairments and interference and maximize spectral efficiency. The process for adaptive QLO and QAM is generally illustrated in FIG. 110. First at step 11002 an analysis of the channel environment is made to determine the present operating environment. A selected combination of a level of QLO process and a level of QAM processing are selected at step 11004 based on the analysis and used to configure communications. Next, at step 11006, the signals are transmitted at the selected level of QLO and QAM processing. Inquiry step 11008 determines if sufficient channel quality has been achieved. If so, the system continues to transmit and the selected combination of QLO and QAM processing levels at step 11006. If not, control passes back to step 11002 to adjust the levels of QLO and QAM processing to achieve better channel performance. Adjustments through the steps continue until a most optimal combination of QLO and QAM processing is achieved to maximize spectral efficiency using a 2-dimensional optimization.

Figure 111:
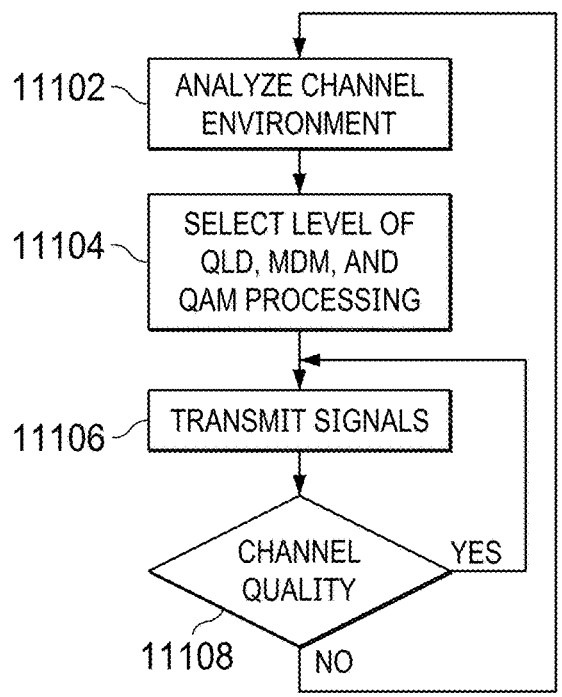
FIG. 111 is a flow diagram illustrating an adaptive QLO, MDM and QAM process.

The processing of signals using an optimal combination of QLO, MDM and QAM may also be adaptively selected to combat channel impairments and maximize spectral efficiency. The process for adaptive QLO, MDM and QAM is generally illustrated in FIG. 111. First at step 11102 an analysis of the channel environment is made to determine the present operating environment. A selected combination of a level of QLO processing, a level of MDM processing and a level of QAM processing are selected at step 11104 based on the analysis and used to configure communications. Next, at step 11106, the signals are transmitted at the selected level of QLO, MDM and QAM processing. Inquiry step 11108 determines if sufficient channel quality has been achieved. If so, the system continues to transmit and the selected combination of QLO, MDM and QAM processing levels at step 11106. If not, control passes back to step 11102 to adjust the levels of QLO, MDM and QAM processing to achieve better channel performance. Adjustments through the steps continue until a most optimal combination of QLO, MDM and QAM processing is achieved to maximize spectral efficiency using a 3-dimensional optimization.

The adaptive approaches described herein above may be used with any combination of QLO, MDM and QAM processing in order to achieve optimal channel efficiency. In another application distinct modal combinations may also be utilized.

Improvement of Pilot Signal Modulation

Figure 112:
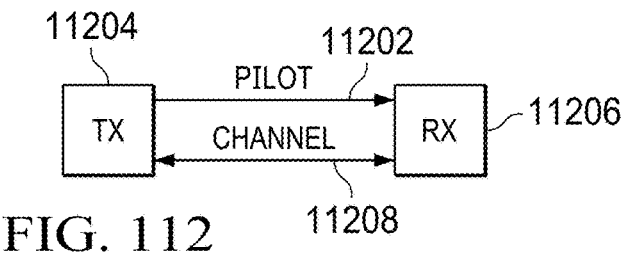

The above described QLO, MDM and QAM processing techniques may also be used to improve the manner in which a system deals with noise, fading and other channel impairments by the use of pilot signal modulation techniques. As illustrated in FIG. 112, a pilot signal 11202 is transmitted between a transmitter 11204 to a receiver 11206. The pilot signal includes an impulse signal that is received, detected and processed at the receiver 11206. Using the information received from the pilot impulse signal, the channel 11208 between the transmitter 11204 and receiver 11206 may be processed to remove noise, fading and other channel impairment issues from the channel 11208.

Figure 113:
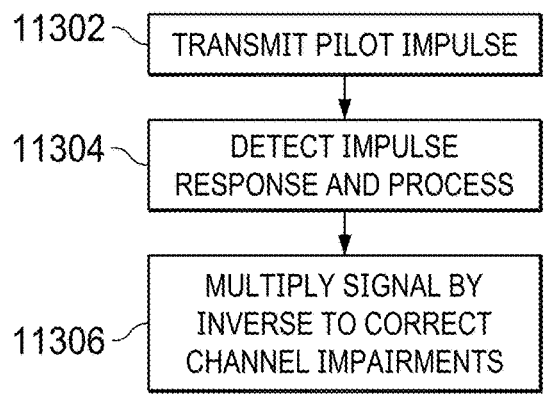

This process is generally described with respect to the flowchart of FIG. 113. The pilot impulse signal is transmitted at 11302 over the transmission channel. The impulse response is detected at step 11304 and processed to determine the impulse response over the transmission channel. Effects of channel impairments such as noise and fading may be countered by multiplying signals transmitted over the transmission channel by the inverse of the impulse response at step 11306 in order to correct for the various channel impairments that may be up on the transmission channel. In this way the channel impairments are counteracted and improved signal quality and reception may be provided over the transmission channel.

Power Control

Figure 114:
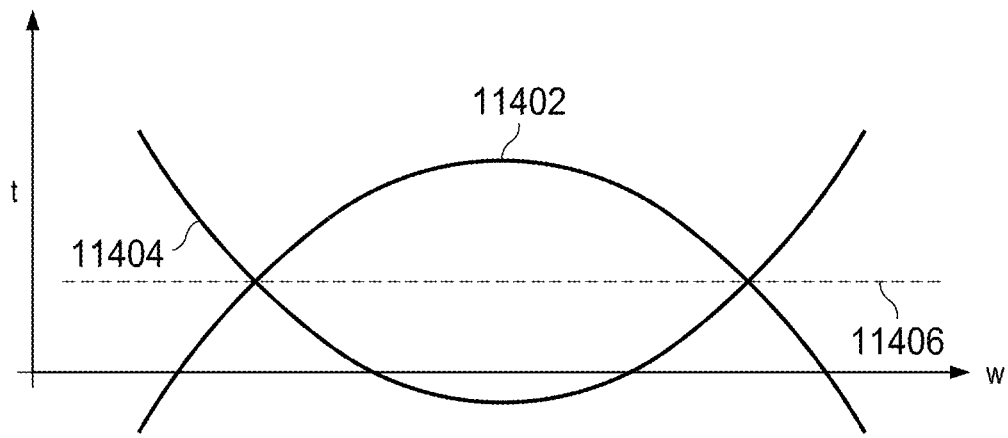

Adaptive power control may be provided on systems utilizing QLO, MDM and QAM processing to also improve channel transmission. Amplifier nonlinearities within the transmission circuitry and the receiver circuitry will cause impairments in the channel response as more particularly illustrated in FIG. 114. As can be seen the channel impairments and frequency response increase and decrease over frequency as illustrated generally at 11402. By adaptively controlling the power of a transmitting unit or a receiving unit and inverse frequency response such as that generated at 11404 may be generated. Thus, when the normal frequency response 11402 and the inverse frequency response 11404 are combined, a consistent response 11406 is provided by use of the adaptive power control.

Backward and Forward Channel Estimation

Figure 115:
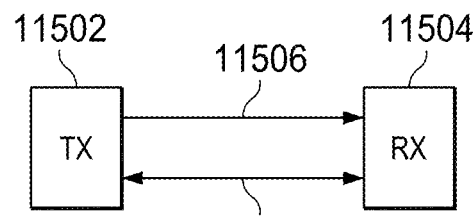

Referring now to FIG. 115, QLO techniques may also be used with forward and backward channel estimation processes when communications between a transmitter 11502 and a receiver 11504 do not have the same channel response over both the forward and backward channels. As shown in FIG. 115, the forward channel 11506 and backward channel 11508 between a transmitter 11502 and receiver 11504 me each be processed to determine their channel impulse responses. Separate forward channel estimation response and backward channel estimation response may be used for processing QLO signals transmitted over the forward channel 11506 and backward channel 11508. The differences in the channel response between the forward channel 11506 and the backward channel 11508 may arise from differences in the topography or number of buildings located within the area of the transmitter 11502 and the receiver 11504. By treating each of the forward channel 11506 and a backward channel 11508 differently better overall communications may be achieved.

Using MIMO Techniques with QLO

MIMO techniques may be used to improve the performance of QLO-based transmission systems. MIMO (multiple input and multiple output) is a method for multiplying the capacity of a radio link using multiple transmit and receive antennas to exploit multipath propagation. MIMO uses multiple antennas to transmit a signal instead of only a single antenna. The multiple antennas may transmit the same signal using modulation with the signals from each antenna modulated by different orthogonal signals such as that described with respect to the QLO modulation in order to provide an improved MIMO based system.

Diversions within OAM beams may also be reduced using phased arrays. By using multiple transmitting elements in a geometrical configuration and controlling the current and phase for each transmitting element, the electrical size of the antenna increases as does the performance of the antenna. The antenna system created by two or more individual intended elements is called an antenna array. Each transmitting element does not have to be identical but for simplification reasons the elements are often alike. To determine the properties of the electric field from an array the array factor (AF) is utilized.

The total field from an array can be calculated by a superposition of the fields from each element. However, with many elements this procedure is very unpractical and time consuming. By using different kinds of symmetries and identical elements within an array, a much simpler expression for the total field may be determined. This is achieved by calculating the so-called array factor (AF) which depends on the displacement (and shape of the array), phase, current amplitude and number of elements. After calculating the array factor, the total field is obtained by the pattern multiplication rule which is such that the total field is the product of the array factor in the field from one single element.

$$E_{total} = E_{single\ element} \times AF$$

This formula is valid for all arrays consisting of identical elements. The array factor does not depend on the type of elements used, so for calculating AF it is preferred to use point sources instead of the actual antennas. After calculating the AF, the equation above is used to obtain the total field. Arrays can be 1D (linear), 2D (planar) or 3D. In a linear array, the elements are placed along the line and in a planar they are situated in a plane.

Figure 116:
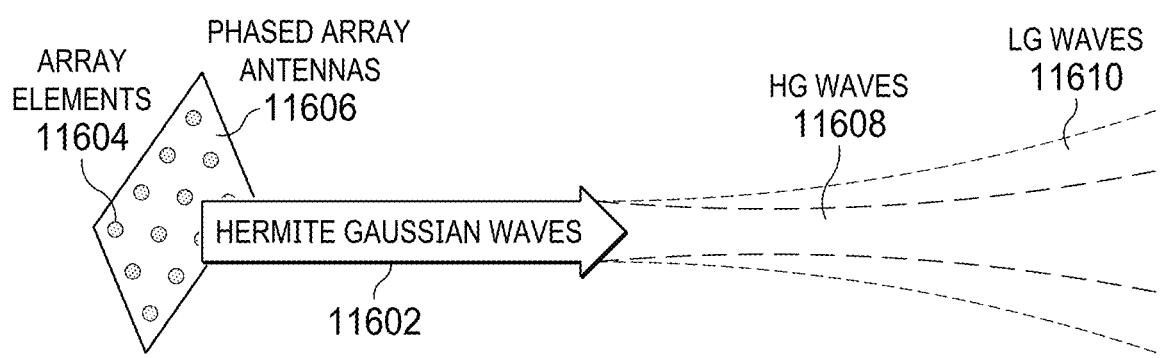

Referring now to FIG. 116, there is illustrated in the manner in which Hermite Gaussian beams and Laguerre Gaussian beams will diverge when transmitted from a phased array of antennas. For the generation of Laguerre Gaussian beams a circular symmetry over the cross-section of the phased antenna array is used, and thus, a circular grid will be utilized. For the generation of Hermite Gaussian beams 11602, a rectangular array 11604 of array elements 11606 is utilized. As can be seen with respect to FIG. 116, the Hermite Gaussian waves 11608 provide a more focused beam front then the Laguerre Gaussian waves 11610.

Reduced beam divergence may also be accomplished using a pair of lenses. As illustrated in FIG. 117, a Gaussian wave 11702 passing through a spiral phase plate 11704 generates an output Laguerre Gaussian wave 11706. The Laguerre Gaussian wave 11706 when passing from a transmitter aperture 11708 to a receiver aperture 11710 diverges such that the entire Laguerre Gaussian beam does not intersect the receiver aperture 11710. This issue may be addressed as illustrated in FIG. 118. As before the Gaussian waves 11802 pass through the spiral phase plate 11804 generating Laguerre Gaussian waves 11806. Prior to passing through the transmitter aperture 11808 the Laguerre Gaussian waves 11806 pass through a pair of lenses 11814. The pair of lenses 11814 have an effective focal length 11816 that focuses the beam 11818 passing through the transmitter aperture 11808. Due to the focusing lenses 11814, the focused beam 11818 fully intersects the receiver aperture 11812. By providing the lenses 11814 separated by an effective focal length 11816, a more focused beam 11818 may be provided at the receiver aperture 11812 preventing the loss of data within the transmission of the Laguerre Gaussian wave 11806.

Application of OAM to Optical Communication

Utilization of OAM for optical communications is based on the fact that coaxially propagating light beams with different OAM states can be efficiently separated. This is certainly true for orthogonal modes such as the LG beam. Interestingly, it is also true for general OAM beams with cylindrical symmetry by relying only on the azimuthal phase. Considering any two OAM beams with an azimuthal index of $\ell$ 1 and $\ell$ 2, respectively:

$$U_1(r,\theta,z) = A_1(r,z)\exp(i\ell_1\theta) \quad (12)$$

where r and z refer to the radial position and propagation distance respectively, one can quickly conclude that these two beams are orthogonal in the sense that:

$$\int_0^{2\pi} U_1 U_2^* d\theta = \begin{cases} 0 & \text{if } \ell_1 \neq \ell_2 \\ A_1 A_2^* & \text{if } \ell_1 = \ell_2 \end{cases} \quad (13)$$

There are two different ways to take advantage of the distinction between OAM beams with different $\ell$ states in communications. In the first approach, N different OAM states can be encoded as N different data symbols representing "0", "1", . . . , "N−1", respectively. A sequence of OAM states sent by the transmitter therefore represents data information. At the receiver, the data can be decoded by checking the received OAM state. This approach seems to be more favorable to the quantum communications community, since OAM could provide for the encoding of multiple bits (log 2(N)) per photon due to the infinitely countable possibilities of the OAM states, and so could potentially achieve a higher photon efficiency. The encoding/decoding of OAM states could also have some potential applications for on-chip interconnection to increase computing speed or data capacity.

The second approach is to use each OAM beam as a different data carrier in an SDM (Spatial Division Multiplexing) system. For an SDM system, one could use either a multi-core fiber/free space laser beam array so that the data channels in each core/laser beam are spatially separated, or use a group of orthogonal mode sets to carry different data channels in a multi-mode fiber (MMF) or in free space. Greater than 1 petabit/s data transmission in a multi-core fiber and up to 6 linearly polarized (LP) modes each with two polarizations in a single core multi-mode fiber has been reported. Similar to the SDM using orthogonal modes, OAM beams with different states can be spatially multiplexed and demultiplexed, thereby providing independent data carriers in addition to wavelength and polarization. Ideally, the orthogonality of OAM beams can be maintained in transmission, which allows all the data channels to be separated and recovered at the receiver. A typical embodiments of OAM multiplexing is conceptually depicted in FIG. 73. An obvious benefit of OAM multiplexing is the improvement in system spectral efficiency, since the same bandwidth can be reused for additional data channels.

Optical Fiber Communications

The use of orbital angular momentum and multiple layer overlay modulation processing techniques within an optical communications interface environment as described herein above can provide a number of opportunities within the optical communications environment for enabling the use of the greater signal bandwidths provided by the use of optical orbital angular momentum processing, or multiple layer overlay modulation techniques alone. FIG. 119 illustrates the general configuration of an optical fiber communication system. The optical fiber communication system 11900 includes an optical transmitter 11902 and an optical receiver 11904. The transmitter 11902 and receiver 11904 communicate over an optical fiber 11906. The transmitter 11902 includes information within a light wavelength or wavelengths that is propagated over the optical fiber 11906 to the optical receiver 11904.

Optical communications network traffic has been steadily increasing by a factor of 100 every decade. The capacity of single mode optical fibers has increased 10,000 times within the last three decades. Historically, the growth in the bandwidth of optical fiber communications has been sustained by information multiplexing techniques using wavelength, amplitude, phase, and polarization of light as a means for encoding information. Several major discoveries within the fiber-optics domain have enabled today's optical networks. An additional discovery was led by Charles M. Kao's groundbreaking work that recognized glass impurities within an optical fiber as a major signal loss mechanism. Existing glass losses at the time of his discovery were approximately 200 dB per kilometer at 1 micrometer.

Figure 120:
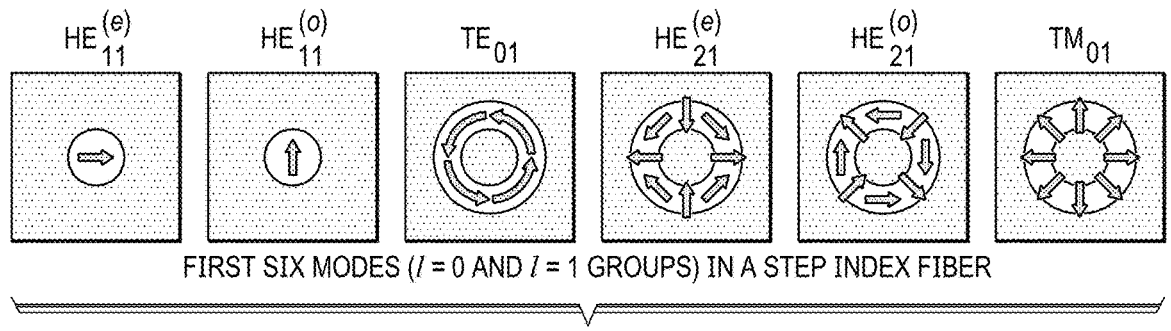

Referring now to FIG. 120, there are illustrated the first six modes within a step indexed fiber for the groups L=0 and L=1.

When orbital angular momentums are applied to the light wavelength within an optical transmitter of an optical fiber communication system, the various orbital angular momentums applied to the light wavelength may transmit information and be determined within the fiber mode.

Angular momentum density (M) of light in a medium is defined as:

$$M = \frac{1}{c^2} r \times (E \times H) = r \times P = \frac{1}{c^2} r \times S$$

with r as position, E electric field, H magnetic field, P linear momentum density and S Poynting vector.

The total angular momentum (J) and angular momentum flux ($\Phi_M$) can be defined as:

$$J = \iiint M \, dV$$

$$\Phi = \iint M \, dA$$

In order to verify whether certain mode has an OAM let us look at the time averages of the angular momentum flux $\Phi_M$:

$$\langle \Phi_M \rangle = \iint \langle M \rangle \, dA$$

as well as the time average of the energy flux:

$$\langle \Phi_W \rangle = \iint \frac{\langle S_z \rangle}{c} dA$$

Because of the symmetry of radial and axial components about the fiber axis, we note that the integration in equation will leave only z-component of the angular momentum density nonzero. Hence:

$$\langle M \rangle = \langle M \rangle_z = \frac{1}{c^2} r \times \langle E \times H \rangle_z$$

and knowing $(S) = \text{Re}\{S\}$ and $S = \frac{1}{2} E \times H^*$ leads to:

$$S_\Phi = \frac{1}{2}(-E_r H_z^* + E_z H_r^*)$$

$$S_z = \frac{1}{2}(E_x H_y^* + E_y H_x^*)$$

Let us now focus on a specific linear combination of the $HE_{l+1,m}^{even}$ and $HE_{l+1,m}^{odd}$ modes with $\pi/2$ phase shift among them:

$$V_{lm}^+ = HE_{l+1,m}^{even} + iEH_{l+1,m}^{odd}$$

The idea for this linear combination comes from observing azimuthal dependence of the $HE_{l+1,m}^{even}$ and modes comprising $\cos(\varphi)$ and $\sin(\varphi)$. If we denote the electric field of $HE_{l+1,m}^{even}$ and $HE_{l+1,m}^{odd}$ modes as $e_1$ and $e_2$, respectively, and similarly, denote their magnetic fields as $h_1$ and $h_2$, the expression for this new mode can be written as:

$$e = e_1 + i e_2, \tag{2.35}$$

$$h = h_1 + i h_2. \tag{2.36}$$

then we derive:

$$e_r = e^{i(l+1)\varphi} F_l(R)$$

$$h_z = e^{i(l+1)\varphi} n_{co} \left(\frac{\epsilon_0}{\mu_0}\right)^{\frac{1}{2}} \frac{(2\Delta)^{\frac{1}{2}}}{V} G_l^-$$

$$e_z = i e^{i(l+1)\varphi} \frac{(2\Delta)^{\frac{1}{2}}}{V} G_l^-$$

$$h_r = -i e^{i(l+1)\varphi} n_{co} \left(\frac{\epsilon_0}{\mu_0}\right)^{\frac{1}{2}} F_l(R)$$

Where $F_l(R)$ is the Bessel function and $$G_l^\pm = \frac{dF_l}{dR} \pm \frac{l}{R} F_l$$

We note that all the quantities have $e^{i(l+1)\varphi}$ dependence that indicates these modes might have OAM, similarly to the free space case. Therefore, the azimuthal and the longitudinal component of the Poynting vector are:

$$S_\varphi = -n_{co} \left(\frac{\epsilon_0}{\mu_0}\right)^{\frac{1}{2}} \frac{(2\Delta)^{\frac{1}{2}}}{V} \text{Re}\{F_l^* G_l^-\}$$

$$S_z = n_{co} \left(\frac{\epsilon_0}{\mu_0}\right)^{\frac{1}{2}} [F_l]^2$$

The ratio of the angular momentum flux to the energy flux therefore becomes:

$$\frac{\phi_M}{\phi_W} = \frac{l+1}{\omega}$$

We note that in the free-space case, this ratio is similar:

$$\frac{\phi_M}{\phi_W} = \frac{\sigma+1}{\omega}$$

where $\sigma$ represents the polarization of the beam and is bounded to be $-1 < \sigma < 1$. In our case, it can be easily shown that SAM of the $V^+$ state, is 1, leading to important conclusion that the OAM of the $V^{+lm}$ state is 1. Hence, this shows that, in an ideal fiber, OAM mode exists.

Thus, since an orbital angular momentum mode may be detected within the ideal fiber, it is possible to encode information using this OAM mode in order to transmit different types of information having different orbital angular momentums within the same optical wavelength.

Figure 121:
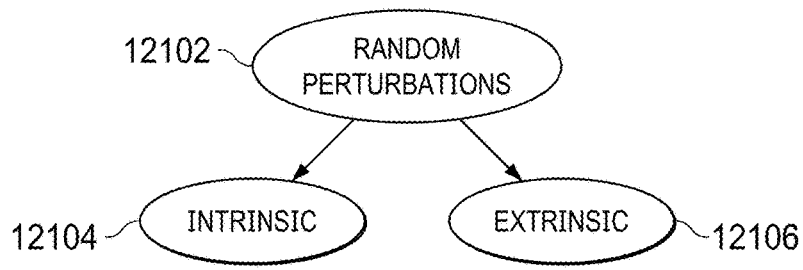

The above description with respect to optical fiber assumed an ideal scenario of perfectly symmetrical fibers having no longitudinal changes within the fiber profile. Within real world fibers, random perturbations can induce coupling between spatial and/or polarization modes, causing propagating fields to evolve randomly through the fiber. The random perturbations can be divided into two classes, as illustrated in FIG. 121. Within the random perturbations 12102, the first class comprises extrinsic perturbations 12104. Extrinsic perturbations 12104 include static and dynamic fluctuations throughout the longitudinal direction of the fiber, such as the density and concentration fluctuations natural to random glassy polymer materials that are included within fibers. The second class includes extrinsic variations 12106 such as microscopic random bends caused by stress, diameter variations, and fiber core defects such as micro voids, cracks, or dust particles.

Mode coupling can be described by field coupling modes which account for complex valued modal electric field amplitudes, or by power coupling modes, which is a simplified description that accounts only for real value modal powers. Early multimode fiber systems used incoherent light emitting diode sources and power coupling models were widely used to describe several properties including steady state, modal power distributions, and fiber impulse responses. While recent multimode fiber systems use coherent sources, power coupling modes are still used to describe effects such as reduced differential group delays and plastic multimode fibers.

By contrast, single mode fiber systems have been using laser sources. The study of random birefringence and mode coupling in single mode fibers which leads to polarization mode dispersion (PMD), uses field coupling modes which predict the existence of principal states of polarization (PSPs). PSPs are polarization states shown to undergo minimal dispersion and are used for optical compensation of polarization mode dispersion in direct detection single mode fiber systems. In recent years, field coupling modes have been applied to multimode fibers, predicting principal mode which are the basis for optical compensation of modal dispersion in direct detection multimode fiber systems.

Mode coupling can be classified as weak or strong, depending on whether the total system length of the optical fiber is comparable to, or much longer than, a length scale over which propagating fields remain correlated. Depending on the detection format, communication systems can be divided into direct and coherent detection systems. In direct detection systems, mode coupling must either be avoided by careful design of fibers and modal D (multiplexers) and/or mitigated by adaptive optical signal processing. In systems using coherent detection, any linear cross talk between modes can be compensated by multiple input multiple output (MIMO) digital signal processing (DSP), as previously discussed, but DSP complexity increases with an increasing number of modes.

Figure 122:
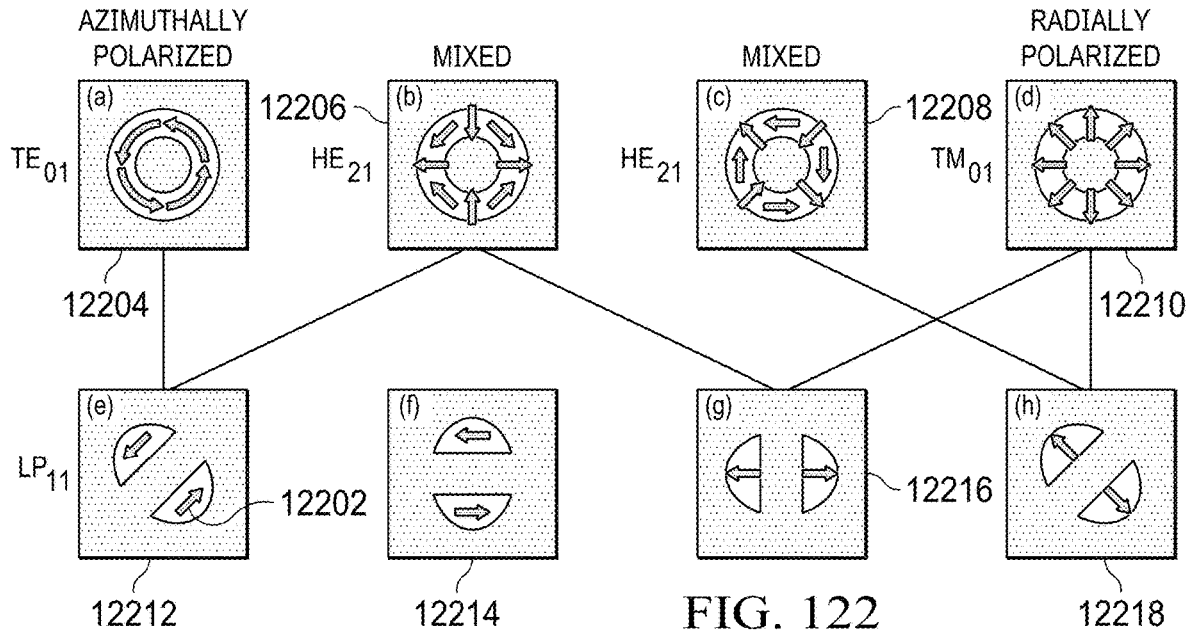

Referring now to FIG. 122, there were illustrated the intensity patterns of the first order mode group within a vortex fiber. Arrows 12202 within the illustration show the polarization of the electric field within the fiber. The top row illustrates vector modes that are the exact vector solutions, and the bottom row shows the resultant, unstable LP11 modes commonly obtained at a fiber output. Specific linear combinations of pairs of top row modes resulting in the variety of LP11 modes obtained at the fiber output. Coupled mode 12202 is provided by the coupled pair of mode 12204 and 12206. Coupled mode 12204 is provided by the coupled pair of mode 12204 and mode 12208. Coupled mode 12216 is provided by the coupled pair of mode 12206 and mode 12210 and coupled mode 12218 is provided by the coupled pair of mode 12208 and mode 12210.

Typically, index separation of two polarizations and single mode fibers is on the order of 10-7. While this small separation lowers the PMD of the fiber, external perturbations can easily couple one mode into another, and indeed in a single mode fiber, arbitrary polarizations are typically observed at the output. Simple fiber polarization controller that uses stress induced birefringence can be used to achieve any desired polarization at the output of the fiber.

By the origin, mode coupling can be classified as distributed (caused by random perturbations in fibers), or discrete (caused at the modal couplers and the multiplexers). Most importantly, it has been shown that small, effective index separation among higher order modes is the main reason for mode coupling and mode instabilities. In particular, the distributed mode coupling has been shown to be inversely proportional to Δ−P with P greater than 4, depending on coupling conditions. Modes within one group are degenerate. For this reason, in most multimode fiber modes that are observed in the fiber output are in fact the linear combinations of vector modes and are linearly polarized states. Hence, optical angular momentum modes that are the linear combination of the HE even, odd modes cannot coexist in these fibers due to coupling to degenerate TE01 and TM01 states.

Thus, the combination of the various OAM modes is not likely to generate modal coupling within the optical systems and by increasing the number of OAM modes, the reduction in mode coupling is further benefited.

OAM Transmission in Regular Few Mode Fiber

Figure 123:
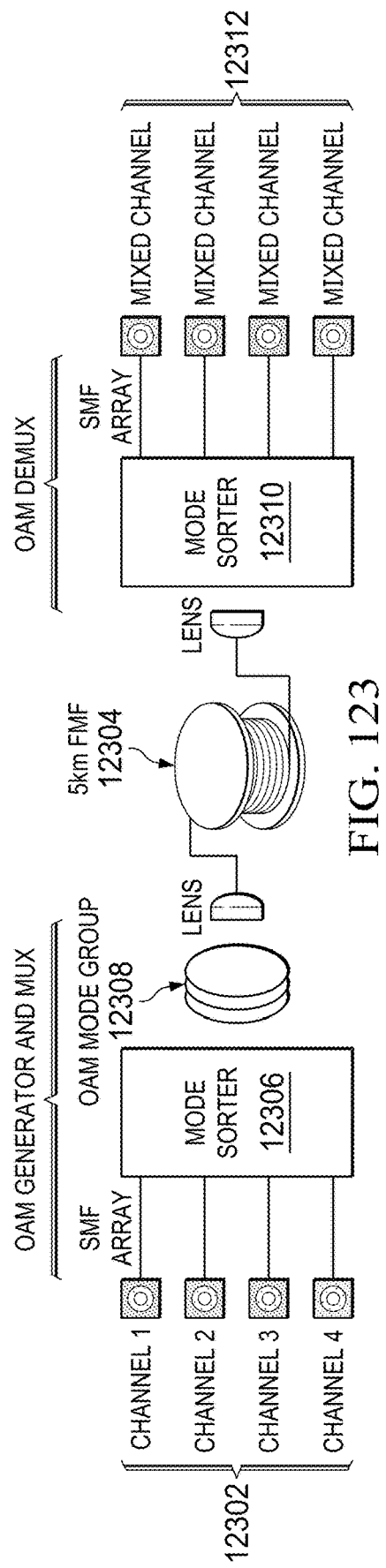

Referring now to FIG. 123, there is illustrated a demonstration of the transmission of four OAM beams ($\ell$ =+1 and −1 each with 2 orthogonal polarization states), each carrying 20 Gbit/s QPSK data, in an approximately 5 kilometer regular FMF (few mode fiber) 12304. Four data channels 12302 (2 with x-pol and 2 with y-pol) were converted to pol-muxed OAM beams with $\ell$ =+1 and −1 using an inverse mode sorter 12306. The pol-muxed to OAM beams 12308 (four in total) are coupled into the FMF 12904 for propagation. At the fiber output, the received modes were decomposed onto an OAM basis ($\ell$ =+1 and −1) using a mode sorter 12310. In each of the two OAM components of light were coupled onto a fiber-based PBS for polarization demultiplexing. Each output 12312 is detected by a photodiode, followed by ADC (analog-to-digital converter) and off-line processing. To mitigate the inter-channel interference, a constant modulus algorithm is used to blindly estimate the channel crosstalk and compensate for the inter-channel interference using linear equalization. Eventually, the QPSK data carried on each OAM beam is recovered with the assistance of a MIMO DSP as illustrated in FIGS. 124 and 125.

OAM Transmission in a Vortex Fiber

A key challenge for OAM multiplexing in conventional fibers is that different OAM modes tend to couple to each other during the transmission. The major reason for this is that conventional fiber OAM modes have a relatively small effective refractive index difference ($\Delta n_{eff}$). Stably transmitting an OAM mode in fiber requires some modifications of the fiber. One manner for stably transmitting OAM modes uses a vortex fiber such as that illustrated in FIG. 126. A vortex fiber 12602 is a specially designed a few mode fiber including an additional high index ring 12604 around the fiber core 12606. The design increases the effective index differences of modes and therefore reduces the mutual mode coupling.

Using this vortex fiber 12602, two OAM modes with $\ell$ =+1 and −1 and two polarizations multiplexed fundamental modes were transmitted together for 1.1 km. The measured mode cross talk between two OAM modes was approximately −20 dB. These four distinct modes were used to each carried a 100 Gbuad QPSK signal at the same wavelength and simultaneously propagate in the vortex fiber. After the mode demultiplexing, all data was recovered with a power penalty of approximately 4.1 dB, which could be attributed to the multipath effects and mode cross talk. In a further example, WDM was added to further extend the capacity of a vortex fiber transmission system. A 20-channel fiber link using to OAM modes and 10 WDM channels (from 1546.642 nm to 1553.88 nm), each channel sending 80 Gb/s 16-QAM signal was demonstrated, resulting in a total transmission capacity of 1.2 Tb/s under the FEC limit.

There are additional innovative efforts being made to design and fabricate fibers that are more suitable for OAM multiplexing. A recently reported air-core fiber has been demonstrated to further increase the refractive index difference of eigenmodes such that the fiber is able to stably transmit 12 OAM states ($\ell$ =±7, ±8 and ±9, each with two orthogonal polarizations) for 2 m. A few mode fibers having an inverse parabolic graded index profile in which propagating 8 OAM orders (ℓ =±1 and ±2, each with two orthogonal polarizations) has been demonstrated over 1.1 km. The same group recently presented a newer version of an air core fiber, whereby the supported OAM states was increased to 16. One possible design that can further increase the supported OAM modes and a fiber is to use multiple high contrast indexed ring core structure which is indicated a good potential for OAM multiplexing for fiber communications.

RF Communications with OAM

As a general property of electromagnetic waves, OAM can also be carried on other ways with either a shorter wavelength (e.g., x-ray), or a longer wavelength (millimeter waves and terahertz waves) than an optical beam. Focusing on the RF waves, OAM beams at 90 GHz were initially generated using a spiral phase plate made of Teflon. Different approaches, such as a phase array antenna and a helicoidal parabolic antenna have also been proposed. RF OAM beams have been used as data carriers for RF communications. A Gaussian beam and an OAM beam with ℓ =+1 at approximately 2.4 GHz have been transmitted by a Yagi-Uda antenna and a spiral parabolic antenna, respectively, which are placed in parallel. These two beams were distinguished by the differential output of a pair of antennas at the receiver side. The number of channels was increased to three (carried on OAM beams with ℓ =-1, 0 and +1) using a similar apparatus to send approximately 11 Mb/s signal at approximately 17 GHz carrier. Note that in these two demonstrations different OAM beams propagate along different spatial axes. There are some potential benefits if all of the OAM beams are actually multiplexed and propagated through the same aperture. In a recent demonstration eight polarization multiplexed (pol-muxed) RF OAM beams (for OAM beams on each of two orthogonal polarizations) our coaxially propagated through a 2.5 m link.

The herein described RF techniques have application in a wide variety of RF environments. These include RF Point to Point/Multipoint applications, RF Point to Point Backhaul applications, RF Point to Point Fronthaul applications (these provide higher throughput CPRI interface for cloudification and virtualization of RAN and future cloudified HetNet), RF Satellite applications, RF Wifi (LAN) applications, RF Bluetooth (PAN) applications, RF personal device cable replacement applications, RF Radar applications and RF electromagnet tag applications. The techniques could also be used in a RF and FSO hybrid system that can provide communications in an RF mode or an FSO mode depending on which mode of operation is providing the most optimal or cost effective communications link at a particular point in time.

The four different OAM beams with ℓ =-3, -1, +1 and +3 on each of 2 orthogonal polarizations are generated using customized spiral phase plates specifically for millimeter wave at 28 GHz. The observed intensity profile for each of the beams and their interferograms are shown in FIG. 127. These OAM beams were coaxially multiplexed using designed beam splitters. After propagation, the OAM channels were multiplexed using an inverse spiral phase plate and a spatial filter (the receiver antenna). The measured crosstalk it 28 GHz for each of the demultiplexed channels is shown in Table 8. It can be seen that the cross talk is low enough for 16-QAM data transmission without the assistance of extra DSPs to reduce the channel interference.

TABLE 8

Crosstalk of the OAM channels measured at f = 28 GHz (CW)

| | ℓ = -3 | ℓ = -1 | ℓ = +1 | ℓ = +3 |
|---|---|---|---|---|
| Single-pol (Y-pol) | -25 dB | -23 dB | -25 dB | -26 dB |
| Dual-pol (X-pol) | -17 dB | -16.5 dB | -18.1 dB | -19 dB |
| Dual-pol (Y-pol) | -18 dB | -16.5 dB | -16.5 dB | -24 dB |

Considering that each beam carries a 1 Gbaud 16-QAM signal, a total link capacity of 32 Gb/s at a single carrier frequency of 28 GHz and a spectral efficiency of 16 Gb/s/Hz may be achieved. In addition, an RF OAM beam demultiplexer ("mode sorter") was also customize for a 28 GHz carrier and is implemented in such a link to simultaneously separate multiple OAM beams. Simultaneously demultiplexing for OAM beams at the single polarization has been demonstrated with a cross talk of less than -14 dB. The cross talk is likely to be further reduced by optimizing the design parameters.

Free Space Communications

An additional configuration in which the optical angular momentum processing and multi-layer overlay modulation technique described herein above may prove useful within the optical network framework is use with free-space optics communications. Free-space optics systems provide a number of advantages over traditional UHF RF based systems from improved isolation between the systems, the size and the cost of the receivers/transmitters, lack of RF licensing laws, and by combining space, lighting, and communication into the same system. Referring now to FIG. 128 there is illustrated an example of the operation of a free-space communication system. The free-space communication system utilizes a free-space optics transmitter 12802 that transmits a light beam 12804 to a free-space optics receiver 12806. The major difference between a fiber-optic network and a free-space optic network is that the information beam is transmitted through free space rather than over a fiber-optic cable. This causes a number of link difficulties, which will be more fully discussed herein below. Free-space optics is a line of sight technology that uses the invisible beams of light to provide optical bandwidth connections that can send and receive up to 2.5 Gbps of data, voice, and video communications between a transmitter 12802 and a receiver 12806. Free-space optics uses the same concepts as fiber-optics, except without the use of a fiber-optic cable. Free-space optics systems provide the light beam 12804 within the infrared (IR) spectrum, which is at the low end of the light spectrum. Specifically, the optical signal is in the range of 300 Gigahertz to 1 Terahertz in terms of wavelength.

Presently existing free-space optics systems can provide data rates of up to 10 Gigabits per second at a distance of up to 2.5 kilometers. In outer space, the communications range of free space optical communications is currently on the order of several thousand kilometers, but has the potential to bridge interplanetary distances of millions of kilometers, using optical telescopes as beam expanders. In January of 2013, NASA used lasers to beam an image of the Mona Lisa to the Lunar Reconnaissance Orbiter roughly 240,000 miles away. To compensate for atmospheric interference, an error correction code algorithm, similar to that used within compact discs, was implemented.

The distance records for optical communications involve detection and emission of laser light by space probes. A two-way distance record for communication was established by the Mercury Laser Altimeter instrument aboard the MESSENGER spacecraft. This infrared diode neodymium laser, designed as a laser altimeter for a Mercury Orbiter mission, was able to communicate across a distance of roughly 15,000,000 miles (24,000,000 kilometers) as the craft neared Earth on a fly by in May of 2005. The previous record had been set with a one-way detection of laser light from Earth by the Galileo Probe as two ground-based lasers were seen from 6,000,000 kilometers by the outbound probe in 1992. Researchers used a white LED based space lighting system for indoor local area network communications.

Referring now to FIG. 129, there is illustrated a block diagram of a free-space optics system using orbital angular momentum and multilevel overlay modulation according to the present disclosure. The OAM twisted signals, in addition to being transmitted over fiber, may also be transmitted using free optics. In this case, the transmission signals are generated within transmission circuitry 12902 at each of the FSO transceivers 12904. Free-space optics technology is based on the connectivity between the FSO based optical wireless units, each consisting of an optical transceiver 12904 with a transmitter 12902 and a receiver 12906 to provide full duplex open pair and bidirectional closed pairing capability. Each optical wireless transceiver unit 12904 additionally includes an optical source 12908 plus a lens or telescope 12910 for transmitting light through the atmosphere to another lens 12910 receiving the information. At this point, the receiving lens or telescope 12910 connects to a high sensitivity receiver 12906 via optical fiber 12912. The transmitting transceiver 12904a and the receiving transceiver 12904b have to have line of sight to each other. Trees, buildings, animals, and atmospheric conditions all can hinder the line of sight needed for this communications medium. Since line of sight is so critical, some systems make use of beam divergence or a diffused beam approach, which involves a large field of view that tolerates substantial line of sight interference without significant impact on overall signal quality. The system may also be equipped with auto tracking mechanism 12914 that maintains a tightly focused beam on the receiving transceiver 12904b, even when the transceivers are mounted on tall buildings or other structures that sway.

The modulated light source used with optical source 12908 is typically a laser or light emitting diode (LED) providing the transmitted optical signal that determines all the transmitter capabilities of the system. Only the detector sensitivity within the receiver 12906 plays an equally important role in total system performance. For telecommunications purposes, only lasers that are capable of being modulated at 20 Megabits per second to 2.5 Gigabits per second can meet current marketplace demands. Additionally, how the device is modulated and how much modulated power is produced are both important to the selection of the device. Lasers in the 780-850 nm and 1520-1600 nm spectral bands meet frequency requirements.

Commercially available FSO systems operate in the near IR wavelength range between 750 and 1600 nm, with one or two systems being developed to operate at the IR wavelength of 10,000 nm. The physics and transmissions properties of optical energy as it travels through the atmosphere are similar throughout the visible and near IR wavelength range, but several factors that influence which wavelengths are chosen for a particular system.

The atmosphere is considered to be highly transparent in the visible and near IR wavelength. However, certain wavelengths or wavelength bands can experience severe absorption. In the near IR wavelength, absorption occurs primarily in response to water particles (i.e., moisture) which are an inherent part of the atmosphere, even under clear weather conditions. There are several transmission windows that are nearly transparent (i.e., have an attenuation of less than 0.2 dB per kilometer) within the 700-10,000 nm wavelength range. These wavelengths are located around specific center wavelengths, with the majority of free-space optics systems designed to operate in the windows of 780-850 nm and 1520-1600 nm.

Wavelengths in the 780-850 nm range are suitable for free-space optics operation and higher power laser sources may operate in this range. At 780 nm, inexpensive CD lasers may be used, but the average lifespan of these lasers can be an issue. These issues may be addressed by running the lasers at a fraction of their maximum rated output power which will greatly increase their lifespan. At around 850 nm, the optical source 12908 may comprise an inexpensive, high performance transmitter and detector components that are readily available and commonly used in network transmission equipment. Highly sensitive silicon (SI) avalanche photodiodes (APD) detector technology and advanced vertical cavity emitting laser may be utilized within the optical source 12908.

VCSEL technology may be used for operation in the 780 to 850 nm range. Possible disadvantage of this technology includes beam detection through the use of a night vision scope, although it is still not possible to demodulate a perceived light beam using this technique.

Wavelengths in the 1520-1600 nm range are well-suited for free-space transmission, and high-quality transmitter and detector components are readily available for use within the optical source block 12908. The combination of low attenuation and high component availability within this wavelength range makes the development of wavelength division multiplexing (WDM) free-space optics systems feasible. However, components are generally more expensive, and detectors are typically less sensitive and have a smaller receive surface area when compared with silicon avalanche photodiode detectors that operator at the 850 nm wavelength. These wavelengths are compatible with erbium-doped fiber amplifier technology, which is important for high power (greater than 500 milliwatt) and high data rate (greater than 2.5 Gigabytes per second) systems. Fifty to 65 times as much power can be transmitted at the 1520-1600 nm wavelength than can be transmitted at the 780-850 nm wavelength for the same eye safety classification. Disadvantages of these wavelengths include the inability to detect a beam with a night vision scope. The night vision scope is one technique that may be used for aligning the beam through the alignment circuitry 12914. Class 1 lasers are safe under reasonably foreseeable operating conditions including the use of optical instruments for intrabeam viewing. Class 1 systems can be installed at any location without restriction.

Another potential optical source 12908 comprised Class 1M lasers. Class 1M laser systems operate in the wavelength range from 302.5 to 4000 nm, which is safe under reasonably foreseeable conditions, but may be hazardous if the user employs optical instruments within some portion of the beam path. As a result, Class 1M systems should only be installed in locations where the unsafe use of optical aids can be prevented. Examples of various characteristics of both Class 1 and Class 1M lasers that may be used for the optical source 12908 are illustrated in Table 9 below.

TABLE 9

| Laser Classification | Power (mW) | Aperture Size (mm) | Distance (m) | Power Density (mW/cm$^2$) |
|---|---|---|---|---|
| 850-nm Wavelength | | | | |
| Class 1 | 0.78 | 7 | 14 | 2.03 |
|  |  | 50 | 2000 | 0.04 |
| Class 1M | 0.78 | 7 | 100 | 2.03 |
|  | 500 | 7 | 14 | 1299.88 |
|  |  | 50 | 2000 | 25.48 |
| 1550-nm Wavelength | | | | |
| Class 1 | 10 | 7 | 14 | 26.00 |
|  |  | 25 | 2000 | 2.04 |
| Class 1M | 10 | 3.5 | 100 | 103.99 |
|  | 500 | 7 | 14 | 1299.88 |
|  |  | 25 | 2000 | 101.91 |

The 10,000 nm wavelength is relatively new to the commercial free space optic arena and is being developed because of better fog transmission capabilities. There is presently considerable debate regarding these characteristics because they are heavily dependent upon fog type and duration. Few components are available at the 10,000 nm wavelength, as it is normally not used within telecommunications equipment. Additionally, 10,000 nm energy does not penetrate glass, so it is ill-suited to behind window deployment.

Within these wavelength windows, FSO systems should have the following characteristics. The system should have the ability to operate at higher power levels, which is important for longer distance FSO system transmissions. The system should have the ability to provide high speed modulation, which is important for high speed FSO systems. The system should provide a small footprint and low power consumption, which is important for overall system design and maintenance. The system should have the ability to operate over a wide temperature range without major performance degradations such that the systems may prove useful for outdoor systems. Additionally, the mean time between failures should exceed 10 years. Presently existing FSO systems generally use VCSELS for operation in the shorter IR wavelength range, and Fabry-Pérot or distributed feedback lasers for operation in the longer IR wavelength range. Several other laser types are suitable for high performance FSO systems.

A free-space optics system using orbital angular momentum processing and multi-layer overlay modulation would provide a number of advantages. The system would be very convenient. Free-space optics provides a wireless solution to a last-mile connection, or a connection between two buildings. There is no necessity to dig or bury fiber cable. Free-space optics also requires no RF license. The system is upgradable, and its open interfaces support equipment from a variety of vendors. The system can be deployed behind windows, eliminating the need for costly rooftop right. It is also immune to radiofrequency interference or saturation. The system is also fairly speedy. The system provides 2.5 Gigabits per second of data throughput. This provides ample bandwidth to transfer files between two sites. With the growth in the size of files, free-space optics provides the necessary bandwidth to transfer these files efficiently.

Free-space optics also provides a secure wireless solution. The laser beam cannot be detected with a spectral analyzer or RF meter. The beam is invisible, which makes it difficult to find. The laser beam that is used to transmit and receive the data is very narrow. This means that it is almost impossible to intercept the data being transmitted. One would have to be within the line of sight between the receiver and the transmitter in order to be able to accomplish this feat. If this occurs, this will alert the receiving site that a connection has been lost. Thus, minimal security upgrades would be required for a free-space optics system.

However, there are several weaknesses with free-space optics systems. The distance of a free-space optics system is very limited. Currently operating distances are approximately within 2 kilometers. Although this is a powerful system with great throughput, the limitation of distance is a big deterrent for full-scale implementation. Additionally, all systems require line of sight be maintained at all times during transmission. Any obstacle, be it environmental or animals can hinder the transmission. Free-space optic technology must be designed to combat changes in the atmosphere which can affect free-space optic system performance capacity.

Something that may affect a free-space optics system is fog. Dense fog is a primary challenge to the operation of free-space optics systems. Rain and snow have little effect on free-space optics technology, but fog is different. Fog is a vapor composed of water droplets which are only a few hundred microns in diameter but can modify light characteristics or completely hinder the passage of light through a combination of absorption, scattering, and reflection. The primary answer to counter fog when deploying free-space optic based wireless products is through a network design that shortens FSO linked distances and adds network redundancies.

Absorption is another problem. Absorption occurs when suspended water molecules in the terrestrial atmosphere extinguish photons. This causes a decrease in the power density (attenuation) of the free space optics beam and directly affects the availability of the system. Absorption occurs more readily at some wavelengths than others. However, the use of appropriate power based on atmospheric conditions and the use of spatial diversity (multiple beams within an FSO based unit), helps maintain the required level of network availability.

Solar interference is also a problem. Free-space optics systems use a high sensitivity receiver in combination with a larger aperture lens. As a result, natural background light can potentially interfere with free-space optics signal reception. This is especially the case with the high levels of background radiation associated with intense sunlight. In some instances, direct sunlight may case link outages for periods of several minutes when the sun is within the receiver's field of vision. However, the times when the receiver is most susceptible to the effects of direct solar illumination can be easily predicted. When direct exposure of the equipment cannot be avoided, the narrowing of receiver field of vision and/or using narrow bandwidth light filters can improve system performance. Interference caused by sunlight reflecting off of a glass surface is also possible.

Scattering issues may also affect connection availability. Scattering is caused when the wavelength collides with the scatterer. The physical size of the scatterer determines the type of scattering. When the scatterer is smaller than the wavelength, this is known as Rayleigh scattering. When a scatterer is of comparable size to the wavelengths, this is known as Mie scattering. When the scattering is much larger than the wavelength, this is known as non-selective scattering. In scattering, unlike absorption, there is no loss of energy, only a directional redistribution of energy that may have significant reduction in beam intensity over longer distances.

Physical obstructions such as flying birds or construction cranes can also temporarily block a single beam free space optics system, but this tends to cause only short interruptions. Transmissions are easily and automatically resumed when the obstacle moves. Optical wireless products use multibeams (spatial diversity) to address temporary abstractions as well as other atmospheric conditions, to provide for greater availability.

The movement of buildings can upset receiver and transmitter alignment. Free-space optics based optical wireless offerings use divergent beams to maintain connectivity. When combined with tracking mechanisms, multiple beam FSO based systems provide even greater performance and enhanced installation simplicity.

Scintillation is caused by heated air rising from the Earth or man-made devices such as heating ducts that create temperature variations among different pockets of air. This can cause fluctuations in signal amplitude, which leads to "image dancing" at the free-space optics based receiver end. The effects of this scintillation are called "refractive turbulence." This causes primarily two effects on the optical beams. Beam wander is caused by the turbulent eddies that are no larger than the beam. Beam spreading is the spread of an optical beam as it propagates through the atmosphere.

Referring now to FIGS. 130-133, in order to achieve higher data capacity within optical links, an additional degree of freedom from multiplexing multiple data channels must be exploited. Moreover, the ability to use two different orthogonal multiplexing techniques together has the potential to dramatically enhance system performance and increased bandwidth.

One multiplexing technique which may exploit the possibilities is mode division multiplexing (MDM) using orbital angular momentum (OAM). OAM mode refers to laser beams within a free-space optical system or fiber-optic system that have a phase term of $e^{il\varphi}$ in their wave fronts, in which $\varphi$ is the azimuth angle and l determines the OAM value (topological charge). In general, OAM modes have a "donut-like" ring shaped intensity distribution. Multiple spatial collocated laser beams, which carry different OAM values, are orthogonal to each other and can be used to transmit multiple independent data channels on the same wavelength. Consequently, the system capacity and spectral efficiency in terms of bits/S/Hz can be dramatically increased. Free-space communications links using OAM may support 100 Tbits/capacity. Various techniques for implementing this as illustrated in FIGS. 130-133 include a combination of multiple beams 13002 having multiple different OAM values 13004 on each wavelength. Thus, beam 13002 includes OAM values, OAM1 and OAM4. Beam 13006 includes OAM value 2 and OAM value 5. Finally, beam 13008 includes OAM3 value and OAM6 value. Referring now to FIG. 131, there is illustrated a single beam wavelength 13110 using a first group of OAM values 13112 having both a positive OAM value 13112 and a negative OAM value 13114. Similarly, OAM2 value may have a positive value 13116 and a negative value 13118 on the same wavelength 13110. While mode division multiplexing of OAM modes is described above, other orthogonal functions may be used with mode division multiplexing such as Laguerre Gaussian functions, Hermite Gaussian functions, Jacobi functions, Gegenbauer functions, Legendre functions and Chebyshev functions.

FIG. 132 illustrates the use of a wavelength 13220 having polarization multiplexing of OAM value. The wavelength 13220 can have multiple OAM values 13222 multiplexed thereon. The number of available channels can be further increased by applying left or right handed polarization to the OAM values. Finally, FIG. 133 illustrates two groups of concentric rings 13360, 13362 for a wavelength having multiple OAM values.

Wavelength distribution multiplexing (WDM) has been widely used to improve the optical communication capacity within both fiber-optic systems and free-space communication system. OAM mode/mode division multiplexing and WDM are mutually orthogonal such that they can be combined to achieve a dramatic increase in system capacity. Referring now to FIG. 134, there is illustrated a scenario where each WDM channel 13402 contains many orthogonal OAM beam 13404. Thus, using a combination of orbital angular momentum with wave division multiplexing, a significant enhancement in communication link to capacity may be achieved. By further combining polarization multiplexing with a combination of MDM and WDM even further increased in bandwidth capacity may be achieved from the +/− polarization values being added to the mode and wavelength multiplexing.

Current optical communication architectures have considerable routing challenges. A routing protocol for use with free-space optic system must take into account the line of sight requirements for optical communications within a free-space optics system. Thus, a free-space optics network must be modeled as a directed hierarchical random sector geometric graph in which sensors route their data via multi-hop paths to a base station through a cluster head. This is a new efficient routing algorithm for local neighborhood discovery and a base station uplink and downlink discovery algorithm. The routing protocol requires order O log(n) storage at each node versus order O(n) used within current techniques and architectures.

Current routing protocols are based on link state, distance vectors, path vectors, or source routing, and they differ from the new routing technique in significant manners. First, current techniques assume that a fraction of the links are bidirectional. This is not true within a free-space optic network in which all links are unidirectional. Second, many current protocols are designed for ad hoc networks in which the routing protocol is designed to support multi-hop communications between any pair of nodes. The goal of the sensor network is to route sensor readings to the base station. Therefore, the dominant traffic patterns are different from those in an ad hoc network. In a sensor network, node to base stations, base station to nodes, and local neighborhood communication are mostly used.

Recent studies have considered the effect of unidirectional links and report that as many as 5 percent to 10 percent of links and wireless ad hoc networks are unidirectional due to various factors. Routing protocols such as DSDV and AODV use a reverse path technique, implicitly ignoring such unidirectional links and are therefore not relevant in this scenario. Other protocols such as DSR, ZRP, or ZRL have been designed or modified to accommodate unidirectionality by detecting unidirectional links and then providing bidirectional abstraction for such links. Referring now to FIG. 135, the simplest and most efficient solution for dealing with unidirectionality is tunneling, in which bidirectionality is emulated for a unidirectional link by using bidirectional links on a reverse back channel to establish the tunnel. Tunneling also prevents implosion of acknowledgement packets and looping by simply pressing link layer acknowledgements for tunneled packets received on a unidirectional link. Tunneling, however, works well in mostly bidirectional networks with few unidirectional links.

Within a network using only unidirectional links such as a free-space optical network, systems such as that illustrated in FIGS. 135 and 136 would be more applicable. Nodes within a unidirectional network utilize a directional transmit 13502 transmitting from the node 13500 in a single, defined direction. Additionally, each node 13500 includes an omnidirectional receiver 13504 which can receive a signal coming to the node in any direction. Also, as discussed here and above, the node 13500 would also include a 0 log(n) storage 13506. Thus, each node 13500 provide only unidirectional communications links. Thus, a series of nodes 13500 as illustrated in FIG. 93 may unidirectionally communicate with any other node 13500 and forward communication from one desk location to another through a sequence of interconnected nodes.

Topological charge may be multiplexed to the wavelength for either linear or circular polarization. In the case of linear polarizations, topological charge would be multiplexed on vertical and horizontal polarization. In case of circular polarization, topological charge would be multiplexed on left hand and right-hand circular polarizations.

The topological charges can be created using Spiral Phase Plates (SPPs) such as that illustrated in FIG. 17E, phase mask holograms or a Spatial Light Modulator (SLM) by adjusting the voltages on SLM which creates properly varying index of refraction resulting in twisting of the beam with a specific topological charge. Different topological charges can be created and muxed together and de-muxed to separate charges.

As Spiral Phase plates can transform a plane wave ($\ell=0$) to a twisted wave of a specific helicity (i.e. l=+1), Quarter Wave Plates (QWP) can transform a linear polarization (s=0) to circular polarization (i.e. s=+1).

Cross talk and multipath interference can be reduced using Multiple-Input-Multiple-Output (MIMO).

Most of the channel impairments can be detected using a control or pilot channel and be corrected using algorithmic techniques (closed loop control system).

Multiplexing of the topological charge to the RF as well as free space optics in real time provides redundancy and better capacity. When channel impairments from atmospheric disturbances or scintillation impact the information signals, it is possible to toggle between free space optics to RF and back in real time. This approach still uses twisted waves on both the free space optics as well as the RF signal. Most of the channel impairments can be detected using a control or pilot channel and be corrected using algorithmic techniques (closed loop control system) or by toggling between the RF and free space optics.

In a further embodiment illustrated in FIG. 137, both RF signals and free space optics may be implemented within a dual RF and free space optics mechanism 13702. The dual RF and free space optics mechanism 13702 include a free space optics projection portion 13704 that transmits a light wave having an orbital angular momentum applied thereto with multilevel overlay modulation and a RF portion 13706 including circuitry necessary for transmitting information with orbital angular momentum and multilayer overlay on an RF signal 13710. The dual RF and free space optics mechanism 13702 may be multiplexed in real time between the free space optics signal 13708 and the RF signal 13710 depending upon operating conditions. In some situations, the free space optics signal 13708 would be most appropriate for transmitting the data. In other situations, the free space optics signal 13708 would not be available and the RF signal 13710 would be most appropriate for transmitting data. The dual RF and free space optics mechanism 13702 may multiplex in real time between these two signals based upon the available operating conditions.

Multiplexing of the topological charge to the RF as well as free space optics in real time provides redundancy and better capacity. When channel impairments from atmospheric disturbances or scintillation impact the information signals, it is possible to toggle between free space optics to RF and back in real time. This approach still uses twisted waves on both the free space optics as well as the RF signal. Most of the channel impairments can be detected using a control or pilot channel and be corrected using algorithmic techniques (closed loop control system) or by toggling between the RF and free space optics.

Quantum Communication Using OAM

OAM has also received increasing interest for its potential role in the development of secure quantum communications that are based on the fundamental laws of quantum mechanics (i.e., quantum no cloning theorem). One of the examples is high dimensional quantum key distribution (QKD) QKD systems have conventionally utilized the polarization or phase of light for encoding. The original proposal for QKD (i.e., the BB 84 protocol of Bennett and Brassard) encodes information on the polarization states and so only allow one bit of information to be impressed onto each photon. The benefit of using OAM is that OAM states reside in an infinite dimensional Hilbert space, implying the possibility of encoding multiple bits of information on an individual photon. Similar to the use of OAM multiplexing in classical optical communications, the secure key rate can be further increased simultaneous encoding of information in different domains is implemented through making use of high dimensional entanglement. The addition to the advantages of a large alphabet for information encoding, the security of keys generated by an OAM-based QKD system have been shown to be improved due to the use of a large Hilbert space, which indicates increase robustness of the QKD system against eavesdropping.

FIG. 138 illustrates a seven-dimensional QKD link based on OAM encoding. FIG. 139 shows the two complementary seven-dimensional bases used for information encoding. Recent QKD systems have been demonstrated to operate at a secure key rate of up to 1 Mb/s. However, in order to support an OAM-based QKD system with a higher secure key rate, the development of a OAM generation methods with speeds higher than MHz would be required. Another challenge arises from the efficiency inch sorting single photons in the OAM basis, although the current OAM sorting approach allows an OAM separation efficiency of greater than 92%. Additionally, adverse channel conditions pose a critical challenge. For a free space QKD system employing OAM states, atmospheric turbulence that distorts the phase front of an OAM state may significantly degrade the information content of the transmitted OAM light field.

OAM Based Networking Functions

In addition to the potential applications for static point to point data transmission, the unique way front structure of OAM beams may also enable some networking functions by manipulating the phase using reconfigurable spatial light modulators (SLMs) or other light projecting technologies.

Data Swapping

Data exchange is a useful function in an OAM-based communication system. A pair of data channels on different OAM states can exchange their data in a simple manner with the assistance of a reflective phase hologram as illustrated in FIG. 140. If two OAM beams 14002, 14004, e.g., OAM beams with $\ell=+L_1$ and $+L_2$, which carry two independent data streams 14006, 14008, are launched onto a reflective SLM 14010 loaded with a spiral phase pattern with an order of −(L1+L2), the data streams will swap between the two OAM channels. The phase profile of the SLM will change these two OAM beams to $\ell = -\ell_2$ and $\ell = -\ell_1$, respectively. In addition, each OAM beam will change to its opposite charge under the reflection effect. As a result, the channel on $\ell = +\ell_1$ is switched to $\ell = +\ell_2$ and vice versa, which indicates that the data on the two OAM channels is exchanged. FIG. 140 shows the data exchange between $\ell = +6$ 14012 and $\ell = 8$ 14014 using a phase pattern on the order of $\ell = -14$ on a reflective SLM 14010. A power penalty of approximately 0.9 dB is observed when demonstrating this in the experiment.

An experiment further demonstrated that the selected data swapping function can handle more than two channels. Among multiple multiplexed OAM beams, any two OAM beams can be selected to swap their data without affecting the other channels. In general, reconfigurable optical add/drop multiplexers (ROADM) are important function blocks in WDM networks. A WDM RODAM is able to selectively drop a given wavelength channel and add in a different channel at the same wavelength without having to detect all pass-through channels. A similar scheme can be implemented in an OAM multiplexed system to selectively drop and add a data channel carried on a given OAM beam. One approach to achieve this function is based on the fact that OAM beams generally have a distinct intensity profile when compared to a fundamental Gaussian beam.

Referring now to FIGS. 141 and 142 there is illustrated the manner for using a ROADM for exchanging data channels. The example of FIG. 142 illustrates SLM's and spatial filters. The principle of an OAM-based ROADM uses three stages: down conversion, add/drop and up conversion. The down conversion stage transforms at step 14102 the input multiplexed OAM modes 14202 (donut like transverse intensity profiles 14204) into a Gaussian light beam with $\ell = 0$ (a spotlight transverse intensity profile 14206). After the down conversion at step 11002, the selected OAM beam becomes a Gaussian beam while the other beams remain OAM but have a different $\ell$ state. The down converted beams 14206 are reflected at step 11004 by a specially designed phase pattern 14208 that has different gratings in the center and in the outer ring region. The central and outer regions are used to redirect the Gaussian beam 14206 in the center (containing the drop channel 14210) and the OAM beams with a ring-shaped (containing the pass-through channels) in different directions. Meanwhile, another Gaussian beam 14212 carrying a new data stream can be added to the pass-through OAM beams (i.e., add channel). Following the selective manipulation, an up-conversion process is used at step 14106 for transforming the Gaussian beam back to an OAM beam. This process recovers the $\ell$ states of all of the beams. FIG. 143 illustrates the images of each step in the add/drop of a channel carried an OAM beam with $\ell = +2$. Some other networking functions in OAM based systems have also been demonstrated including multicasting, 2 by 2 switching, polarization switching and mode filtering.

In its fundamental form, a beam carrying OAM has a helical phase front that creates orthogonality and hence is distinguishable from other OAM states. Although other mode groups (e.g., Hermite-Gaussian modes, etc.) also have orthogonality and can be used for mode multiplexing, OAM has the convenient advantage of its circular symmetry which is matched to the geometry of most optical systems. Indeed, many free-space data link demonstrations attempt to use OAM-carrying modes since such modes have circular symmetry and tend to be compatible with commercially available optical components. Therefore, one can consider that OAM is used more as a technical convenience for efficient multiplexing than as a necessarily "better" type of modal set.

The use of OAM multiplexing in fiber is potentially attractive. In a regular few mode fiber, hybrid polarized OAM modes can be considered as fiber eigenmodes. Therefore, OAM modes normally have less temporal spreading as compared to LP mode basis, which comprise two eigenmode components each with a different propagation constant. As for the specially designed novel fiber that can stably propagate multiple OAM states, potential benefits could include lower receiver complexity since the MIMO DSP is not required. Progress can be found in developing various types of fiber that are suitable for OAM mode transmission. Recently demonstrated novel fibers can support up to 16 OAM states. Although they are still in the early stages, there is the possibility that further improvement of performance (i.e., larger number of "maintained" modes and lower power loss) will be achieved.

OAM multiplexing can be useful for communications in RF communications in a different way than the traditional spatial multiplexing. For a traditional spatial multiplexing system, multiple spatially separated transmitter and receiver aperture pairs are adopted for the transmission of multiple data streams. As each of the antenna elements receives a different superposition of the different transmitted signals, each of the original channels can be demultiplexed through the use of electronic digital signal processing. The distinction of each channel relies on the spatial position of each antenna pair. However, OAM multiplexing is implemented such that the multiplexed beams are completely coaxial throughout the transmission medium, and only one transmitter and receiver aperture (although with certain minimum aperture sizes) is used. Due to the OAM beam orthogonality provided by the helical phase front, efficient demultiplexing can be achieved without the assist of further digital signal post-processing to cancel channel interference.

Many of the demonstrated communication systems with OAM multiplexing use bulky and expensive components that are not necessarily optimized for OAM operation. As was the case for many previous advances in optical communications, the future of OAM would greatly benefit from advances in the enabling devices and subsystems (e.g., transmitters, (de)multiplexers and receivers). Particularly with regard to integration, this represents significant opportunity to reduce cost and size and to also increase performance.

Orthogonal beams using for example OAM, Hermite Gaussian, Laguerre Gaussian, spatial Bessel, Prolate spheroidal or other types of orthogonal functions may be multiplexed together to increase the amount of information transmitted over a single communications link. The structure for multiplexing the beams together may use a number of different components. Examples of these include spatial light modulators (SLMs); micro electromechanical systems (MEMs); digital light processers (DLPs); amplitude masks; phase masks; spiral phase plates; Fresnel zone plates; spiral zone plates; spiral phase plates and phase plates.

Multiplexing Using Holograms

Referring now to FIGS. 144 and 145, there are illustrated a block diagram of a circuit for generating a muxed and multiplexed data stream containing multiple new Eigen channels (FIG. 144) for transmission over a communications link (free space, fiber, RF, etc.), and a flow diagram of the operation of the circuit (FIG. 145). Multiple data streams 14402 are received at step 14502 and input to a modulator circuit 14404. The modulator circuit 14404 modulates a signal with the data stream at step 14504 and outputs these signals to the orthogonal function circuit 14406. The orthogonal function circuit 14406 applies a different orthogonal function to each of the data streams at step 14506. These orthogonal functions may comprise orbital angular momentum functions, Hermite Gaussian functions, Laguerre Gaussian functions, prolate spheroidal functions, Bessel functions or any other types of orthogonal functions. Each of the data streams having an orthogonal function applied thereto are applied to the mux circuit 14498. The mux circuit 14498 performs a spatial combination of multiple orthogonal signals onto a same physical bandwidth at step 14508. Thus, a single signal will include multiple orthogonal data streams that are all located within the same physical bandwidth. A plurality of these muxed signals are applied to the multiplexing circuit 14410. The multiplexing circuit 14410 multiplexes multiple muxed signals onto a same frequency or wavelength at step 14510. Thus, the multiplexing circuit 14410 temporally multiplexes multiple signals onto the same frequency or wavelength. The muxed and multiplexed signal is provided to a transmitter 14412 such that the signal 14414 may be transmitted at step 14512 over a communications link (Fiber, FSO, RF, etc.).

Referring now to FIGS. 146 and 147, there is illustrated a block diagram (FIG. 146) of the receiver side circuitry and a flow diagram (FIG. 147) of the operation of the receiver side circuitry associated with the circuit of FIG. 144. A received signal 14602 is input to the receiver 14604 at step 14702. The receiver 14514 provides the received signal 14602 to the de-multiplexer circuit 14606. The de-multiplexer circuit 14606 separates the temporally multiplexed received signal 14602 into multiple muxed signals at step 14704 and provides them to the de-mux circuit 14608. As discussed previously with respect to FIGS. 144 and 145, the de-multiplexer circuit 14606 separates the muxed signals that are temporally multiplexed onto a same frequency or wavelength. The de-mux circuit 14608 separates (de-muxes) the multiple orthogonal data streams at step 14706 from the same physical bandwidth. The multiple orthogonal data streams are provided to the orthogonal function circuit 14610 that removes the orthogonal function at step 14708. The individual data streams may then be demodulated within the demodulator circuit 14612 at step 14710 and the multiple data streams 14614 provided for use.

Thus, the above described process enables multiple data streams to be first placed within a same physical bandwidth to create a muxed signal of orthogonal data streams. Multiple of these muxed signals may then be multiplexed onto a same frequency or wavelength in order to provide more information on a same communications link. Each orthogonal function within the muxed signals that are then multiplexed together represents a new Eigen channels that may carry a unique information stream thus greatly increasing the amount of data which may be transmitted over the communications link. As described here and above the communications link may comprise free space optical, fiber, RF or any other communication structure. The manner for muxing and multiplexing the data may also use any of the processing techniques described herein above.

Spin-Orbital Entanglement

Google recently announced that they had achieved quantum supremacy with 53 qubits (base-2 binaries or radix-2), corresponding to a computational state-space of dimension $2^{53}$ (about $10^{16}$). Google claimed to perform computations that took 200 seconds on their quantum processor that would have taken 10,000 years to accomplish on a classical supercomputer. However, achieving superposition and entanglement of 53 qubits is not an easy task given the environmental noise that decoheres the entangled qubits. Qubits are state-2 binary systems constructed from superposition of two orthogonal binary basis. Improved operation of a quantum computer can be made using multi-dimensional qudits (not qubits) having greater than two states that are created as described herein. The hyperentanglement process applies more than two states to each photon using OAM or other processing that creates greater than two orthogonal states to create hyperentangled qudits 14808. The present disclosure describes a process in which one can achieve a similar computational dimension with much lower number of qudits (not qubits) where each qudit is of a higher radix (greater than 2) using photonics system (i.e. 16 qudits with radix-10). As shown in FIG. 148, any two-state system 14802 can be used as a qubit 14804 and they can be used to create hyper-entanglement of qudits 14808 using a hyper-entanglement system 14806. The hype-entanglement system 14806 uses a Free-Space Optical (FSO) Fabry-Perot Etalon that eliminates the need for adaptive optics as described in S. Ashrafi et al. "Hybrid RF & FSO for Defense and 5G Backhaul," IEEE GLOBECOM 2019, which is incorporated herein by reference in its entirety. The described technology uses multiple Orbital Angular Momentum (OAM) modes 14810 as described above as a new degree of freedom for quantum computing and a multi-dimensional QKD as described in U.S. patent application Ser. No. 16/509,301, entitled UNIVERSAL QUANTUM COMPUTER, COMMUNICATION, QKD SECURITY AND QUANTUM NETWORKS USING OAM QU-DITS WITH DLP, filed Jul. 11, 2019; U.S. patent application Ser. No. 16/579,298, entitled ELECTROMAGNETIC KNOT APPLICATIONS IN RADIO WAVES FOR WIRELESS AND PHOTONICS FOR QUANTUM COMPUTING, filed Sep. 23, 2019; U.S. patent application Ser. No. 16/660,246, entitled QUANTUM MECHANICAL FRAMEWORK FOR INTERACTION OF OAM WITH MATTER AND APPLICATIONS IN SOLID STATES, BIOSCIENCES AND QUANTUM COMPUTING, filed Oct. 22, 2019; and U.S. patent application Ser. No. 16/673,447, entitled QUANTUM RESISTANT BLOCKCHAIN WITH MULTI-DIMENSIONAL QUANTUM KEY DISTRIBUTION, filed Nov. 4, 2019 each of which are incorporated herein by reference in their entirety. The convergence of both broadband, secure communications, quantum computing and quantum teleportation is only possible in a photonics realization. Therefore, the use of photonic qudits generated as described herein above allows extending the security and capacity of the quantum teleportation beyond what was achieved by Chinese Micius quantum satellite as described in Jian-Wei Pan, et al. "China's quantum satellite achieves 'spooky action' at record distance," *Science AAAS*, June 2017, which is incorporated herein by reference in its entirety. Both defense and commercial computing industries need such quantum computing systems.

Any two-state system 14802 can be used as a qubit 14804 and used to create hyper-entanglement of qudits 14808. Various types of two-state qubit systems 14902 are shown in FIG. 149. A two-state qubit system 14902 may comprise polarization 14904 (HV, DD, RL) horizontal/vertical, diagonal (45 degree/135 degree) or right and left hand circular polarizations. A two-state qubit system could also be two different spatial modes or paths 14906 (say up and down paths). A two-state qubit system could comprise two different path lengths 14908 (longer path 15004 and shorter path 15006) or earlier photon and a later photon 14910 that are implemented using prisms 15002 as shown generally in FIG. 150.

Referring now to FIG. 151, N-state behavior 15102 can hyper-entangle with a two-state system 15104 to create a hyperentangled output 15106. For example, a resolvable wavelength or frequency can be used for the N-state behavior and those states could have more than two states. Another example is resolvable orbital angular momentum states (OAM) can be used for the N-state behavior and those states could have more than two states. All two-state systems 15104 can be combined with all the n-state systems 15102 into a multi-dimensional hyper-entangled state 15106 to create qudits. A convergence can be achieved of an advanced FSO system for communications, QKD, quantum computing and quantum teleportation with qudits that can perform beyond what was achieved with the Chinese Micius quantum satellite. The quantum gates and new degrees of freedom provided by OAM and other multi-state techniques can be used to create hyper-entangled states and perform quantum computation, multi-dimensional QKD as well as quantum teleportation (transmission of quantum data from one location to another) using qudits with a fewer number of entangled qudits compared to qubits for the same computational state-space dimension.

One way to achieve spin-orbital entanglement is by using a metamaterial. A metamaterial is any material engineered to have a property that is not found in naturally occurring materials. Metamaterials are made from assemblies of multiple elements fashioned from composite materials such as metals and plastics. The materials are usually arranged in repeating patterns, at scales that are smaller than the wavelengths of the phenomena they influence. Metamaterials derive their properties not from the properties of the base materials, but from their newly designed structures. Their precise shape, geometry, size, orientation and arrangement gives them their smart properties capable of manipulating electromagnetic waves: by blocking, absorbing, enhancing, or bending waves, to achieve benefits that go beyond what is possible with conventional materials. Appropriately designed metamaterials can affect waves of electromagnetic radiation or sound in a manner not observed in bulk materials. Those that exhibit a negative index of refraction for particular wavelengths have been the focus of a large amount of research. These materials are known as negative-index metamaterials. The metamaterial could be a dielectric metasurface. These structures are man-made and not found in nature. Metallic metasurfaces produce high loss. Therefore high $n \gg n_0$ dielectric can be used.

Referring now to FIG. 152, SAM-OAM entanglement can also be achieved using q-plates 15202 based on liquid crystals. Both 2-state qubits 15204 and Spin and/or OAM values 15206 are provided to the q-plates 15202 based on liquid crystals to enable the generation of hyper entangled qudits 15208. Such an approach can produce integrated photonics chips that perform quantum processing. One can use a Geometric Phase Metasurface (GPM) which could be a Si-based component. GPMs are usually used for wave-function shaping using spin-control. They perform a nano half-wave plate function that generate a local geometric phase delay. GPMs can have an orientation function $\phi_g = -2\sigma_\pm \theta(x, y)$ which defines a geometric phase of light passing through the metasurface at (x, y) for different spin states of a photon $\sigma_\pm = \pm 1$ (Right/Left hand circular polarization). Multi-dimensional Bell states or GHZ (Greenberger-Horne-Zeilinger) states can also be constructed using qudits.

The GPM can be designed where:

$$\theta(x, y) \to \theta(r, \phi) = \frac{l\phi}{2}$$

GPM adds or subtracts $\Delta l = \pm 1$, one quanta of OAM depending on sign of spin, but it also flips the spin:

$\sigma_+$ = right hand circular $\sigma_-$ = left hand circular

GPM $|\sigma_+\rangle |l\rangle \to |\sigma_-\rangle |l+\Delta l\rangle$

GPM $|\sigma_-\rangle |l\rangle \to |\sigma_+\rangle |l-\Delta l\rangle$

Starting with a Gaussian $l = l_0 = 0$ with linear horizontal (H) polarization:

$$|H\rangle|l_0\rangle \to \frac{1}{\sqrt{2}}[|\sigma_-\rangle|l_0+\Delta l\rangle + |\sigma_+\rangle|l_0-\Delta l\rangle]$$

Similarly $$|V\rangle|l_0\rangle \to \frac{1}{\sqrt{2}i}[|\sigma_-\rangle|l_0+\Delta l\rangle - |\sigma_+\rangle|l_0-\Delta l\rangle]$$

The first two Bell states can then be recovered:

$$|\Psi^+\rangle = \frac{1}{\sqrt{2}}[|\sigma_+\rangle|l_{-1}\rangle + |\sigma_-\rangle|l_{+1}\rangle]$$

$$|\Psi^-\rangle = \frac{1}{\sqrt{2}}[|\sigma_+\rangle|l_{-1}\rangle - |\sigma_-\rangle|l_{+1}\rangle]$$

Fidelity between recovered density $\tilde{\rho}$ and theoretical $\rho$ is:

$$F(\rho, \tilde{\rho}) = Tr\left(\sqrt{\tilde{\rho}^{\frac{1}{2}}\rho\tilde{\rho}^{\frac{1}{2}}}\right)$$

By flipping the GPM
(l can flip sign $\Delta l = -1$) for $\overline{GPM}$ flipped $\overline{GPM}$ $|\sigma_+ l\rangle \to |\sigma_-\rangle |l-\Delta l\rangle$ $\overline{GPM}$ $|\sigma_- l\rangle \to |\sigma_+\rangle |l+\Delta l\rangle$ The second two Bell states can then be recovered:

$$|\Phi^+\rangle = \frac{1}{\sqrt{2}}[|\sigma_+\rangle|l_{+1}\rangle + |\sigma_-\rangle|l_{-1}\rangle]$$

$$|\Phi^-\rangle = \frac{1}{\sqrt{2}}[|\sigma_+\rangle|l_{+1}\rangle - |\sigma_-\rangle|l_{-1}\rangle]$$

Referring now to FIG. 153, this can also be extended to hyper-entangled states with qudits and in fact construct C-Not gate 15302 with Polarization as a control bit 15304 and helicity as target bit 15306 (this can also do that in reverse) or even beam path as the target bit 15306 and combine the methods as shown in FIG. 154:

$|0\rangle_n = |H\rangle |U\rangle |l_+\rangle$ $|1\rangle_n = |V\rangle |D\rangle |l_-\rangle$ Where n=number of qudits
In general, we can have a hyper-entangled state.

$$|\Psi\rangle_n = \frac{1}{\sqrt{2}}|0\rangle_n - \frac{1}{\sqrt{2}}|1\rangle_n$$

Polarization as control bit, OAM as target:

$$H = 1$$
$$V = 0$$
$$\alpha|H\rangle|l_+\rangle + \beta|V\rangle|l_-\rangle \to \alpha|H\rangle|l_+\rangle +$$
$$\beta|V\rangle|l_+\rangle = (\alpha|H\rangle + \beta|V\rangle)|l_+\rangle$$

$$|H\rangle|l_0\rangle = \frac{1}{\sqrt{2}}[\sigma_R\rangle + |\sigma_L\rangle]|l_0\rangle \to \frac{1}{\sqrt{2}}[|\sigma_L\rangle|l_{\Delta l}\rangle + |\sigma_R\rangle|l_{-\Delta l}\rangle]$$

Also $$|V\rangle|l_0\rangle = \frac{1}{\sqrt{2}i}[|\sigma_R\rangle - |\sigma_L\rangle]|l_0\rangle$$

Gives $$\frac{1}{\sqrt{2}}[|\sigma_L\rangle|l_{\Delta l}\rangle - |\sigma_R\rangle|l_{-\Delta l}\rangle]$$

2-Bell states $$|\Psi^\pm\rangle = \frac{1}{\sqrt{2}}[|\sigma_R\rangle|l_{-1}\rangle \pm |\sigma_L\rangle|l_{+1}\rangle]$$

Polarization entanglement $$|\Psi\rangle = \frac{1}{\sqrt{2}}[|H\rangle|V\rangle - |V\rangle|H\rangle]$$

Take $\alpha|H\rangle + \beta|V\rangle$ convert to polarization-path hyper-entangled state $$\alpha|H\rangle|U\rangle + \beta|V\rangle|D\rangle$$

Then do the OAM entanglement on that
Starting with $$\alpha|H\rangle|U\rangle + \beta|V\rangle|D\rangle$$

and ending with this with helicity entanglement $$\alpha|H\rangle|U\rangle|l_+\rangle + \beta|V\rangle|D\rangle|l_-\rangle$$

Qudits $$|\Psi\rangle_n = \frac{1}{\sqrt{2}}[|0\rangle_n - |1\rangle_n]$$

Superposition $$\frac{1}{\sqrt{2}}[|0\rangle \pm e^{i\theta}|1\rangle]$$

Steps with first C-NOT $$[\alpha|l_+\rangle + \beta|l_-\rangle]|H\rangle \to \alpha|l_+\rangle|H\rangle + \beta|l_-\rangle|V\rangle$$

Second C-NOT $$\alpha|l_+\rangle|H\rangle + \beta|l_-\rangle|V\rangle \to [\alpha|H\rangle + \beta|V\rangle]|l_+\rangle$$

Then $$|l_+\rangle \to |G\rangle$$

And outcome $$|l_+\rangle|H\rangle \xrightarrow{QW} \frac{|l_+\rangle}{\sqrt{2}}[|H\rangle - i|V\rangle] \xrightarrow{q-plate} \frac{|G\rangle}{\sqrt{2}}[|H\rangle + i|V\rangle] \to |G\rangle|H\rangle \xrightarrow{QW} |l_-\rangle \xrightarrow{q-plate} |V\rangle \to$$

$$\frac{|l_-\rangle}{\sqrt{2}}[|H\rangle + i|V\rangle] \to \frac{|G\rangle}{\sqrt{2}}[|H\rangle + i|V\rangle] \to |G\rangle|V\rangle$$

For photons, if polarization is used, this will only present a qubit (radix-2). However, if OAM is leveraged, this can present a qudit (higher order radix). This is achieved by applying OAM values to the photons 15404 from the beam splitter 15402 using for example a spiral phase plate 15406. Therefore, for a pump beam of zero-angular momentum multi-dimensional entangled state for 2-photons.

$$|\Psi\rangle = C_{0,0}|00\rangle + C_{1,-1}|1\rangle|-1\rangle + C_{-1,1}|-1\rangle|1\rangle + C_{2,-2}|2\rangle|-2\rangle + C_{-2,2}|-2\rangle$$

Neither photon in this state has a well-defined OAM after parametric down-conversion. The measurement of 1 photon defines its OAM state and projects the second one into the corresponding OAM state.

Two-Photon Interferometry
There are two types of Spontaneous parametric Down-conversion (SPDC).
Type I:
Referring to FIG. 155, non-linear crystal KDP (Potassium dihydrogen phosphate) 15502 with $\chi^2$ optical nonlinearity.

$$\omega_p = \omega_1 + \omega_2 = \omega_i + \omega_s, i = \text{idler}$$

$$k_p = k_1 + k_2 = k_i + k_s, s = \text{signal}$$

Phases of the corresponding wavefunctions match $$|\Psi\rangle = \int_0^{\omega_p} \phi(\omega_1, \omega_0 - \omega_1)|\omega_1\rangle|\omega_0 - \omega_1\rangle d\omega_1$$

Two photons 15504 leave the crystal 15502 with the same polarization but orthogonal to polarization of the pump beam 15506. The photons have OAM applied using holograms 15508 to apply the OAM values rather than the spiral phase plates described in FIG. 154. It will be appreciated that any of the techniques for applying OAM values to signals described herein may be utilized.

Type II:
Referring now to FIG. 156, the two emitted photon pairs 15604 have orthogonal polarizations. This allows polarizations to be used for entanglement achieving hyper-entanglement.

$$|\Psi\rangle = \frac{1}{2}\int_0^{\omega_p} \phi(\omega, \omega_0 - \omega)|\omega\rangle|\omega_0 - \omega\rangle \cdot$$

$$[(|k_1\rangle|k_1'\rangle + e^{i\phi}|k_2\rangle|k_2'\rangle)(|e\rangle|0\rangle + |0\rangle e\rangle)]d\omega$$

Where e=extraordinary axes of nonlinear crystal o=ordinary axes of nonlinear crystal High-Intensity type II phase-matched SPDC 2-photon entanglement with no extra beam splitters as shown in FIG. 157. A laser 15702 generates a beam that is provided to crystal 15704. Two photons from the crystal 15704 are provided to a beam splitter 15706. The split beams are provided to the first and second analyzers 15708 and 15710, respectively. The outputs from the analyzers 15708 and 15710 are provided to photo detectors 15712 and 15714. The outputs of the photo detectors 15712 and 15714 are then each provided to a coincidence counter 15716.

One can generate all four Bell states:

$$|\Psi^{\pm}\rangle = \tfrac{1}{2}[(|HV\rangle \pm |VH\rangle)], |\Phi^{\pm}\rangle = \tfrac{1}{2}[(|HH\rangle \pm |VV\rangle)]$$

This is achieved using the system illustrated in FIG. 158 a UV pump provides a beam 15802 to crystal 15804 providing two different outputs 15806 and 15808 with respect to the first and second photons.

New Two-Crystal Ultra-Bright 2-Photon Entanglement

Referring now to FIG. 159, there is illustrated a line polarized 45° pump 15902. The pump 15902 generates two photons 15904 having different polarizations.

$$\text{2-photons have } |\Psi\rangle = \frac{1}{\sqrt{2}}(|H\rangle|H\rangle + e^{i\phi}|V\rangle|V\rangle)$$

where $\phi$ = adjusted by crystal tilt

One can measure Polarization Mode Dispersion (PMD) which is the difference in propagation rate between two polarizations in a birefringent medium. Entangled short and long distance can be generated by:

$$|\Psi\rangle = \frac{1}{\sqrt{2}}(|S\rangle_p|S\rangle_p + e^{i\phi}|L\rangle_p|L\rangle_p) \quad p = \text{pump}$$

2-photon state pairs $$|\Psi\rangle = a|HH\rangle + b|HV\rangle + c|VH\rangle + d|VV\rangle$$

Entanglement happens because of indistinguishability of HH and VV pairs prior to polarization measurements where H is the Horizontal polarization and V is vertical polarization.

$$|\Psi\rangle = \frac{1}{\sqrt{2}}(|HH\rangle + e^{i\phi}|V\rangle|V\rangle)$$

This is obtained when which crystal a certain photon pair emerges from cannot be determined.

The compensation crystal can be tilted so that $\phi=0$ (relative) is obtained producing:

$$|\Psi\rangle = \frac{1}{\sqrt{2}}(|HH\rangle + |V\rangle|V\rangle)$$

In a two-photon system that are Gaussian input signals:

$$|\Psi_{in}\rangle = (\alpha|H\rangle|V\rangle + \beta e^{i\phi}|V\rangle|H\rangle)\otimes|0\rangle|0\rangle$$

$$\alpha^2 + \beta^2 = 1$$

H: Horizontal polarization

V: Vertical polarization $$|\Phi\rangle_{12345} = \frac{1}{\sqrt{2}}[|H_1\rangle|H_2\rangle|H_3\rangle|H_4\rangle|H_5\rangle + |V_1\rangle|V_2\rangle|V_3\rangle|V_4\rangle|V_5\rangle]$$

The photons can be transferred to a LG mode by SLM (spatial light modulator) based on the polarization of photons.

$$|\Psi_{out}\rangle = \alpha|l_+\rangle|l_-\rangle + e^{i\phi}\beta|l_-\rangle|l_+\rangle$$

If a polarizer is placed after this stage, the following is obtained:

$$|\Psi_{out}\rangle_p = |D\rangle|D\rangle \otimes [\alpha|l_+\rangle|l_-\rangle + e^{i\phi}\beta|l_-|l_+\rangle]$$

Multi-Photon Entanglement

3-Particle GHZ-Entanglement

3-GHZ (Greenberger-Horne-Zeilinger)-states are generalized Bell-states $$|\Phi^{\pm}\rangle = \frac{1}{2}[|H\rangle|H\rangle|H\rangle \pm |V\rangle|V\rangle|V\rangle]$$

$$|\Psi_1^{\pm}\rangle = \frac{1}{2}[|V\rangle|H\rangle|H\rangle \pm |H\rangle|V\rangle|V\rangle]$$

$$|\Psi_2^{\pm}\rangle = \frac{1}{2}[|H\rangle|V\rangle|H\rangle \pm |V\rangle|H\rangle|V\rangle]$$

$$|\Psi_3^{\pm}\rangle = \frac{1}{2}[|H\rangle|H\rangle|V\rangle \pm |V\rangle|V\rangle|H\rangle]$$

$$|\Psi^{\pm}\rangle_{23} = \frac{1}{\sqrt{2}}[|H\rangle|V\rangle \pm |V\rangle|H\rangle]$$

$$|\Phi^{\pm}\rangle_{23} \frac{1}{\sqrt{2}}[|H\rangle|H\rangle \pm |V\rangle|V\rangle]$$

Photon 2 and 3 are measured, projecting their state onto one of the Bell states. Referring now to FIG. 160, there is illustrated a pump laser 16002 providing a beam with H and V polarization to a first entangled proton source 16004 that generates a first pair of protons 16006 and 16008. The proton 16006 is defined by the equation:

$$|\Psi\rangle = \frac{1}{\sqrt{2}}(|H_0\rangle|H_1\rangle + e^{i\theta(\theta)}|V_0\rangle|V_1\rangle)$$

The second proton 16008 is provided to a second entangled proton source 16010 to generate a second pair of entangled protons 16012 and 16014. The proton 16014 is defined by the equation:

$$|\Psi\rangle = \frac{1}{\sqrt{2}}(|H_1\rangle|H_2\rangle|H_3\rangle + e^{i[\theta(\theta)+\phi]}|V_1\rangle|V_2\rangle|V_3\rangle)$$

$$\sigma_x, \sigma_y = -i|H\rangle\langle V| - i|V\rangle\langle H|$$

$$\sigma_z = |H\rangle\langle H| - |V\rangle\langle V|$$

Five-Photon Entanglement

Referring now to FIG. 161, there is illustrated how two-entangled photon pairs 16102, 16104 can be used to generate a four-photon entangled state, which is then combined with a single photon state 16106 to achieve 5-photon entanglement. The single proton 16106 state is defined by:

$$\frac{1}{\sqrt{2}}(H\rangle_1 + V\rangle_2)$$

The entangled proton pairs 16102, 16104 are defined by:

$$|\Phi\rangle_{2345} = \frac{1}{\sqrt{2}}[|H_2\rangle|H_3\rangle|H_4\rangle|H_5\rangle + |V_2\rangle|V_3\rangle|V_4\rangle|V_5\rangle]$$

The single proton state 16106 is entangled with one of the two-entangled proton pairs 16102 in entangle proton source 16108 to generate a first ones 16112 of the 5-proton entanglement. Each of the two-entangled proton pairs are entangled with one another using entangled proton source 16114 to generate a further pair 16112 of the 5-proton entanglement. The final member 16112 of the 5-proton entanglement comes from one of the two-entangled proton pairs.

Entangled states are in Bell-states are:

$$|\Phi^+\rangle_{23} = \frac{1}{\sqrt{2}}[|H\rangle_2|H\rangle_3 + |V\rangle_2|V\rangle_3]$$

$$|\Phi^-\rangle_{23} = \frac{1}{\sqrt{2}}[|H\rangle_2|H\rangle_3 - |V\rangle_2|V\rangle_3]$$

$$|\Psi^+\rangle_{23} = \frac{1}{\sqrt{2}}[|H\rangle_2|V\rangle_3 + |V\rangle_2|H\rangle_3]$$

$$|\Psi^-\rangle_{23} = \frac{1}{\sqrt{2}}[|H\rangle_2|V\rangle_3 - |V\rangle_2|H\rangle_3]$$

Similarly for $|\Phi^+\rangle_{45}$, $|\Phi^-\rangle_{45}$, $|\Psi^+\rangle_{45}$, $|\Psi^-\rangle_{45}$ with index 45

Referring now to FIG. 162, there is illustrated a system for generating five photon-entanglement. A laser 16202 generates a beam through lithium-triborate (LBO) crystal 16204. The beam from Crystal 16204 passes through deformable mirror 16206. A first beam is directed toward deformable mirror 16208, and a second beam is directed toward beta barium borate (BBO) crystal 16210. The first beam is directed from mirror 16208 to polarizing beam splitter 16212. The output from the beam splitter 16212 passes through a delay circuit 16214. The output of the delay circuit 16214 passes through a quarter wave plate 16216 and half wave plate 16218. The output from the halfway plate 16218 is provided to a second polarizing beam splitter 16220 that provides three different outputs. A first output passes through a polarizer 16222 and narrowband filter 16224 to generate first entangled signal $D_1$. The polarizer 16222 is oriented at +/− and quarter wave to allow measurement of +/− or circular polarization. A second output of beam splitter 16220 is output through a second polarizer 16222 and narrowband filter 16224 to provide second entangled signal $D_2$.

The third output is provided to mirror 16226 that is directed toward BBO Crystal 16210. The crystal 16210 provides an output beam that is directed at a mirror 16228 that is directed toward another crystal 16230. The crystal 16230 provides three separate outputs one of which is directed toward a mirror 16232 that is directed back through BBO Crystal 16210. The crystal 16210 then provides an output beam through quarter wave plate 16234 polarizer 16222 and narrowband filter 16224 to generate entangled output $D_5$. The remaining two outputs from Crystal 16230 comprise a first beam applied to quarter wave plate 16236 polarizer 16222 and filter 16224 to provide entangled signal $D_4$. The other output is provided through polarizer 16222 and filter 16224 to provide entangled signal $D_3$.

Six-Photon GHZ-State

Six proton entangled states may be determined according to:

$$|G_6\rangle = \frac{1}{\sqrt{2}}[|H_1\rangle|H_2\rangle|H_3\rangle|H_4\rangle|H_5\rangle|H_6\rangle + |V_1\rangle|V_2\rangle|V_3\rangle|V_4\rangle|V_5\rangle|V_6\rangle]$$

Applying Hadamard to photon 4:

$$\mathbb{H}\,|H_4\rangle = |+_4\rangle$$

$$\mathbb{H}\,|V_4\rangle = |-_4\rangle$$

Four-photon GHZ state (combine 2 and 3 photons)

$$\frac{1}{\sqrt{2}}[|H_1\rangle|H_2\rangle|H_3\rangle|+_4\rangle + |V_1\rangle|V_2\rangle|V_3\rangle|-_4\rangle]$$

Where $$|+\rangle = \frac{1}{\sqrt{2}}[|H\rangle + |V\rangle]$$

$$|-\rangle = \frac{1}{\sqrt{2}}[|H\rangle - |V\rangle]$$

Combine photon 4 and 5, we have six-photon cluster state $$|C_6\rangle = \frac{1}{2}[|H_1\rangle|H_2\rangle|H_3\rangle|H_4\rangle|H_5\rangle|H_6\rangle + |H_1\rangle|H_2\rangle|H_3\rangle|V_4\rangle|V_5\rangle|V_6\rangle + |V_1\rangle|V_2\rangle|V_3\rangle|H_4\rangle|H_5\rangle|H_6\rangle - |V_1\rangle|V_2\rangle|V_3\rangle|V_4\rangle|V_5\rangle|V_6\rangle]$$

FIGS. 163 and 164 illustrate the manner for generating a 6-photon entanglement. FIG. 163 illustrates three two-state entangled pairs 16302, 16304, 16306 are combined to generate the six photon states. Two-state entangled pair 16302 generates the first entangled photon state (1) using the first photon and it second photon is applied to a polarizing beam splitter (PBS) 16308. Two-state entangled pair 16304 provides one of its photon pair to PBS 16308 and it second photon to PBS 16310. To state entangled pair 16306 provides a first photon to PBS 16310 and a second photon as the sixth entangled state (6). PBS 16308 generates the second and third entangled states (2), (3). PBS 16310 generates the fourth and fifth entangled states (4), (5).

FIG. 164 illustrates the circuit for generating the six entangled photon states. Laser 16402 generates a beam provided to LBO crystal 16404. The output of crystal 16404 is reflected from deformable mirror 164062 BBO crystal 16408. Crystal 16408 generates three outputs a first of which is reflected from mirror 16410 to polarizing beam splitter 16412. The first output of the beam splitter 16412 passes through a filter 16414 to generate a first output $D1_R$ and a second output passes through filter 16416 to provide output $D1_T$.

A second output from Crystal 16408 reflects from mirror 16418 through delay circuit 16420. The output of delay circuit 16420 reflects from mirror 16422 as one input to beam splitter 16428. A third output from Crystal 16408 is provided to a second Crystal 16404 that also generates three outputs. A first output reflects from mirror 164262 beam splitter 16428. The beam splitter 16428 generates a first output provided through quarter wave plate 16430, polarizer 16432 and filter 16434 to provide entangled signal $D_2$. A second output from beam splitter 16428 is provided through quarter wave plate 16436, polarizer 16438 and filter 16440 to provide entangled signal $D_3$.

A second output from Crystal 16424 is provided to mirror 164423 delay circuit 16444, mirror 16446 and half wave plate 16448. The signal from the half wave plate 16448 is provided to a beam splitter 16450 along with a reflected signal from mirror 16464 from Crystal 16466 that also generates two different outputs. The first output is provided through quarter wave plate 16452, polarizer 16454 and filter 16456 to provide entangled signal $D_4$. Second output is provided through quarter wave plate 16458, polarizer 16460 and filter 16462 to provide entangled signal $D_5$.

Third output from Crystal 16424 is provided to Crystal 164664 generation of the second signal to beam splitter 16450 as described above. The Crystal 16466 also provides an output to mirror 16468 that is reflected to beam splitter 16470 the outputs from beam splitter 16470 are provided through a filter 16472 to provide entangled signal $D6_T$ and through a filter 16474 to provide entangled signal $D6_R$.

Ten-Photons

FIGS. 165 and 166 illustrate the manner for generating a 10-photon entanglement. FIG. 165 illustrates the manner for generating 10-entangled photon states in a manner similar to those discussed above using similar components. FIG. 166 illustrates the manner for inserting orbital angular momentum or other multi-state signals into the entangle states using spiral wave plates 16602. The entangled photons are generated in a similar manner to that illustrated in FIG. 165. This circuit further includes the spiral wave plates to enable the OAM values to be inserted into the entangled photon states to create hyperentanglement of greater than two states. A combination of greater than n-state photons 19412 with multiphoton entanglement enables the creation of hyper entangled photons that includes a multiple number of photons that each have n-states greater than two that are hyperentangled.

C-NOT operation with multi-photon hyper-entangled qudits with polarization as a control bit:

$$(\alpha|H\rangle+\beta|V\rangle)|l_+\rangle \rightarrow (\alpha|H\rangle|l_+\rangle+\beta|V\rangle|l_-\rangle)$$

Steps $$(\alpha|H\rangle+\beta|V\rangle)\left(\frac{\prod|l_+\rangle+\prod|L\rangle}{\sqrt{2}}\right)$$

Where $$\Pi|l_+\rangle = |l_{+1}\rangle|l_{+2}\rangle|l_{+3}\rangle|l_{+4}\rangle\ldots$$

$$\Pi|l_-\rangle = |l_{-1}\rangle|l_{-2}\rangle|l_{-3}\rangle|l_{-4}\rangle\ldots$$

Then $$(\alpha|H\rangle+\beta|V\rangle)\left(\frac{\prod|l_+\rangle}{\sqrt{2}}\right)$$

gives $$(\alpha|H\rangle e^{-i\frac{\pi}{4}} + \beta|V\rangle e^{i\frac{\pi}{4}})\left(\frac{\prod|l_+\rangle}{\sqrt{2}}\right)$$

and $$(\alpha|H\rangle+\beta|V\rangle)\left(\frac{\prod|l_-\rangle}{\sqrt{2}}\right)$$

gives $$(\alpha|H\rangle e^{i\frac{\pi}{4}} + \beta|V\rangle e^{-i\frac{\pi}{4}})\left(\frac{\prod|l_-\rangle}{\sqrt{2}}\right)$$

$$e^{i\frac{\pi}{4}}\alpha|H\rangle\left[\frac{\prod|l_+\rangle - i\prod|l_i\rangle}{\sqrt{2}}\right] + e^{-i\frac{\pi}{4}}\beta|V\rangle\left[\frac{\prod|l_+\rangle - i\prod|l_i\rangle}{\sqrt{2}}\right]$$

Then $$\alpha|H\rangle\Pi|l_+\rangle + \beta|V\rangle\Pi|l_-\rangle$$

$$\alpha|H\rangle|U\rangle\Pi|l_+\rangle + \beta|V\rangle|D\rangle\Pi|l_-\rangle$$

$$\alpha|H\rangle|U\rangle|S\rangle\Pi|\lambda_i\rangle\Pi|l_+\rangle + \beta|V\rangle|D\rangle|L\rangle\Pi|\lambda_j\rangle\Pi|l_-\rangle$$

Where degrees of freedom are:
U: up beam path
D: down beam path
H: horizontal polarization
V: vertical polarization
$1_-$, $1_+$=negative and positive helicities
S: short or early
L: long or late
$\lambda_i, \lambda_j$: resolvable wavelengths Degrees of Freedom Any two-level quantum system can represent a qubit. Thus, a typical qubit could be a spin-1/2. But experiments with spin-1/2 systems are difficult. Fortunately, photons possess a ready and easily controllable qubit degree of freedom. Spin in quantum electrodynamics has an analog in classical electrodynamics called polarization. However, there are also other methods to make photons carry qubits such as OAM states of photons. These are the manners in which the additional states can be provided to the photons such as spiral phase plates as described in FIG. 166. The following is the list of few degrees of freedom that can be used for quantum computing:

Polarization qubits: The most commonly used photonic qubits are realized using polarization. In this case arbitrary qubit states can be:

For two-photon polarization $HV$ Linear $[|H\rangle, |V\rangle]$ (Fig. 167)

$D\overline{D}$ Diagonal $\left[\frac{1}{\sqrt{2}}(|H\rangle+|V\rangle), \frac{1}{2}(-|H\rangle+|V\rangle)\right]$ (Fig. 168)

$RL$ Circular $\left[\frac{1}{\sqrt{2}}(|H\rangle-i|V\rangle), \frac{1}{2}(|H\rangle-i|V\rangle)\right]$ (Fig. 169)

$|\Psi\rangle_2 = \alpha|H\rangle + \beta|V\rangle$ where H and V stand for horizontal and vertical polarizations respectively. The advantage of using polarization qubits is because of the fact that they can easily be created and manipulated with high precision (at 99% level) by simple linear-optical elements such as polarizing beam splitters (PBS), polarizers and waveplates.

Spatial qubits: A single photon can also appear in two different spatial modes or paths (say up and down paths). The general state reads:

$|\Psi\rangle_2 = \alpha|D\rangle + \beta|U\rangle$

Where U: up beam path and D: down beam path

As shown in FIG. 170, this can be achieved if a single photon exits a beam splitter (BS) 19902, with two output modes D 17004 and U 17006. Any state of spatial qubits can be prepared by using suitable phase shifters and beam splitters. A disadvantage of using spatial qubits is that the coherence between two output modes D and U is sensitive to the relative phase for the two paths and this is difficult to control in long-distance cases.

Time-bin qubits: For a more robust long-distance transmission of quantum information, one can use time-bin qubits. The computational basis consists of two states which are of the same spectral shape, but time shifted by much more than the coherence time: early and late. Referring now to FIG. 171, any state of time-bin qubits 17102 can be realized with a single-photon pulse 17104 sent through an unbalanced Mach-Zehnder interferometer 17106.

$|\Psi\rangle = \frac{1}{\sqrt{2}}(|S\rangle_p|S\rangle_p + e^{i\phi}|L\rangle_p|L\rangle_p)$ $p = \text{pump}$ Frequency or Wavelength-bin qudits: This is a degree of freedom that uses resolved frequencies or wavelength of photonic beam as orthogonal basis.

$|\Psi\rangle_n = \alpha|\lambda_i\rangle + \beta|\lambda_j\rangle$

OAM qudits: This is a degree of freedom that uses resolved OAM modes of photonic beam. However, unlike the two-state polarization, OAM can have many orthogonal resolvable modes and they can lend themselves to creating qudits rather than qubits.

$|\Psi\rangle_n = \alpha|l_+\rangle + \beta|l_-\rangle$

OAM Beams Multiplexing and Demultiplexing

Many approaches for creating OAM beams have been proposed and demonstrated as described herein above. One can obtain a single or multiple OAM beams directly from the output of a laser cavity or can convert a fundamental Gaussian beam into an OAM beam outside a cavity. The converter could be a spiral phase plate, diffractive phase holograms, metamaterials, cylindrical lens pairs, q-plates, fiber gratings, or couplers. There are also different ways to detect an OAM beam, such as using a converter that creates a conjugate helical phase or by using a plasmonic detector.

One of the benefits of OAM is that multiple coaxially propagating OAM beams with different l states provide additional data carriers, as they can be separated based only on the twisting wave front as described above. Hence, one of the critical techniques is the efficient multiplexing/demultiplexing of OAM beams of different l states, such that each carries an independent data channel and all beams can be transmitted and received using a single aperture pair. Several multiplexing and demultiplexing techniques have been demonstrated, including the use of an inverse helical phase hologram to convert the OAM into a Gaussian-like beam, a mode sorter such as that described by W. Hossack, et al. "Coordinate Transformation with Multiple Computer-generated Optical-element," J. Mod. Opt. 34, 1987, which is incorporated herein by reference in its entirety, free-space interferometers, a photonic integrated circuit, and q-plates. Some of these techniques are briefly described below.

Beam Splitter and Inverse Phase Hologram

Referring now to FIG. 172, a straightforward way of multiplexing different beams is to use cascaded beam splitters 17202. Each beam splitter 17202 can coaxially multiplex two beams that are properly aligned, and cascaded N beam splitters can multiplex N+1 independent OAM beams at most. Similarly, as shown in FIG. 173, at the receiver 17302, the multiplexed beams are divided into four copies at 17304. To demultiplex the data channel on one of the beams, a phase hologram with a spiral charge is applied to all the multiplexed beams using a demultiplexer 17306. As a result, the helical phase on the target beam is removed, and this beam will eventually evolve into a Gaussian-like beam. The Gaussian-like beam can be isolated from the other OAM beams, which still have helical phase fronts, by using a spatial mode filter 17308, e.g., a single-mode fiber (SMF) at the focal point of a lens will couple the power only of the Gaussian mode due to the mode-matching constraints. Accordingly, each of the multiplexed beams can be demultiplexed by changing the spiral phase hologram. Although the power loss incurred by the beam splitters and the spatial mode filter makes this method quite power inefficient, it was frequently used in the initial laboratory demonstrations of OAM multiplexing/demultiplexing due to its simplicity and reconfigurability provided by the programmable SLMs.

Optical Geometrical Transformation-Based Method

More power-efficient multiplexing and demultiplexing of OAM beams are achieved by using an OAM mode sorter as described in W. Hossack, et al. "Coordinate Transformation with Multiple Computer-generated Optical-element," J. Mod. Opt. 34, 1987; M. Lavery, et al. "Refractive Elements for the Measurement of the Orbital Angular Momentum of a Single Photon," Opt. Express 20, 2012; A. Wilner, et al. "Tunable Orbital Angular Mode Filter Based on Optical Geometric Transformation," Opt. Lett. 39, 2014 and S.

Ashrafi, et al. "Recent advances in high-capacity free-space optical and radio-frequency communications using orbital angular momentum multiplexing," *Royal Society Publishing, Phil. Trans. R. Soc.* A375:20150439, Oct. 13, 2016, each of which are incorporated herein by reference in their entirety.

This mode sorter usually comprises three optical elements, namely, a transformer, a corrector, and a lens, as shown in FIG. 174. The transformer performs a geometrical transformation of the input beam from log-polar coordinates to Cartesian coordinates, such that the position (x; y) in the input plane is mapped to a new position (u; v) in the output plane. The corrector compensates for phase errors and ensures that the transformed beam is collimated. Considering an input OAM beam with ring-shaped beam profile, it can be unfolded and mapped into a rectangular-shaped plane wave with a tilted phase front. Similarly, multiple OAM beams having different l states will be transformed into a series of plane waves, each with a different phase tilt. As shown in FIG. 175, a lens focuses these tilted plane waves into spatially separated spots in the focal plane such that all OAM beams are simultaneously demultiplexed. Since the transformation is reciprocal, the mode sorter can also be used in reverse to function as an OAM generator and multiplexer. A Gaussian beam array placed in the focal plane of the lens is converted into superimposed plane waves with different tilts. These beams then pass through the corrector and the transformer to produce properly multiplexed OAM beams as described in A. Wilner, et al. "Tunable Orbital Angular Mode Filter Based on Optical Geometric Transformation," *Opt. Lett.* 39, 2014, which is incorporated herein by reference.

Proof-of-Concept Link Demonstration

Initial demonstrations of using OAM multiplexing for optical communications include free-space links using a Gaussian beam and an OAM beam encoded with on-off keying data. The multiplexing/demultiplexing of four different OAM beams in a free-space data link has been demonstrated. Four monochromatic Gaussian beams each carrying an independent 50.8 Gbps (4×12.7 Gbps) 16-QAM signal were prepared from an IQ modulator and free-space collimators.

Combination qudits (not qubits: It is indeed possible to combine all these degrees of freedom to achieve a higher qudit of higher order radix as follows:

$$\begin{pmatrix} H \\ V \end{pmatrix} \otimes \begin{pmatrix} U \\ D \end{pmatrix} \otimes \begin{pmatrix} L_{+1} \\ L_{+2} \\ \vdots \\ L_{+5} \\ L_{-1} \\ L_{-2} \\ \vdots \\ L_{-5} \end{pmatrix} = \begin{pmatrix} HU \\ HD \\ VU \\ VD \end{pmatrix} \otimes \begin{pmatrix} L_{+1} \\ L_{+2} \\ \vdots \\ L_{+5} \\ L_{-1} \\ L_{-2} \\ \vdots \\ L_{-5} \end{pmatrix} = \begin{pmatrix} HUL_{+1} \\ HUL_{+2} \\ \vdots \\ \vdots \\ \vdots \\ VDL_{-5} \end{pmatrix}$$

Wavelength can be combined $\alpha |H\rangle |U\rangle \Pi |\lambda_i\rangle \Pi |l_+\rangle + \beta |V\rangle |D\rangle \Pi |\lambda_j\rangle \Pi |l_-\rangle$ and even combine time-bins with early and late or short and long $\alpha |H\rangle |U\rangle |S\rangle \Pi |\lambda_i\rangle \Pi |l_+\rangle + \beta |V\rangle |D\rangle |L\rangle \Pi |\lambda_j\rangle \Pi |l_-\rangle$ Google recently announced that they had achieved quantum supremacy with 53 qubits (base-2 binaries or radix-2), corresponding to a computational state-space of dimension 2⁵³ (about 10¹⁶). A similar computational dimension as Google can be achieved with a much lower number of qudits (not qubits) where each qudit is of a higher radix (greater than 2) using photonics system (i.e. 16 qudits with radix-10). If we compare to Google's quantum supremacy that was achieved with 53 qubits, we can see how many qudits can be used to cover the same computational state-space dimension using only 10 photons. It is possible to achieve quantum supremacy by using 10 photons with radix-40 which is possible to achieve based on the prescription above because ten-photon entanglement has already been achieved. The calculation is as follows:

$$2^{53} = x^{10}$$

$$53 \log_{10} 2 = 10 \log_{10} x$$

$$\log_{10} x = 1.595$$

$$x = 39.36 \; x \approx 40$$

Thus, as generally illustrated in FIG. 205, multiple photons 20502 processed in a manner to provide greater than two states 2504 using any number of the above techniques such as applying orthogonal signals thereto enable the creation of hyperentangled photons 2506 that provide quantum supremacy using a lesser number of photons that previously implemented quantum techniques or classical computing techniques.

A New Performance Measure for Quantum Computing

Recent quantum computing has been entirely about how many qubits one can achieve. If one achieves 53 qubits, then you can claim quantum supremacy. However, efforts now focused on managing systems with several tens of qubits such as those described in "IBM Q Experience," https://quantumexperience.ng.bluemix.net/qx/experience, Last Accessed: 2018-11; N. Friis, O. Marty, C. Maier, C. Hempel, M. Holzapfel, P. Jurcevic, M. Plenio, M. Huber, C. Roos, R. Blatt, and B. Lanyon, Phys. Rev. X 8, 021012 (2018); C. Song, K. Xu, W. Liu, C. ping Yang, S.-B. Zheng, H. Deng, Q. Xie, K. Huang, Q. Guo, L. Zhang, P. Zhang, D. Xu, D. Zheng, X. Zhu, H. Wang, Y.-A. Chen, C.-Y. Lu, S. Han, and J.-W. Pan, Phys. Rev. Lett. 119, 180511 (2017), each of which are incorporated herein by reference in their entirety. In such noisy environment of intermediate-scale quantum (NISQ) systems as shown in J. Preskill, Quantum 2 (2018) which is incorporated herein by reference in its entirety, performance of gates could not predict the behavior of the system. Methods such as randomized benchmarking as described in E. Magesan, J. M. Gambetta, and J. Emerson, Physical Review A 85, 042311 (2012) which is incorporated herein by reference in its entirety, state and process tomography as described in M. G. A. Paris and J. Reha'cek, eds., Quantum State Estimation, Lecture Notes in Physics (Springer-Verlag, Berlin Heidelberg, 1714) which is incorporated herein by reference in it entirety, and gateset tomography as described in S. T. Merkel, J. M. Gambetta, J. A. Smolin, S. Poletto, A. D. C'orcoles, B. R. Johnson, C. A. Ryan, and M. Stef-fen, Physical Review A 87, 062119 (2013); R. Blume-Kohout, J. K. Gamble, E. Nielsen, K. Rudinger which is incorporated herein by reference in its entirety, can be used for measuring the performance of operations on a few qubits, yet they neglect to account for errors from interactions with qubits as described in J. Mizrahi, K. Fortier, and P. Maunz, Nature Communications 8, 14485 (2017) and M. Takita, A. W. Cross, A. D. Corcoles, J. M. Chow, and J. M. Gambetta, Phys. Rev. Lett. 119, 180501 (2017) each of which are incorporated herein by reference in their entirety. Given a system like this, where individual gate operations have been independently adjusted and verified, it is not easy to measure the degree to which the system performs as a general-purpose universal quantum computer. Here a new performance measure is introduced which is different than IBM's quantum volume.

The performance measure provides a new measure for quantum performance. This new measure is also strongly linked to gate error rates and is affected by underlying qubit connectivity and gate parallelism. It can also be improved by achieving the limit of large numbers of controlled, highly coherent, connected, and generically programmable qubits are manipulated within a circuit. As shown in FIG. 206, this new measure has to do with computational state-space of dimension 20602, high-fidelity operations 20604, high connectivity 20606, large calibrated gate sets 20608, and circuit rewriting toolchains 20610 and not just the number of qubits. This new measure determined based on these factors is called quantum capacity 20612 and is a practical way to measure and compare progress toward improved system structure of a universal quantum computer. Note that it is possible to achieve the same computational state-space using higher number of qubits or lower number of qubits with higher radix. For example, it is possible to achieve the same 53 qubit computational state-space dimension by using only 10 photons of radix-40 and 10-photon entanglement has already been achieved.

The approach presented herein can achieve a convergence of an advanced FSO system for communications, QKD, quantum computing and quantum teleportation with qudits that can perform beyond what was achieved with the Chinese Micius quantum satellite. Based on what has already been achieved by other system, its novel system can initially deliver a low cost 10 Gbps FSO link scalable to 100 Gbps without using OAM methods. Since other system uses Gaussian beams to deliver such throughputs, it is possible to increase the throughput using the above described system's leveraging of OAM muxing and demuxing as a new dimension to increase link throughput. The combination of existing and the described systems can potentially increase system throughput from an initial 4× with 4 OAM modes, 8× with 4 OAM modes and 2 polarizations states, to 24× with 12 OAM modes and 2 polarization states reaching an output of 2.4 Tbps using a single optical frequency.

It will be appreciated by those skilled in the art having the benefit of this disclosure that this multi-photon, multi-dimensional hyper-entanglement using higher-order radix qudits with applications to quantum computing, quantum key distribution and quantum teleportation provides an improved manner for implementing quantum processing that utilizes less photons and provides faster computational results than previous techniques. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A system comprising:
   a light source for generating a first light beam, wherein the first light beam is modulated by a data stream;
   entanglement circuitry for receiving the first light beam from the light source and generating at least two second light beams responsive to the first light beam, wherein the at least two second light beams are entangled; and
   multistate photon processing circuitry for processing the at least two second light beams to apply n-states to photons within the at least two second light beams and create hyperentangled qudits, where n is greater than 4, wherein the multistate photon processing circuitry further comprises:
      spin angular momentum (SAM) processing circuitry for applying polarization to the photons of the at least two second light beams;
      orbital angular momentum (OAM) processing circuitry for applying orbital angular momentum to the at least two second light beams;
      spatial mode processing circuitry for applying one of two spatial modes to the photons of the at least two second light beams; and
      wherein a processing of each of the photons of the at least two second light beams by a combination of each of the SAM processing circuitry, the OAM processing circuitry and the spatial mode processing circuitry creates and applies the n-states to the photons of the at least two second light beams to create the hyperentangled qudits.

2. The system of claim 1, wherein the n-states photons represents qudits, each qudit having a radix greater than 2.

3. The system of claim 1, wherein the orbital angular momentum processing circuitry applies a separate orbital angular momentum (OAM) mode to the at least two second light beams for each of the n-states.

4. The system of claim 3 further comprising a multi-dimensional quantum key distribution system for receiving the hyperentangled qudits from the multistate photon processing circuitry and generating a quantum key responsive thereto.

5. The system of claim 1, wherein the light source comprises a laser.

6. The system of claim 1 further comprising a generalized Chrestenson gate for processing the hyperentangled qudits to provide maximally superpositioned qudits.

7. The system of claim 1, wherein the n-state photons have a weak interaction with environmental factors causing signal interference.

8. The system of claim 1, wherein an output of the multistate photon processing circuitry interacts with matter as part of a deterministic gate.

9. The system of claim 8, wherein the matter comprises graphene.

10. The system of claim 1, wherein the spin angular momentum processing circuitry is implemented using a metamaterial having a dielectric metasurface.

11. The system of claim 1, wherein the multistate photon processing circuitry further comprises at least one q-plate based on a liquid crystal for providing SAM-OAM hyper entanglement.

12. The system of claim 1, wherein the entanglement circuitry and the multistate photon processing circuitry are implemented using a Geometric Phase Metasurface (GPM).

13. The system of claim 12, wherein the Geometric Phase Metasurface adds or subtracts one quanta of OAM depending on sign of spin angular momentum applied to the at least two second light beam.

14. The system of claim 1, wherein the multistate photon processing circuitry applies n-states from the group consisting of multi-dimensional Bell states and GHZ states using qudits.

15. The system of claim 1, wherein the multistate photon processing circuitry further comprises each of:
   time-bin processing circuitry for applying a time shift greater than a coherence time to the photons of the at least two second light beams;
   frequency/wavelength processing circuitry for applying a different frequency or wavelength to the photons of the at least two second light beams; and
   wherein the additional processing of each of the photons of the at least two second light beams by a combination of each of the time-bin processing circuitry and the frequency/wavelength processing circuitry further creates and applies the n-states to each of the photons of the at least two second light beams to create the hyperentangled qudits.

16. A method for generating at least two hyperentangled light beams, comprising:
   generating a first light beam using a light source, wherein the first light beam is modulated by a data stream;
   receiving at entanglement circuitry the first light beam from the light source;
   generating at least two second light beams responsive to the first light beam, wherein the at least two second light beams are entangled; and
   processing the at least two second light beams using multistate photon processing circuitry to apply n-states to photons within the at least two second light beams, where n is greater than 4, wherein the step of processing further comprises:
      applying polarization to the photons of the at least two second light beams using spin angular momentum (SAM) processing circuitry;
      applying orbital angular momentum to the at least two second light beams using orbital angular momentum (OAM) processing circuitry;
      applying one of two spatial modes to the photons of the at least two second light beams using spatial mode processing circuitry; and
      wherein application of a combination of each of the polarization, the orbital angular momentum and the one of two spatial modes to each of the photons of the at least two second light beams creates and applies the n-states to each of the photons of the at least two second light beams to create hyperentangled qudits.

17. The method of claim 16, wherein the n-states photons represents qudits, each qudit having a radix greater than 2.

18. The method of claim 16, wherein the step of applying orbital angular momentum further comprises applying a separate orbital angular momentum (OAM) mode to the at least two second light beams for each of the n-states using the orbital angular momentum processing circuitry.

19. The method of claim 18 further comprising:
   receiving the hyperentangled qudits from the multistate photon processing circuitry at a multi-dimensional quantum key distribution system; and
   generating a quantum key responsive to the hyperentangled qudits.

20. The method of claim 16, wherein the light source comprises a laser.

21. The method of claim 16 further comprising processing the hyperentangled qudits to provide maximally superpositioned qudits using a generalized Chrestenson gate.

22. The method of claim 16, wherein the step of processing further comprises applying n-state photons having a weak interaction with environmental factors causing signal interference.

23. The method of claim 16 further comprising the step of applying an output of the multistate photon processing circuitry to a deterministic gate to interact with matter therein.

24. The method of claim 23, wherein the step of applying the output of the multistate photon processing circuitry to a deterministic gate to interact with graphene therein.

25. The method of claim 16, wherein the step of applying the spin angular momentum further comprises applying spin orbital angular momentum using a metamaterial having a dielectric metasurface.

26. The method of claim 16, further comprising providing SAM-OAM hyper entanglement using at least one q-plate based on a liquid crystal.

27. The method of claim 16, wherein the step of applying orbital angular momentum further comprises:
   adding one quanta of OAM responsive to a first sign of spin angular momentum applied to the at least two second light beam using a Geometric Phase Metasurface; and
   subtracting one quanta of OAM responsive to a second sign of spin angular momentum applied to the at least two second light beam using the Geometric Phase Metasurface.

28. The method of claim 16, wherein the step of processing further comprises processing the at least two second light beams to apply n-states from the group consisting of multi-dimensional Bell states and GHZ states using qudits.

29. The method of claim 16, wherein the step of processing further comprises each of:
   applying a time shift greater than a coherence time to the photons of the at least two second light beams using time-bin processing circuitry; and
   applying a different frequency or wavelength to the photons of the at least two second light beams using frequency/wavelength processing circuitry
   wherein the additional application of a combination of greater time shift than the coherence time and the different frequency or wavelength further creates and applies the n-states to each of the photons of the at least two second light beams to create the hyperentangled qudits.

30. A system comprising:
   a light source for generating a first light beam, wherein the first light beam is modulated by a data stream;
   entanglement circuitry for receiving the first light beam from the light source and generating at least two second light beams responsive to the first light beam, wherein the at least two second light beams are entangled; and
   multistate photon processing circuitry for processing the at least two second light beams to apply n-states to photons within the at least two second light beams and create hyperentangled qudits, where n is greater than 4, wherein the multistate photon processing circuitry further comprises:
      spin angular momentum (SAM) processing circuitry for applying polarization to the photons of the at least two second light beams;

orbital angular momentum (OAM) processing circuitry for applying orbital angular momentum to the at least two second light beams;

wherein the multistate photon processing circuitry further comprises at least one circuitry from the group consisting of:

spatial mode processing circuitry for applying one of two spatial modes to the photons of the at least two second light beams;

frequency/wavelength processing circuitry for applying a different frequency or wavelength to the photons of the at least two second light beams; and wherein processing of each of the photons of the at least two second light beams by a combination of each of the SAM processing circuitry, the OAM processing circuitry and at least one of the spatial mode processing circuitry and the frequency/wavelength processing circuitry creates and applies the n-states to the photons of the at least two second light beams to create the hyperentangled qudits.

* * * * *